United States Patent
Good et al.

(10) Patent No.: US 6,705,528 B2
(45) Date of Patent: *Mar. 16, 2004

(54) AUTOMATED SYSTEM AND METHOD FOR IDENTIFYING AND MEASURING PACKAGES TRANSPORTED THROUGH A LASER SCANNING TUNNEL

(75) Inventors: Timothy A. Good, Balckwood, NJ (US); Xiaoxun Zhu, Marlton, NJ (US); David M. Wilz, Sr., Sewell, NJ (US); George B. Rockstein, Audubon, NJ (US); Stephen J. Colavito, Brookhaven, PA (US); Robert E. Blake, Woodbury Heights, NJ (US); Ka Man Au, Philadelphia, PA (US); Sankar Ghosh, Glenolden, PA (US); George Kolis, Pennsauken, NJ (US); Ian A. Scott, Haddonfield, NJ (US); Andrew D. Dehennis, Cheltenham, PA (US); Thomas Amundsen, Turnersville, NJ (US); LeRoy Dickson, Leeds, UT (US); Carl Harry Knowles, Moorestown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/079,138

(22) Filed: Feb. 19, 2002

(65) Prior Publication Data

US 2002/0179716 A1 Dec. 5, 2002

Related U.S. Application Data

(63) Continuation of application No. 09/274,265, filed on Mar. 22, 1999, now Pat. No. 6,382,515, which is a continuation-in-part of application No. 09/243,078, filed on Feb. 2, 1999, now Pat. No. 6,354,505, and a continuation-in-part of application No. 09/241,930, filed on Feb. 2, 1999, now Pat. No. 6,422,467, and a continuation-in-part of application No. 09/157,778, filed on Sep. 21, 1998, and a continuation-in-part of application No. 09/047,146, filed on Mar. 24, 1998, now Pat. No. 6,360,947, and a continuation-in-part of application No. 08/949,915, filed on Oct. 14, 1997, now Pat. No. 6,158,659, and a continuation-in-part of application No. 08/854,832, filed on May 12, 1997, now Pat. No. 6,085,978, and a continuation-in-part of application No. 08/886,806, filed on Apr. 22, 1997, now Pat. No. 5,984,185, and a continuation-in-part of application No. 08/726,522, filed on Oct. 7, 1996, now Pat. No. 6,073,846, and a continuation-in-part of application No. 08/573,949, filed on Dec. 18, 1995, now abandoned.

(51) Int. Cl.$^7$ .................................................. G06K 7/10
(52) U.S. Cl. ............................. 235/472.01; 235/462.01
(58) Field of Search .................................... 235/472.01

(56) References Cited

U.S. PATENT DOCUMENTS 4,333,006 A    6/1982   Gorin et al.

(List continued on next page.)

FOREIGN PATENT DOCUMENTS

| GB | 2 189 594 A | 10/1987 | |
|---|---|---|---|
| WO | WO 97/22082 | 6/1997 | ............ G06K/7/10 |

OTHER PUBLICATIONS

Scientific Publication entitled "Accu–Sort—Tunnel Scanning System" by Accu–sort Systems, Inc. (www.accusort.com/mktg/as01.html, 1999, p. 1–2).

(List continued on next page.)

Primary Examiner—Thien M. Le
Assistant Examiner—Daniel A. Hess
(74) Attorney, Agent, or Firm—Thomas J. Perkowski, Esq., P.C.

(57) ABSTRACT

A fully automated package identification and measuring system, in which an omni-directional holographic scanning tunnel is used to read bar codes on packages entering the tunnel, while a package dimensioning subsystem is used to capture information about the package prior to entry into the tunnel. Mathematical models are created on a real-time basis for the geometry of the package and the position of the laser scanning beam used to read the bar code symbol thereon. The mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

11 Claims, 160 Drawing Sheets

U.S. PATENT DOCUMENTS

| | | | |
|---|---|---|---|
| 4,580,894 A | 4/1986 | Wojeik | |
| 5,080,456 A | 1/1992 | Katz et al. | |
| 5,331,118 A | 7/1994 | Jensen | |
| 5,495,097 A | 2/1996 | Katz et al. | |
| 5,547,034 A | 8/1996 | Wurz et al. | |
| 5,555,090 A | * 9/1996 | Schmutz | 356/601 |
| 5,633,487 A | 5/1997 | Schmutz et al. | |
| 5,656,799 A | 8/1997 | Ramsden et al. | |
| 5,661,561 A | 8/1997 | Wurz et al. | |
| 5,689,092 A | 11/1997 | Wurz et al. | |
| 5,699,161 A | 12/1997 | Woodworth | |
| 5,737,438 A | 4/1998 | Zlotnick | |
| 5,814,802 A | 9/1998 | Hecht et al. | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,969,823 A | 10/1999 | Wurz et al. | |
| 5,979,760 A | 11/1999 | Freyman et al. | |
| 5,984,186 A | 11/1999 | Tafoya | |
| 5,991,041 A | 11/1999 | Woodworth | |
| 6,053,409 A | 4/2000 | Brobst et al. | |
| 6,123,264 A | 9/2000 | Li et al. | |
| 6,147,358 A | 11/2000 | Hecht | |

OTHER PUBLICATIONS

Scientific Publication entitled "Dimensioning the Right Way: Reliably" by , Cargoscan, 1998, (p. 1–16).

Product Brochure for Accu–Sort Systems, Inc. MINI–X, (1998, p. 1–3).

Scientitif Publication entitled "OMNI–SCAN Tunnel" by Metrolgic Instruments, Inc., (1997, p. 1–16).

International Search Report for PCT/US00/15624, 2000.

International Search Report for PCT/US99/06505, 1999.

* cited by examiner

TUNNEL SCANNER POSITIONING DATA:

| SCANNER: | ROTATION ANGLES (degrees): | | | POSITION COORDINATES (inches): | | |
|---|---|---|---|---|---|---|
| | YAW | RITCH | ROLL | X | Y | Z |
| TOP/FRONT | 0 | 80 | 0 | 1 | 73 | -10 |
| TOP/BACK | 0 | 100 | 0 | -1 | 66 | 10 |
| FRONT | 0 | 40 | 0 | 0 | 57 | -40 |
| BACK | 0 | 130 | 0 | 0 | 57 | 40 |
| RIGHT SIDE/FRONT | 60 | 0 | 90 | -45 | 18 | -12 |
| RIGHT SIDE/BACK | 120 | 0 | 90 | -45 | 18 | 12 |
| LEFT SIDE/FRONT | -60 | 0 | 90 | 45 | 18 | -12 |
| LEFT SIDE/BACK | -120 | 0 | 90 | 45 | 18 | 12 |
| L/F CORNER #1 | -30 | 15 | -7 | 29 | 18 | -80 |
| L/F CORNER #2 | -30 | 15 | -7 | 40 | 18 | -69 |
| L/B CORNER #1 | -150 | 15 | 7 | 29 | 18 | 80 |
| L/B CORNER #2 | -150 | 15 | 7 | 40 | 18 | 68 |
| R/F CORNER #1 | 30 | 15 | 7 | -29 | 18 | -80 |
| R/F CORNER #2 | 30 | 15 | 7 | -40 | 18 | -59 |
| R/B CORNER #1 | 150 | 15 | -7 | -29 | 18 | 80 |
| R/B CORNER #2 | 150 | 15 | -7 | -40 | 18 | 68 |

ROTATION OCCURS IN THE ORDER GIVEN: YAW, PITCH, ROLL
POSITIVE YAW IS FROM R-AXIS TO P-AXIS
POSITIVE PITCH IS FROM Y-AXIS TO R-AXIS
POSITIVE ROLL IS FROM P-AXIS TO Y-AXIS

POSITION COORDINATES ARE OF THE CENTER OF THE DISC WITHIN THE FIXED (X,Y,Z) SYSTEM

FIG. 2C

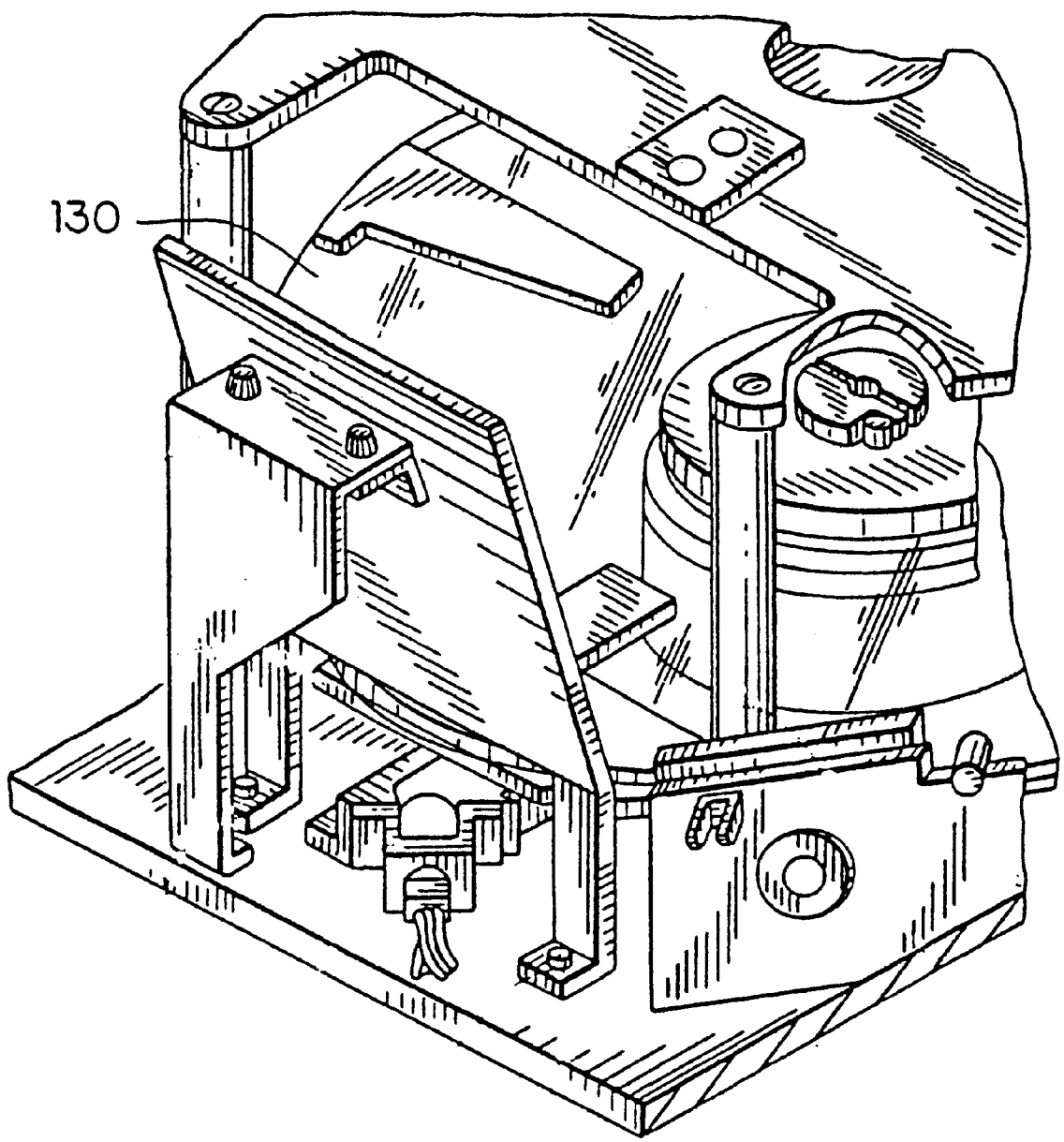
FIG. 3A1

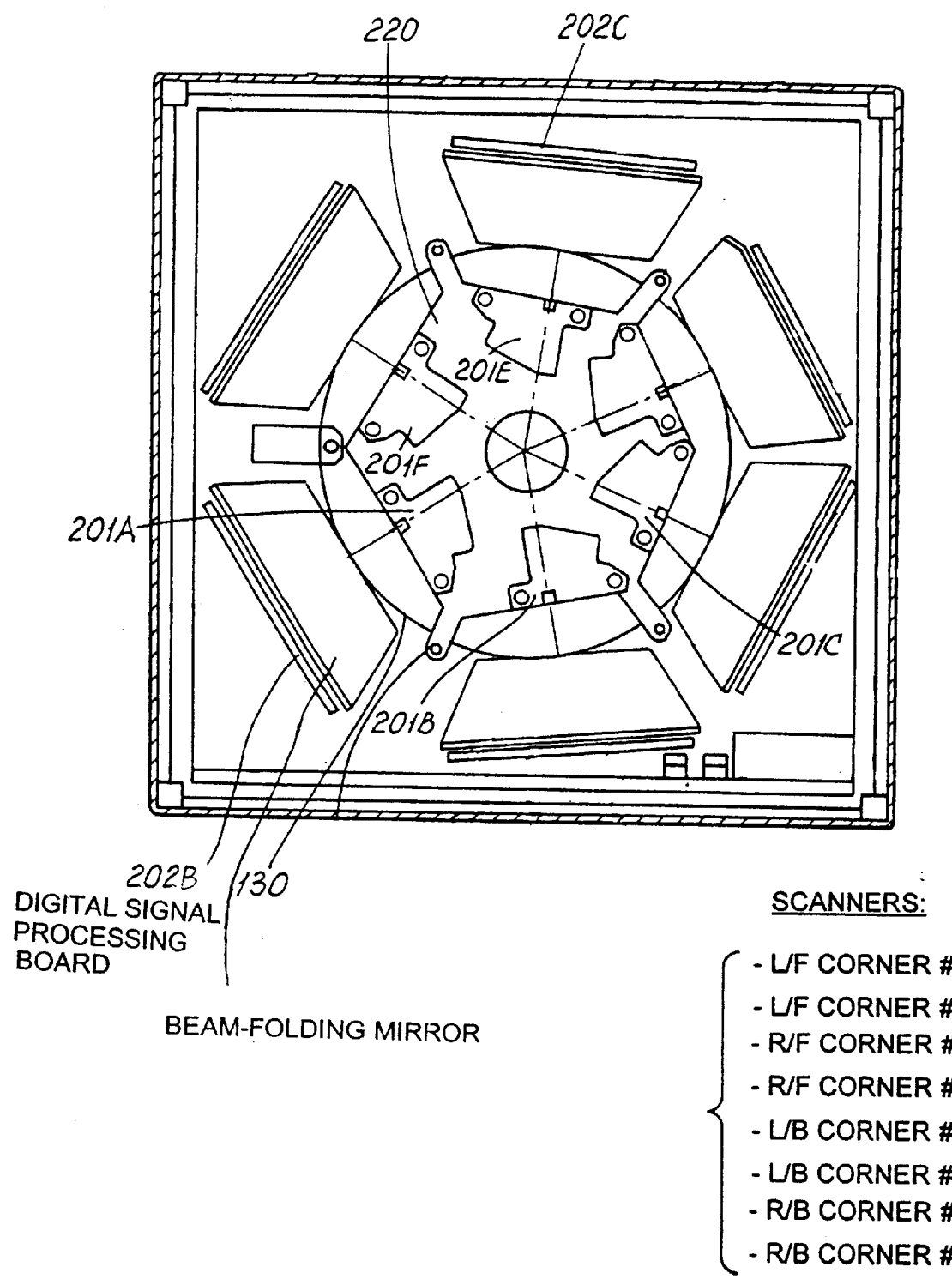
FIG. 3A2

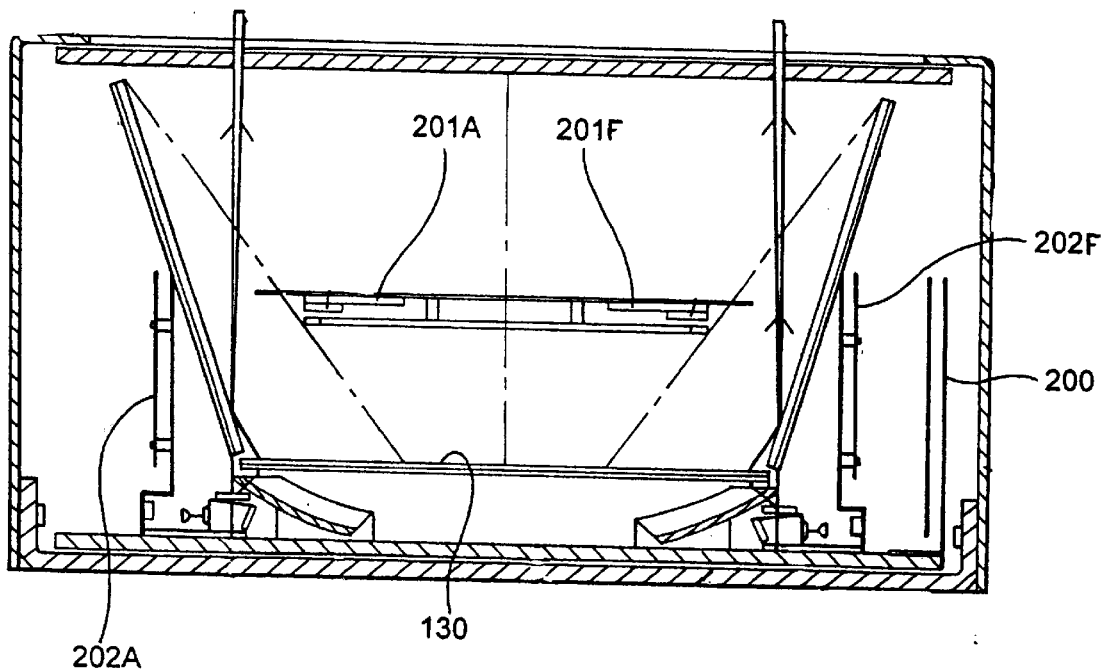
FIG. 3A3

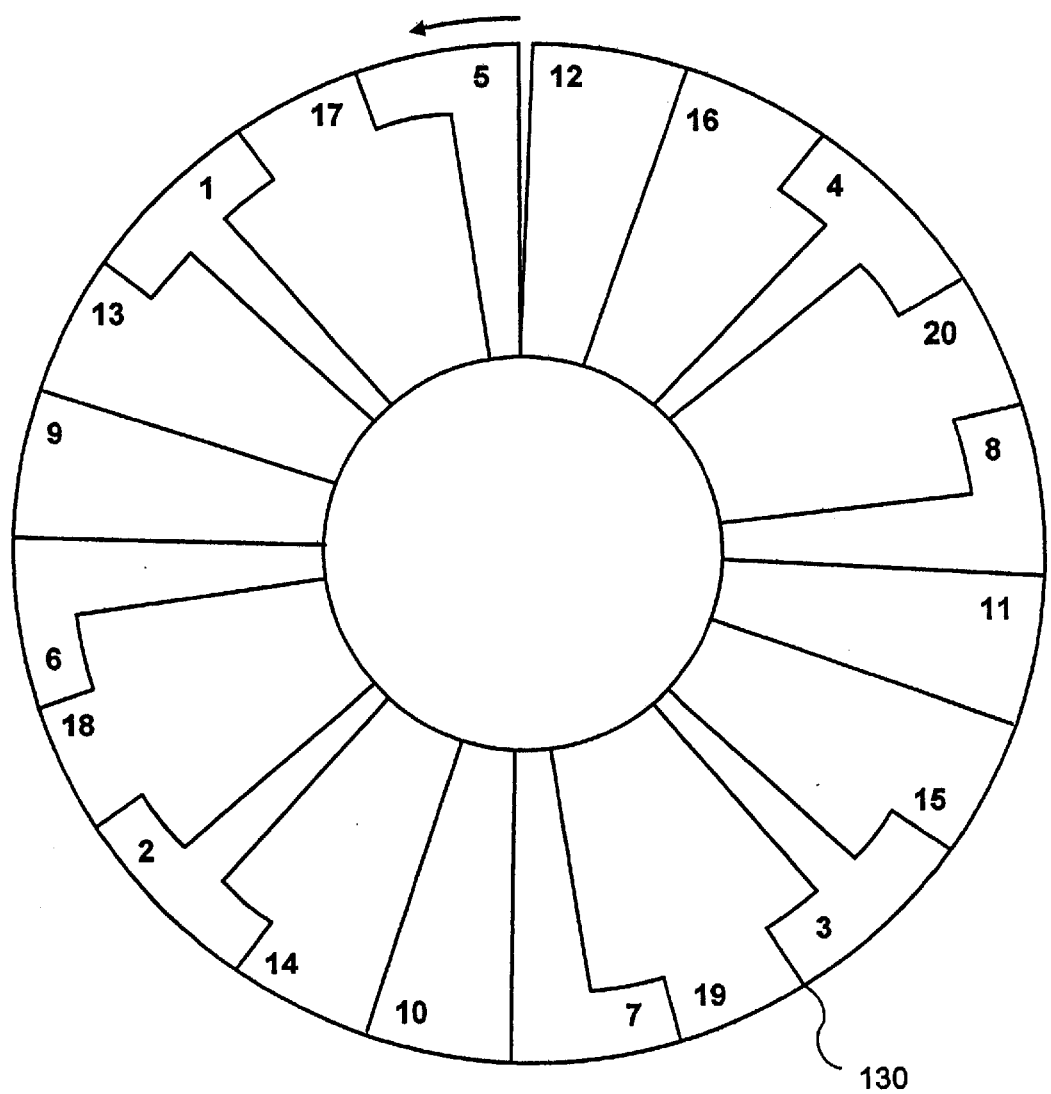
F I G. 3A4

| ROTATIONAL SPEED OF DISK (rpm) | | | | | |
|---|---|---|---|---|---|
| X-SCAN 4 LINES/ 5 FOCAL PLANES (8.66 disk) DISK 4-6fp-8.66DISK xts LDD 1/21/98 WAVELENGTH: | | | | | |
| FACET | DIFFRACTION FOCAL LENGTH (inches) | GEOMETRICAL FOCAL LENGTH (inches) | ANGLE A (degrees) | ANGLE B (degrees) | ANGLE OF DIFFRACTION (degrees) |
| 1 | 39.00 | 39.07 | 45.9 | 57.40 | 32.60 |
| 2 | 39.00 | 39.07 | 45.9 | 57.40 | 32.60 |
| 3 | 39.00 | 39.07 | 45.9 | 57.40 | 32.60 |
| 4 | 39.00 | 39.07 | 45.9 | 57.40 | 32.60 |
| 5 | 45.01 | 45.11 | 45.9 | 57.00 | 33.00 |
| 6 | 45.01 | 45.11 | 45.9 | 57.00 | 33.00 |
| 7 | 45.01 | 45.11 | 45.9 | 57.00 | 33.00 |
| 8 | 45.01 | 45.11 | 45.9 | 57.00 | 33.00 |
| 9 | 51.51 | 51.66 | 45.9 | 56.67 | 33.33 |
| 10 | 51.51 | 51.66 | 45.9 | 56.67 | 33.33 |
| 11 | 51.51 | 51.66 | 45.9 | 56.67 | 33.33 |
| 12 | 51.51 | 51.66 | 45.9 | 56.67 | 33.33 |
| 13 | 58.32 | 58.64 | 45.9 | 56.40 | 33.60 |
| 14 | 58.32 | 58.64 | 45.9 | 56.40 | 33.60 |
| 15 | 58.32 | 58.64 | 45.9 | 56.40 | 33.60 |
| 16 | 58.32 | 58.64 | 45.9 | 56.40 | 33.60 |
| 17 | 64.93 | 65.24 | 45.9 | 56.19 | 33.81 |
| 18 | 64.93 | 65.24 | 45.9 | 56.19 | 33.81 |
| 19 | 64.93 | 65.24 | 45.9 | 56.19 | 33.81 |
| 20 | 64.93 | 65.24 | 45.9 | 56.19 | 33.81 |
| 21 | | | | | |
| 22 | | | | | |
| 23 | | | | | |
| . | | | | | |
| . | | | | | |
| . | | | | | |
| 37 | | | | | |
| 38 | | | | | |
| 39 | | | | | |
| 40 | | | | | |
| AVERAGE ANGLE B(degrees): | | | | 56.73 | |
| APPROXIMATE MINIMUM BOX WIDTH: 12.57 inches (BASED ON LARGE MIRROR AS LIMITATION) | | | | | |

FIG. 3A5A

| | 6000 | | | |
|---|---|---|---|---|
| | 685 mm | | | ACCOUNTING FOR DEAD TIME FOR LASER BEAM 2.59 (degrees) |
| ANGLE OF BEAM FROM VERTICAL (degrees) | SCAN ANGLE (degrees) | SCAN MULT. FACTOR(m) | ROTATION ANGLE (degrees) | |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| | AVERAGE: | 1.33 | | |
| SUMS | 407.01 | | 307.00 | 358.88 |
| TOTAL FACET ANGULAR SWEEP (degrees): | | | | 358.88 |

FIG. 3A5B

| LIGHT COLLECTION FACTOR | MAXIMUM COLLECTION AREA (IGNORING NOTCH) (sq. in) | DESIGN COLLECTION AREA (INCLUDES NOTCH LOSS OF 0.15) (sq. inches) | BEAM SPEED AT CENTER OF SCAN LINE (inches/sec) | BEAM SPEED AT MAX DEPTH OF FIELD (inches/sec) | BEAM SPEED AT MIN DEPTH OF FIELD (inches/sec) |
|---|---|---|---|---|---|
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| | | | | | |
| 37.18 | 48.34 | 46.34 | | SUMS | |
| | | Vmax (in/s): | 56908 | | |
| | | Vmin (in/s): | 29409 | | |
| | | RATIO | 1.34 | | |

FIG. 3A5C

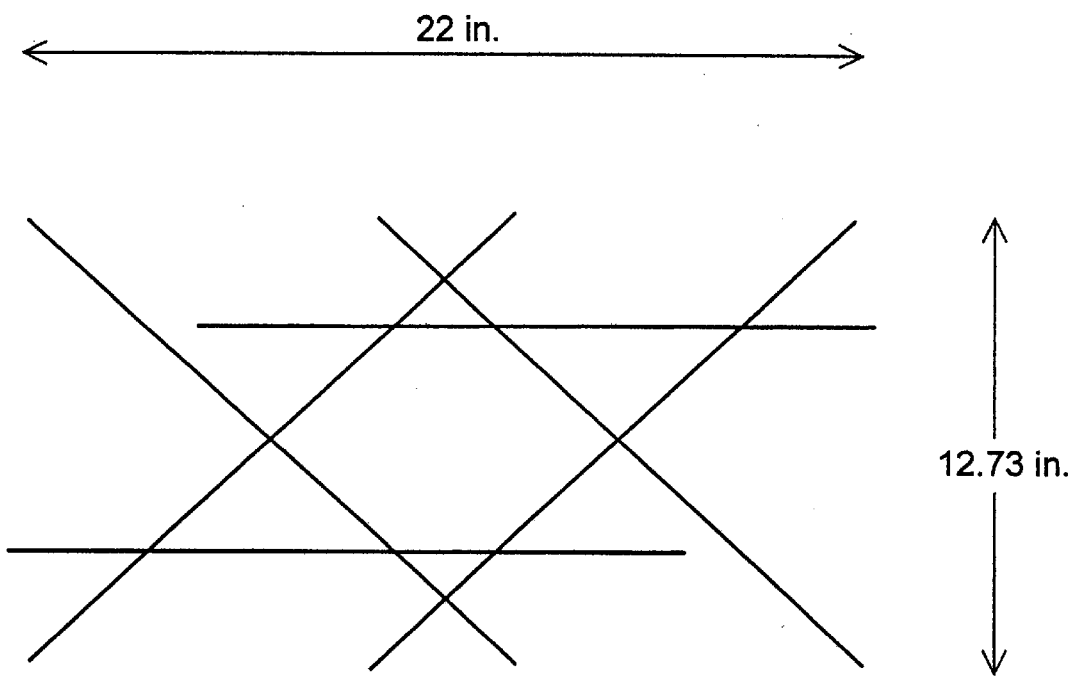
FIG. 3A6

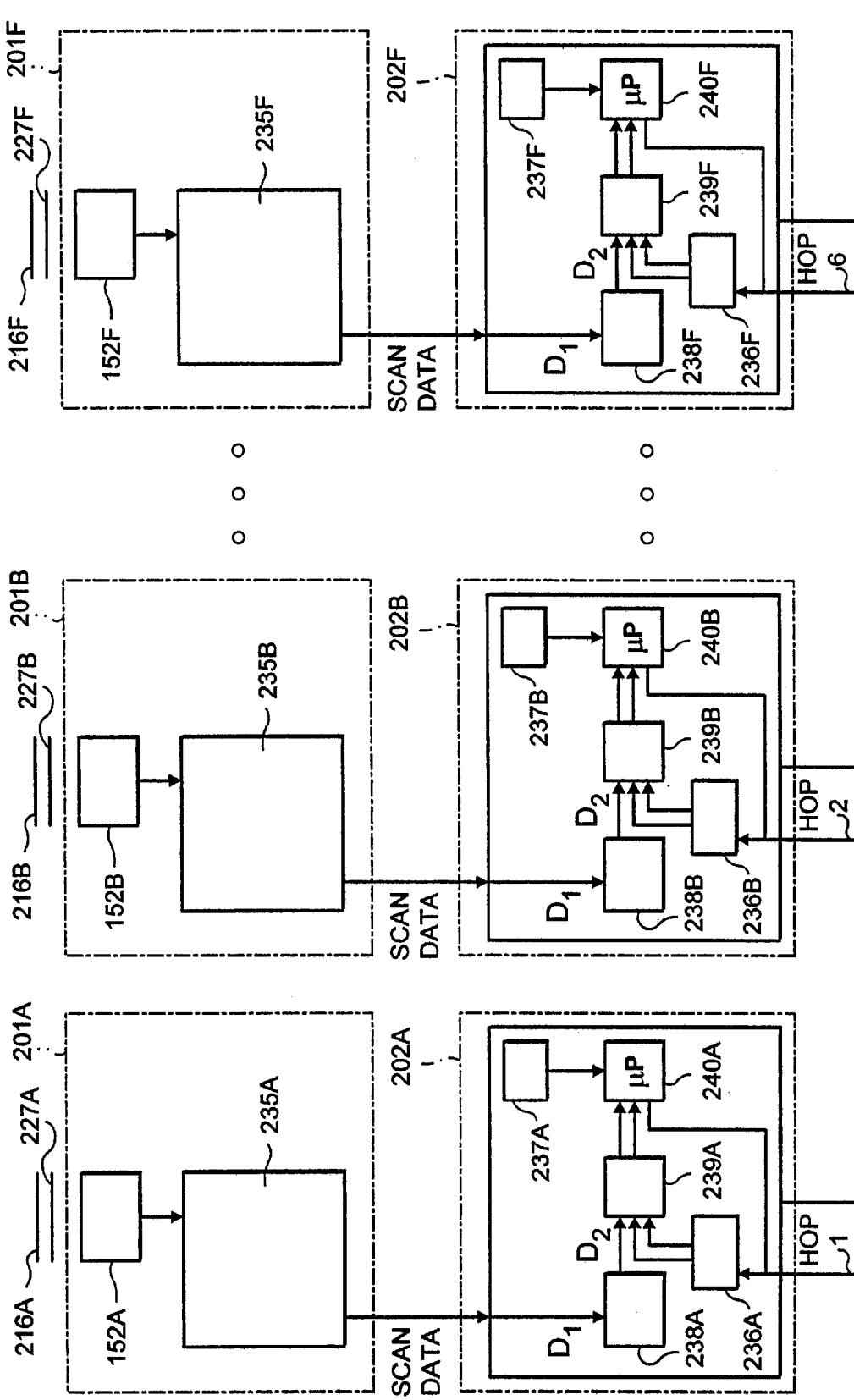
FIG. 3A7A

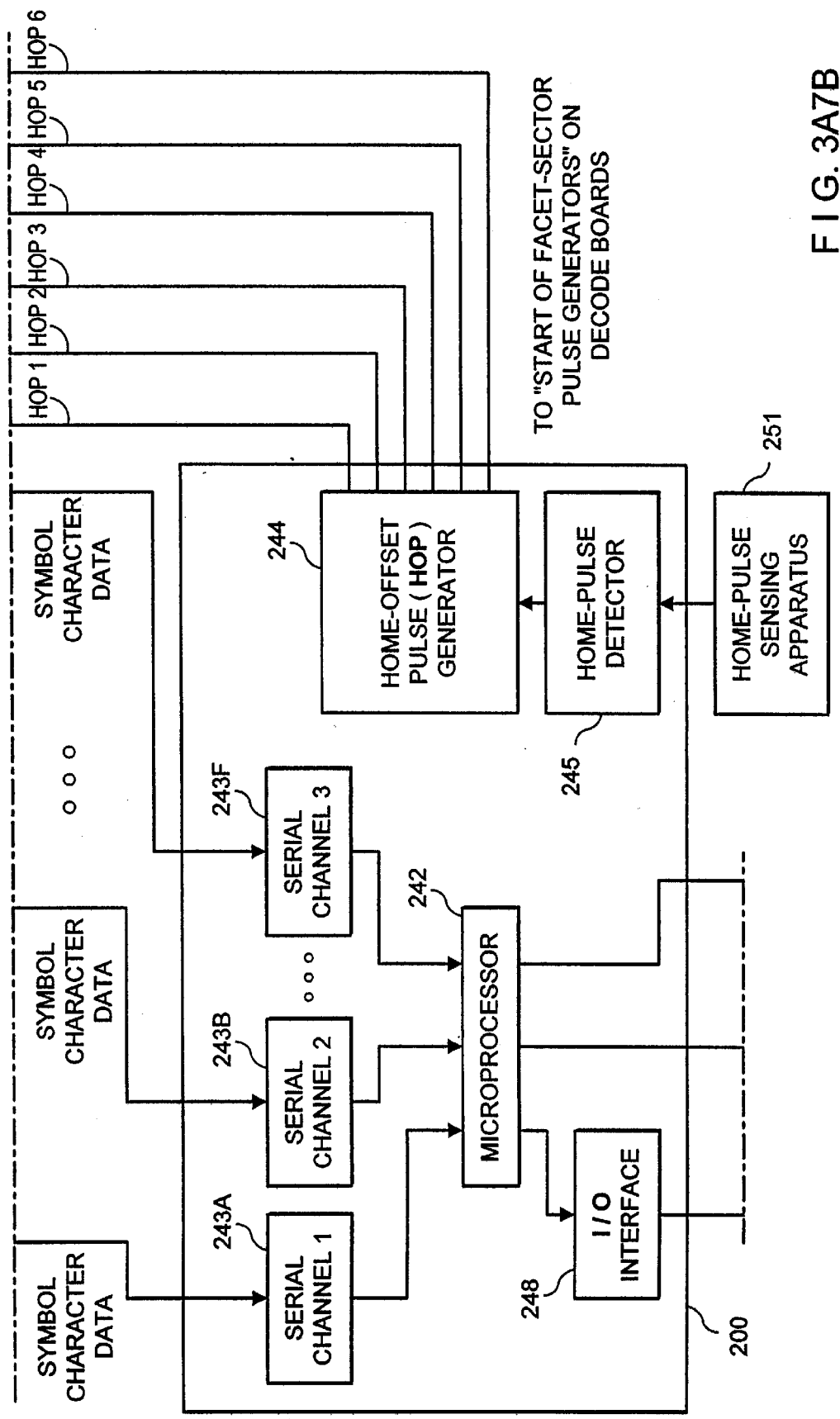
FIG. 3A7B

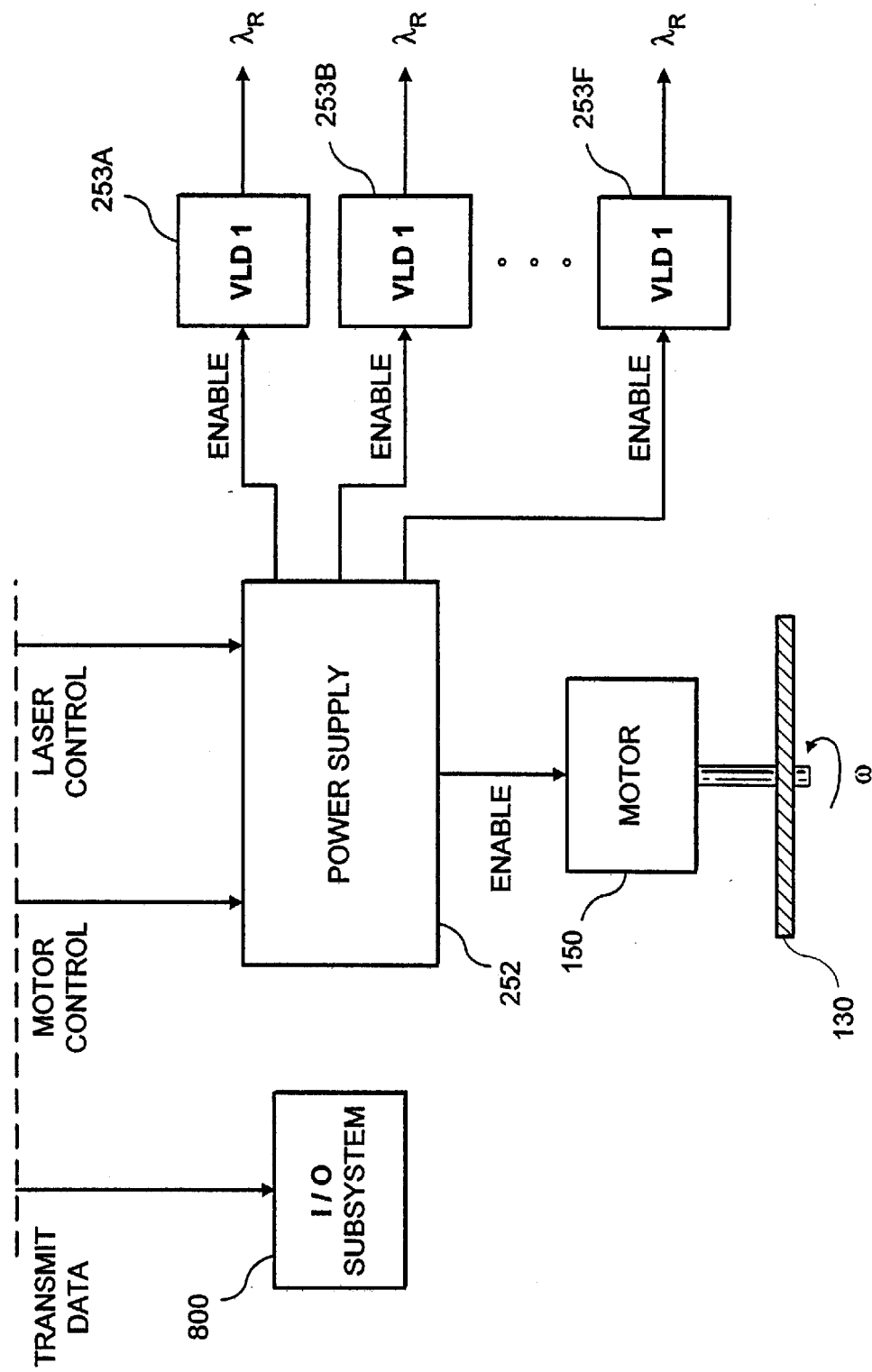

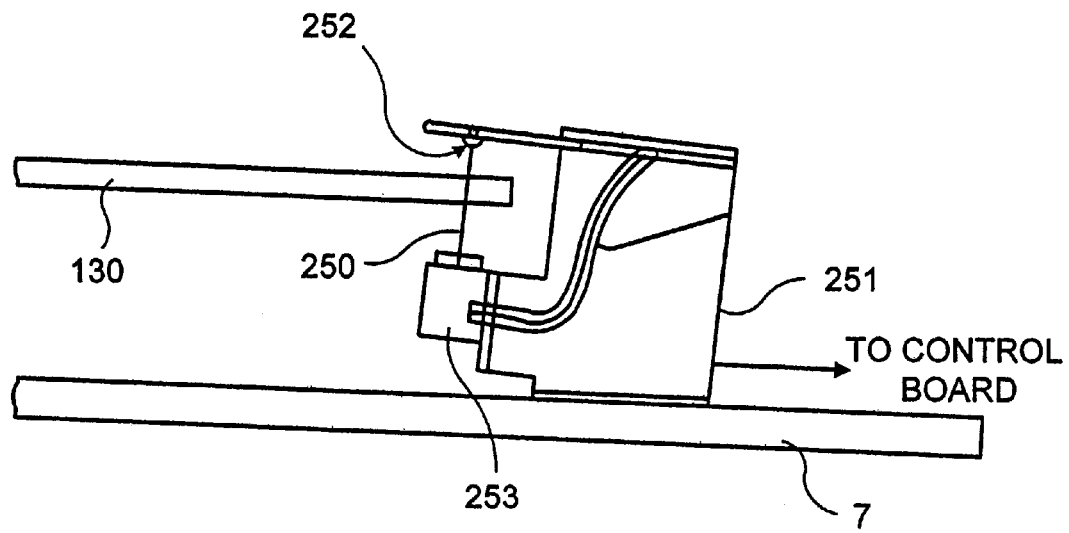
FIG. 3A8A
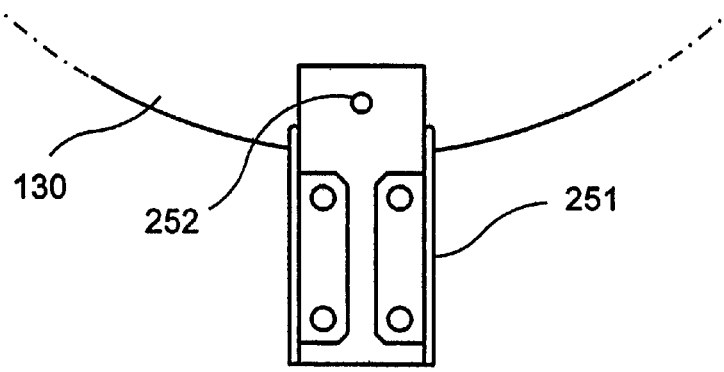
FIG. 3A8B

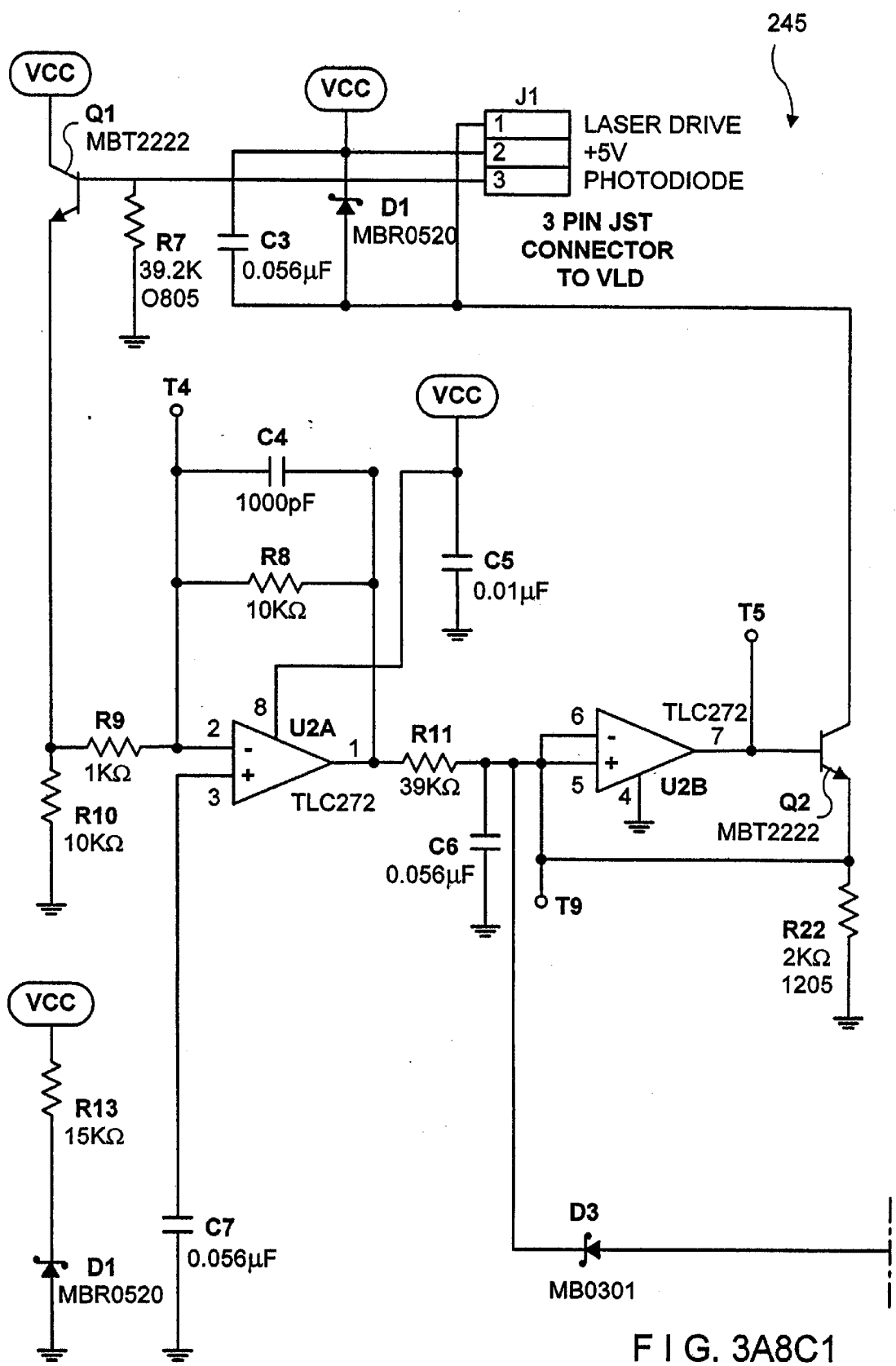
FIG. 3A8C1

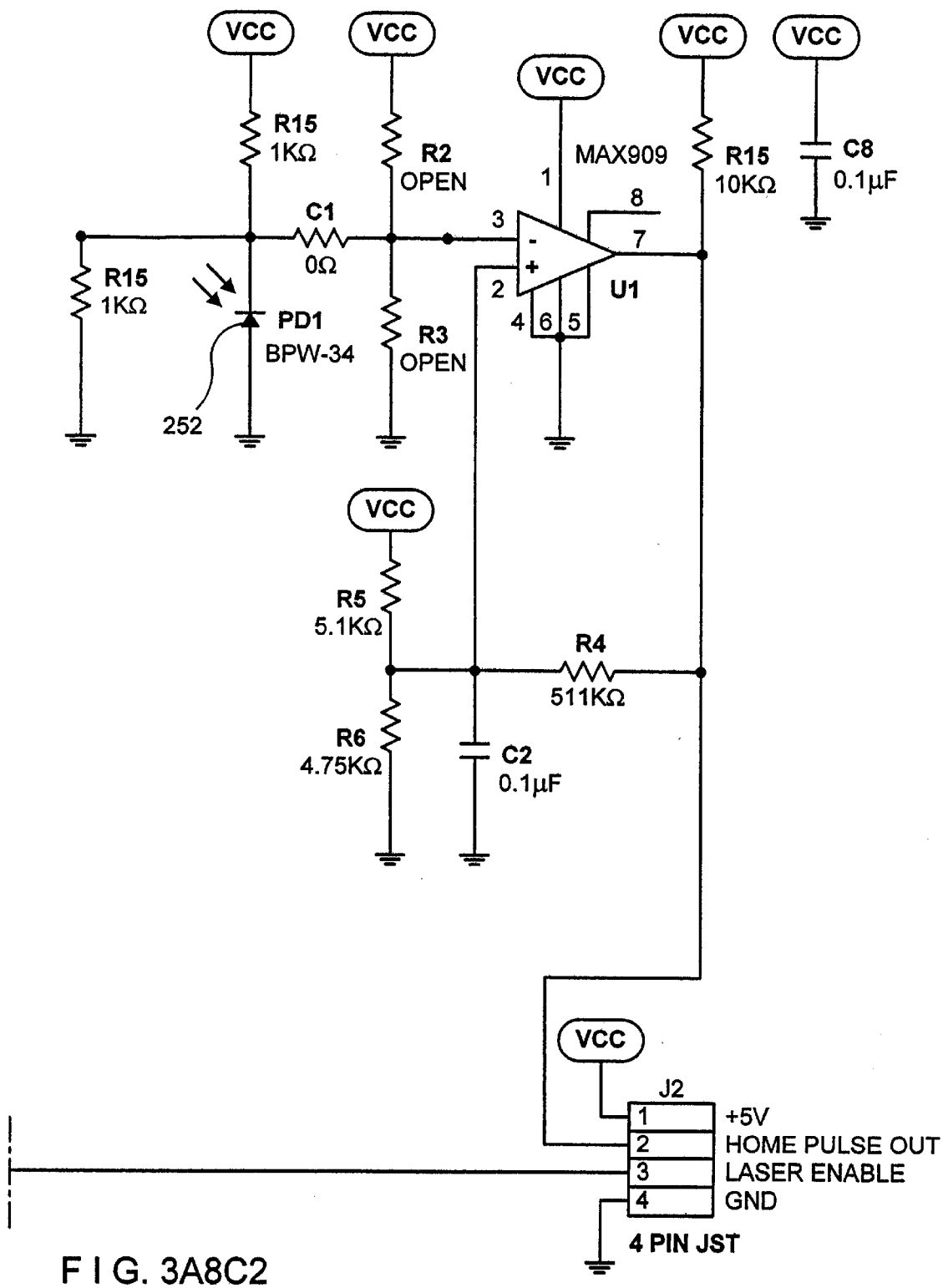
FIG. 3A8C2

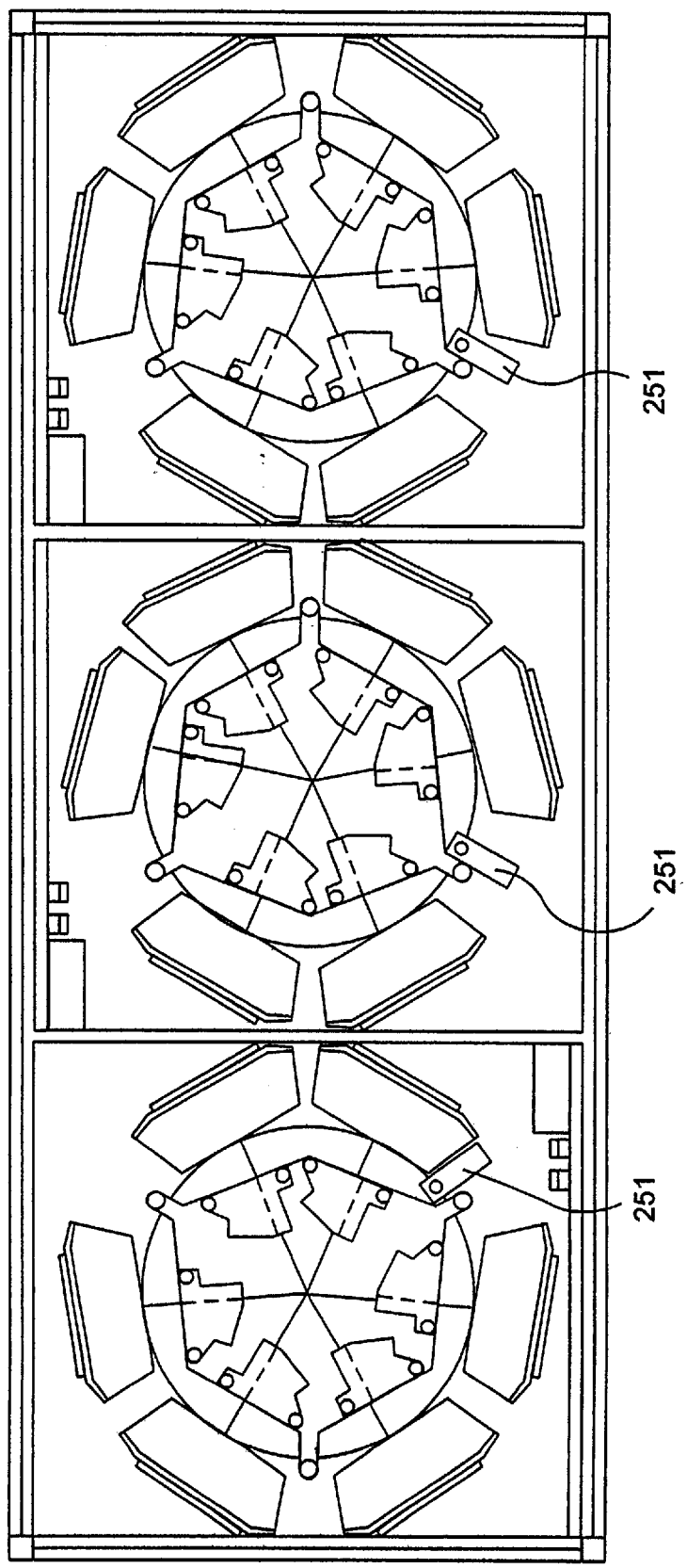
FIG. 3B1
SCANNERS:
- TOP FRONT
- TOP BACK
- LEFT/SIDE FRONT
- LEFT/SIDE BACK
- RIGHT/SIDE FRONT
- RIGHT/SIDE BACK

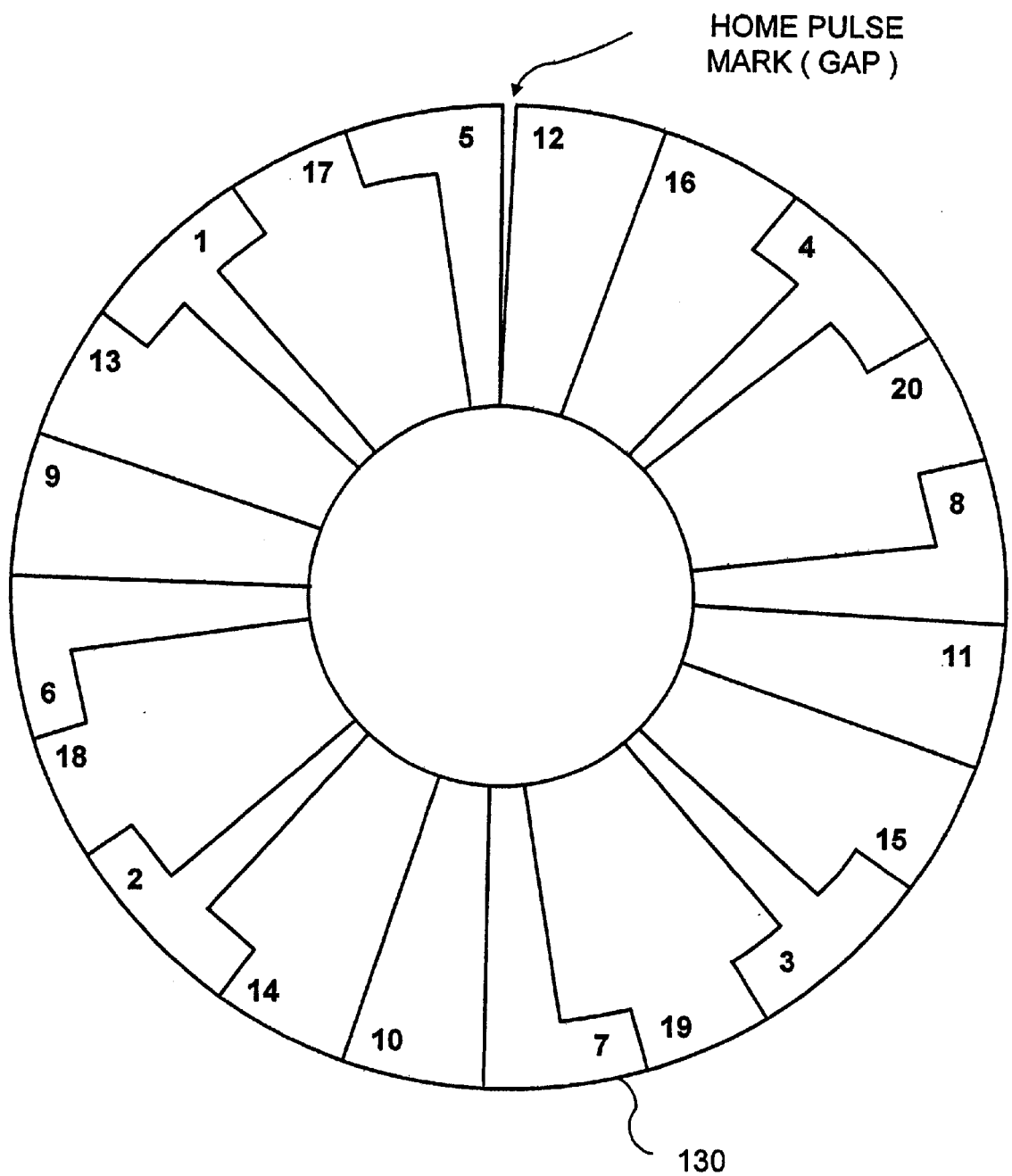
FIG. 3B2

ROTATIONAL SPEED OF DISK (RPM)
TUNNEL SCANNER 1: 4 LINES/5 FOCAL PLANES DISK
WAVELENGTH: 685NM

| FACET | DIFFRACTION FOCAL LENGTH (INCHES) | GEOMETRICAL FOCAL LENGTH (INCHES) | ANGLE A (DEGREES) | ANGLE B (DEGREES) | ANGLE OF DIFFRACTION (DEGREES) | ANGLE OF BEAM FROM VERTICAL (DEGREES) | SCAN ANGLE (DEGREES) |
|---|---|---|---|---|---|---|---|
| 1 | 39.04 | 39.11 | 45.9 | 55.30 | 34.70 | 2.70 | 26.24 |
| 2 | 39.04 | 39.11 | 45.9 | 55.30 | 34.70 | 2.70 | 26.24 |
| 3 | 39.04 | 39.11 | 45.9 | 55.30 | 34.70 | 2.70 | 26.24 |
| 4 | 39.04 | 39.11 | 45.9 | 55.30 | 34.70 | 2.70 | 26.24 |
| 5 | 45.04 | 45.14 | 45.9 | 55.54 | 34.46 | 2.46 | 22.84 |
| 6 | 45.04 | 45.14 | 45.9 | 55.54 | 34.46 | 2.46 | 22.84 |
| 7 | 45.04 | 45.14 | 45.9 | 55.54 | 34.46 | 2.46 | 22.84 |
| 8 | 45.04 | 45.14 | 45.9 | 55.54 | 34.46 | 2.46 | 22.84 |
| 9 | 51.54 | 51.69 | 45.9 | 55.73 | 34.27 | 2.27 | 20.03 |
| 10 | 51.54 | 51.69 | 45.9 | 55.73 | 34.27 | 2.27 | 20.03 |
| 11 | 51.54 | 51.69 | 45.9 | 55.73 | 34.27 | 2.27 | 20.03 |
| 12 | 51.54 | 51.69 | 45.9 | 55.73 | 34.27 | 2.27 | 20.03 |
| 13 | 58.34 | 58.56 | 45.9 | 55.89 | 34.11 | 2.11 | 17.73 |
| 14 | 58.34 | 58.56 | 45.9 | 55.89 | 34.11 | 2.11 | 17.73 |
| 15 | 58.34 | 58.56 | 45.9 | 55.89 | 34.11 | 2.11 | 17.73 |
| 16 | 58.34 | 58.56 | 45.9 | 55.89 | 34.11 | 2.11 | 17.73 |
| 17 | 64.94 | 65.24 | 45.9 | 56.02 | 33.98 | 1.98 | 15.95 |
| 18 | 64.94 | 65.24 | 45.9 | 56.02 | 33.98 | 1.98 | 15.95 |
| 19 | 64.94 | 65.24 | 45.9 | 56.02 | 33.98 | 1.98 | 15.95 |
| 20 | 64.94 | 65.24 | 45.9 | 56.02 | 33.98 | 1.98 | 15.95 |

FIG. 3B3A

| FACET | SCAN MULT. FACTOR (m) | ROTATION. ANGLE (DEGREES) | ACCOUNTING FOR DEAD TIME FOR LASER BEAM 2.59 (DEGREES) | LIGHT COLLECTION FACTOR | MAXIMUM COLLECTION AREA (IGNORING NOTCH) (SQ. IN.) | DESIGN COLLECTION AREA (INCLUDES NOTCH LOSS OF 0.15 SQ.INCHES) |
|---|---|---|---|---|---|---|
| 1 | 1.37 | 19.19 | 21.78 | 1.00 | 1.29 | 1.36 |
| 2 | 1.37 | 19.19 | 21.78 | 1.00 | 1.29 | 1.36 |
| 3 | 1.37 | 19.19 | 21.78 | 1.00 | 1.29 | 1.36 |
| 4 | 1.37 | 19.19 | 21.78 | 1.00 | 1.29 | 1.36 |
| 5 | 1.35 | 16.91 | 19.51 | 1.32 | 1.71 | 1.75 |
| 6 | 1.35 | 16.91 | 19.51 | 1.32 | 1.71 | 1.75 |
| 7 | 1.35 | 16.91 | 19.51 | 1.32 | 1.71 | 1.75 |
| 8 | 1.35 | 16.91 | 19.51 | 1.32 | 1.71 | 1.75 |
| 9 | 1.34 | 14.98 | 17.58 | 1.72 | 2.23 | 2.23 |
| 10 | 1.34 | 14.98 | 17.58 | 1.72 | 2.23 | 2.23 |
| 11 | 1.34 | 14.98 | 17.58 | 1.72 | 2.23 | 2.23 |
| 12 | 1.34 | 14.98 | 17.58 | 1.72 | 2.23 | 2.23 |
| 13 | 1.33 | 13.38 | 15.97 | 2.19 | 2.84 | 2.81 |
| 14 | 1.33 | 13.38 | 15.97 | 2.19 | 2.84 | 2.81 |
| 15 | 1.33 | 13.38 | 15.97 | 2.19 | 2.84 | 2.81 |
| 16 | 1.33 | 13.38 | 15.97 | 2.19 | 2.84 | 2.81 |
| 17 | 1.32 | 12.12 | 14.71 | 2.71 | 3.51 | 3.43 |
| 18 | 1.32 | 12.12 | 14.71 | 2.71 | 3.51 | 3.43 |
| 19 | 1.32 | 12.12 | 14.71 | 2.71 | 3.51 | 3.43 |
| 20 | 1.32 | 12.12 | 14.71 | 2.71 | 3.51 | 3.43 |

FIG. 3B3B

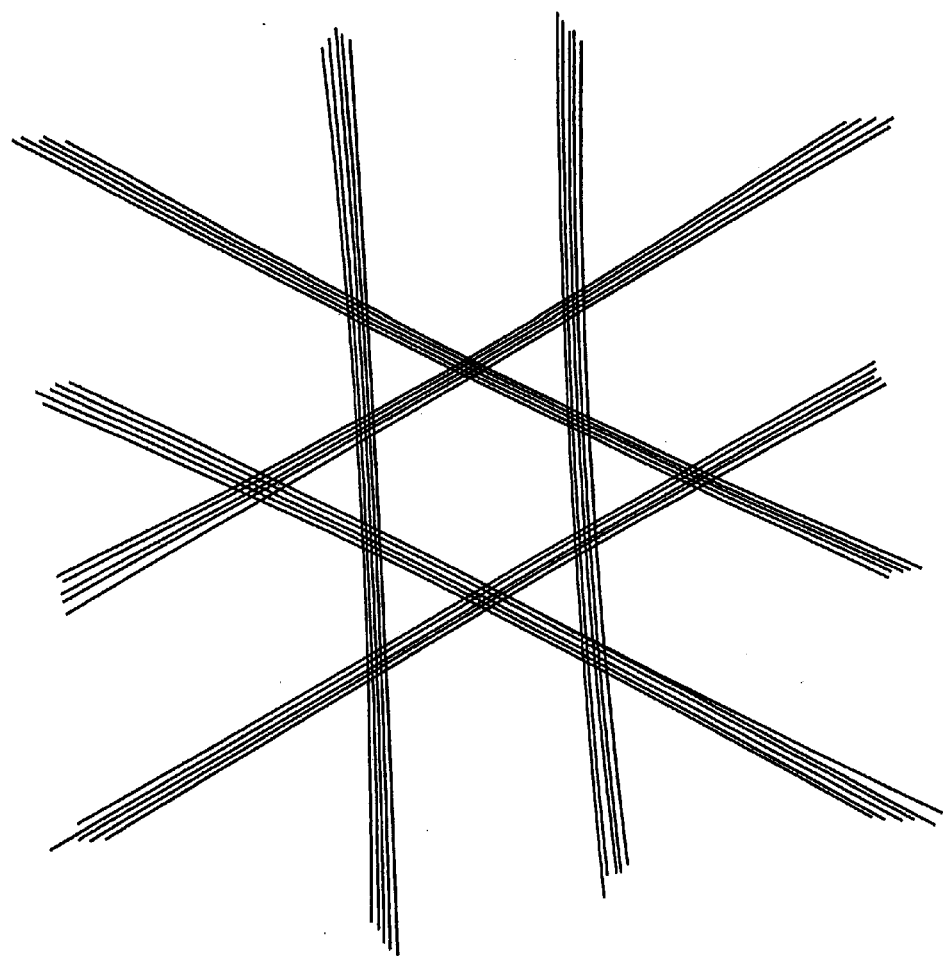
FIG. 3B4

Mirror angles for the 60 degrees Tunnel Scanner

The angle delta is the anglular spacing between the mirror and its following neighbour mirror

| Mirror | Angular location of folding mirrors (degrees) | | Angular rotation of folding mirrors (degrees) | |
|---|---|---|---|---|
| | | delta | | |
| 1 | 25.61 | 64.39 | 2.28 | CCW |
| 2 | 90.00 | 64.39 | 0.00 | CW |
| 3 | 154.39 | 51.23 | 2.28 | CW |
| 4 | 205.61 | 64.39 | 2.28 | CCW |
| 5 | 270.00 | 64.39 | 0.00 | CW |
| 6 | 334.39 | 51.23 | 2.28 | CW |

FIG. 3B5

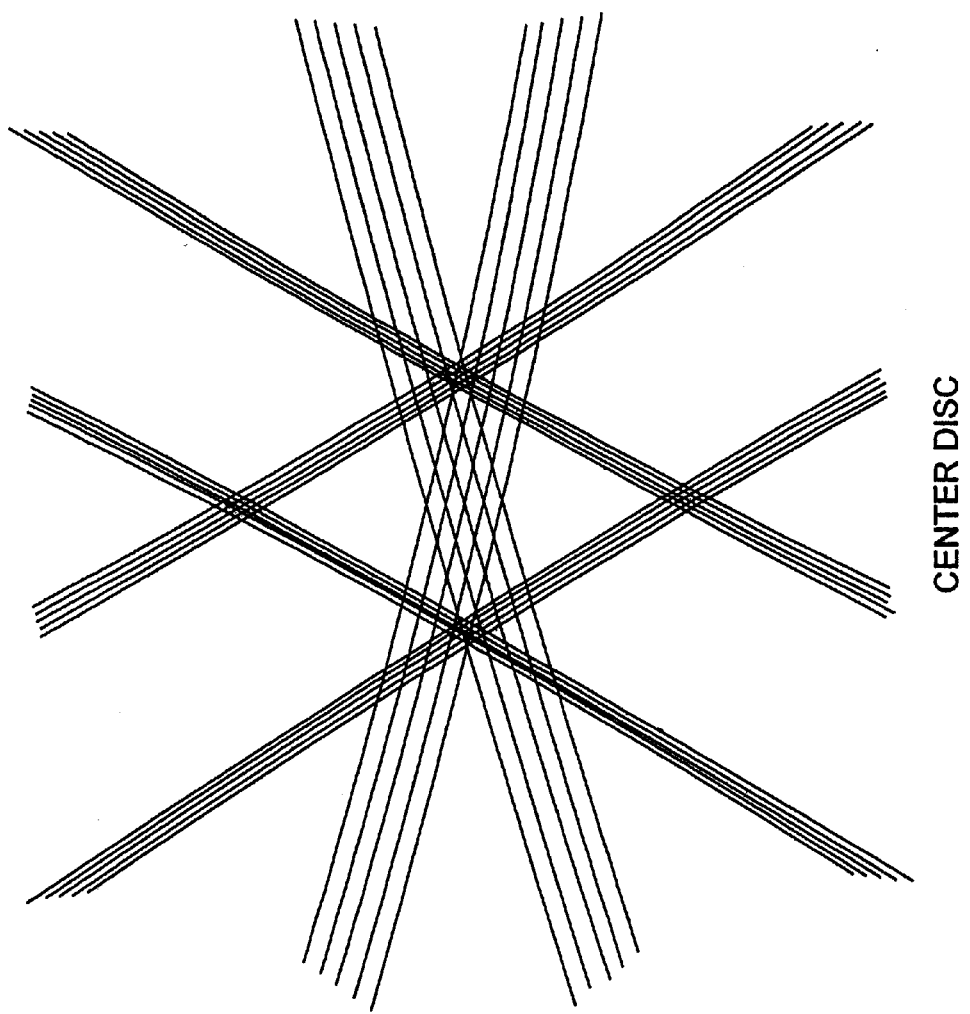
FIG. 3B6 CENTER DISC

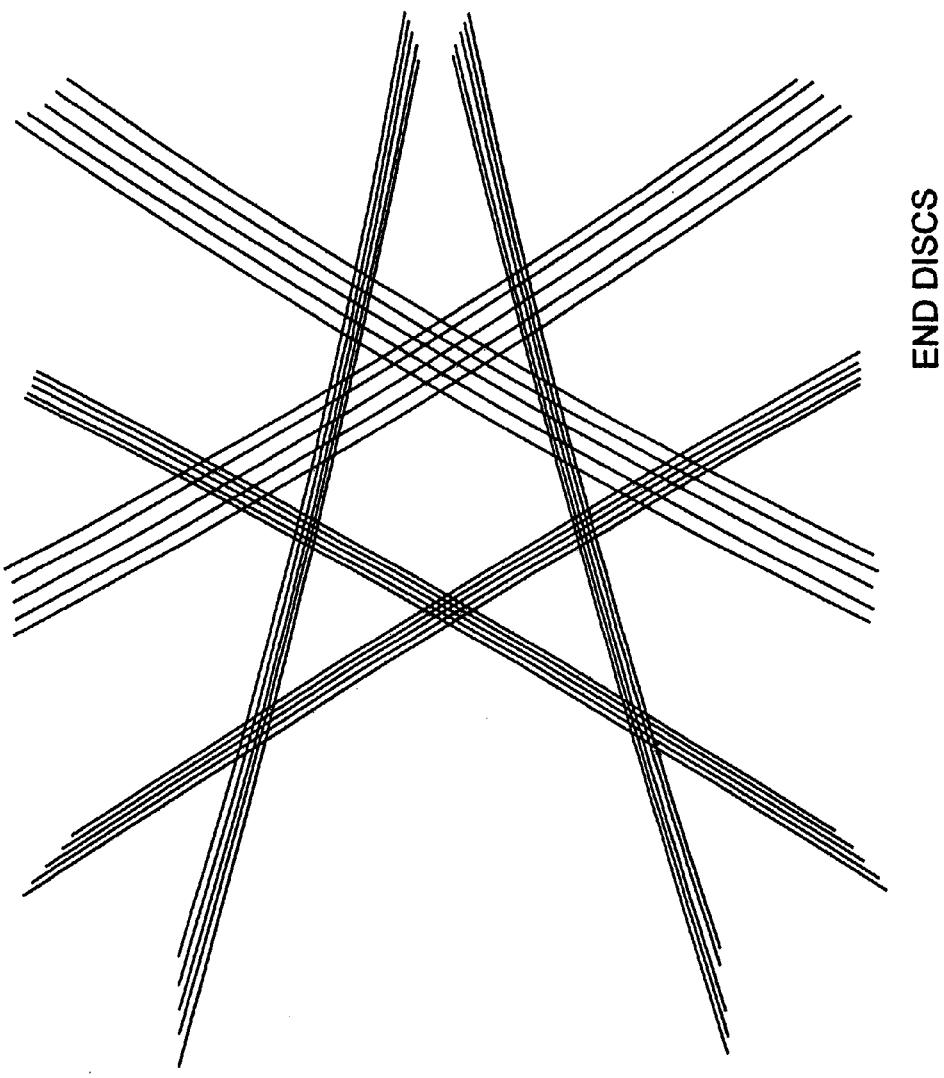
END DISCS
FIG. 3B7

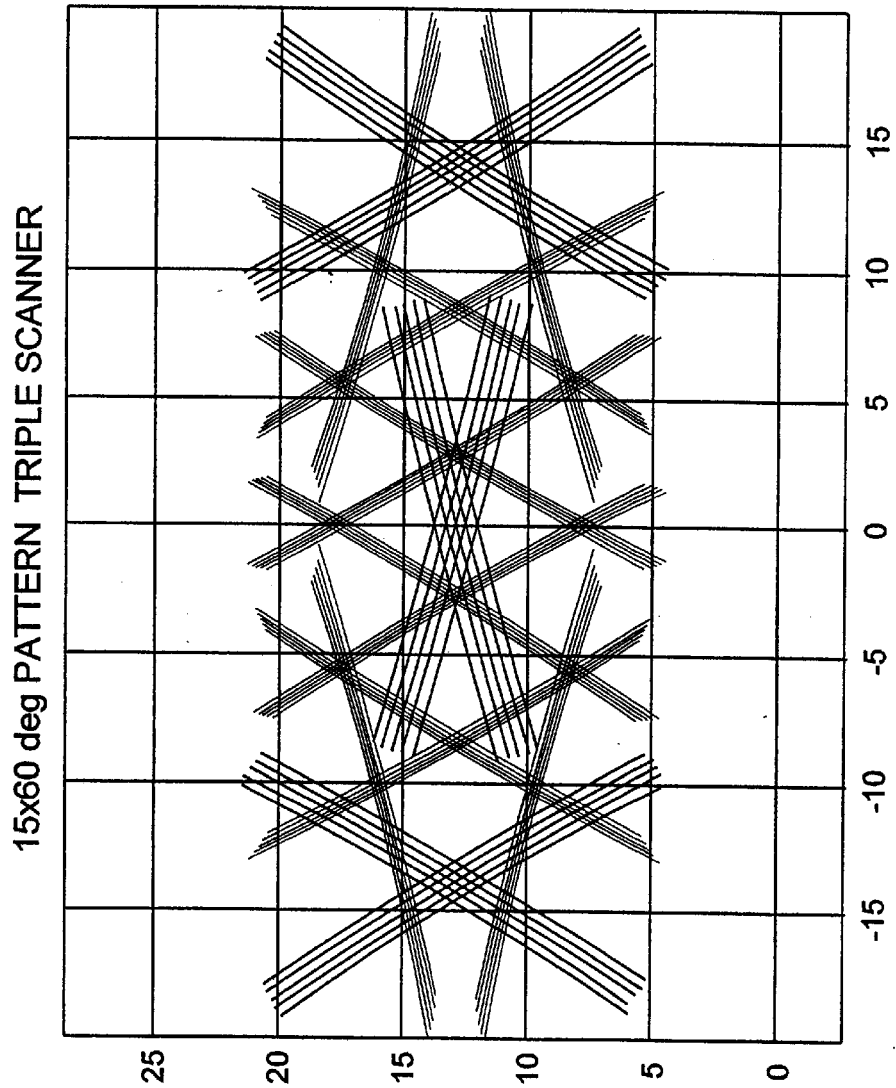
FIG. 3B8

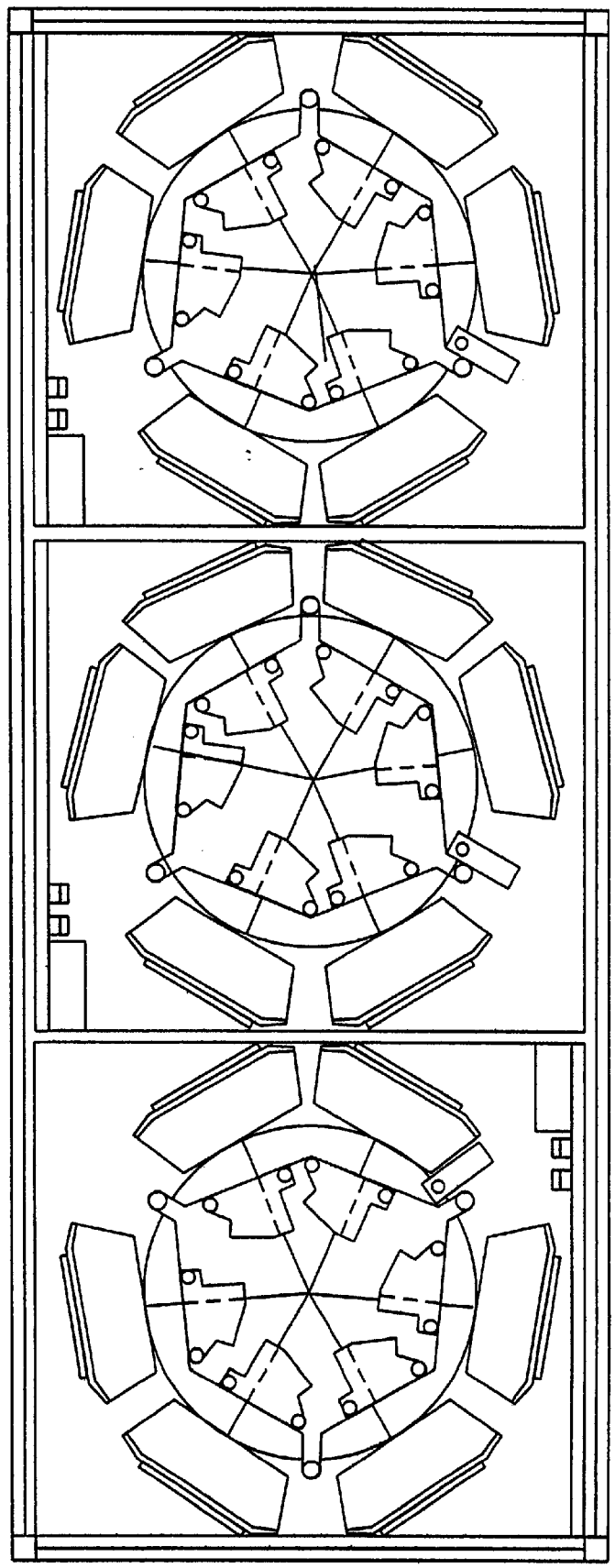
FIG. 3C1
SCANNERS:
- FRONT
- BACK

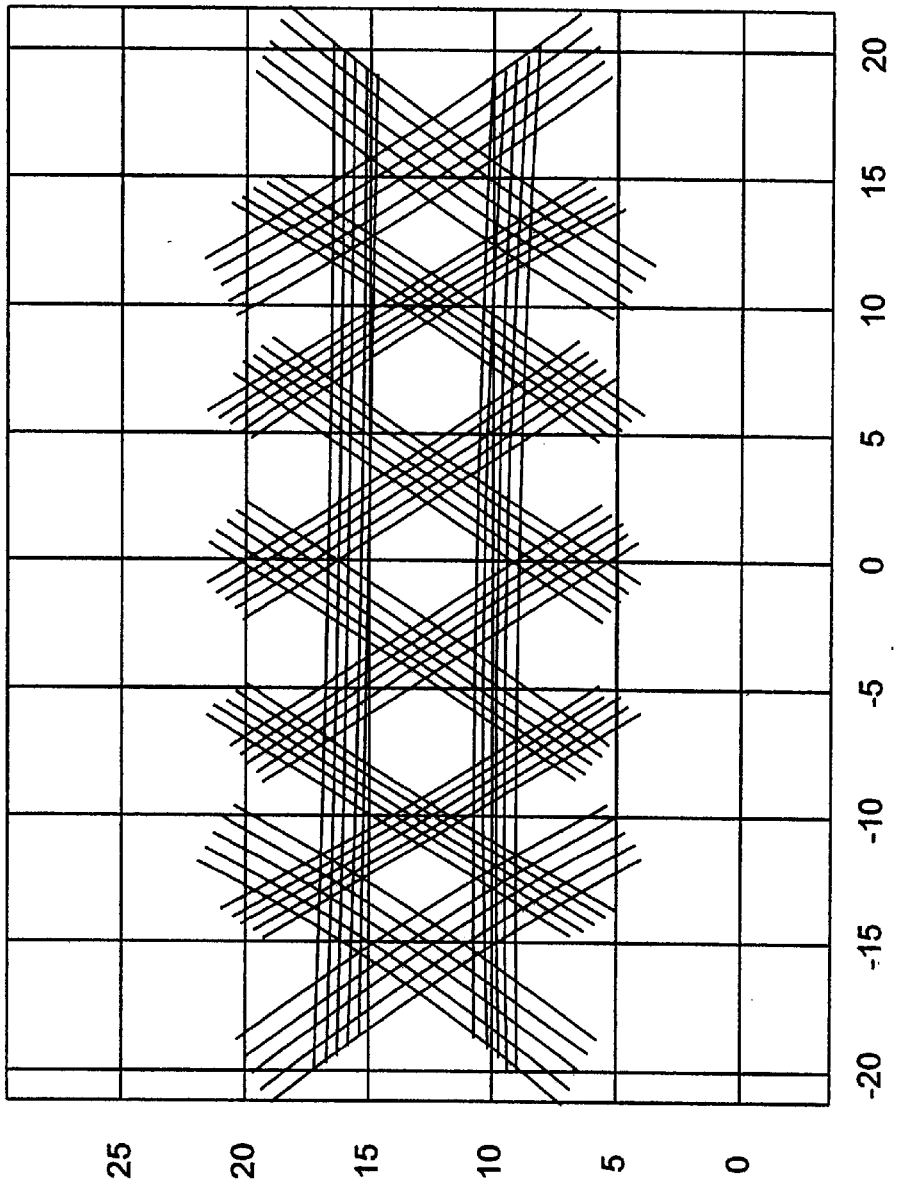
FIG. 3C2

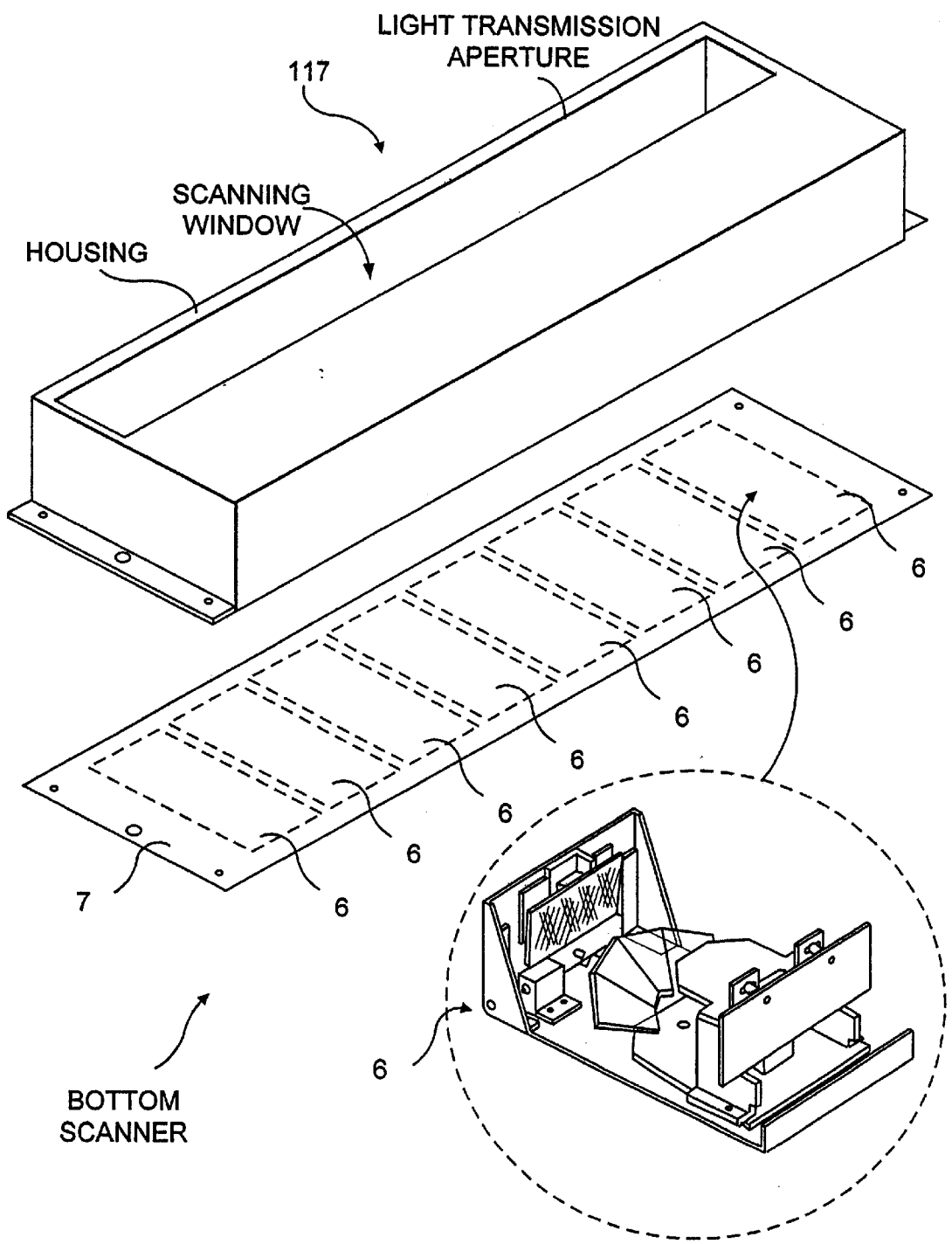
FIG. 3D1

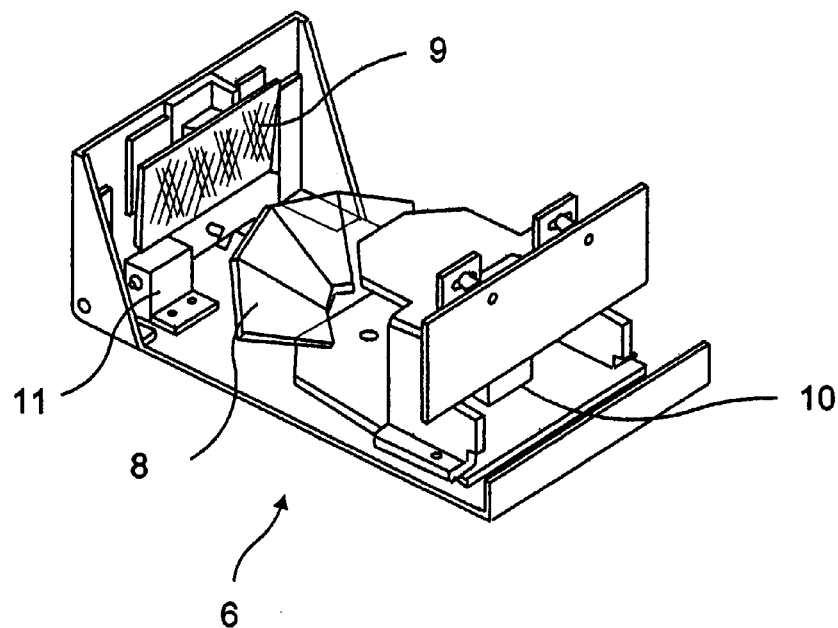
FIG. 3D2
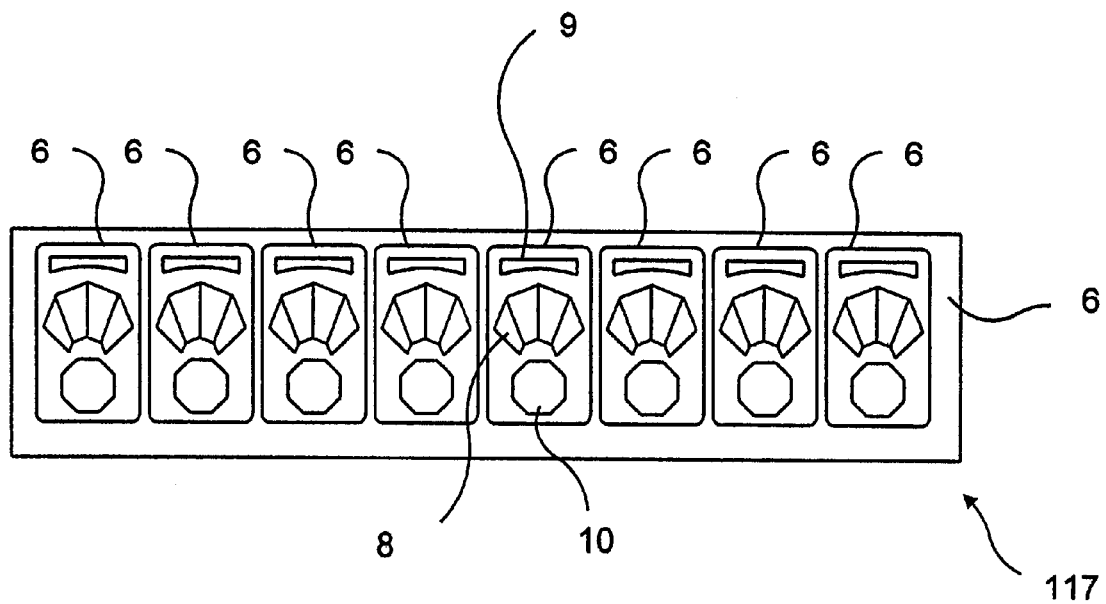
FIG. 3D3

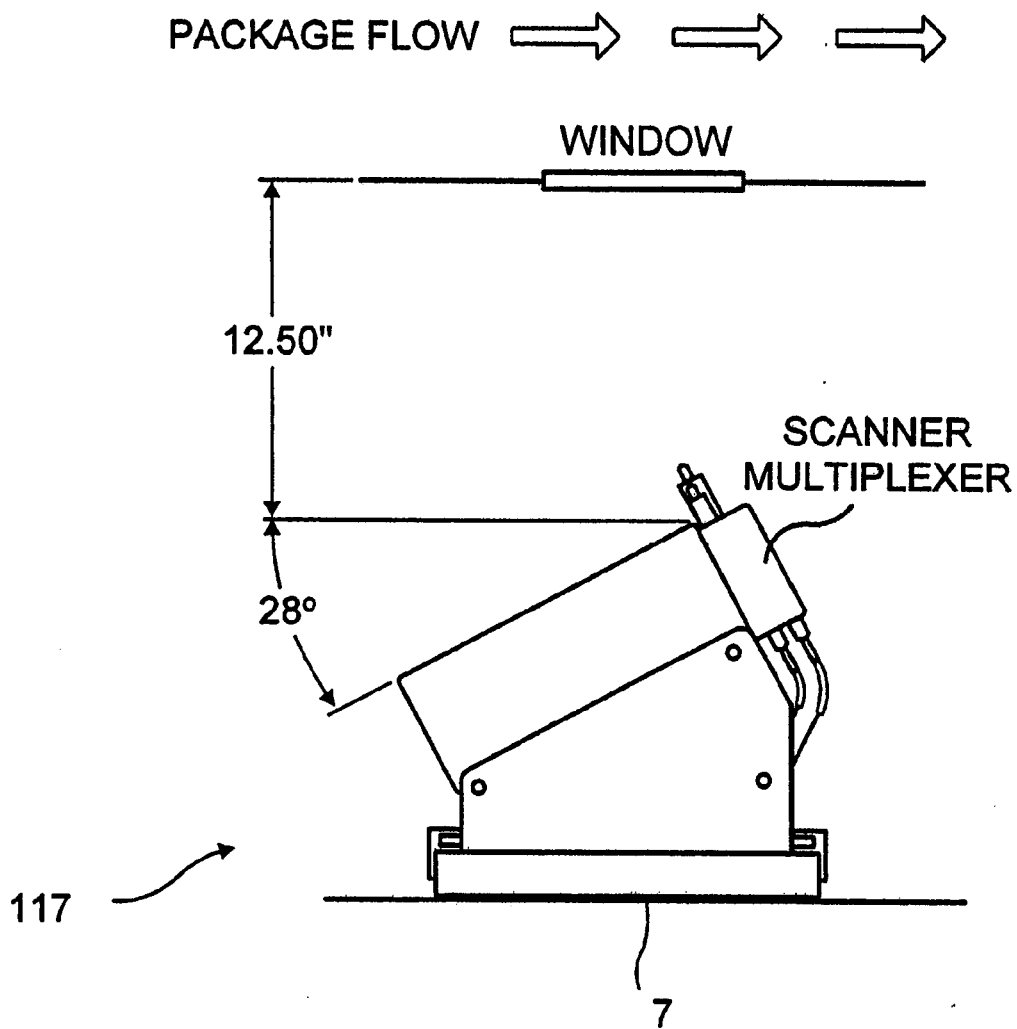
FIG. 3D3A

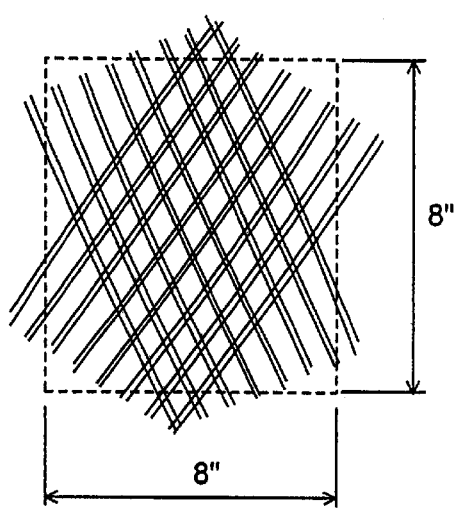
FIG. 3D4
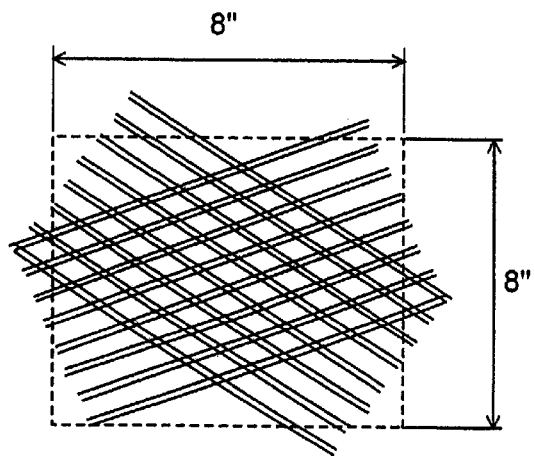
FIG. 3D5
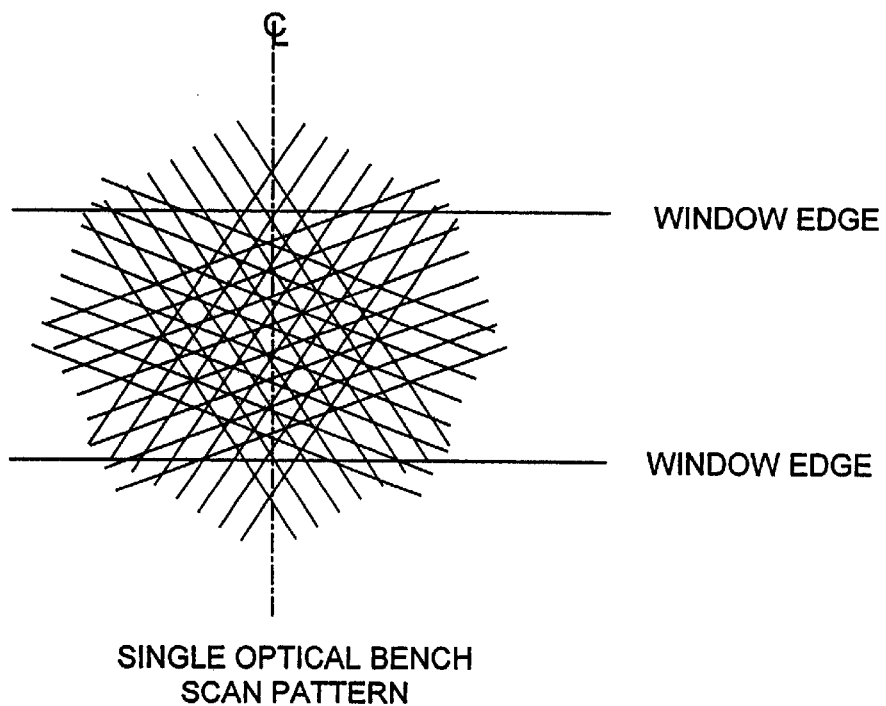
SINGLE OPTICAL BENCH
SCAN PATTERN
FIG. 3D6

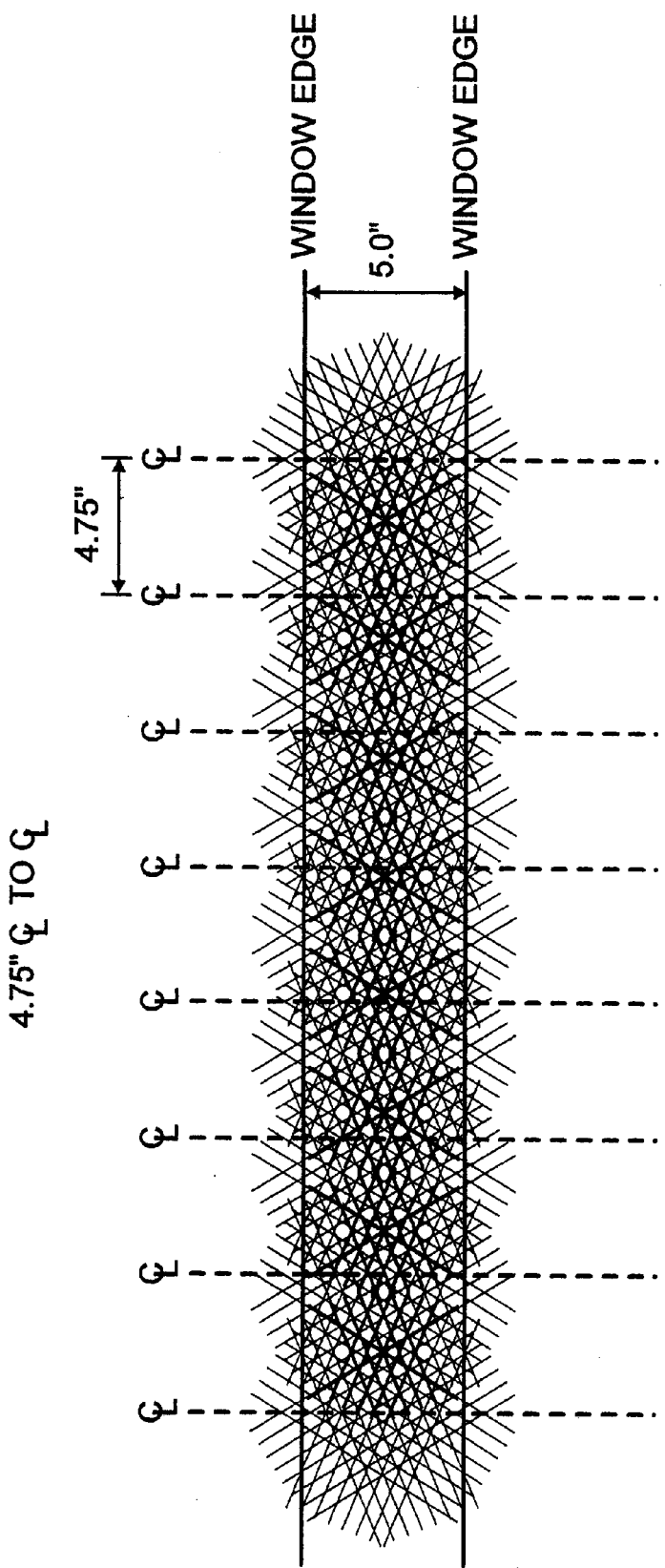
FIG. 3D7

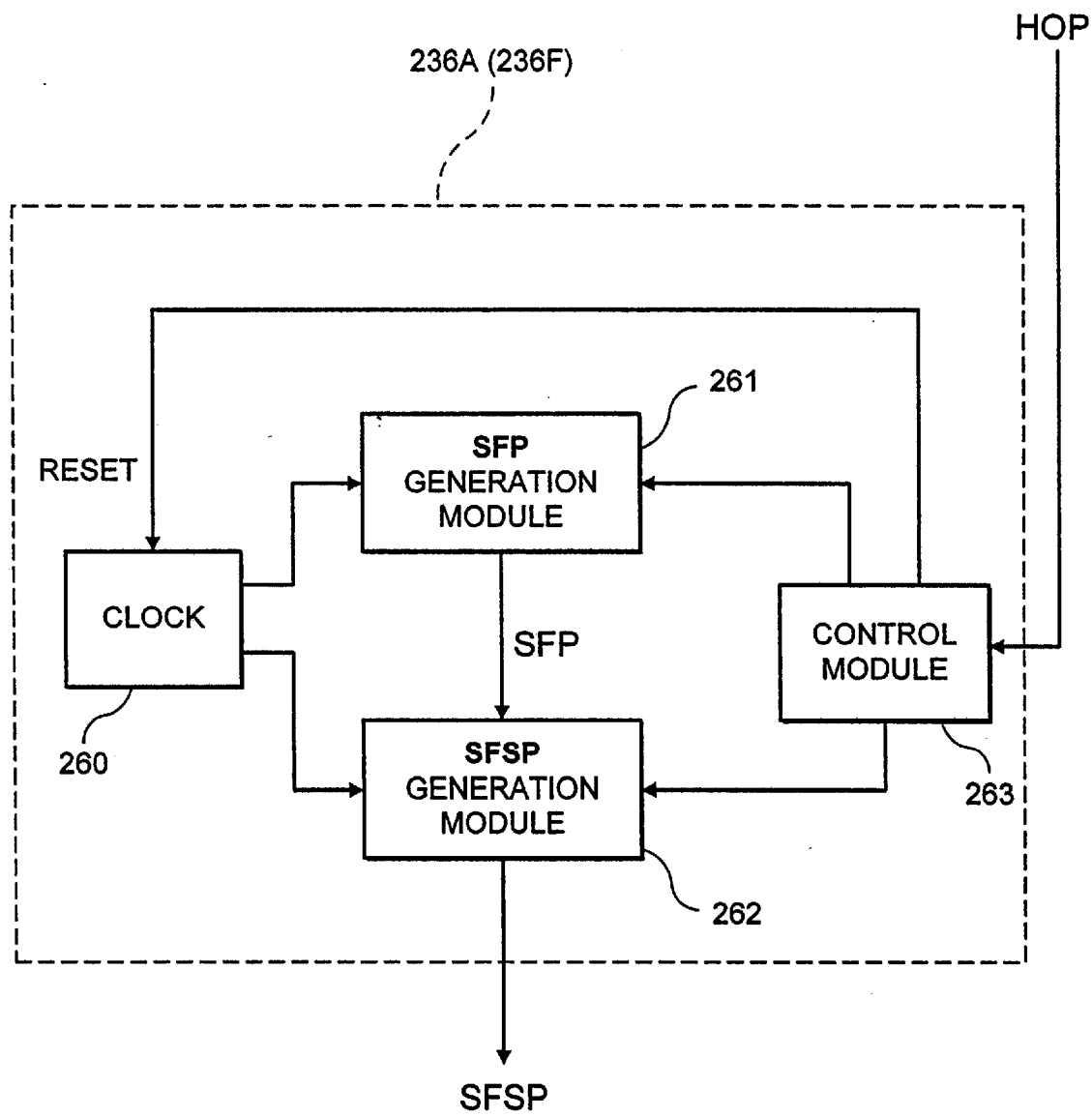
F I G. 10A

DATA TABLE EMBODIED IN SFP GENERATOR ON DECODE PROCESSOR BOARD

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

W = 5200 RPM

CLOCK PULSE WIDTH = 4 μSEC

FIG. 10B

TABLE EMBODIED IN SFSP GENERATOR DECODE PROCESSOR BOARD

| SCANNING FACET NO. | SFSP TRIGGERING EVENT | PULSE EVENT FROM SFSP MODULE |
|---|---|---|
| 12 | RULES 1 - 4 IN FIGS. | SFS 12/1P |
| | | SFS 12/2P |
| | | SFS 12/3P |
| | | SFS 12/4P |
| 16 | RULES 1-4 IN FIGS. | SFS 16/1P |
| | | SFS 16/2P |
| | | SFS 16/3P |
| | | SFS 16/4P |
| 4 | RULES 1-4 IN FIGS. | SFS 4/1P |
| | | SFS 4/2P |
| | | SFS 4/3P |
| | | SFS 4/4P |
| 20 | RULES 1-4 IN FIGS. | SFS 20/1P |
| | | SFS 20/2P |
| | | SFS 20/3P |
| | | SFS 20/4P |
| 8 | RULES 1-4 IN FIGS. | SFS 8/1P |
| | | SFS 8/2P |
| | | SFS 8/3P |
| | | SFS 8/4P |
| 11 | RULES 1-4 IN FIGS. | SFS 11/1P |
| | | SFS 11/2P |
| | | SFS 11/3P |
| | | SFS 11/4P |
| ⋮ | ⋮ | ⋮ |
| 17 | RULES 1-4 IN FIGS. | SFS 17/1P |
| | | SFS 17/2P |
| | | SFS 17/3P |
| | | SFS 17/4P |
| 5 | RULES 1-4 IN FIGS. | SFS 5/1P |
| | | SFS 5/2P |
| | | SFS 5/3P |
| | | SFS 5/4P |

F I G. 10D

RULE 1: FOR GENERATING SFSX/1P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/1P TYPE PULSES WHEN THE COUNT IS EQUAL TO:

COUNT (SFXP)

RULE 2: FOR GENERATING SFSX/2P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/2P TYPE PULSES WHEN THE COUNT IS EQUAL TO:

$$\text{COUNT (SFXP)} + 1 \left[ \frac{\text{COUNT (SFX+1P)} - \text{COUNT (SFXP)}}{4} \right]$$

FIG. 10E1

RULE 3: FOR GENERATING SFSX/3P TYPE PULSES

FOR EACH FACET X BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/3 TYPE PULSES WHEN THE COUNT IS EQUAL TO:

$$\text{COUNT (SFXP)} + 2\left[\frac{\text{COUNT (SFX+1P)} - \text{COUNT (SFXP)}}{4}\right]$$

RULE 4: FOR GENERATING SFSX/4P TYPE PULSES

FOR EACH FACET X, BEFORE WHICH IS LOCATED FACET X-1 AND BEYOND WHICH IS LOCATED FACET X+1 (ABOUT THE SCANNING DISC), THE SFSP GENERATION MODULE GENERATES SFSX/4 TYPE PULSES WHEN THE COUNT IS EQUAL TO:

$$\text{COUNT (SFXP)} + 3\left[\frac{\text{COUNT (SFX+1P)} - \text{COUNT (SFXP)}}{4}\right]$$

FIG. 10E2

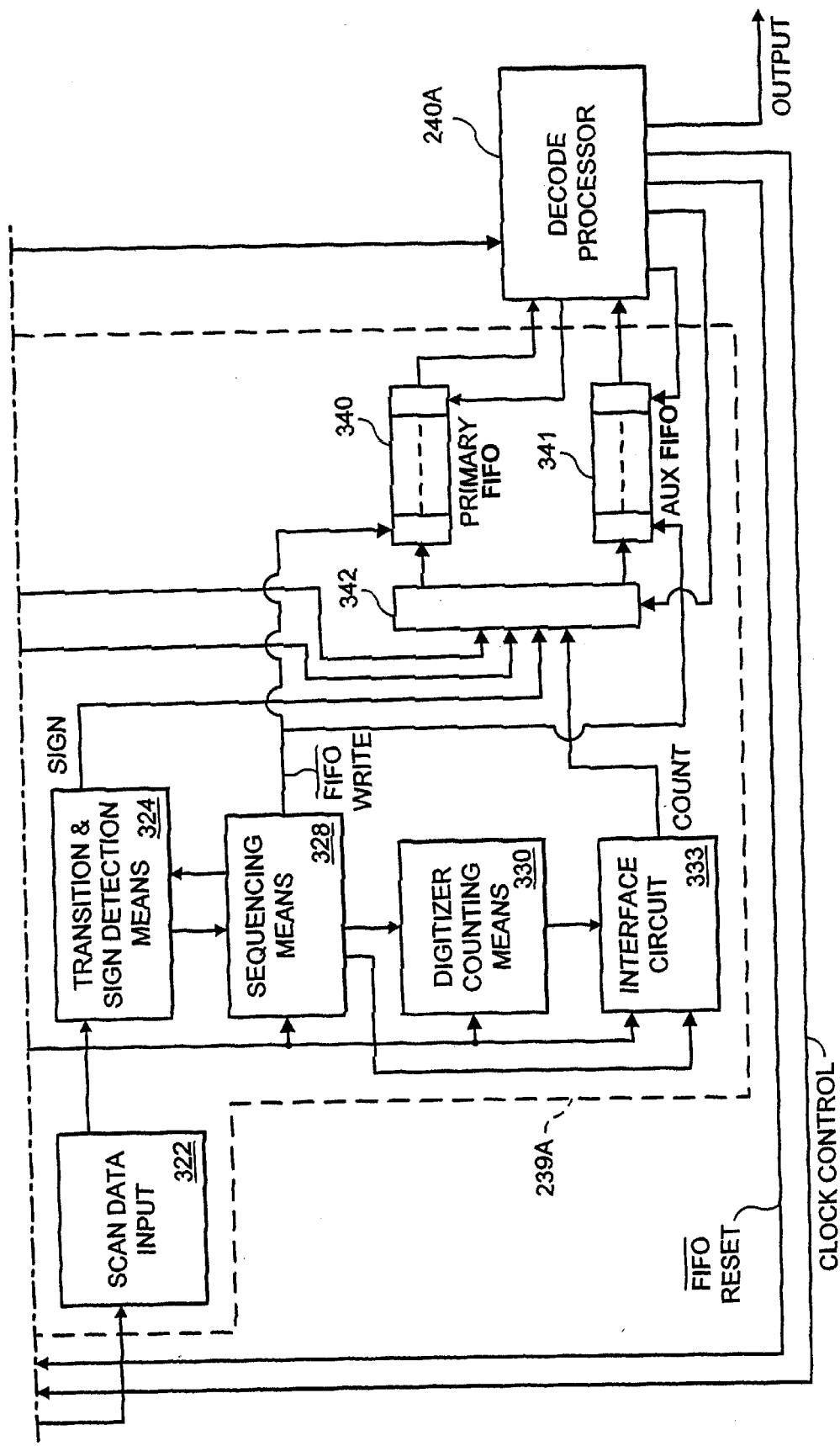
F I G. 11(2)

| SCANNER NO. | TOTAL NO. OF FACETS ON DISC |
|---|---|
| NO. OF SECTORS / FACET | SCANNING STATION NO. |

FIG. 11B1

| SCANNING FACET NO. | TRIGGERING EVENT: WHEN THE CLOCK PULSE COUNT ATTAINS THE VALUE EQUAL TO THE COUNT VALUE SET FORTH BELOW | PULSE EVENT FROM SFP MODULE |
|---|---|---|
| 12 | 7 | SF12P |
| 16 | 146 | SF16P |
| 4 | 271 | SF4P |
| 20 | 446 | SF20P |
| 8 | 561 | SF8P |
| 11 | 716 | SF11P |
| 15 | 855 | SF15P |
| 3 | 980 | SF3P |
| 19 | 1155 | SF19P |
| 7 | 1270 | SF7P |
| 10 | 1425 | SF10P |
| 14 | 1564 | SF14P |
| 2 | 1689 | SF2P |
| 18 | 1864 | SF18P |
| 6 | 1979 | SF6P |
| 9 | 2134 | SF9P |
| 13 | 2273 | SF13P |
| 1 | 2398 | SF1P |
| 17 | 2573 | SF17P |
| 5 | 2688 | SF5P |

TABLES EMBODIED IN DECODE PROCESSOR

W = 5200 RPM

CLOCK PULSE WIDTH = 4.0 μSEC

FIG. 11B2

TABLE EMBODIED IN DECODE PROCESSOR

| SCANNING FACET NO. | SFSP TRIGGERING EVENT | PULSE EVENT FROM SFSP MODULE | MINIMUM AND MAXIMUM FACET ANGLES CORRESPONDING TO FACET-SECTOR IDENTIFIED BY SFSP EVENT |
|---|---|---|---|
| 12 | RULES 1 - 4 IN FIGS. | SFS 12/1P | $\theta$ ROT MIN , $\theta$ ROT MAX |
|    |                      | SFS 12/2P |  |
|    |                      | SFS 12/3P |  |
|    |                      | SFS 12/4P |  |
| 16 | RULES 1-4 IN FIGS. | SFS 16/1P |  |
|    |                     | SFS 16/2P |  |
|    |                     | SFS 16/3P |  |
|    |                     | SFS 16/4P |  |
| 4  | RULES 1-4 IN FIGS. | SFS 4/1P |  |
|    |                     | SFS 4/2P |  |
|    |                     | SFS 4/3P |  |
|    |                     | SFS 4/4P |  |
| 20 | RULES 1-4 IN FIGS. | SFS 20/1P |  |
|    |                     | SFS 20/2P |  |
|    |                     | SFS 20/3P |  |
|    |                     | SFS 20/4P |  |
| 8  | RULES 1-4 IN FIGS. | SFS 8/1P |  |
|    |                     | SFS 8/2P |  |
|    |                     | SFS 8/3P |  |
|    |                     | SFS 8/4P |  |
| 11 | RULES 1-4 IN FIGS. | SFS 11/1P |  |
|    |                     | SFS 11/2P |  |
|    |                     | SFS 11/3P |  |
|    |                     | SFS 11/4P |  |
| ○○○ | | | |
| 17 | RULES 1-4 IN FIGS. | SFS 17/1P |  |
|    |                     | SFS 17/2P |  |
|    |                     | SFS 17/3P |  |
|    |                     | SFS 17/4P |  |
| 5  | RULES 1-4 IN FIGS. | SFS 5/1P |  |
|    |                     | SFS 5/2P |  |
|    |                     | SFS 5/3P |  |
|    |                     | SFS 5/4P |  |

FIG. 11C

TABLE EMBODIED IN SFSP GENERATOR MODULE

| SCANNING FACET NO. | SFSP TRIGGERING EVENTS | PULSE EVENT FROM SFSP MODULE |
|---|---|---|
| 12 | DETECTION OF 1ST, 2ND, 3RD AND 4TH SFS PULSE AFTER DETECTION OF HOME PULSE (HOP) | SFS 12/1P<br>SFS 12/2P<br>SFS 12/3P<br>SFS 12/4P |
| 16 | DETECTION OF 5TH, 6TH, 7TH AND 8TH SFS PULSE AFTER DETECTION OF HOP | SFS 16/1P<br>SFS 16/2P<br>SFS 16/3P<br>SFS 16/4P |
| 4 | DETECTION OF 9TH, 10TH, 11TH AND 12TH SFSP AFTER DETECTION OF HOP | SFS 4/1P<br>SFS 4/2P<br>SFS 4/3P<br>SFS 4/4P |
| 20 | DETECTION OF 13TH, 14TH, 15TH AND 16TH SFSP AFTER DETECTION OF HOP | SFS 20/1P<br>SFS 20/2P<br>SFS 20/3P<br>SFS 20/4P |
| 8 | DETECTION OF 17TH, 18TH, 19TH AND 20TH SFSP AFTER DETECTION OF HOP | SFS 8/1P<br>SFS 8/2P<br>SFS 8/3P<br>SFS 8/4P |
| 11 | DETECTION OF 21ST, 22ND, 23RD AND 24TH SFSP AFTER DETECTION OF HOP | SFS 11/1P<br>SFS 11/2P<br>SFS 11/3P<br>SFS 11/4P |
| ⋮ | ⋮ | |
| 17 | DETECTION OF 73RD, 74TH, 75TH AND 76TH SFSP AFTER DETECTION OF HOP | SFS 17/1P<br>SFS 17/2P<br>SFS 17/3P<br>SFS 17/4P |
| 5 | DETECTION OF 77TH, 78TH, 79TH AND 80TH SFSP AFTER DETECTION OF HOP | SFS 5/1P<br>SFS 5/2P<br>SFS 5/3P<br>SFS 5/4P |

| SCANNER NO. | SCANNING STATION NO. |
|---|---|
| TOTAL NO. OF FACETS ON DISC | NO. OF SECTORS PER FACET |

FIG. 14B2

TABLE EMBODIED IN DECODE PROCESSOR

| SCANNING FACET NO. | SFSP TRIGGERING EVENTS | PULSE EVENT FROM SFSP MODULE | MIN. AND MAX. FACET ANGLES CORRESPONDING TO FACET SECTOR IDENTIFIED BY SFSP EVENT |
|---|---|---|---|
| 12 | DETECTION OF 1$^{ST}$, 2$^{ND}$, 3$^{RD}$ AND 4$^{TH}$ SFS PULSE AFTER DETECTION OF HOME PULSE (HOP) | SFS 12/1P | $\theta$ ROT MIN , $\theta$ ROT MAX |
| | | SFS 12/2P | |
| | | SFS 12/3P | |
| | | SFS 12/4P | |
| 16 | DETECTION OF 5$^{TH}$, 6$^{TH}$, 7$^{TH}$ AND 8$^{TH}$ SFS PULSE AFTER DETECTION OF HOP | SFS 16/1P | |
| | | SFS 16/2P | |
| | | SFS 16/3P | |
| | | SFS 16/4P | |
| 4 | DETECTION OF 9$^{TH}$, 10$^{TH}$, 11$^{TH}$ AND 12$^{TH}$ SFSP AFTER DETECTION OF HOP | SFS 4/1P | |
| | | SFS 4/2P | |
| | | SFS 4/3P | |
| | | SFS 4/4P | |
| 20 | DETECTION OF 13$^{TH}$, 14$^{TH}$, 15$^{TH}$ AND 16$^{TH}$ SFSP AFTER DETECTION OF HOP | SFS 20/1P | |
| | | SFS 20/2P | |
| | | SFS 20/3P | |
| | | SFS 20/4P | |
| 8 | DETECTION OF 17$^{TH}$, 18$^{TH}$, 19$^{TH}$ AND 20$^{TH}$ SFSP AFTER DETECTION OF HOP | SFS 8/1P | |
| | | SFS 8/2P | |
| | | SFS 8/3P | |
| | | SFS 8/4P | |
| 11 | DETECTION OF 21$^{ST}$, 22$^{ND}$, 23$^{RD}$ AND 24$^{TH}$ SFSP AFTER DETECTION OF HOP | SFS 11/1P | |
| | | SFS 11/2P | |
| | | SFS 11/3P | |
| | | SFS 11/4P | |
| | ⋮ | | |
| 17 | DETECTION OF 73$^{RD}$, 74$^{TH}$, 75$^{TH}$ AND 76$^{TH}$ SFSP AFTER DETECTION OF HOP | SFS 17/1P | |
| | | SFS 17/2P | |
| | | SFS 17/3P | |
| | | SFS 17/4P | |
| 5 | DETECTION OF 77$^{TH}$, 78$^{TH}$, 79$^{TH}$ AND 80$^{TH}$ SFSP AFTER DETECTION OF HOP | SFS 5/1P | |
| | | SFS 5/2P | |
| | | SFS 5/3P | |
| | | SFS 5/4P | |

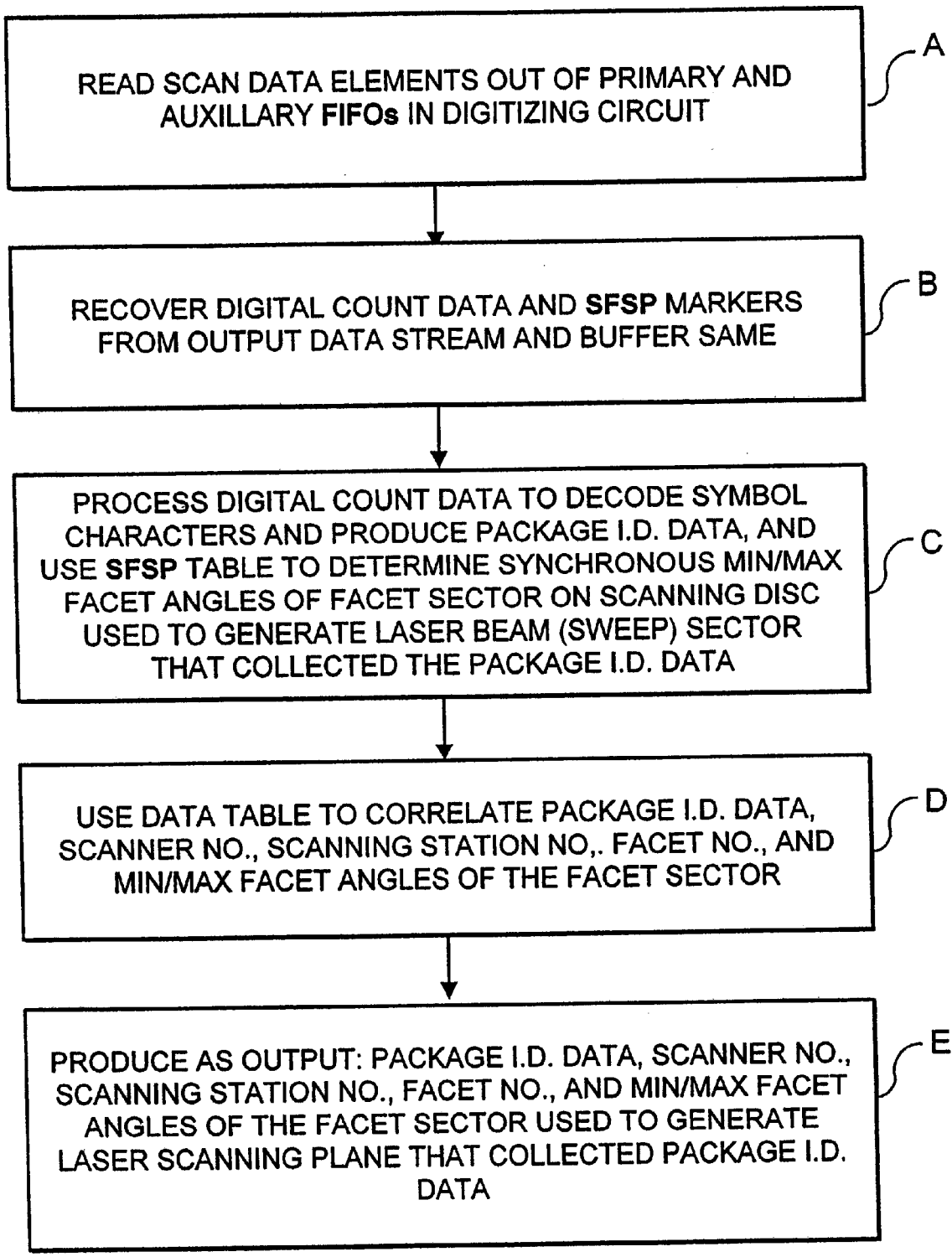
F I G. 14C

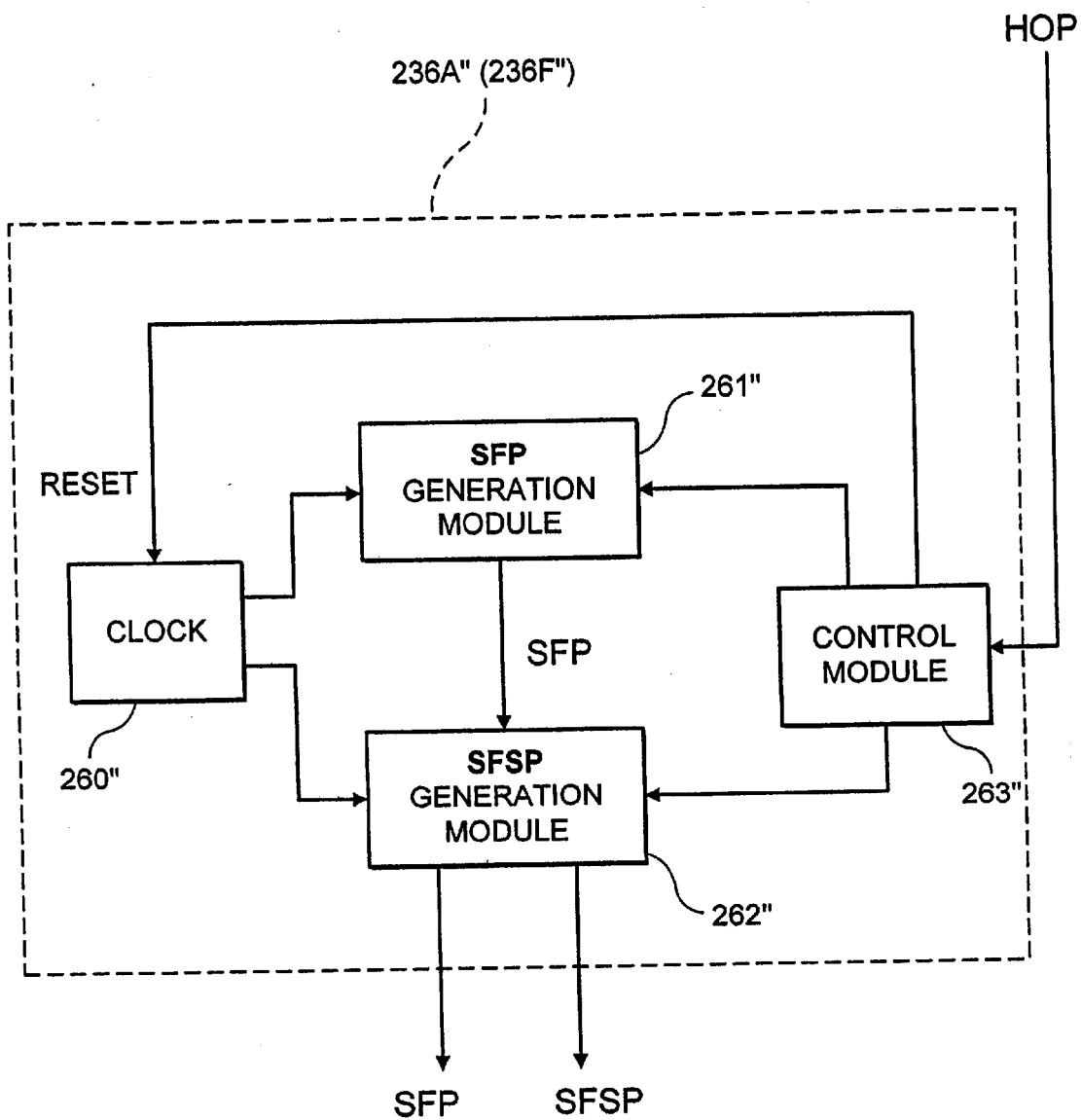
F I G. 14E

PACKAGE VELOCITY AND PACKAGE LENGTH MEASUREMENT SUBSYSTEM

PACKAGE VELOCITY AND PACKAGE LENGTH MEASUREMENT SUBSYSTEM
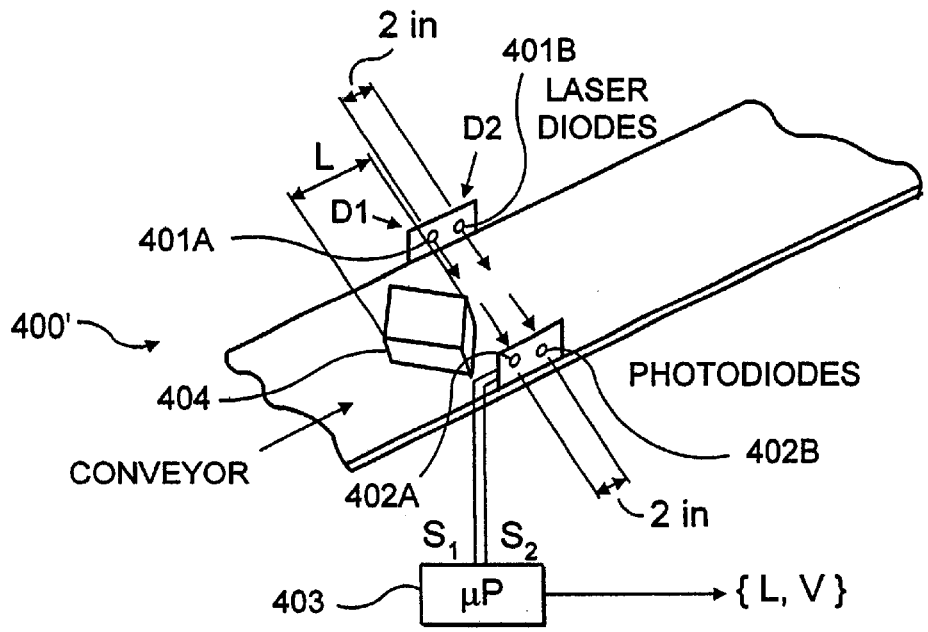
FIG. 15A
PHOTODIODE OUTPUTS
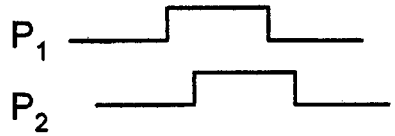
FIG. 15A1
INPUT TO MICROPROCESSOR
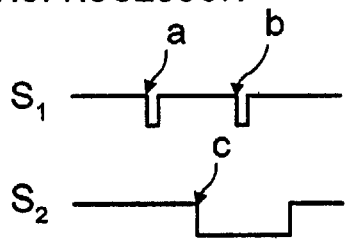
FIG. 15A2

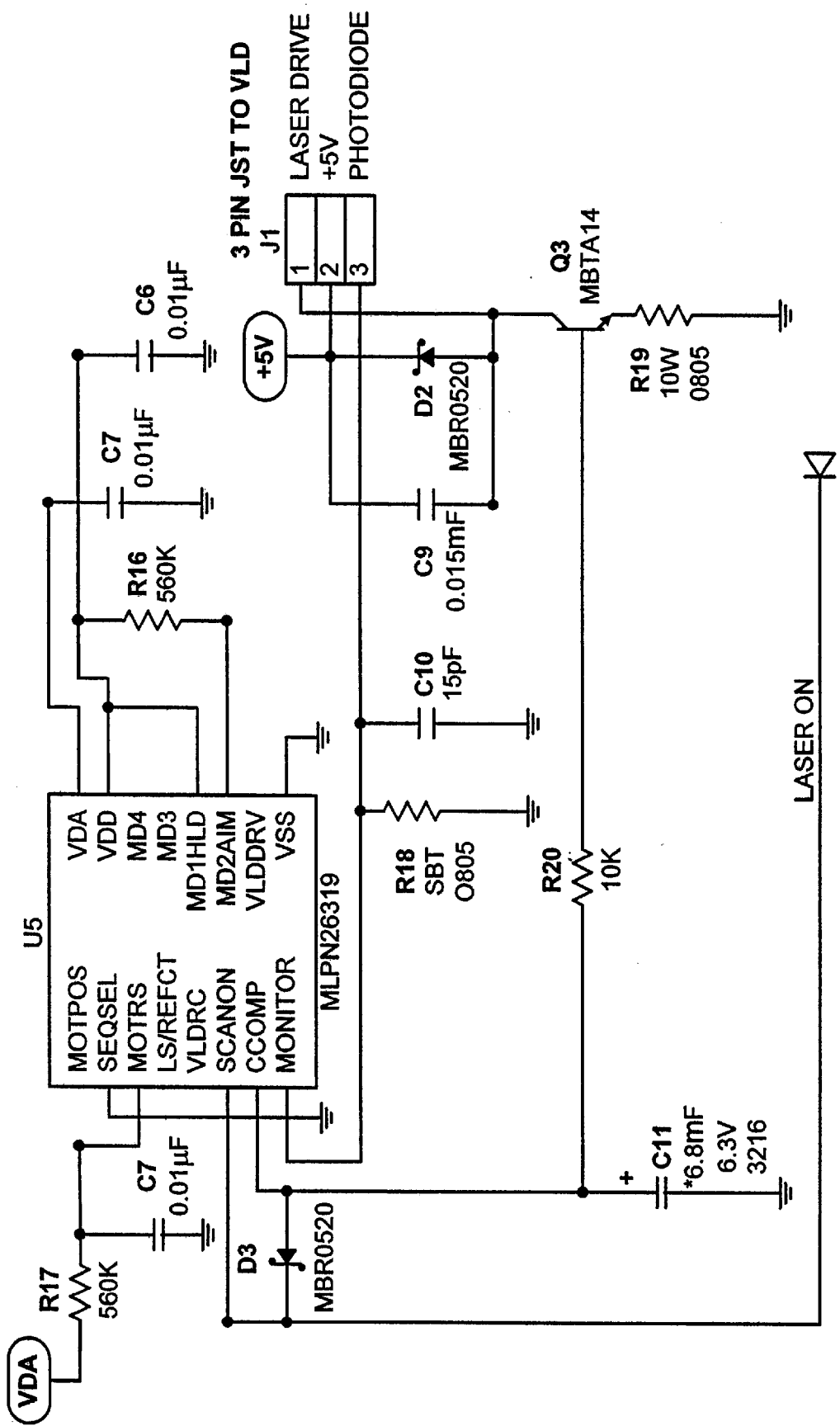
FIG. 15A3

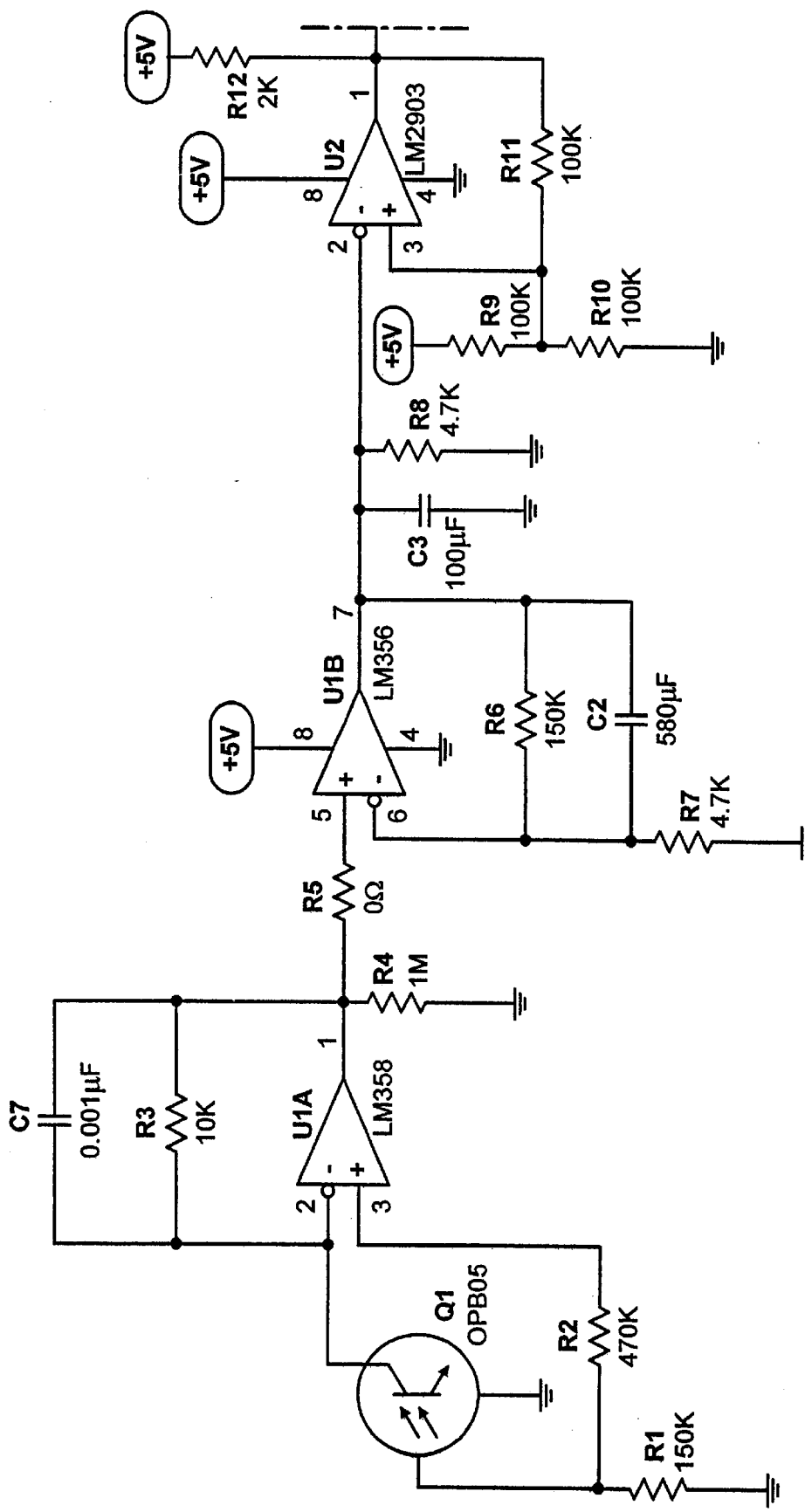
FIG. 15A4(1)

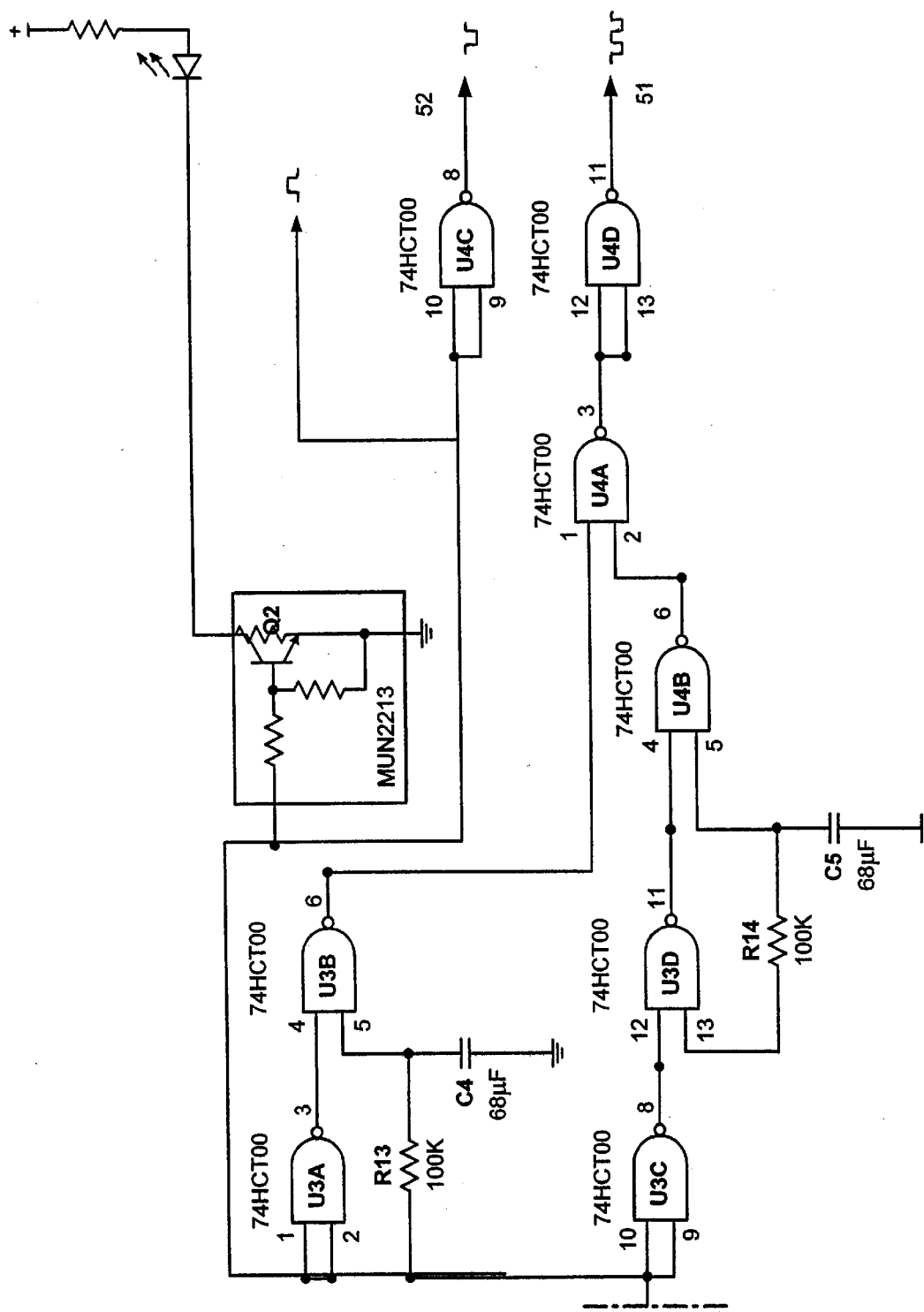
FIG. 15A4(2)

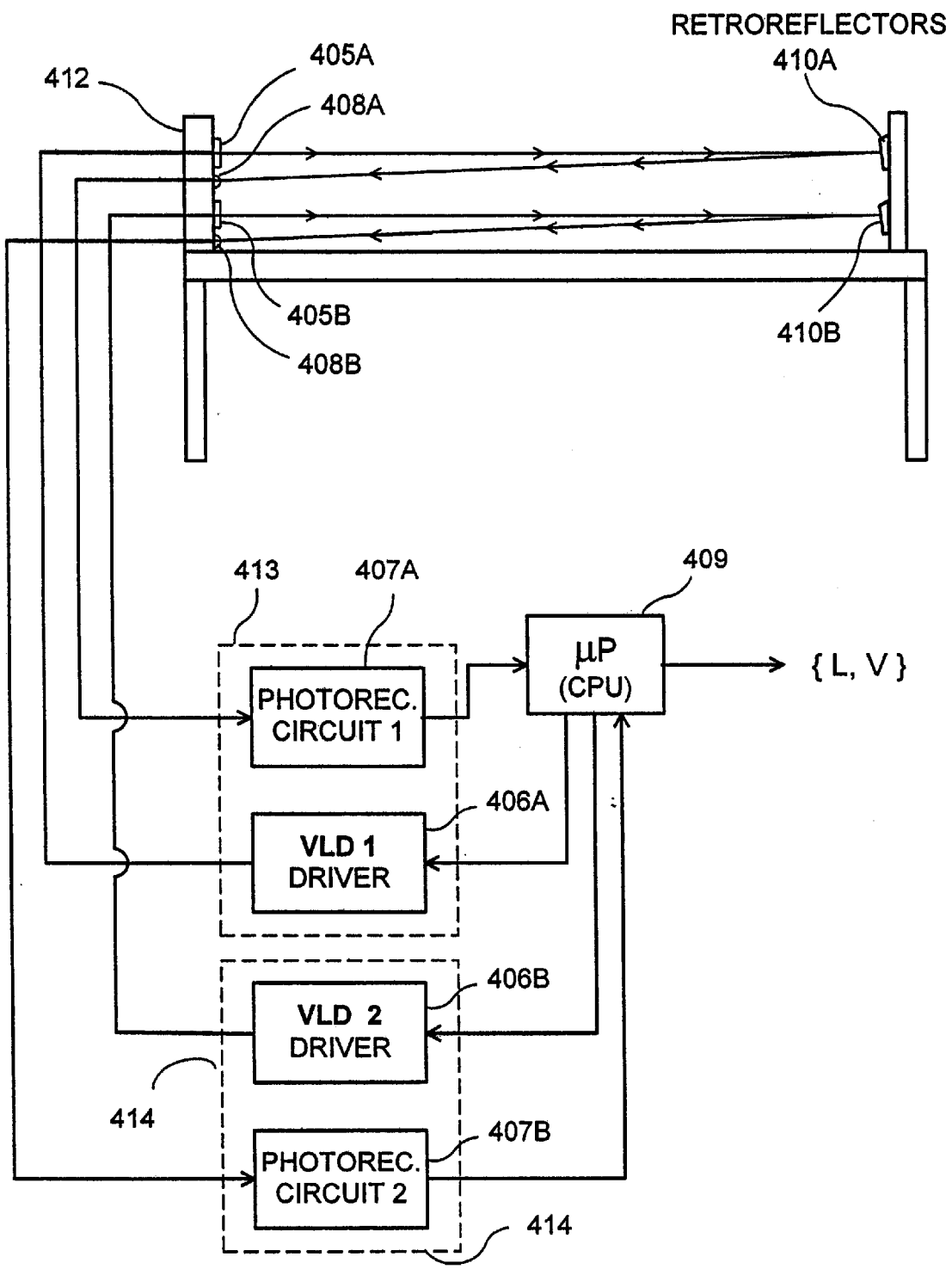
F I G. 15B

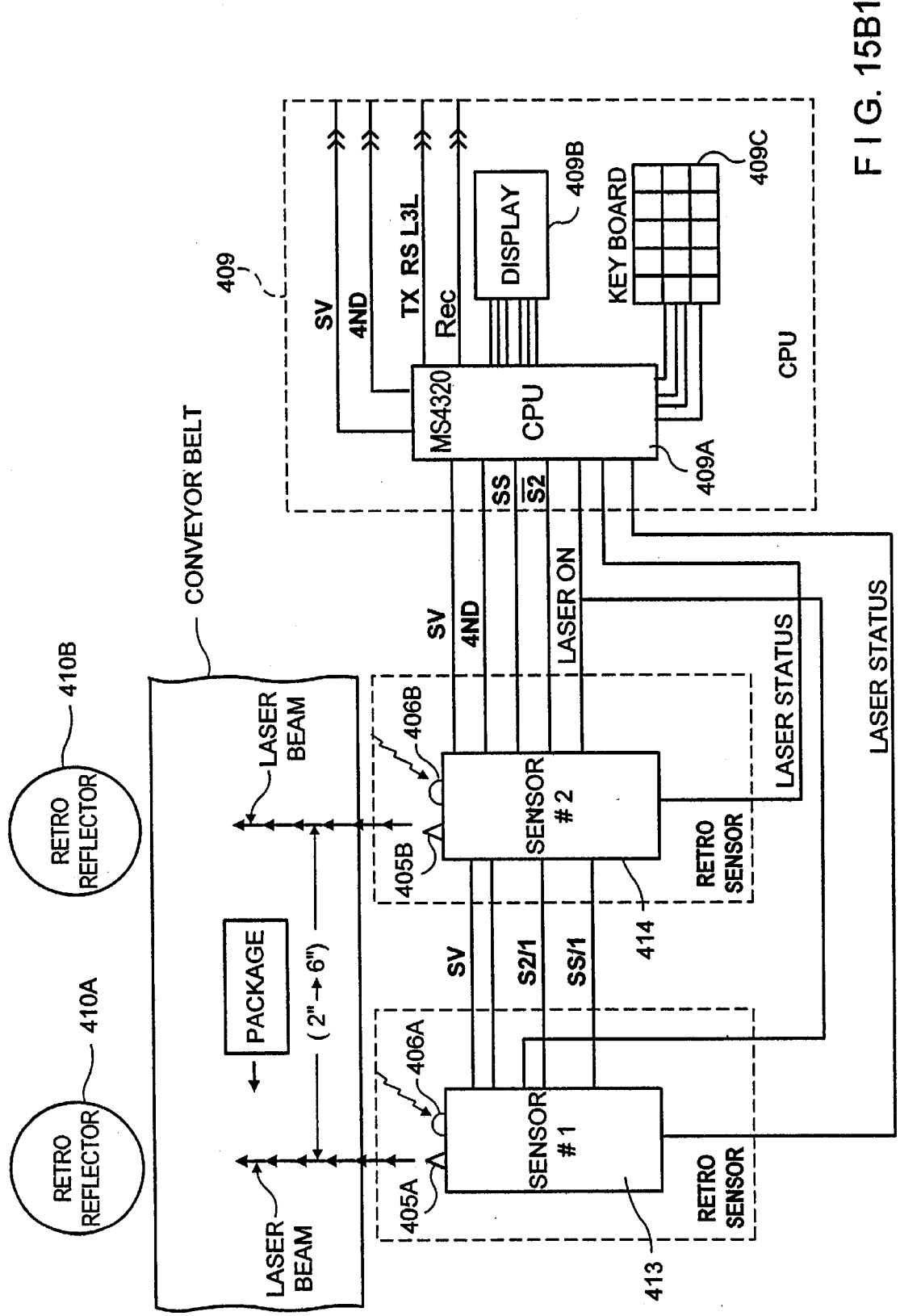
FIG. 15B1

( FOR RETRO - REFLECTIVE CONFIGURATION )
FLOW CHARTS FOR THE VELOCITY AND LENGTH MEASUREMENT SUBSYSTEM

D = DISTANCE BETWEEN 2 SENSORS ( TYPICAL VALUE: 3 INCHES )
VC = VELOCITY COUNTS ( 32 BITS )
LC = LENGTH COUNTS ( 32 BITS )
T = 0.651 MICROSECONDS ( LENGTH ON ONE MACHINE CYCLE )
VS = VELOCITY COUNT RECEIVED FLAG
LS = LENGTH COUNT RECEIVED FLAG
CC = ALL COUNTS AND FLAGS CLEARED FLAG

EXTERNAL INTERRUPT 0 ( SENSOR 1 )
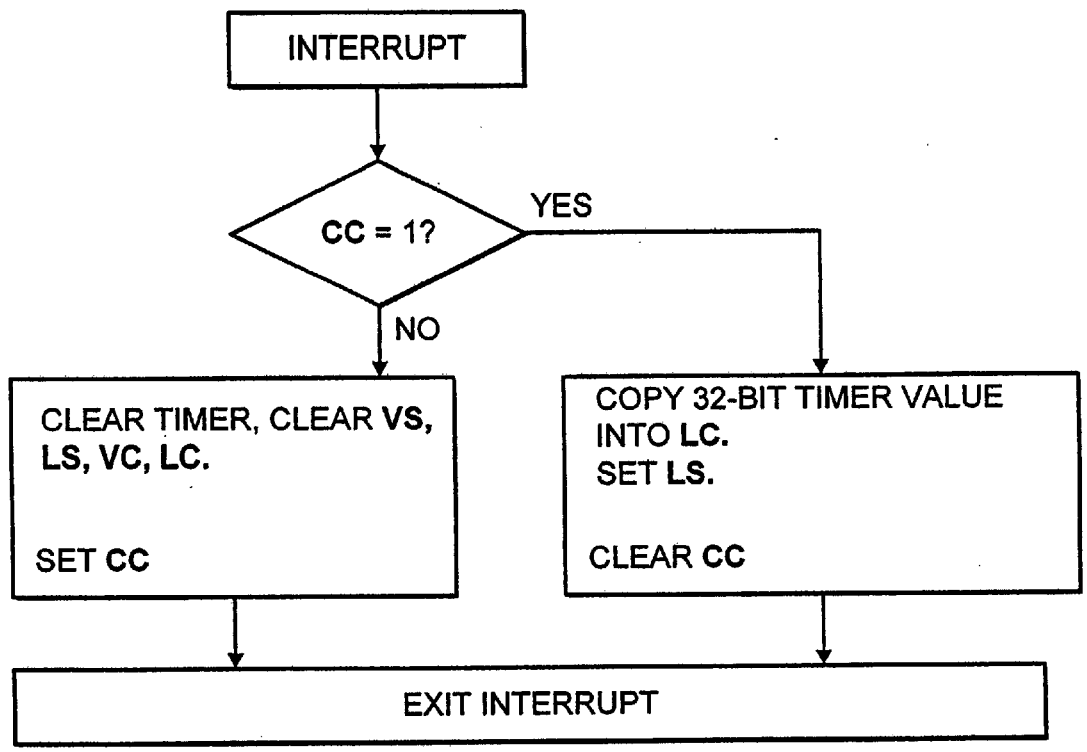
F I G. 15C1
EXTERNAL INTERRUPT 1 ( SENSOR 2 )
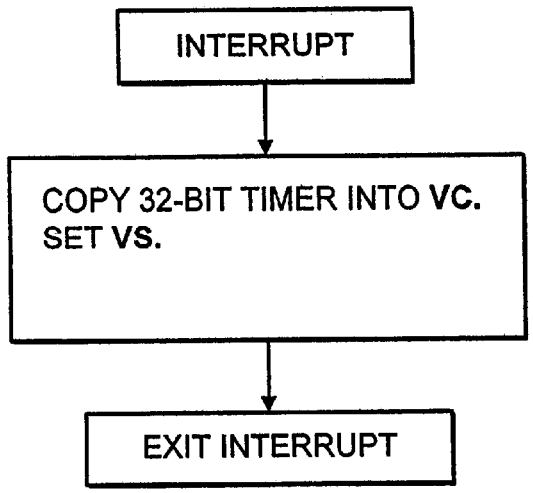
F I G. 15C2

NOTE: $R_{GLOBAL}$ IS FOR SPECIFYING LOCATION OF SCANNED BARCODES IN TUNNEL SYSTEM, AS WELL AS LOCATION OF SCANNED PACKAGES SCANNED WITHIN THE TUNNEL SYSTEM

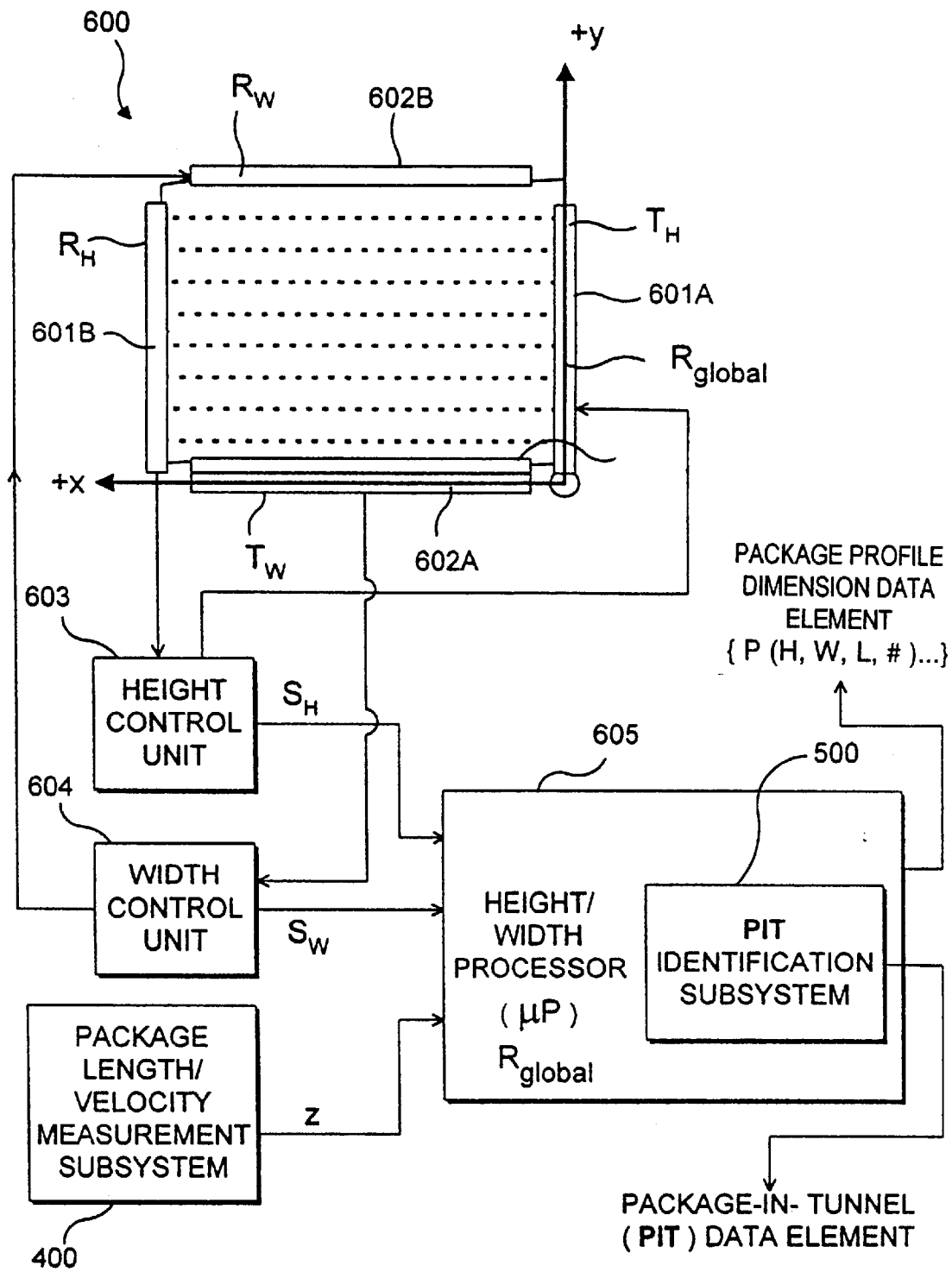
F I G. 16A

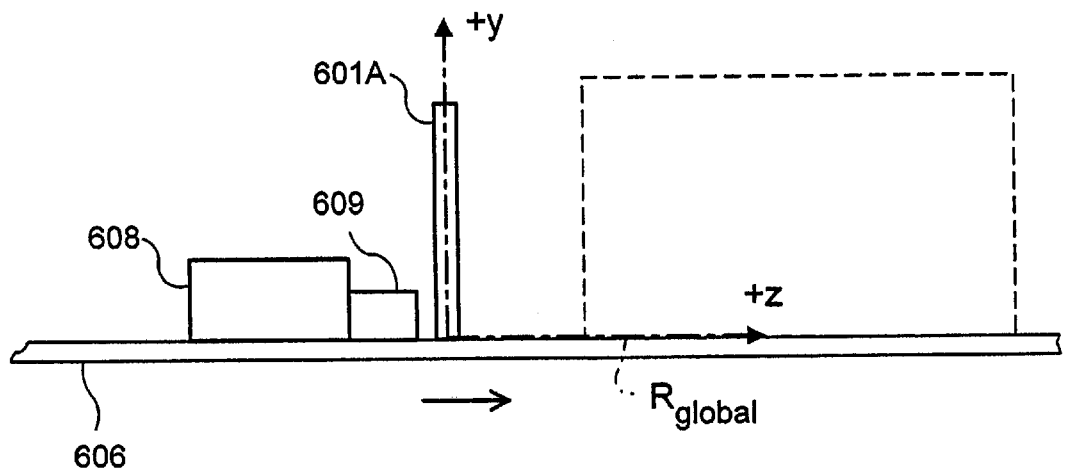
F I G. 17A
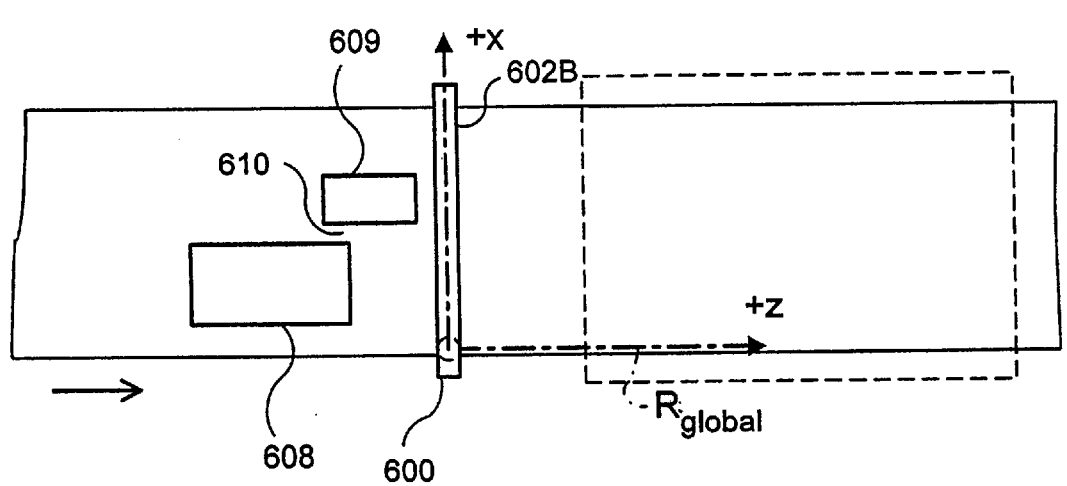
F I G. 17B
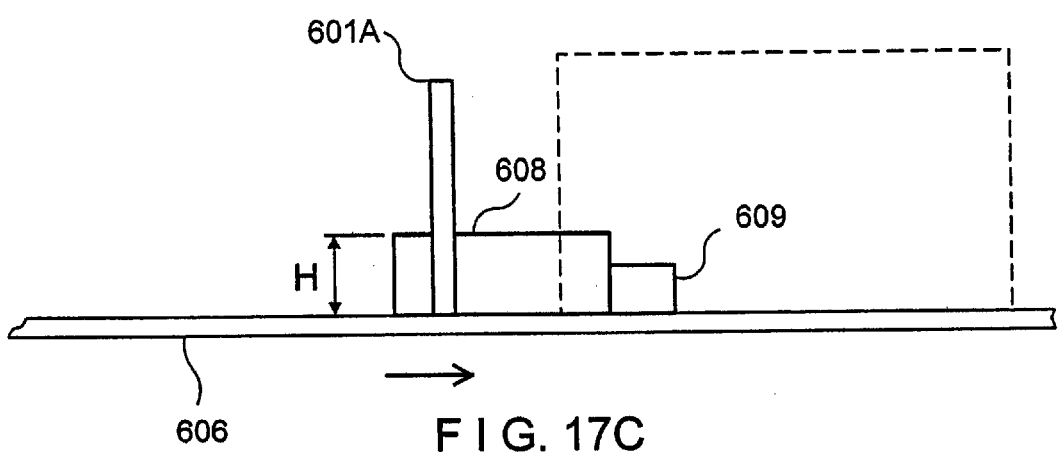
F I G. 17C

CHANGE DETECTION PROCEDURE

DATA ELEMENT HANDLING RULES

1. WHEN A PACKAGE DATA ELEMENT (PDE) OF ANY TYPE IS REMOVED FROM THE SYSTEM EVENT QUEUE, THEN IT IS PLACED IN THE MOVING PACKAGE TRACKING QUEUE

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN THE MOVING PACKAGE TRACKING QUEUE AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 22(1) AND 22(2)

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE IS REMOVED THERE FROM

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT

FIG. 23A1

(a) IF THE TIME STAMP $T_i$ ON THE REMOVED POOT DATA ELEMENT INDICATES THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE (b) IF THE TIME STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM THE MOVING PACKAGE TRACKING QUEUE.

FIG. 23A2

VECTOR-BASED SURFACE MODELLING OF PACKAGES MOVING IN SCANNING TUNNEL

MATHEMATICAL FORM OF EACH SURFACE ON THE PACKAGE: VECTOR-BASED MODEL CONSISTING OF (1) AT LEAST THREE VERTICE POINTS WITHIN THE PLANE OF THE PACKAGE SURFACE, AND (2) NORMAL VECTOR FOR THE PLANE.

PROCEDURE:

(1) USE POSITION VECTOR ( REFERENCED TO X=0, Y=0, Z=0 IN $R_{global}$), FOR SPECIFYING THE POSITION OF EACH VERTEX IN THE PACKAGE SURFACE PLANE; AND (2) USE NORMAL VECTOR FOR SPECIFYING THE SURFACE DIRECTION OF THE PACKAGE SURFACE (AT WHICH LIGHT REFLECTS)

(3) THESE FOUR VECTORS SPECIFY THE SURFACE OF THE PACKAGE IN COORDINATE REFERENCE FROM $R_{global}$

FIG. 24A

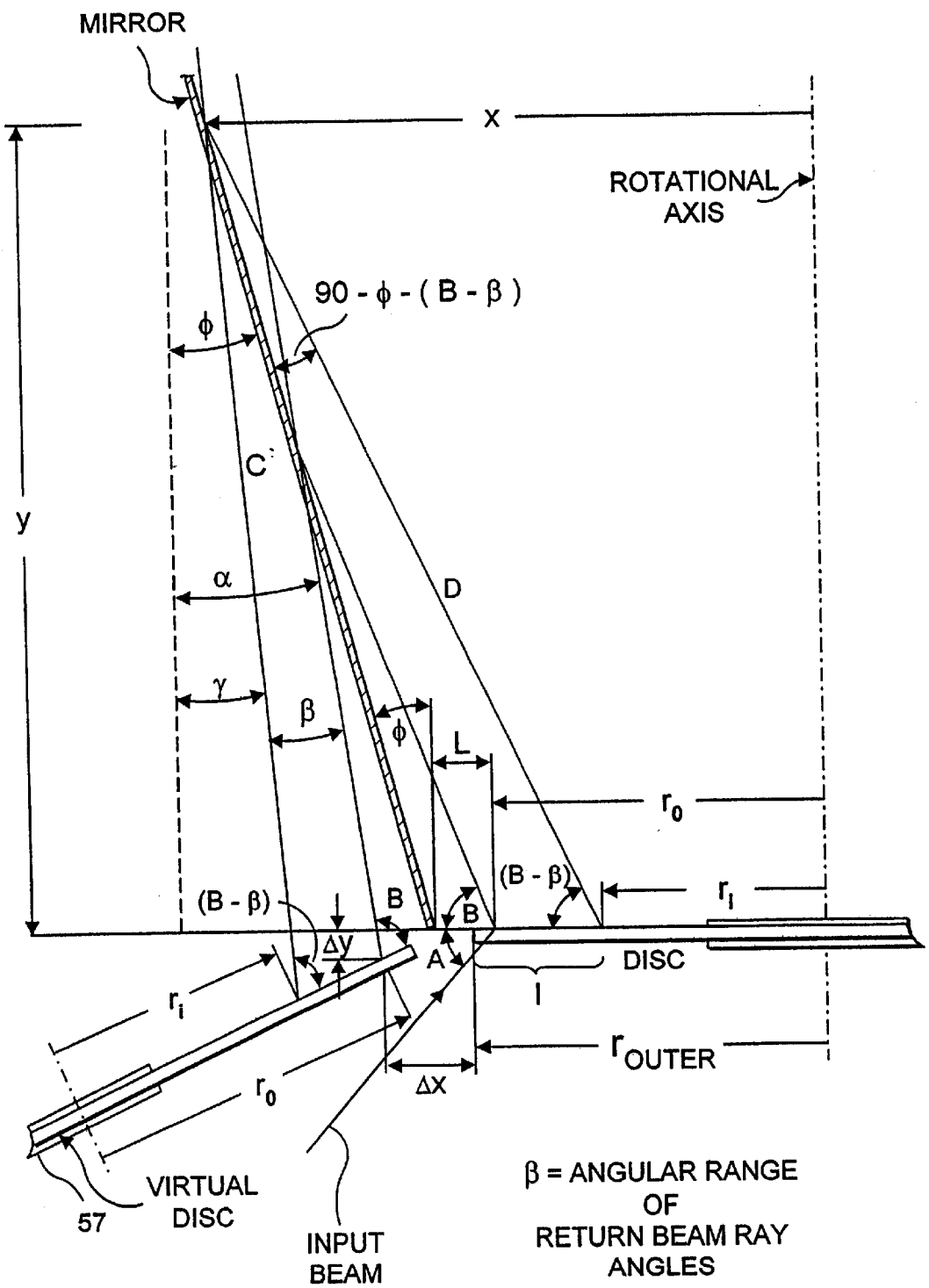
FIG. 25A1

( 1 ) THE RADIUS TO BEAM-INCIDENT-POINT ON THE HOLOGRAPHIC SCANNING DISC, ASSIGNED THE SYMBOLIC NOTATION "$r_0$"

( 2 ) SCANLINE SEPARATION BETWEEN ADJACENT SCANLINES AT THE FOCAL PLANE OF THE (i, J)-TH SCANLINE, ASSIGNED THE SYMBOLIC NOTATION "$S_{SL}$"

( 3 ) THE SCANLINE LENGTH (MEASURED INTO THE PAPER) FOR THE (i, J)-TH SCANLINE, ASSIGNED THE SYMBOLIC NOTATION "$L_{SL}$"

( 4 ) THE DISTANCE MEASURED FROM THE SCANNING DISC TO THE FOCAL PLANE OF THE (i, J)-TH SCANLINE, ASSIGNED THE SYMBOLIC NOTATION "$a_i$"

( 5 ) THE DISTANCE FROM RADIUS TO BEAM-INCIDENT-POINT $r_0$ TO BEAM FOLDING MIRROR, ASSIGNED THE SYMBOLIC NOTATION "$L$"

( 6 ) THE TILT ANGLE OF THE J-TH BEAM FOLDING MIRROR ASSOCIATED WITH GENERATION OF THE (i, J)-TH SCANLINE, ASSIGNED THE SYMBOLIC NOTATION "$\phi_j$"

( 7 ) THE TILT ANGLE OF THE VIRTUAL SCANNING DISC, ASSIGNED THE SYMBOLIC NOTATION "$2\phi$"

( 8 ) THE LATERAL SHIFT OF THE BEAM INCIDENT POINT ON THE VIRTUAL SCANNING DISC, ASSIGNED THE SYMBOLIC NOTATION "$\Delta X$"

( 9 ) THE VERTICAL SHIFT OF THE BEAM INCIDENT POINT ON THE VIRTUAL SCANNING DISC, ASSIGNED THE SYMBOLIC NOTATION "$\Delta Y$"

( 10 ) THE DISTANCE FROM THE ROTATION AXIS TO THE BEAM INCIDENT POINT ON THE VIRTUAL SCANNING DISC, ASSIGNED THE SYMBOLIC NOTATION "$r_0 + \Delta X$"

( 11 ) THE DISTANCE FROM THE BEAM INCIDENT POINT ON THE VIRTUAL SCANNING DISC TO THE FOCAL PLANE WITHIN WHICH THE (i, j)-TH SCANLINE RESIDES, ASSIGNED THE SYMBOLIC NOTATION "$f_i$"

( 12 ) THE DIAMETER OF THE CROSS-SECTION OF THE LASER BEAM SCANNING STATION, ASSIGNED THE SYMBOLIC NOTATION "$d_{BEAM}$"

( 13 ) THE ANGULAR GAP BETWEEN ADJACENT HOLOGRAPHIC SCANNING FACETS, ASSIGNED THE SYMBOLIC NOTATION "$d_{GAP}$"

( 14 ) THE OUTER RADIUS OF THE AVAILABLE LIGHT COLLECTION REGION ON THE HOLOGRAPHIC SCANNING DISC, ASSIGNED THE SYMBOLIC NOTATION "$r_{OUTER}$"

FIG. 25B1

(15) THE INNER RADIUS OF THE AVAILABLE LIGHT COLLECTION REGION ON THE HOLOGRAPHIC SCANNING FACET, ASSIGNED THE SYMBOLIC NOTATION "$r_{INNER}$"

(16) ONE-HALF OF THE DEPTH OF FIELD OF THE (i, J)-TH SCANLINE, ASSIGNED THE SYMBOLIC NOTATION "$\delta$"

(17) THE DISTANCE FROM THE MAXIMUM READ DISTANCE ($f_i + 5"$) TO THE INNER RADIUS $r_i$ OF THE SCANNING FACET, ASSIGNED THE SYMBOLIC NOTATION "C"

(18) THE OUTER RAY ANGLE MEASURED RELATIVE TO THE NORMAL TO THE i-TH HOLOGRAPHIC FACET, ASSIGNED THE SYMBOLIC NOTATION "$\alpha$"

(19) THE INNER RAY ANGLE MEASURED RELATIVE TO THE NORMAL TO THE i-TH HOLOGRAPHIC FACET, ASSIGNED THE SYMBOLIC NOTATION "$\gamma$"

(20) THE LIGHT COLLECTION ANGLE MEASURED FROM THE FOCAL POINT OF THE i-TH FACET TO THE LIGHT COLLECTION AREA OF THE SCANNING FACET, ASSIGNED THE SYMBOLIC NOTATION "$\beta$"

(21) THE INTERSECTION OF THE BEAM FOLDING MIRROR AND LINE C, ASSIGNED THE SYMBOLIC NOTATION "X"

(21A) THE INTERSECTION OF THE BEAM FOLDING MIRROR AND LINE C, ASSIGNED THE SYMBOLIC NOTATION "Y"

(22) THE DISTANCE MEASURED FROM THE INNER RADIUS TO THE POINT OF MIRROR INTERSECTION, ASSIGNED THE SYMBOLIC NOTATION "D"

(23) THE DISTANCE MEASURED FROM THE BASE OF THE SCANNER HOUSING TO THE TOP OF THE j-TH BEAM FOLDING MIRROR, ASSIGNED THE SYMBOLIC NOTATION "h"

(24) THE DISTANCE MEASURED FROM THE SCANNING DISC TO THE BASE OF THE HOLOGRAPHIC SCANNER, ASSIGNED THE SYMBOLIC NOTATION "d"

(25) THE FOCAL LENGTH OF THE i-TH HOLOGRAPHIC SCANNING FACET FROM THE SCANNING FACET TO THE CORRESPONDING FOCAL PLANE WITHIN THE SCANNING VOLUME, ASSIGNED THE SYMBOLIC NOTATION "$f_i$"

(26) INCIDENT BEAM ANGLE, ASSIGNED THE SYMBOLIC NOTATION "$A_i$"

FIG. 25B2

(27) DIFFRACTED BEAM ANGLE, ASSIGNED THE SYMBOLIC NOTATION "$B_i$"

(28) THE ANGLE OF THE J-TH LASER BEAM MEASURED FROM THE VERTICAL, ASSIGNED THE SYMBOLIC NOTATION "$-\alpha$"

(29) THE SCAN ANGLE OF THE LASER BEAM, ASSIGNED THE SYMBOLIC NOTATION "$\theta_{si}$"

(30) THE SCAN MULTIPLICATION FACTOR FOR THE i-TH HOLOGRAPHIC FACET, ASSIGNED THE SYMBOLIC NOTATION "$M_i$"

(31) THE FACET ROTATION ANGLE FOR THE i-TH HOLOGRAPHIC FACET, ASSIGNED THE SYMBOLIC NOTATION "$\theta_{ROTi}$"

(32) ADJUSTED FACET ROTATION ANGLE ACCOUNTING FOR DEADTIME, ASSIGNED THE SYMBOLIC NOTATION "$\theta'_{ROTi}$"

(33) THE LIGHT COLLECTION EFFICIENCY FACTOR FOR THE i-TH HOLOGRAPHIC FACET, NORMALIZED RELATIVE TO THE 16TH FACET, ASSIGNED THE SYMBOLIC NOTATION "$\xi_i$"

(34) THE MAXIMUM LIGHT COLLECTION AREA FOR THE i-TH HOLOGRAPHIC FACET, ASSIGNED THE SYMBOLIC NOTATION "$Area_i$"

(35) THE BEAM SPEED AT THE CENTER OF THE (i, j)-TH SCANLINE, ASSIGNED THE SYMBOLIC NOTATION "$V_{CENTER}$"

(36) THE ANGLE OF SKEW OF THE DIFFRACTED LASER BEAM AT THE CENTER OF THE i-TH HOLOGRAPHIC FACET, ASSIGNED THE SYMBOLIC NOTATION "$\phi_{SKEW}$"

(37) THE MAXIMUM BEAM SPEED OF ALL LASER BEAMS PRODUCED BY THE HOLOGRAPHIC SCANNING DISC, ASSIGNED THE SYMBOLIC NOTATION "$V_{MAX}$"

(38) THE MINIMUM BEAM SPEED OF ALL LASER BEAMS PRODUCED BY THE HOLOGRAPHIC SCANNING DISC, ASSIGNED THE SYMBOLIC NOTATION "$V_{MIN}$"

(39) THE RATIO OF THE MAXIMUM BEAM SPEED TO THE MINIMUM BEAM SPEED, ASSIGNED THE SYMBOLIC NOTATION "$V_{MAX}/V_{MIN}$"

(40) THE DEVIATION OF THE LIGHT RAYS REFLECTED OFF THE PARABOLIC LIGHT REFLECTING MIRROR BENEATH THE SCANNING DISC, FROM THE BRAGG ANGLE FOR THE FACET, ASSIGNED THE SYMBOLIC NOTATION "$\delta_e$"

FIG. 25B3

PARAMETER EQUATION USED IN THE SPREADSHEET DESIGN OF THE SCANNER (1) $\Delta x := L(1 + \cos(2\phi))$ (2) $\Delta y := L \sin(2\phi)$ (3) $\Delta y := r_0 + \Delta x$ (4) $C := \sqrt{(f+\delta)^2 + l^2 + 2(f+\delta) l \cos(B)}$ LAW OF COSINES, WHERE: $l = r_{outer} - r_{inner}$ $\beta = \alpha - \gamma = B + 2\phi - 90 - \gamma$ (5) $\alpha := B - 90 + 2\phi$ (6) $r := \alpha - \cos\left[\dfrac{(f+\delta)^2 + C^2 - l^2}{2(f+\delta)C}\right]$ (7) $\beta := \alpha - \gamma$ (8) $X := D \cos(B - \beta) + r_i$ (9) $Y := D \sin(B - \beta)$

(10) $D := \dfrac{[r_0 + L - r_i] \sin(90 + \phi)}{\sin(90 - B + \beta - \phi)}$ (LAW OF SINES)

$$(12) \quad f_i := \sqrt{a_i^2 + \left[m S_{SL} - \left[r_0 + \Delta x\right]\right]^2}$$

m IS A FACTOR THAT VARIES FROM SCAN LINE TO SCAN LINE AND DETERMINED BY SCAN LINE SEPARATION AND DISTANCE FROM THE ROTATIONAL AXIS OF THE DISC.

$$(13) \quad B_i := \mathrm{atan}\left[\left[\frac{m S_{SL} - \left[r_0 + \Delta x\right]}{a_i}\right]\right] + 90 - 2\phi$$

$$(14) \quad \theta_{Si} := 2\,\mathrm{atan}\left[\left[\frac{\frac{1}{2}\mathrm{ScanLineLength}}{f_i}\right]\right]$$

$$(15) \quad M_i := \frac{r_0}{f_i} + \cos(\lambda_i) + \cos(B_i)$$

$$(16) \quad \theta_{roti} := \frac{\theta_{Si}}{M_i}$$

$$(17) \quad \theta'_{roti} := \theta_{roti} + \underbrace{\frac{d_{beam}}{r_0} + \frac{d_{gap}}{r_0}}_{\Theta_{dead}}$$

$$(18) \quad \xi_i := \left[\frac{f_i}{f_{16}}\right]^2 \frac{\sin[B_{16}]}{\sin(B_i)} H_i$$

$$(19) \quad \mathrm{Area}_i := \pi\left[r_{outer}^2 + r_{inner}^2\right]\frac{\xi_i}{\sum_{i=1}^{16}[\xi_i]} \qquad i = 1,2,\ldots 16$$

FIG. 25C2

VECTOR MODELING OF LASER SCAN BEAMS IN HOLOGRAPHIC SCANNING SUBSYSTEMS

MATHEMATICAL FORM FOR EACH LASER SCAN BEAM:
VECTOR-BASED MODEL OF OPTICAL PATH OF BEAM
FROM DISC TO MIRROR TO FOCAL PLANE ($\infty$)

PROCEDURE:

(1) USE POSITION VECTOR REFERENCED FROM X=0, Y=0, Z=0 IN $R_{local\ scanner}$, FOR SPECIFYING THE STARTING POINT OF LASER SCAN BEAM ON DISC, AND DIRECTION VECTOR FOR SPECIFYING THE DIRECTION OF LASER BEAM TO THE BEAM FOLDING MIRROR; AND (2) USE POSITION VECTOR FOR SPECIFYING POINT ON MIRROR WHERE BEAM IS REFLECTED FROM BEAM FOLDING MIRROR TOWARDS FOCAL PLANE OF FACET, EXTENDING TO INFINITY, AND DIRECTION VECTOR FOR SPECIFYING THE DIRECTION OF LASER BEAM TOWARDS DESIGNATED FOCAL PLANE (3) THESE FOUR VECTORS SPECIFY THE LASER BEAM RAY IN LOCAL COORDINATE REFERENCE $R_{local\ scanner}$

FIG. 27

VECTOR-BASED MODEL OF SCANNING-SURFACE PRODUCED BY NON-HOLOGRAPHIC BOTTOM SCANNERS

NOTE:

EACH SCANNING SURFACE IS SPECIFIED BY FOUR BOUNDARY POINTS IN $y = 0$, X - Z PLANE OF $R_{global}$ REFERENCED TO $x = 0, y = 0, z = 0$;

EACH POINT IS REPRESENTED BY A POSITION VECTOR AND A DIRECTION VECTOR ASSUMED NORMAL TO X-Y PLANE.

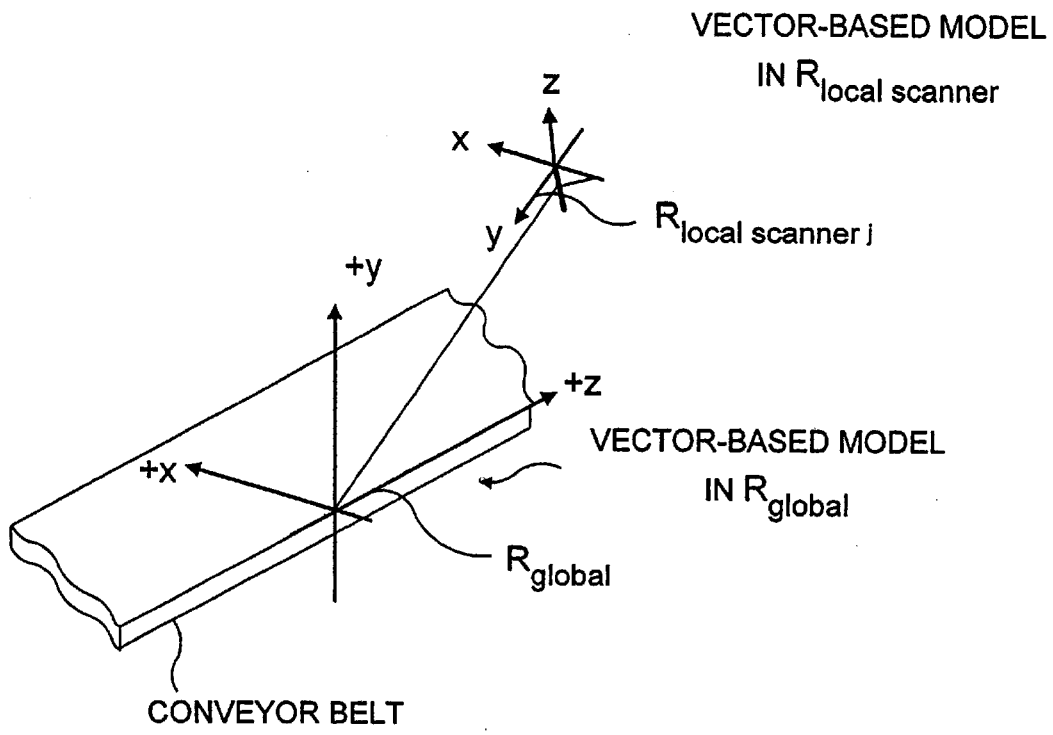
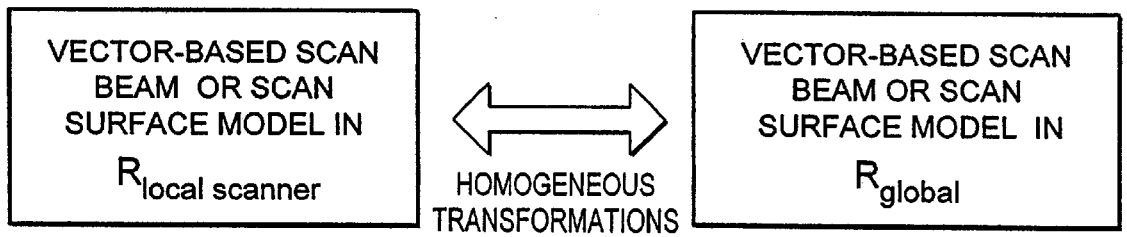
FIG. 29

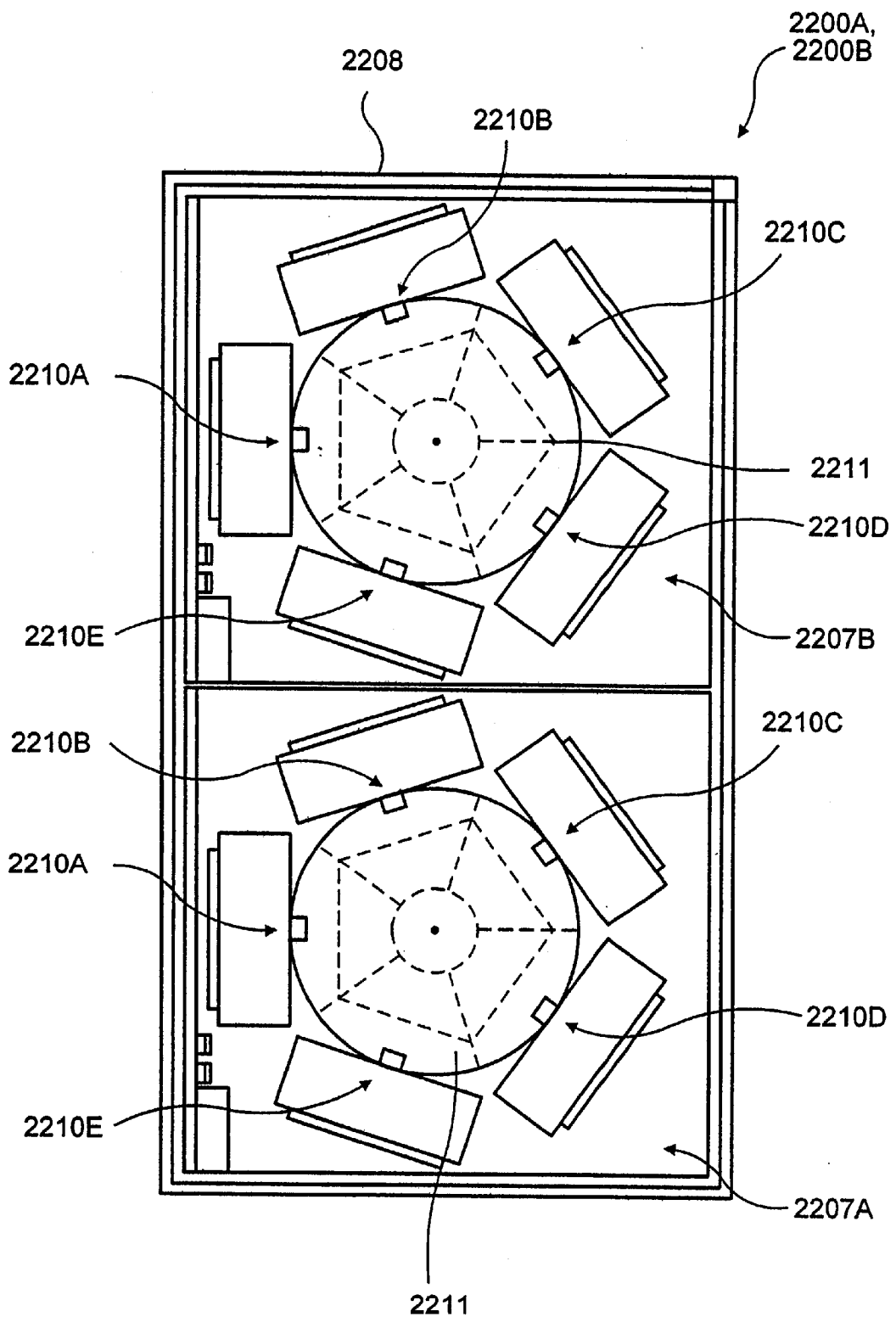
F I G. 36

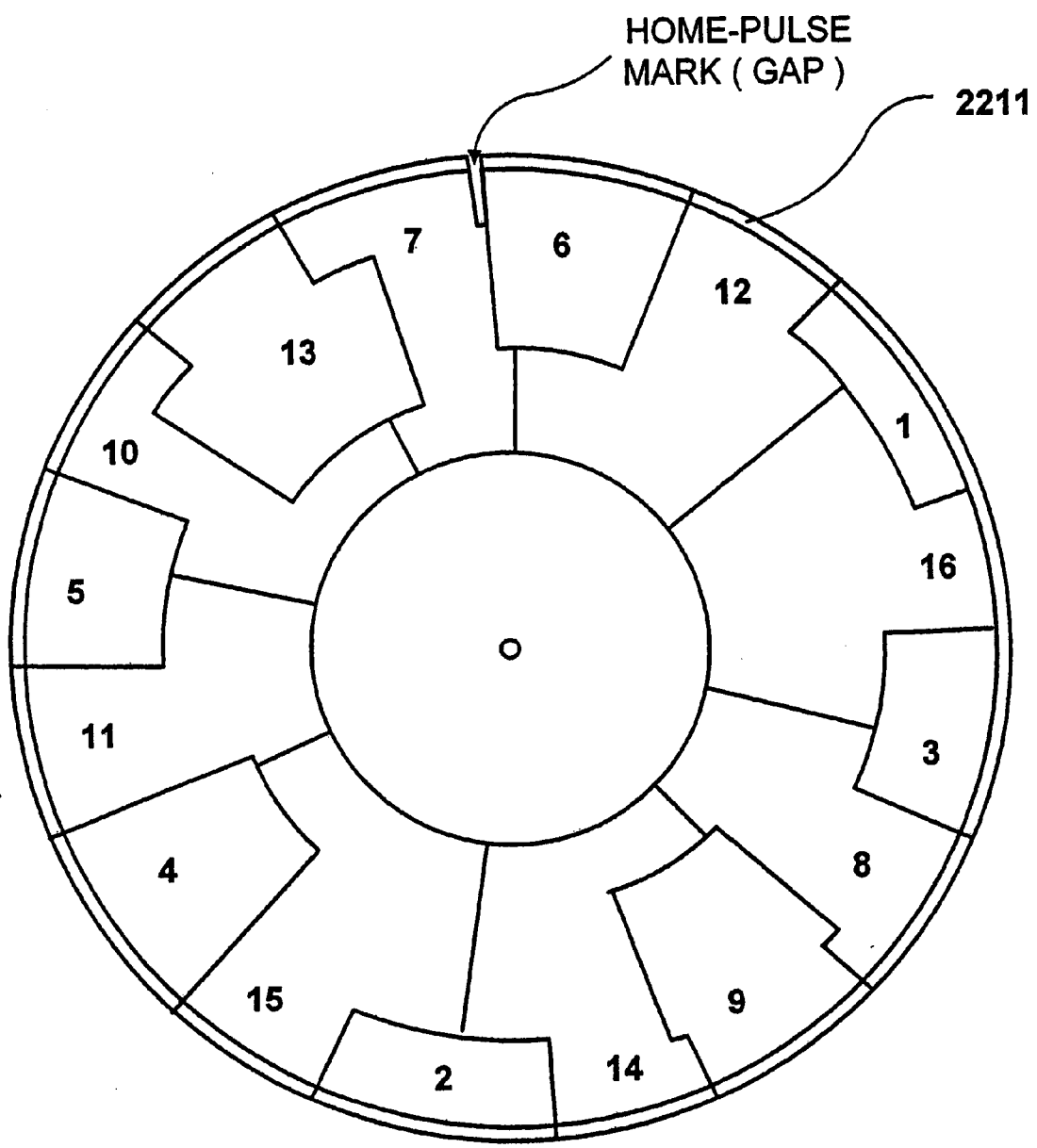
F I G. 37

| FACET | DIFFRACTION FOCAL LENGTH (INCHES) | GEOMETRICAL FOCAL LENGTH (INCHES) | ANGLE A (DEGREE) | ANGLE B (DEGREES) | ANGLE OF DIFFRACTION (DEGREES) | ANGLE OF BEAM FROM VERTICAL (DEREES) | SCAN ANGLE (DEGREES) | SCAN MULT. FACTOR (m) | ROTATION ANGLE (DEGREES) |
|---|---|---|---|---|---|---|---|---|---|
| 1 | 49.57 | 49.76 | 45.9 | 61.06 | 28.94 | -3.06 | 29.61 | 1.26 | 23.51 |
| 2 | 49.54 | 49.73 | 45.9 | 55.62 | 34.38 | 2.38 | 29.62 | 1.34 | 22.10 |
| 3 | 49.96 | 50.16 | 45.9 | 50.23 | 39.77 | 7.77 | 29.39 | 1.41 | 20.77 |
| 4 | 50.81 | 51.01 | 45.9 | 44.97 | 45.03 | 13.03 | 28.92 | 1.48 | 19.52 |
| 5 | 49.57 | 49.76 | 45.9 | 61.06 | 28.94 | -3.06 | 29.61 | 1.26 | 23.51 |
| 6 | 49.54 | 49.73 | 45.9 | 55.62 | 34.38 | 2.38 | 29.62 | 1.34 | 22.10 |
| 7 | 49.96 | 50.16 | 45.9 | 50.23 | 39.77 | 7.77 | 29.39 | 1.41 | 20.77 |
| 8 | 50.81 | 51.01 | 45.9 | 44.97 | 45.03 | 13.03 | 28.92 | 1.48 | 19.52 |
| 9 | 59.06 | 59.38 | 45.9 | 60.56 | 29.44 | -2.56 | 25.01 | 1.25 | 19.94 |
| 10 | 59.04 | 59.36 | 45.9 | 56.00 | 34.00 | 2.00 | 25.02 | 1.32 | 18.93 |
| 11 | 59.39 | 59.72 | 45.9 | 51.47 | 38.53 | 6.53 | 24.88 | 1.39 | 17.96 |
| 12 | 60.10 | 60.44 | 45.9 | 47.01 | 42.99 | 10.99 | 24.59 | 1.44 | 17.04 |
| 13 | 59.06 | 59.38 | 45.9 | 60.56 | 29.44 | -2.56 | 25.01 | 1.25 | 19.94 |
| 14 | 59.04 | 59.36 | 45.9 | 56.00 | 34.00 | 2.00 | 25.02 | 1.32 | 18.93 |
| 15 | 59.39 | 59.72 | 45.9 | 51.47 | 38.53 | 6.53 | 24.88 | 1.39 | 17.96 |
| 16 | 60.10 | 60.44 | 45.9 | 47.01 | 42.99 | 10.99 | 24.59 | 1.44 | 17.04 |

FIG. 38

DATA ELEMENT HANDLING RULES

1. WHEN A PACKAGE DATA ELEMENT (PDE) IS REMOVED FROM THE SYSTEM EVENT QUEUE, THEN IT IS PLACED IN THE MOVING PACKAGE TRACKING QUEUE

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN THE MOVING PACKAGE TRACKING QUEUE AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 41A AND 41B

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE IS REMOVED THEREFROM

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT

FIG. 42A (A) IF THE TIME-STAMP $T_i$ ON THE REMOVED POOT DATA ELEMENT INDICATE THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE.

(B) IF THE TIME-STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM THE MOVING PACKAGE TRACKING QUEUE

FIG. 42B

COORDINATE CONVERSION OF VECTOR-BASED SCAN BEAM MODELS FROM LOCAL TO GLOBAL COORDINATE REFERENCE SYSTEM
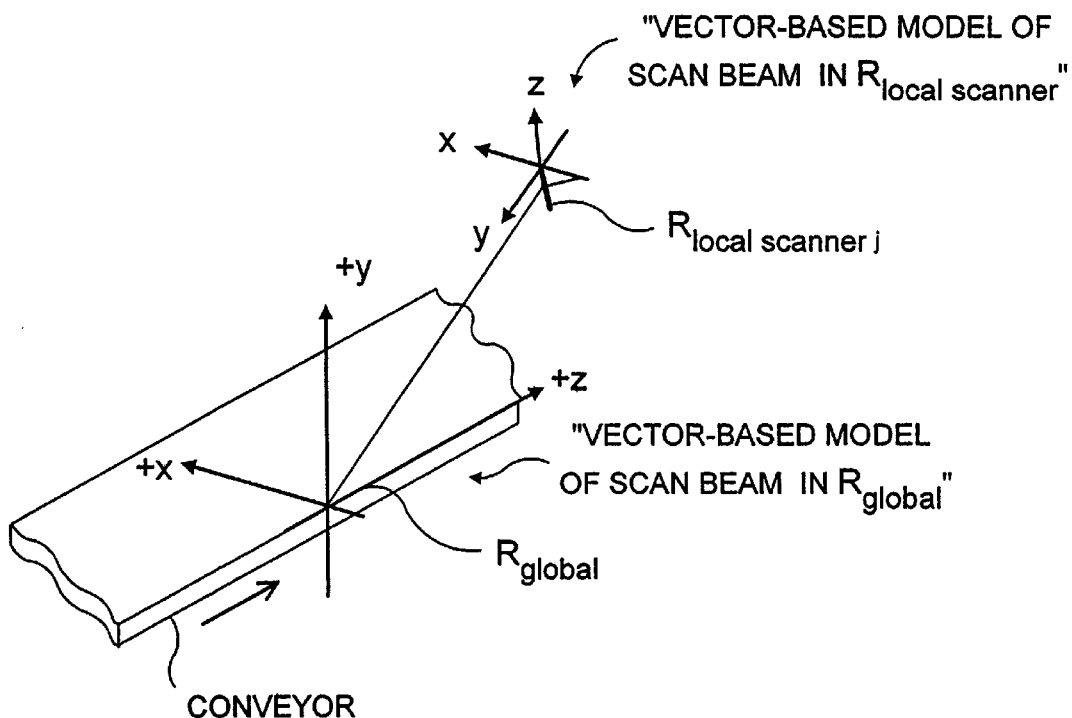
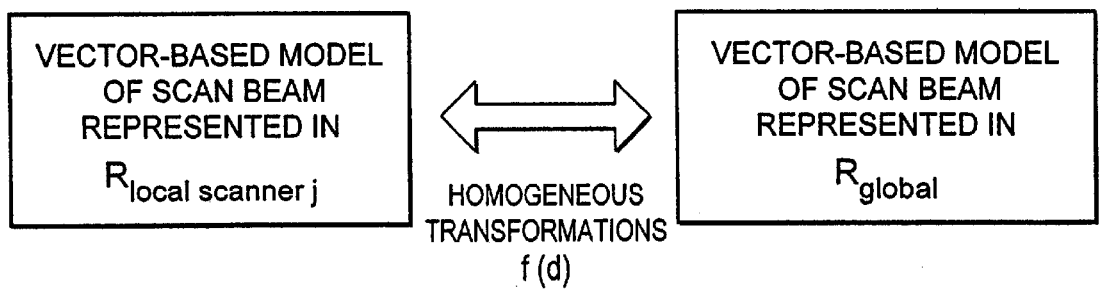
FIG. 45

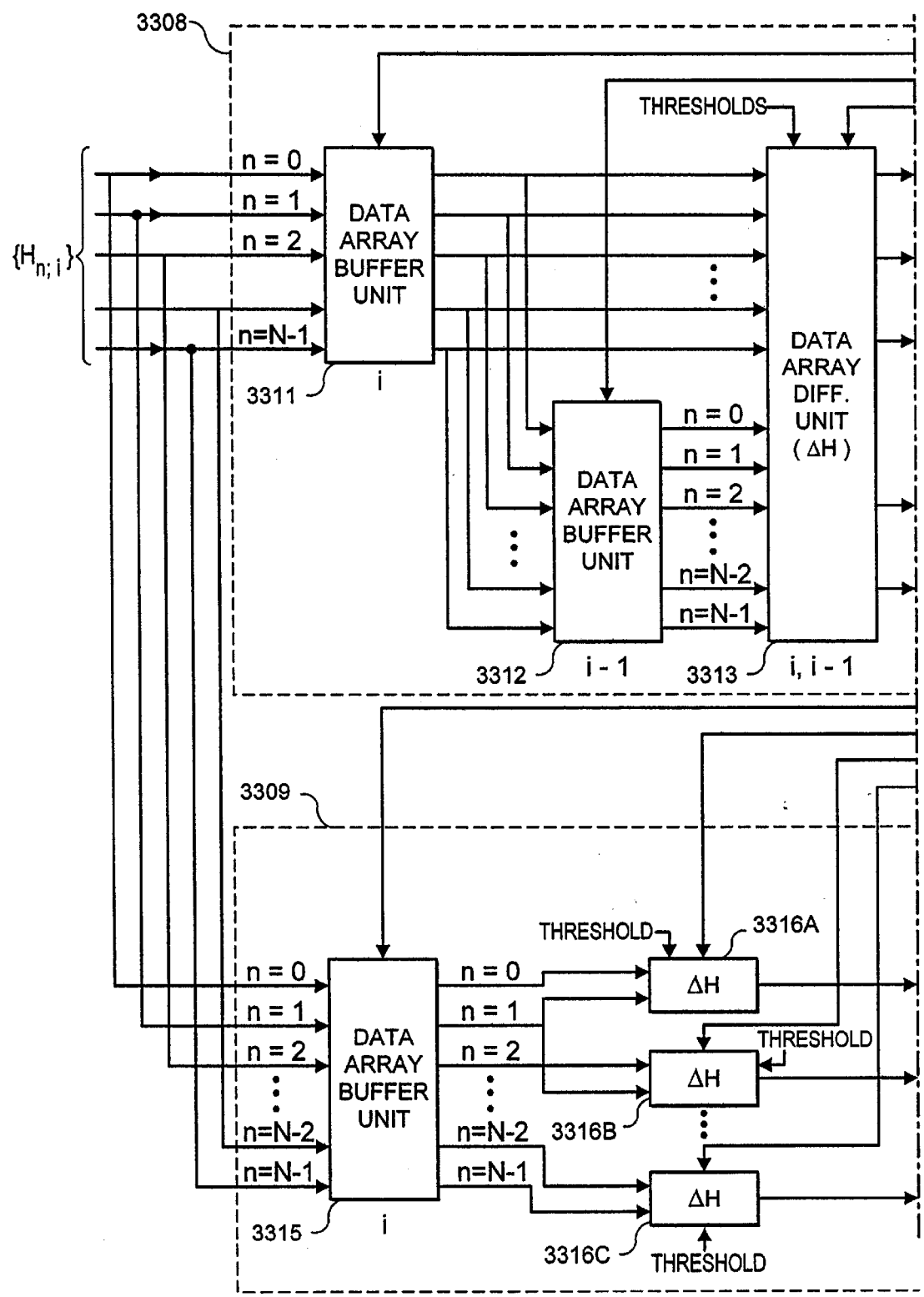
F I G. 49A1

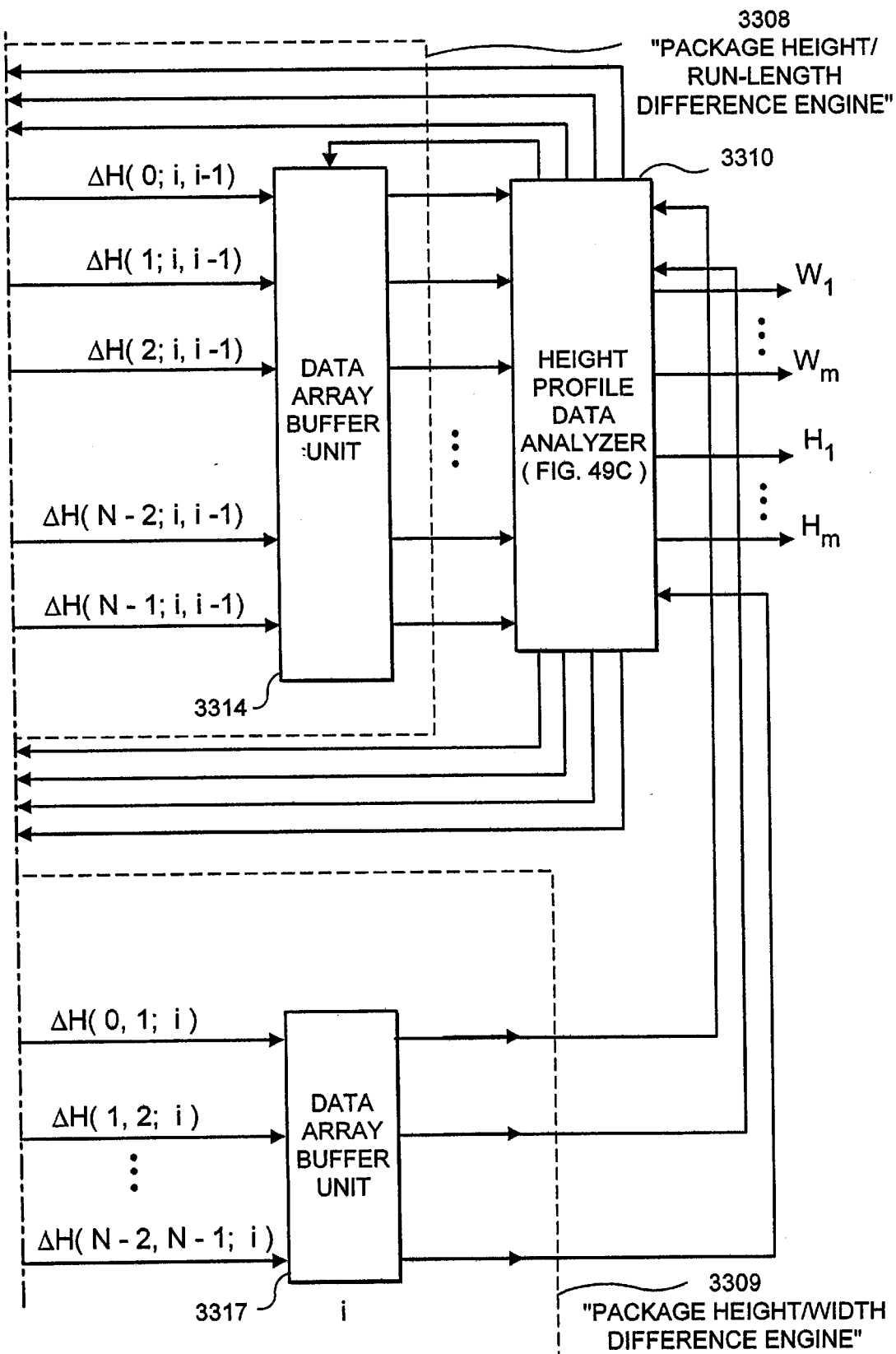
FIG. 49A2

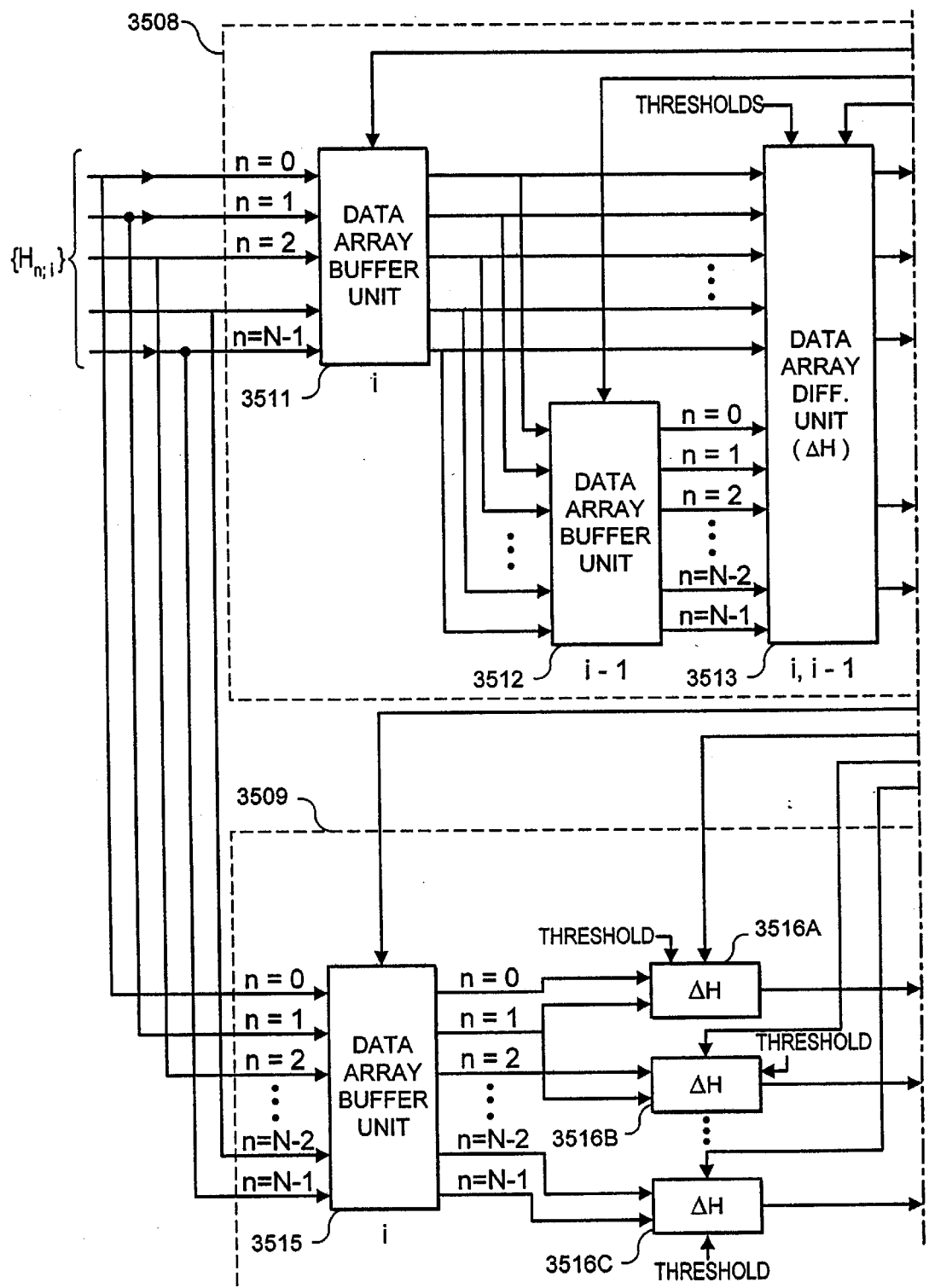
F I G. 50A1

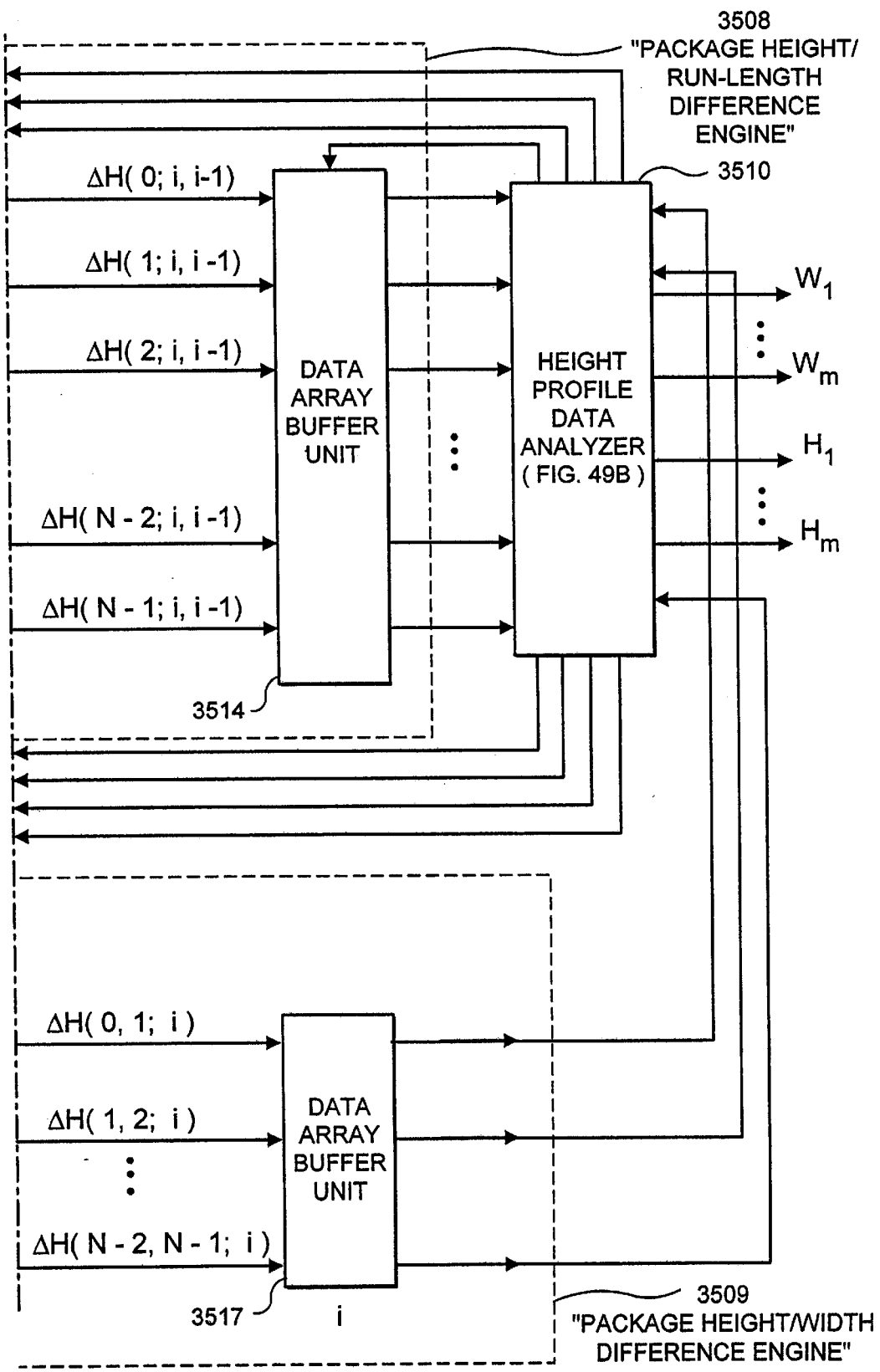
FIG. 50A2

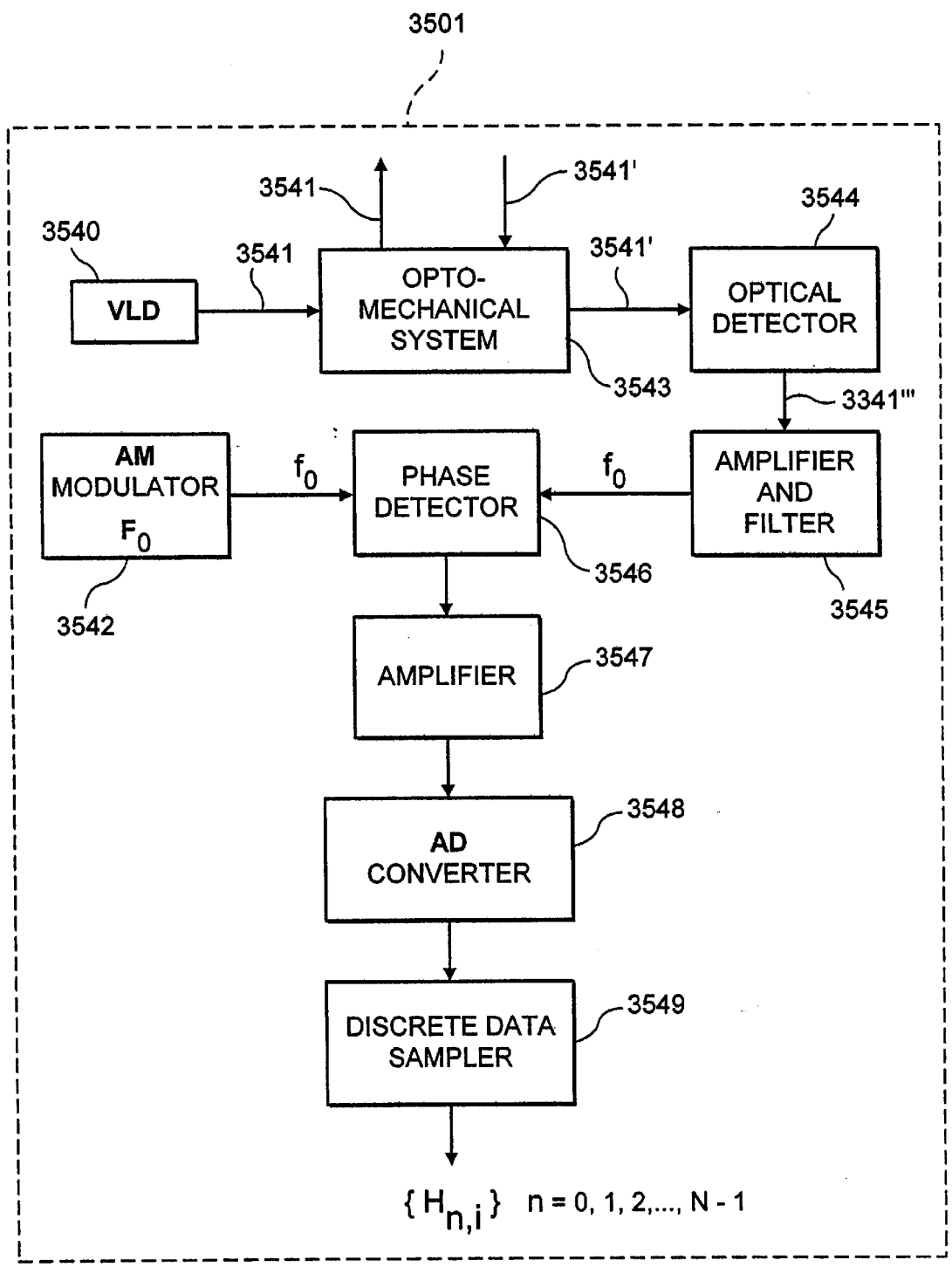
F I G. 50B

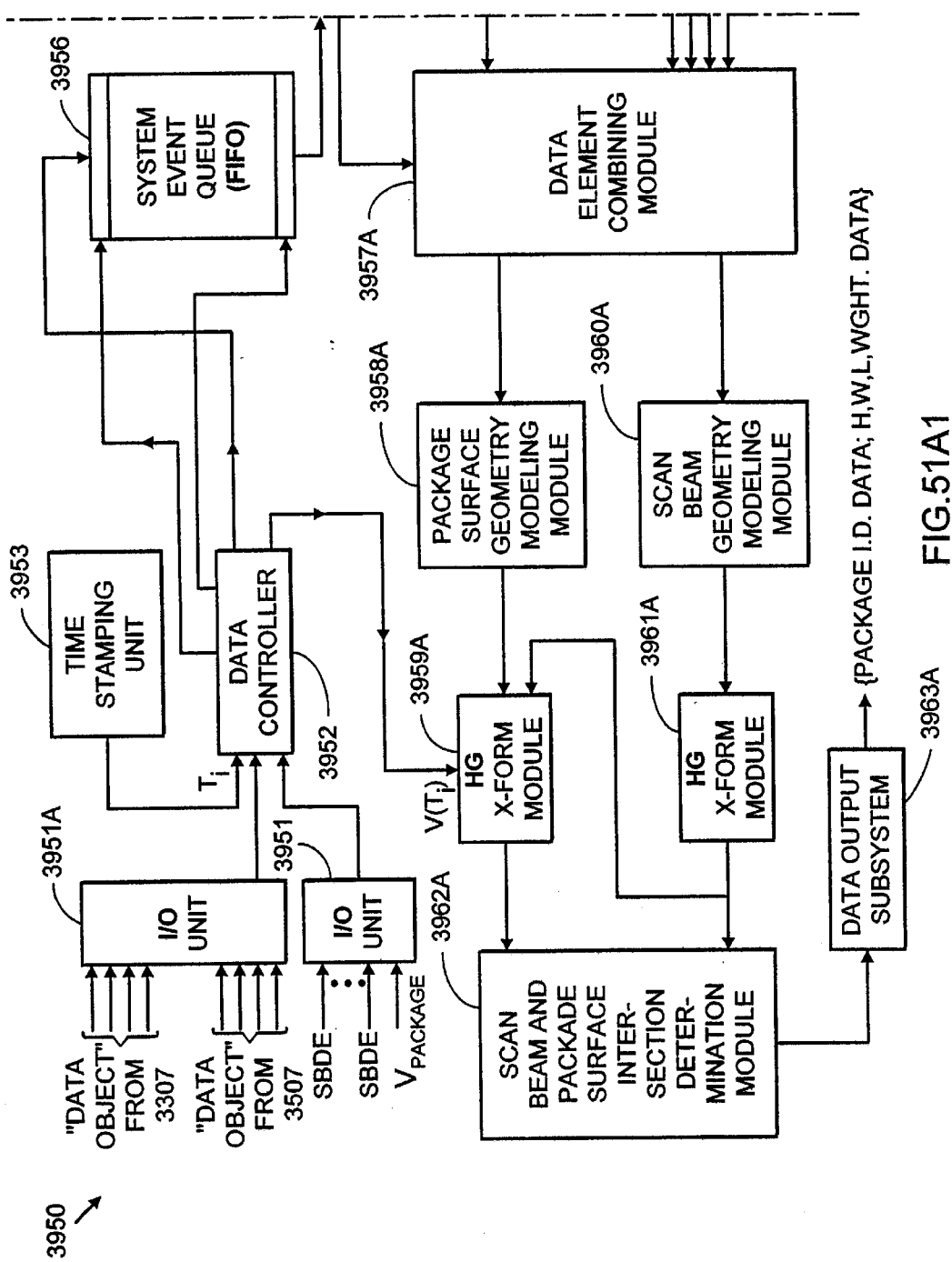
FIG.51A1

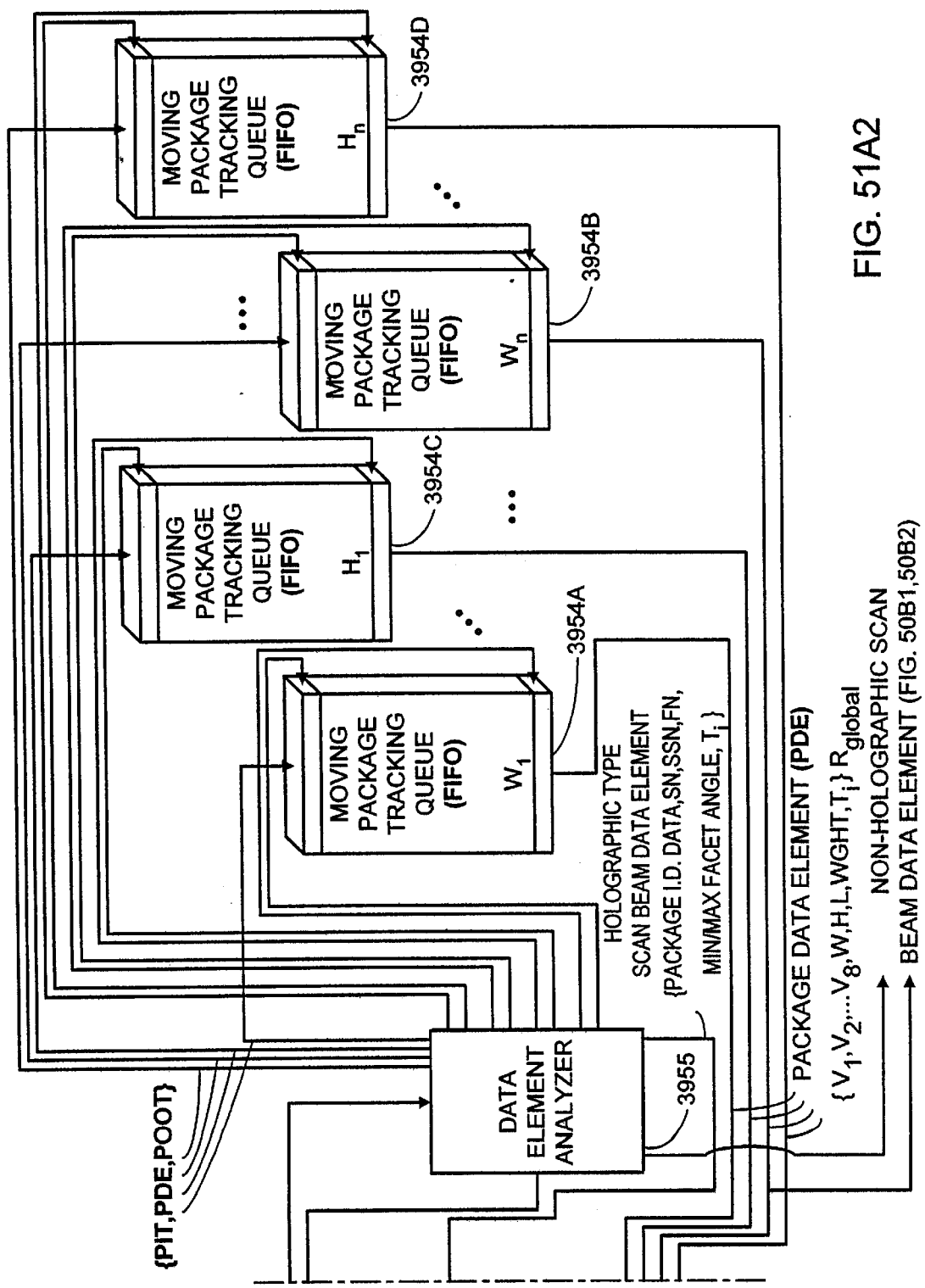

DATA ELEMENT HANDLING RULES

1. WHEN A PACKAGE DIMENSION ELEMENT (PDE) OF ANY TYPE IS REMOVED FROM THE SYSTEM EVENT QUEUE, THEN IT IS PLACED IN THE MOVING PACKAGE TRACKING QUEUE INDICATED BY THE PACKAGE DIMENSION DATA ASSOCIATED WITH THE PACKAGE DIMENSION DATA ELEMENT

2. WHEN A SCAN BEAM DATA ELEMENT (SBDE) IS REMOVED FROM THE SYSTEM EVENT QUEUE, THEN IT IS COMBINED WITH EACH PACKAGE DATA ELEMENT IN EACH MOVING PACKAGE TRACKING QUEUE, AND THEN EACH RESULTING DATA ELEMENT PAIR IS PROCESSED ALONG THE PACKAGE DATA ELEMENT CHANNEL AND SCAN DATA ELEMENT CHANNEL AS SHOWN IN FIGS. 51A1 AND 51A2

3. WHEN A PACKAGE-IN-TUNNEL (PIT) DATA ELEMENT IS REMOVED FROM THE SYSTEM EVENT QUEUE, THEN THE OLDEST PACKAGE DATA ELEMENT IN THE MOVING PACKAGE TRACKING QUEUE (INDICATED BY THE PACKAGE DIMENSION DATA ASSOCIATED WITH THE PIT DATA ELEMENT) IS REMOVED THEREFROM.

4. WHEN A PACKAGE-OUT-OF-TUNNEL (POOT) DATA ELEMENT IS REMOVED FROM THE SYSTEM EVENT QUEUE, THEN THE FOLLOWING OPERATIONS ARE CARRIED OUT:

FIG. 52A (A) IF THE TIME STAMP $T_i$ ON THE REMOVED POOT DATA ELEMENT INDICATES THAT CORRESPONDING PACKAGE HAS MOVED OUT OF THE SCANNING TUNNEL, THEN REMOVE THE OLDEST PACKAGE DATA ELEMENT IN MOVING PACKAGE TRACKING QUEUE INDICATED BY THE PACKAGE DIMENSION DATA ELEMENT ASSOCIATED WITH THE POOT DATA ELEMENT (B) IF THE TIME-STAMP $T_i$ ON THE REMOVED POOT DATA ELEMENT INDICATES THAT THE CORRESPONDING PACKAGE IS STILL MOVING THROUGH THE SCANNING TUNNEL, THEN DO NOT REMOVE ANY PACKAGE DATA ELEMENT FROM ANY MOVING PACKAGE TRACKING QUEUE

FIG. 52B

VECTOR-BASED SURFACE MODELLING OF PACKAGES MOVING IN SCANNING TUNNEL

MATHEMATICAL FORM OF EACH SURFACE ON THE PACKAGE: VECTOR-BASED MODEL CONSISTING OF (1) AT LEAST THREE VERTICE POINTS WITHIN THE PLANE OF THE PACKAGE SURFACE, AND (2) NORMAL VECTOR FOR THE PLANE.

PROCEDURE:
(1) USE POSITION VECTOR (REFERENCED TO X=0, Y=0, Z=0 IN $R_{global}$) FOR SPECIFYING THE POSITION OF EACH VECTOR IN THE PACKAGE SURFACE PLANE; AND A (2) USE NORMAL VECTOR FOR SPECIFYING THE SURFACE DIRECTION OF THE PACKAGE SURFACE (AT WHICH LIGHT REFLECTS)

(3) THESE FOUR VECTORS SPECIFY THE SURFACE OF THE PACKAGE IN COORDINATE REFERENCE FRAME $R_{global}$

FIG. 53B

VECTOR MODELING OF LASER SCAN BEAMS IN HOLOGRAPHIC SCANNING SUBSYSTEMS

MATHEMATICAL FORM FOR EACH LASER SCAN BEAM:
VECTOR-BASED MODEL OF OPTICAL PATH OF BEAM FROM DISC TO MIRROR TO FOCAL PLANE ($\infty$)

PROCEDURE:
(1) USE POSITION VECTOR REFERENCED FROM X=0, Y=0, Z=0 IN $R_{local\ scanner}$, FOR SPECIFYING THE STARTING POINT OF LASER SCAN BEAM ON DISC, AND DIRECTION VECTOR FOR SPECIFYING THE DIRECTION OF LASER BEAM TO THE BEAM FOLDING MIRROR, AND (2) USE POSITION VECTOR FOR SPECIFYING POINT ON MIRROR WHERE LASER BEAM IS REFLECTED FROM BEAM FOLDING MIRROR TOWARD FOCAL PLANE OF FACET EXTENDING TO INFINITY AND DIRECTION VECTOR FOR SPECIFYING THE DIRECTION OF LASER BEAM TOWARD DESIGNATED FOCAL PLANE (3) THESE FOUR VECTORS SPECIFY THE LASER BEAM RAY IN LOCAL COORDINATE REFERENCE $R_{local\ scanner}$

FIG. 54

VECTOR-BASED MODEL OF SCANNING-SURFACE PRODUCED BY NON-HOLOGRAPHIC BOTTOM SCANNERS

NOTE:

EACH SCANNING SURFACE IS SPECIFIED BY FOUR BOUNDARY POINTS IN y = 0, X - Z PLANE OF $R_{global}$, REFERENCED TO x = 0, y = 0, z = 0;

EACH POINT IS REPRESENTED BY A POSITION VECTOR AND A DIRECTION VECTOR ASSUMED NORMAL TO X-Y PLANE.

COORDINATE CONVERSION OF VECTOR-BASED MODELS OF SCAN BEAMS PRODUCED BY HOLOGRAPHIC SCANNERs IN SYSTEM
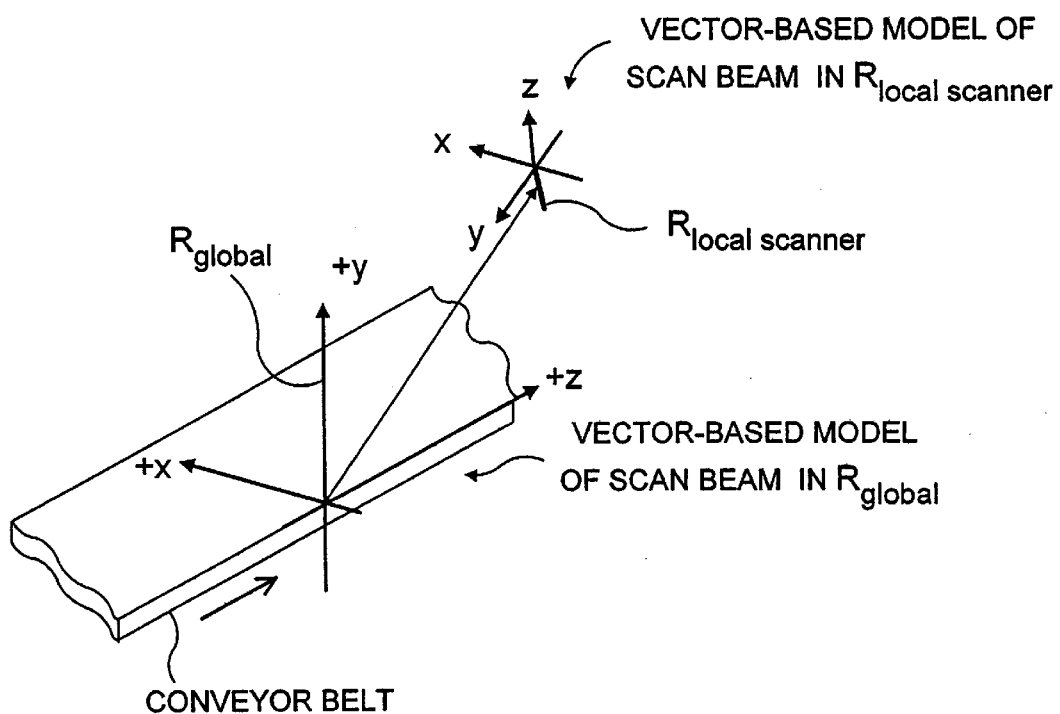
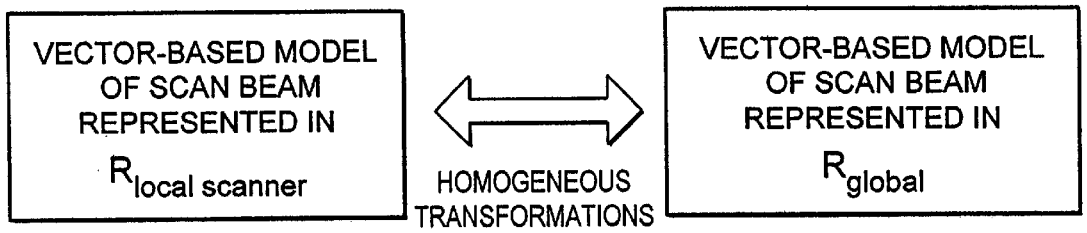
FIG. 56

AUTOMATED SYSTEM AND METHOD FOR IDENTIFYING AND MEASURING PACKAGES TRANSPORTED THROUGH A LASER SCANNING TUNNEL

CROSS-REFERENCE TO RELATED US APPLICATIONS

This is a Continuation of application Ser. No. 09/274,265 filed Mar. 22, 1999 now U.S. Pat. No. 6,832,515; which is a Continuaton-in-Part of application Ser. Nos.: 09/243,078 filed Feb. 2, 1999 now U.S. Pat. No. 6,354,505; Ser. No. 09/241,930 filed Feb. 2, 1999 now U.S. Pat. No. 6,442,461; Ser. No. 09/157,778 filed Sep. 21, 1998; Ser. No. 09/047,146 filed Mar. 24, 1998 now U.S. Pat. No. 6,360,947; Ser. No. 08/949,915 filed Oct. 14, 1997, now U.S. Pat. No. 6,158,659; Ser. No. 08/854,832 filed May 12, 1997, now U.S. Pat. No. 6,085,978; Ser. No. 08/886,806 filed Apr. 22, 1997, now U.S. Pat. No. 5,984,185; Ser. No. 08/726,522 filed Oct. 7, 1996, now U.S. Pat. No. 6,073,846; and 08/573,949 filed Dec. 18, 1995 now abandoned, each said application being commonly owned by Assignee, Metrologic Instruments, Inc., of Blackwood, N.J., and incorporated herein by reference as if fully set forth herein.

BACKGROUND OF THE INVENTION

1. Field of Invention

The present invention relates generally to an automated tunnel-type laser scanning package identification and measuring system arranged about a high-speed conveyor belt used in diverse package routing and transport applications, and also to a method of identifying and measuring packages having bar code symbols on surfaces facing any direction with a 3-D scanning volume.

2. Brief Description of the Prior Art

In many environments, there is a great need to automatically identify and measure objects (e.g. packages, parcels, products, luggage, etc.) as they are transported along a conveyor structure. While over-the-head laser scanning systems are effective in scanning upwardly-facing bar codes on conveyed objects, there are many applications where it is not practical or otherwise feasible to ensure that bar code labels are upwardly-facing during transported under the scanning station.

Various types of "tunnel" scanning systems have been proposed so that bar codes can be scanned independent of their orientation within scanning volume of the system. One such prior art tunnel scanning system is disclosed in U.S. Pat. No. 5,019,714 to Knowles. In this prior art scanning system, a plurality of single scanline scanners are orientated about a conveyor structure in order to provide limited degree of omni-directional scanning within the "tunnel-like" scanning environment. Notably, however, prior art tunnel scanning systems, including the system disclosed in U.S. Pat. No. 5,019,714, are incapable of scanning bar code systems in a true onmi-directional sense, i.e. independent of the direction that bar code faces as it is transported along the conveyor structure. At best, prior art scanning systems provide omni-directional scanning in the plane of the conveyor belt or in portions of planes orthogonal thereto. However, true omnidirectional scanning along the principal planes of a large 3-D scanning volume has not been hitherto possible.

Also, while numerous systems have been proposed for automatically identifying and measuring the dimensions and weight of packages along a high-speed conveyor, prior art systems have been very difficult to manufacture, maintain, and operate in a reliable manner without the use of human supervision.

Thus, there is a great need in the art for an improved tunnel-type automated laser scanning package identification/measuring system and a method of identifying and measuring packages transported along a high-speed conveyor system, while avoiding the shortcomings and drawbacks of prior art scanning systems and methodologies.

OBJECTS AND SUMMARY OF THE PRESENT INVENTION

Accordingly, a primary object of the present invention is to provide a novel omni-directional tunnel-type automated package identification and measuring system that is free of the shortcomings and drawbacks of prior art tunnel-type laser scanning systems and methodologies.

Another object of the present invention is to provide a fully automated package identification and measuring system, wherein an omni-directional holographic scanning tunnel is used to read bar codes on packages entering the tunnel, while a package dimensioning subsystem is used to capture information about the package prior to entry into the tunnel.

Another object of the present invention is to provide a fully automated package identification and measuring system, wherein mathematical models are created on a real-time basis for both the geometry of the package and the position of the laser scanning beam used to read the bar code symbol thereon.

Another object of the present invention is to provide a fully automated package identification and measuring system, wherein the mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

Another object of the present invention is to provide a fully automated package identification and measuring system, wherein bar code symbols that have been placed on any surface of any package, including USPS trays and tubs, and other customer mailed products, including the bottom surface of the product, are automatically scanned during movement through the system.

Another object of the present invention is to provide such a tunnel-type system which can be used for high speed mail and parcel sorting systems (e.g. Large Package Sorting Systems (LPSS), Singulate and Scan Induction Units (SSIU), as well as luggage checking and tracking systems used in airport terminals, bus-stations, train stations, and the like.

Another object of the present invention is to provide such a tunnel-type system, which can read different bar code symbologies (e.g., Interleaved two of five, Code 128 and Code three of nine), code lengths, and formats in accordance with AIM and ANSI Standards.

Another object of the present invention is to provide such a tunnel-type system, in which a user-interface is provided for programming the bar code symbologies, code lengths and code formats handled by each laser scanning unit within the system.

Another object of the present invention is to provide such a tunnel-type system, for reading bar code symbols on packages having various types of symbol formats, such as ZIP Code symbols (six digits), Package Identification Code (PIC) symbols (sixteen characters), and Tray bar code symbols (ten digits).

Another object of the present invention is to provide such a tunnel-type system, for omni-directional scanning of bar code symbols on packages, parcels and products transported along a high-speed conveyor system at velocities in the range of about 100 to 520 feet per minute or greater.

Another object of the present invention is to provide such a tunnel-type system, in which a plurality of holographic laser scanning subsystems are mounted from a scanner support framework, arranged about a high-speed conveyor belt, and arranged so that each scanning subsystem projects a highly-defined 3-D omni-directional scanning volume with a large depth-of-field, above the conveyor structure so as to collectively provide omni-directional scanning with each of the three principal scanning planes of the tunnel-type scanning system.

Another object of the present invention is to provide such a tunnel-type system, in which each holographic laser scanning subsystem projects a highly-defined 3-D omni-directional scanning volume that has a large depth-of-field and is substantially free of spatially and temporally coincident scanning planes, to ensure substantially zero crosstalk among the numerous laser scanning channels provided within each holographic laser scanning subsystem employed in the system.

Another object of the present invention is to provide such a tunnel-type system, in which a split-type conveyor is used with a gap disposed between its first and second conveyor platforms, for mounting of an omni-directional projection-type laser scanning subsystem that is below the conveyor platforms and extending substantially the entire width of the conveyor platform.

Another object of the present invention is to provide such a tunnel-type system, wherein a plurality of holographic laser scanners are arranged about the conveyor system as to produce a bi-directional scanning pattern along the principal axes of a three-dimensional laser scanning volume.

A further object of the present invention is to provide a tunnel-type system, in which each holographic laser scanner employed in the system projects a three-dimensional laser scanning volume having multiple focal planes and a highly confined geometry extending about a projection axis extending from the scanning window of the holographic scanner and above the conveyor belt of the system.

Another object of the present invention is to provide an improved tunnel-type system, wherein bar code symbols downwardly facing the conveyor belt can be automatically scanned as they are transported through the system in a high-speed manner.

Another object of the present invention is to provide an improved method of identifying and measuring packages within a tunnel-scanning environment through which objects of various types can be conveyed at high transport speeds.

Another object of the present invention is to provide an automated package identification and measuring system characterized by: lower labor costs; higher load efficiency; perfect destination accuracy; extremely fast ID throughput; more accurate shipping charges; fast, accurate tracking and sorting; and precision package weights, shapes, and measurements.

Another object of the present invention is to provide an automated package identification and measuring system which can read bar codes anywhere on a parcel moving down a fast conveyor line: top; sides; front; rear; and bottom.

Another object of the present invention is to provide an automated package identification and measuring system which enables fully automated package handling on real world-sized bar codes.

Another object of the present invention is to provide an automated package identification and measuring system which doe not require any human intervention during handling.

Another object of the present invention is to provide an automated package identification and measuring system which can sort the package after bar code data on the package has been read and captured by the system software.

Another object of the present invention is to provide an automated package identification and measuring system which can measure and weigh the package, eliminating the "guesstimating" often required by human operators.

Another object of the present invention is to provide an automated package identification and measuring system which enables exact weighing and measuring of packages, and thus minimizes wasted cargo space and more carrying capacity on every shipment, thereby allowing shippers to bill customers with greater precision, with fees keyed to package volume, shape, weight, and destination.

Another object of the present invention is to provide a novel method of automated package identification and measuring.

A further object of the present invention is to provide a novel way of and means for digitizing digital scan data while correlating laser scanning information.

A further object of the present invention is to provide a novel way of and means for decoding digital scan count data while correlating laser scanning information for use in various types of object tracking operations.

These and other objects of the present invention will become apparent hereinafter and in the Claims to Invention.

BRIEF DESCRIPTION OF THE DRAWINGS

For a more complete understanding of the present invention, the following Detailed Description of the Illustrative Embodiment should be read in conjunction with the accompanying Drawings, wherein:

FIG. 2C is a table setting forth data specifying the position and orientation of the sixteen omni-directional holographic laser scanners mounted within the tunnel scanning subsystem of the first illustrative embodiment of the present invention, wherein the position of each single-disc holographic scanner is specified with respect to the center of the holographic scanning disc contained within each such scanning unit, and the position of each triple-disc holographic scanner is specified with respect to the center of the middle holographic scanning disc contained within each such scanning unit;

FIG. 3A1 is a perspective, partially cut-away view of the single-disc holographic laser scanning subsystem (e.g. indicated as L/F Corner #1, L/F Corner #2, L/B Corner #1, L/B Corner #2, R/F Corner #1, R/F Corner #2, R/B Corner #1 and R/B Corner #2 in FIG. 1B and the Scanner Positioning Table shown in FIG. 2C), mounted within the corners of the tunnel-type scanning system of the first illustrative embodiment, showing the holographic scanning disc surrounded by one of its six beam folding mirrors, parabolic light collection mirrors, laser beam production modules, photodetectors, and analog and digital signal processing boards mounted on the optical bench of the subsystem;

FIG. 3A2 is a plan view of the single-disc holographic laser scanning subsystem employed in the tunnel scanning subsystem of the first illustrative embodiment, showing the holographic scanning disc surrounded by six laser scanning stations comprising a beam folding mirror, parabolic light collection mirror, laser beam production module (employing a VLD), each of which is enclosed in a compact housing adapted for adjustable support by the scanner support framework employed in the tunnel scanning subsystem of the illustrative embodiment;

FIG. 3A3 is a cross-sectional view of the single-disc holographic laser scanning subsystem shown in FIG. 3A2, showing its holographic scanning disc rotatably supported by its scanning motor mounted on the optical bench of the subsystem;

FIG. 3A4 is a schematic representation of the layout of the volume-transmission type holographic optical element (HOEs) mounted between the glass support plates of the holographic scanning disc employed within the single-disc holographic scanning subsystem installed in the tunnel scanning system of the first illustrative embodiment;

FIG. 3A5 is a table setting forth the design parameters used to construct each holographic disc within the single-disc holographic scanning subsystem employed in the tunnel scanning system of the first illustrative embodiment;

FIG. 3A6 is a schematic representation of the laser scanning pattern projected from the single-disc holographic laser scanning subsystem employed in the tunnel-type scanning system of the first illustrative embodiment of the present invention;

FIGS. 3A7A through 3A7C, taken together, show the subcomponents configured together on the analog signal processing boards, decode signal processing boards and within the housing of the single-disc holographic laser scanning subsystems of the first illustrative embodiment of the present invention;

FIG. 3A8A is an elevated side view of the home-pulse mark sensing module of the present invention deployed about each holographic scanning disc in the system of the first illustrative embodiment of the present invention;

FIG. 3A8B is a plan view of the home pulse mark sensing module shown in FIG. 3A8A;

FIG. 3A8C is a schematic diagram of an analog signal processing circuit which can be used to implement the home-pulse detector employed in the holographic laser scanning subsystems of the first illustrative embodiment of the present invention;

FIG. 3B1 is a plan view of the triple-disc holographic scanning subsystem (e.g. indicated as Top/Front, Top/Back, Left Side/Front, Left Side/Back, Right Side/Front and Right Side/Back in FIG. 1B and the Scanner Positioning Table shown in FIG. 2C), mounted on the top and sides of the tunnel-type scanning system of the first illustrative embodiment, showing three holographic scanning discs mounted on an optical bench with 13.3 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3B2 is a schematic representation of the layout of the volume-transmission type holographic optical elements (HOEs) mounted between the glass support plates of each holographic scanning disc employed within the triple-disc holographic scanning subsystem shown in FIG. 3B1;

FIGS. 3B3A and 3B3B, taken together, provide a table setting forth the design parameters used to construct each holographic scanning disc employed within each holographic scanning subsystem in the triple-disc holographic laser scanner shown in FIG. 3B1;

FIG. 3B4 is a schematic representation of the laser scanning pattern projected from the single-disc holographic laser scanning subsystem employed in the triple-disc holographic laser scanner shown in FIG. 3B4, when no beam folding mirrors associated therewith are angularly located or rotated;

FIG. 3B5 is a table setting forth the angular location and rotation of each beam folding mirror in the center and end-located holographic scanning subsystems employed in the triple-disc holographic laser scanner shown in FIG. 3B4;

FIG. 3B6 is a schematic representation of the laser scanning pattern projected from the center holographic laser scanning subsystem employed in the triple-disc holographic laser scanner shown in FIG. 3B4, wherein each of beam folding mirror associated therewith is angularly located and rotated as shown in the table of FIG. 3B5, to achieve the desired scanning pattern;

FIG. 3B7 is a schematic representation of the laser scanning pattern projected from end located holographic laser scanning subsystem employed in the triple-disc holographic laser scanner shown in FIG. 3B4, wherein each of beam folding mirrors associated therewith is angularly located and rotated to achieve the desired scanning pattern;

FIG. 3B8 is a schematic representation of the laser scanning pattern projected from the triple-disc holographic laser scanner shown in FIG. 3B4;

FIG. 3C1 is a plan view of the triple-disc holographic scanning subsystem (e.g. indicated as Front and Back in FIG. 1B and the Scanner Positioning Table shown in FIG. 2C), mounted on the top of the tunnel-type scanning system: of the illustrative embodiment, showing three holographic scanning discs mounted on an optical bench with 14.0 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3C2 is a schematic representation of the laser scanning pattern projected from the triple-disc holographic laser scanner shown in FIG. 3C1;

FIG. 3D1 is an exploded diagram of the fixed laser projection scanner mounted beneath the conveyor belt surface of the system and between the first and second conveyor belt platforms of the conveyor subsystem employed in the tunnel scanning system of the first illustrative embodiment, showing the optical bench upon which eight fixed projection-type laser scanning subsystems are mounted and enclosed within a scanner housing having a rugged glass scanning window bridging the gap provided between the first and second conveyor belt platforms;

FIG. 3D2 is a perspective diagram of the projection-type laser scanning subsystem mounted within the bottom-mounted fixed projection scanner shown in FIG. 3D1, showing an eight-sided polygon scanning element rotatably mounted closely adjacent to a stationary mirror array comprised of four planar mirrors, and a light collecting mirror centrally mounted for focusing light onto a photodetector disposed slightly beyond the polygon scanning element;

FIG. 3D3 is a plan view of the eight fixed-projection laser scanning subsystems mounted on the optical bench of the bottom-mounted laser scanner shown in FIG. 3D1;

FIG. 3D3A is an elevated end view of the eight fixed-projection laser scanning subsystems mounted on the optical bench of the bottom-mounted laser scanner shown in FIG. 3D1, so that the scanning window(s) of the fixed projection laser scanning subsystems (i.e. platforms or benches) are disposed at about a 28° angle with respect to the optically transparent extending across the width extent of the plane of the conveyor belt structure of the system;

FIG. 3D4 is a schematic representation of the partial scanning pattern produced by the eight-sided polygon scanning element and two stationary mirrors mounted adjacent the central plane of each fixed-projection laser scanning subsystem mounted on the optical bench of the bottom-mounted laser scanner shown in FIG. 3D1;

FIG. 3D5 is a schematic representation of the partial scanning pattern produced by the eight-sided polygon scanning element and two outer stationary mirrors mounted adjacent the two inner-located stationary mirrors in each fixed-projection laser scanning subsystem mounted on the optical bench of the bottom-mounted laser scanner shown in FIG. 3D1;

FIG. 3D6 is a schematic representation of the complete scanning pattern produced by the eight-sided polygon scanning element and four stationary mirrors mounted about the central plane of each fixed-projection laser scanning subsystem mounted on the optical bench of the bottom-mounted laser scanner shown in FIG. 3D1;

FIG. 3D7 is a schematic representation of the resultant (collective) omni-directional scanning pattern produced through the conveyor-mounted scanning window, by the eight fixed-projection laser scanning subsystems mounted on the optical bench of the bottom-mounted laser scanner shown in FIG. 3D1;

FIG. 4 is a schematic block diagram illustrating that the holographic and fixed-projection laser scanning subsystems, the package dimensioning/measurement subsystem, package velocity and length measurement subsystem, the package-in-tunnel indication subsystem, the package-out-of-tunnel subsystem, the package weighing-in-motion subsystem, the data-element queuing, handling and processing subsystem, the input/output port multiplexing subsystem, and the conveyor belt control subsystem integrated together within the automated tunnel-type package identification and measurement system of the first illustrative embodiment of the present invention;

FIG. 6 is a schematic diagram showing the direction of omni-directional scanning provided in the X-Y plane of the 3-D scanning volume of the tunnel scanning system of the first illustrative embodiment, by the Left Side Front, Left Side Back, Right Side Front and Right Side Back holographic laser scanning subsystems employed therein;

FIG. 7 is a schematic diagram showing the direction of omni-directional scanning provided in the Y-Z plane of the 3-D scanning volume of the tunnel scanning system of the first illustrative embodiment, by the Front and Back holographic laser scanning subsystems employed therein;

FIG. 8A is a schematic diagram showing the direction of Omni-directional scanning provided in the Y-Z plane of the 3-D scanning volume of the tunnel scanning system of the first illustrative embodiment of the present invention, by the holographic laser scanning subsystems (indicated by R/B Corner #1, R/B Corner #2, L/F Corner #1 and R/B Corner #2) employed therein;

FIG. 8B is a schematic diagram showing the direction of omni-directional scanning provided in the X-Y plane of the 3-D scanning volume of the tunnel scanning system of the first illustrative embodiment of the present invention, by the holographic laser scanning subsystems (indicated by R/B Corner #1, R/B Corner #2, R/F Corner #1 and R/B Corner #2) employed therein;

FIG. 10A is a schematic representation of the start-of-facet-sector pulse (SOFSP) generator employed on each decode board associated with a holographic laser scanning subsystem in the system of the first illustrative embodiment of the present invention;

FIG. 10B is a first table containing parameters and information that are used within the SOFP generation module of the SOFSP generator shown in FIG. 10A;

FIG. 10D is a second table containing parameters and information that are used within the SOFSP generation module of the SOFSP generator shown in FIG. 10A;

FIGS. 10E1 and 10E2 set forth a table containing a set of production rules used within the SOFSP generation module of the SOFSP generator shown in FIG. 10A, to generate start-of-facet-sector pulses therewithin;

FIGS. 11A is a schematic diagram showing in greater detail the digitizing circuit shown in. FIG. 10;

FIGS. 11B1, 11B2 and 11C set forth tables containing parameters and information that are used within the decode processor of the present invention shown in FIG. 11A in order to recover digital count data from time-based facet-sector related information, and generate decoded symbol character data and the minimum and maximum facet sector angles that specify the facet sector on a particular holographic scanning disc used to generate the laser scanning beam/plane that collected the scan data associated with the decoded bar code symbol;

FIG. 13C is a table containing parameters and information that are used within the SOFSP generation module of the SOFSP generator shown in FIG. 13B;

FIGS. 14B1 and 14B2 are tables containing parameters and information that are used within the decode processor of the present invention shown in FIG. 13A in order to recover digital count data from time-based facet-sector related information, and generate decoded symbol character data and the minimum and maximum facet sector angles that specify the facet sector on a particular holographic scanning disc used to generate the laser scanning beam/plane that collect the scan data associated with the decoded bar code symbol;

FIG. 14C is a high level flow chart describing the steps of the process carried out by the decode processor of the present invention shown in FIG. 13A;

FIG. 14A is a schematic representation of the components on the motherboard and decode processing boards associated with a holographic scanning disc employed within an alternative embodiment of the holographic scanning subsystems in the tunnel scanning subsystem of the first illustrative embodiment of the present invention, showing the home-pulse detector and home-offset pulse (HOP) generator on the mother (control) board, and the start-of-facet-sector pulse (SOFSP) generator, digitizer circuitry, and decode signal processor.

FIG. 14B is a schematic representation of the start-of-facet-sector pulse (SOFSP) generator employed on each decode board associated with a holographic laser scanning subsystem depicted in FIG. 14A;

FIG. 14C is a flow chart describing the operation of the HOP generator on the mother/control board associated with each holographic scanning disc, wherein home offset pulses (HOPs) are automatically generated from the HOP generator aboard the central motherboard in each holographic laser scanning subsystem independent of the angular velocity of the holographic scanning disc employed therein;

FIG. 15A is a schematic representation showing the dual-laser based package velocity and measurement subsystem installed in a "direct transmit/receive" configuration at the location of the vertical and horizontal light curtains employed in the package profiling subsystem of the present invention;

FIG. 15A1 is a schematic representation of the signals received by the photoreceivers of the dual-laser based package velocity and measurement subsystem shown in FIG. 15;

FIG. 15A2 is a schematic representation of the signals generated by the photoreceiving circuitry and provided as input to the signal processor of the dual-laser based package velocity and measurement subsystem shown in FIG. 15;

FIG. 15A3 is a schematic diagram of circuitry for driving the dual laser diodes used in the dual-laser based package velocity and measurement subsystem of FIG. 15A;

FIG. 15A4 is a schematic diagram of circuitry for conditioning the signals received by the photoreceivers employed in the dual-laser based package velocity and measurement subsystem of FIG. 15A;

FIG. 15B is a schematic representation showing the dual-laser based package velocity and measurement subsystem installed in a "retro-reflection" configuration at the location of the vertical and horizontal light transmitting/receiving structures employed in the package profiling subsystem of the present invention;

FIG. 15B1 is a schematic diagram of electronic circuitry adapted for automatically generating a pair of laser beams at a known space-part distance, towards a retroflective device positioned on the opposite side of the conveyor belt of the system of the first illustrative embodiment of the present invention, and automatically detecting the retroflected beams and processing the same so as to produce signals suitable for computing the length and velocity of a package passing through the transmitted laser beams within the dual-laser based package velocity and measurement subsystem of FIG. 15B;

FIGS. 15C through 15C2, taken together, set forth a flow chart describing the steps carried out by the signal processor used in the dual-laser based package velocity and measurement subsystems of FIGS. 15 and FIG. 15B, so as to compute the velocity (v) and length (L) of the package transported through the laser beams of the dual-laser based package velocity and measurement subsystem hereof;

FIG. 16A is a schematic representation of the horizontally and vertically arranged light transmitting and receiving structures and subcomponents employed in the package (X-Y) dimensioning/profiling subsystem in the system of the first illustrative embodiment of the present invention;

FIG. 17A is an elevated side view of a pair of packages, arranged in a side-by-side configuration, and about to be transported through the package dimensioning/profiling subsystem of FIG. 16;

FIG. 17B is a plan view of a pair of packages, arranged in a side-by-side configuration, and about to be transported through the package dimensioning/profiling subsystem of FIG. 16;

FIG. 17C is an elevated side view of a pair of package, arranged in a side-by-side configuration, and being transported through and thus profiled by the package dimensioning/profiling subsystem of FIG. 16;

FIGS. 23A1 and 23A2 set forth a table of rules used to handle the data elements stored in the system event queue in the data element queuing, handling and processing subsystem of FIG. 22;

FIG. 24A is a table setting forth a preferred procedure for creating a vector-based surface model for each surface of each package transported through the package dimensioning/measuring subsystem and package velocity/length measurement subsystem of the system hereof;

FIGS. 25A through 25A1 is schematic representation of a diffraction-based geometric optics model, created by the scan beam geometry modeling subsystem (i.e. module) of FIG. 22, for the propagation of the laser scanning beam (ray) emanating from a particular point on the facet, towards its point of reflection on the corresponding beam folding mirror, towards to the focal plane determined by the focal length of the facet, created within the scan beam geometry modeling module shown in FIG. 22;

FIGS. 25B1 through 25B3 set forth a table of parameters used to construct the diffraction-based geometric optics model of the scanning facet and laser scanning beam shown in FIGS. 25A and 25A1;

FIGS. 25C1 through 25C2 comprise a table setting forth mathematical expressions used to construct the model shown in FIGS. 25B1 through 25B3;

FIG. 27 is a table setting forth a preferred procedure for creating a vector-based ray model for laser scanning beams which have been produced by a holographic laser scanning subsystem of the system hereof, that may have collected the scan data associated with a decoded bar code symbol read thereby within the tunnel scanning subsystem;

FIG. 29 is a schematic representation graphically illustrating how a vector-based model created within a local scanner coordinate reference frame $R_{localscannerj}$ can be converted into a corresponding vector-based model created within the global scanner coordinate reference frame $R_{global}$ using homogeneous transformations;

FIG. 36 is a plan view of a dual-disc holographic laser scanning subsystem mounted over the conveyor belt of the system shown in FIG. 33;

FIG. 37 is a schematic representation of each holographic laser scanning disc employed in the laser scanning subsystem of the present invention;

FIG. 38 is a table setting forth the design parameters used to construct each holographic disc within the dual-disc holographic scanning subsystem employed in the tunnel scanning system of the second illustrative embodiment;

Figure 33:
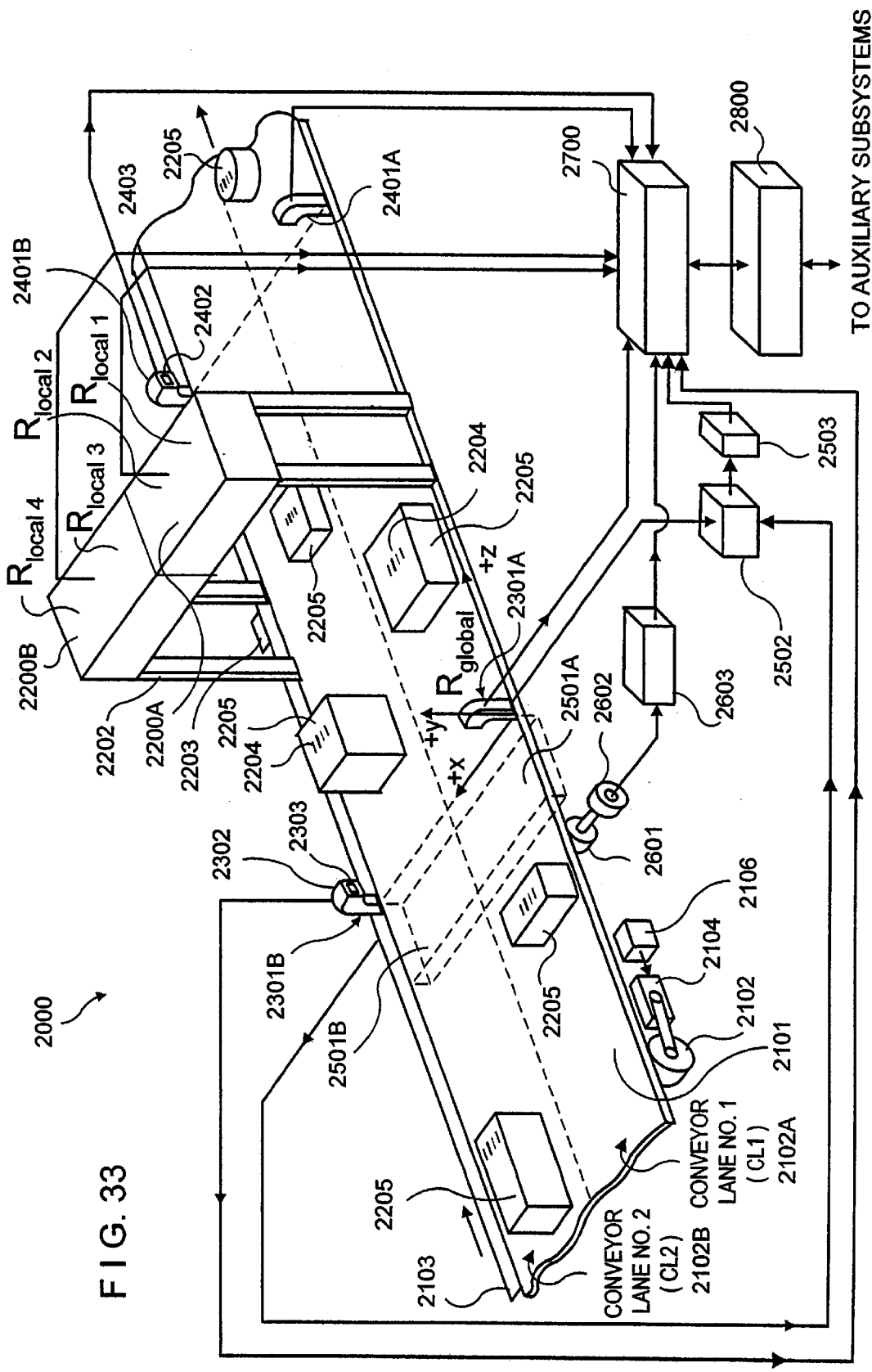
FIG. 33 is a perspective view of a "dual-lane" automated tunnel-type laser scanning package identification and weighing system constructed in accordance with the second illustrated embodiment of the present invention.
Figure 41A:
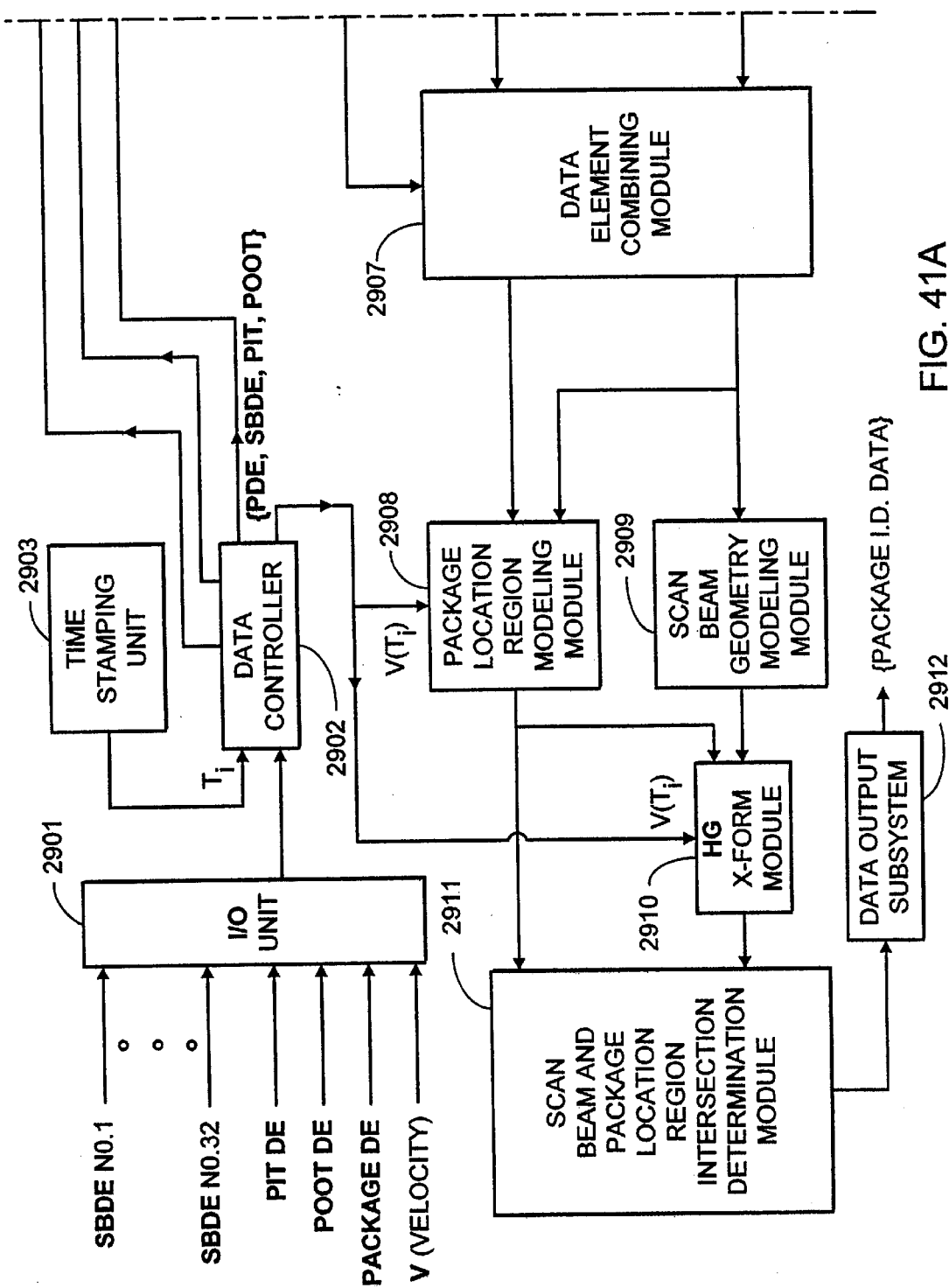
FIG. 41 is a taken together provide a schematic representation of the data element queuing, handling and processing subsystem employed in the system of the second illustrative embodiment of the present invention, illustrated in FIG. 33.
Figure 41B:
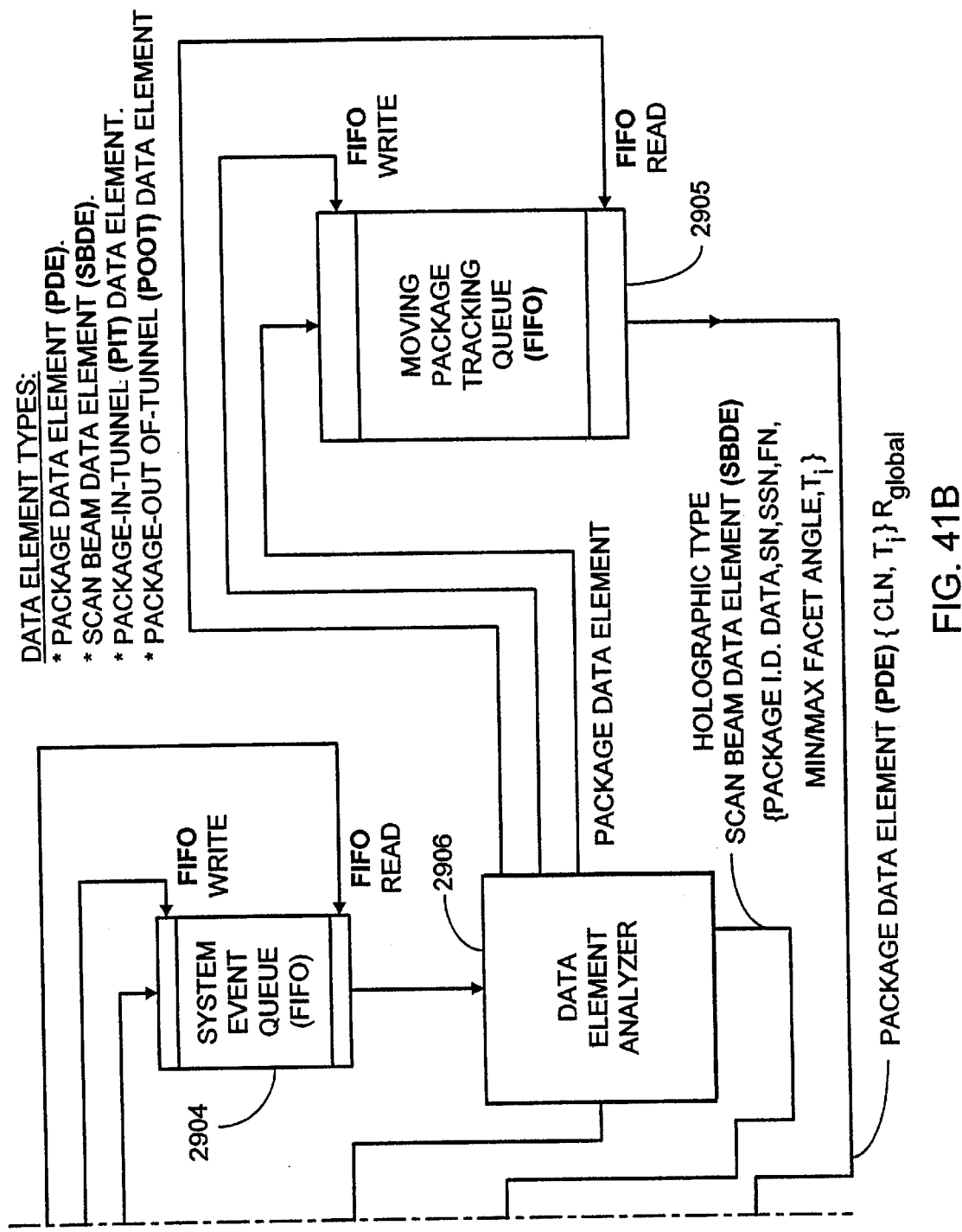
Figure 43:
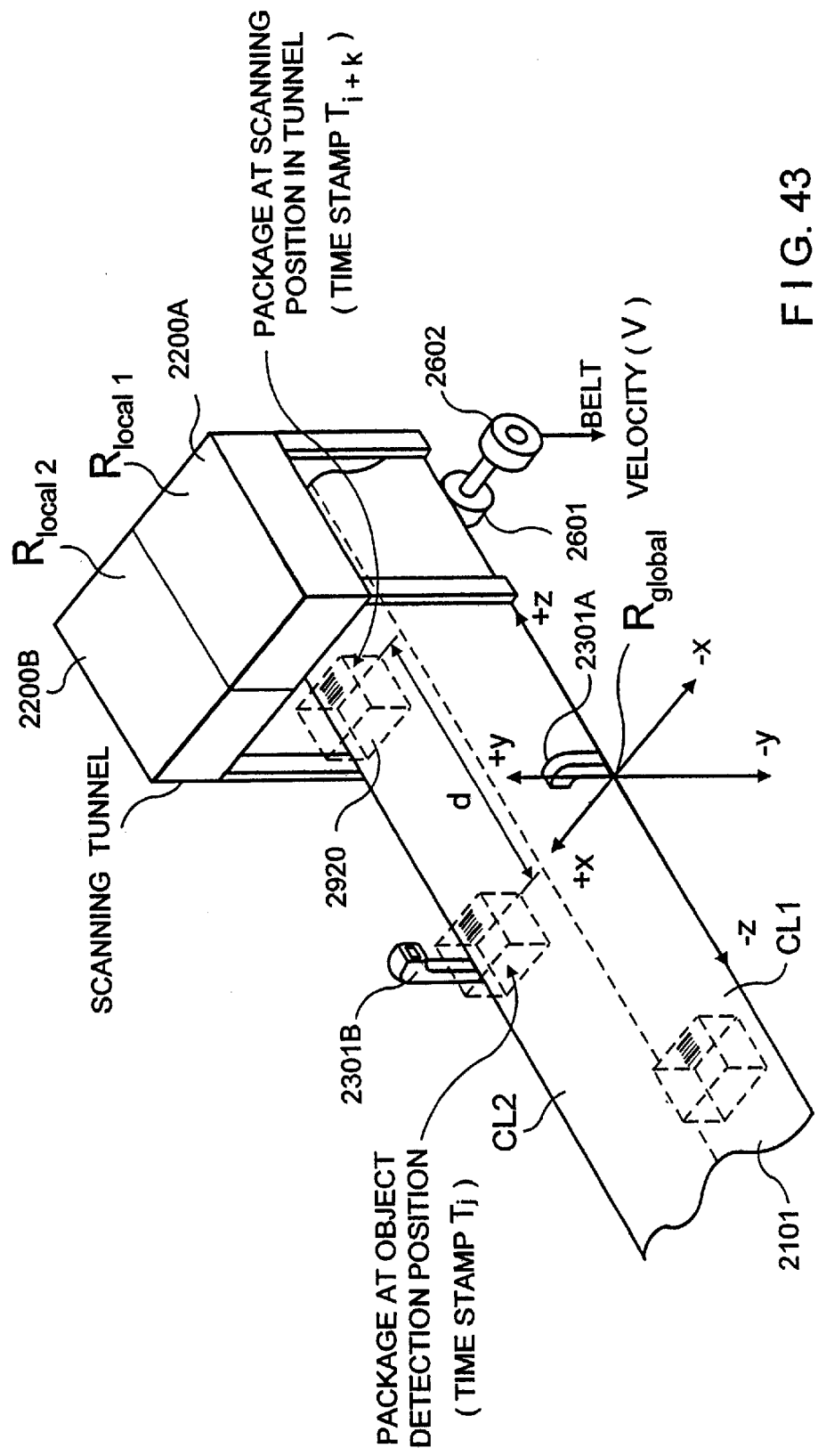
Figure 44A:
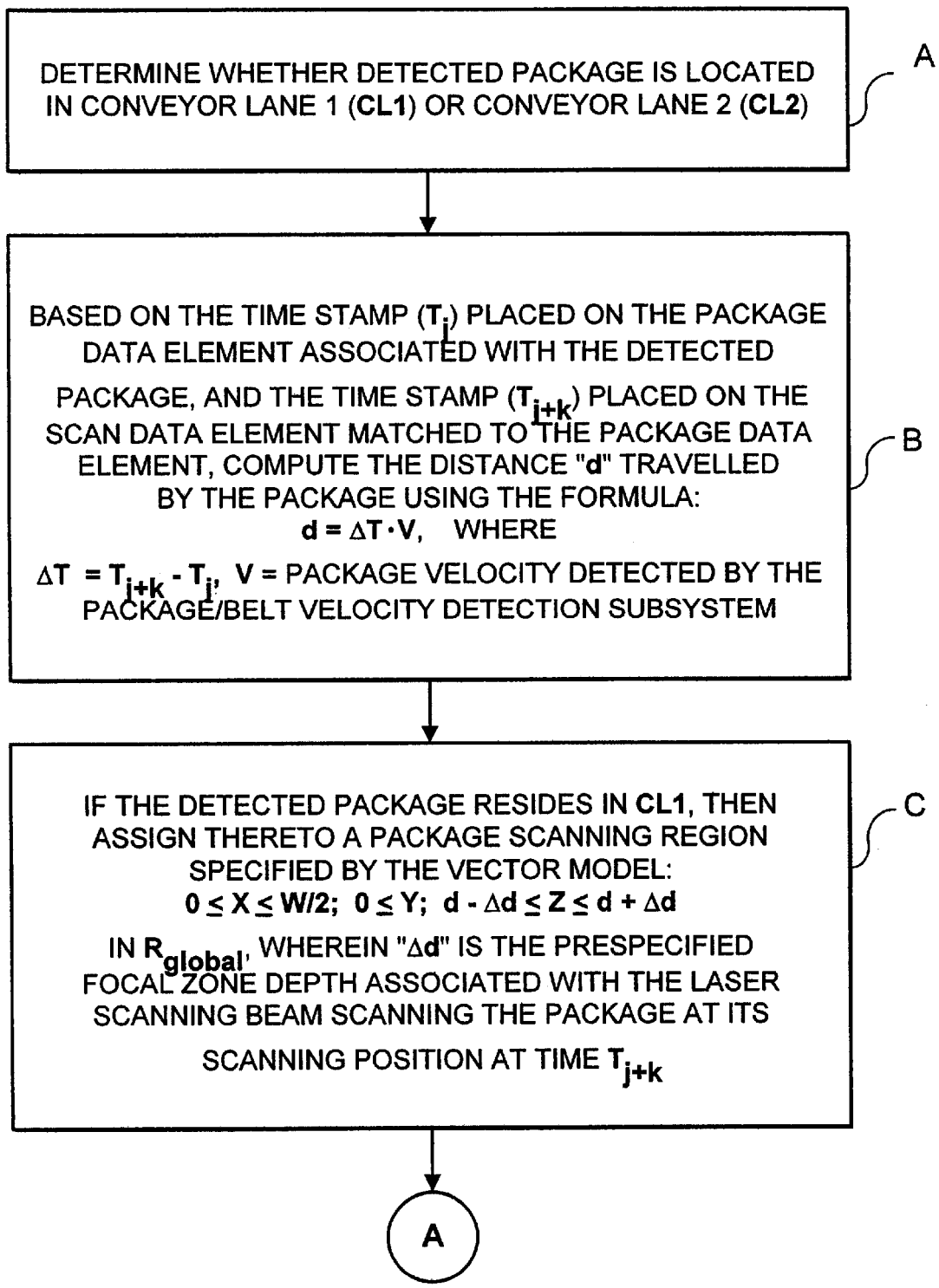
Figure 44B:
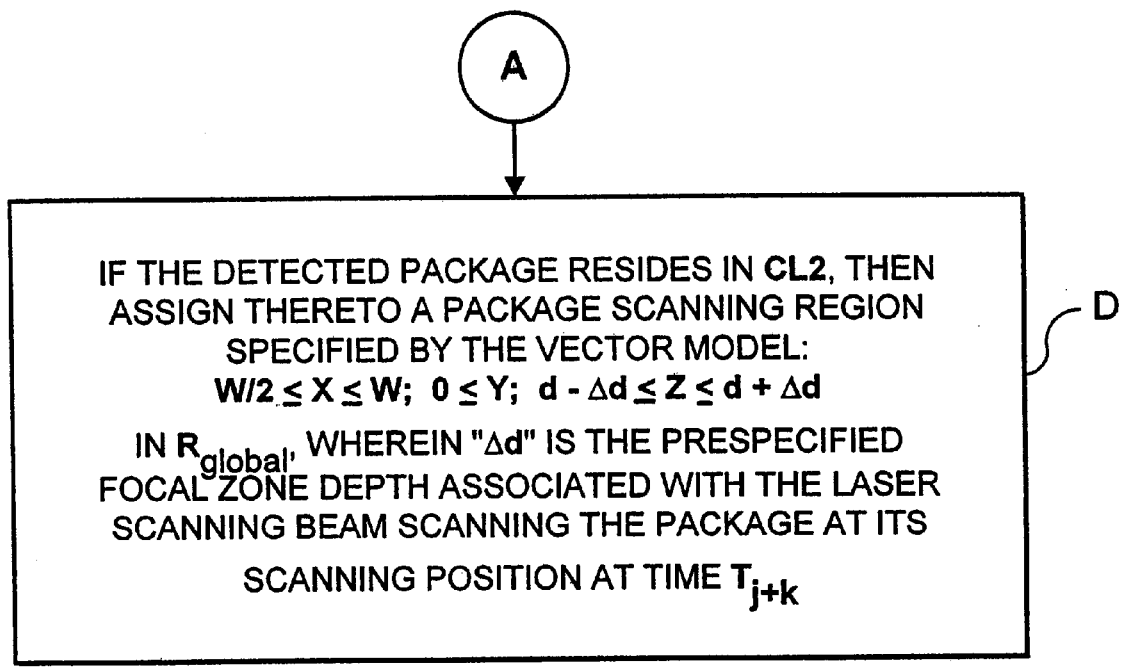
Figure 46:
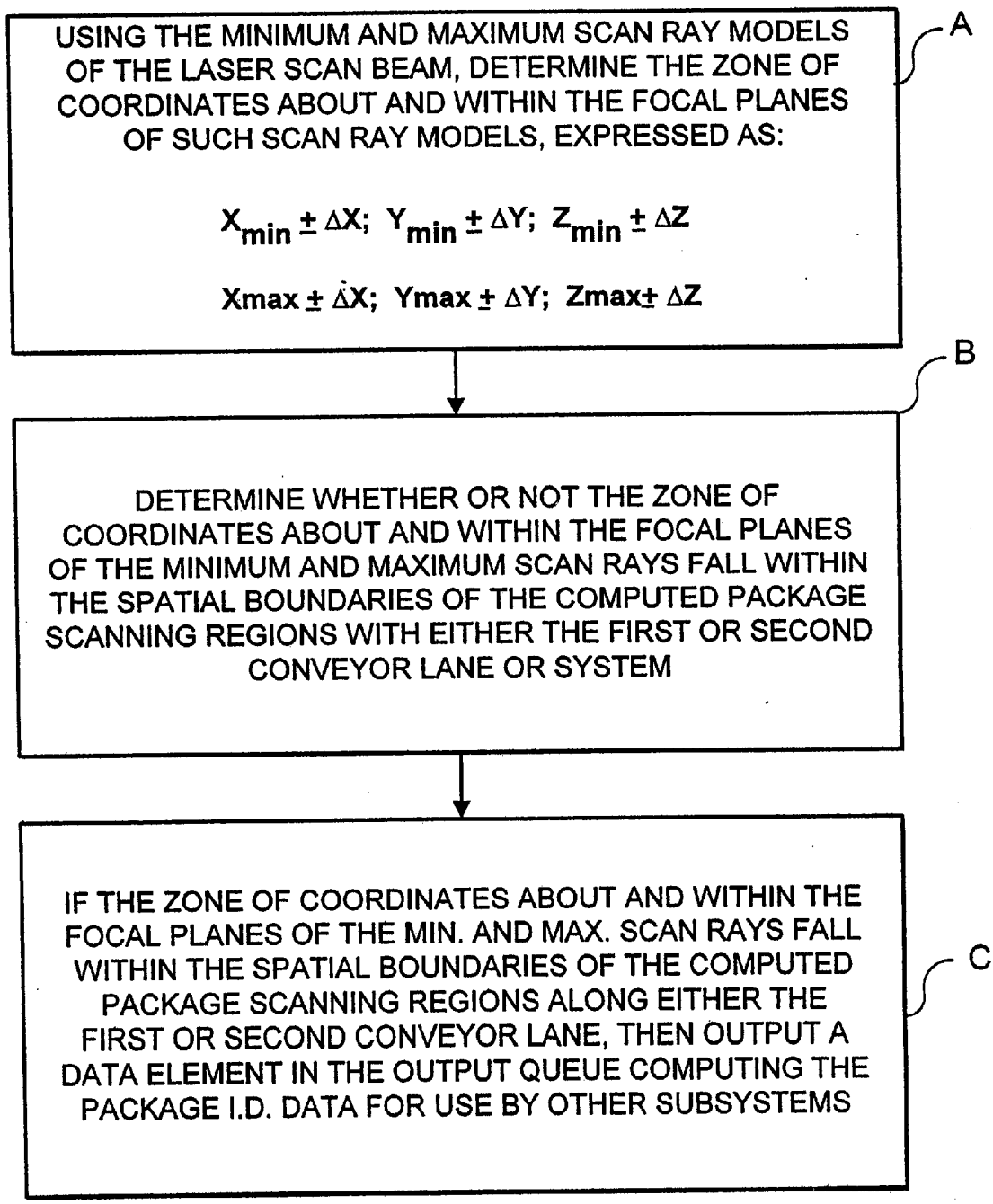
Figure 47:
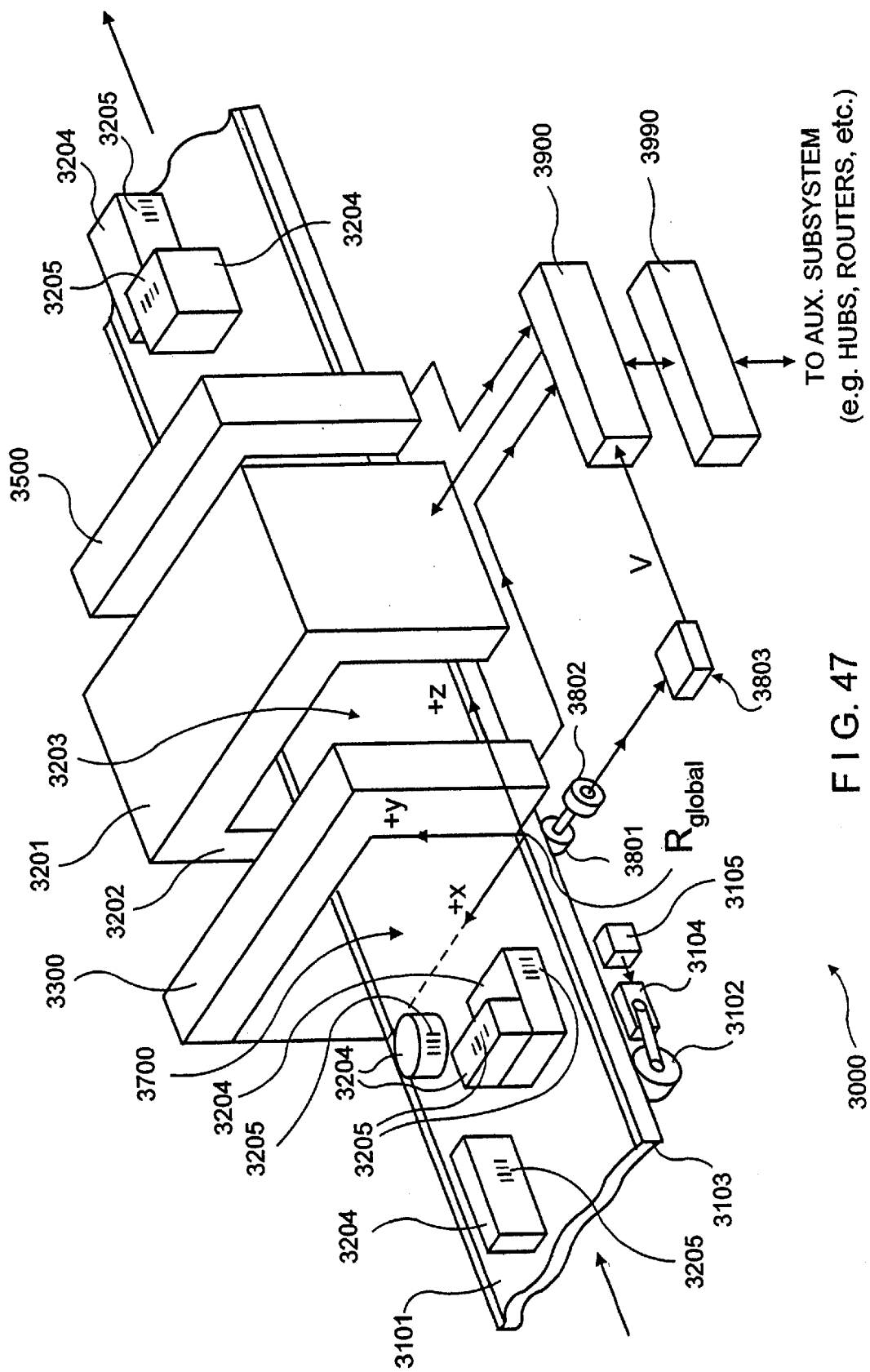
Figure 48:
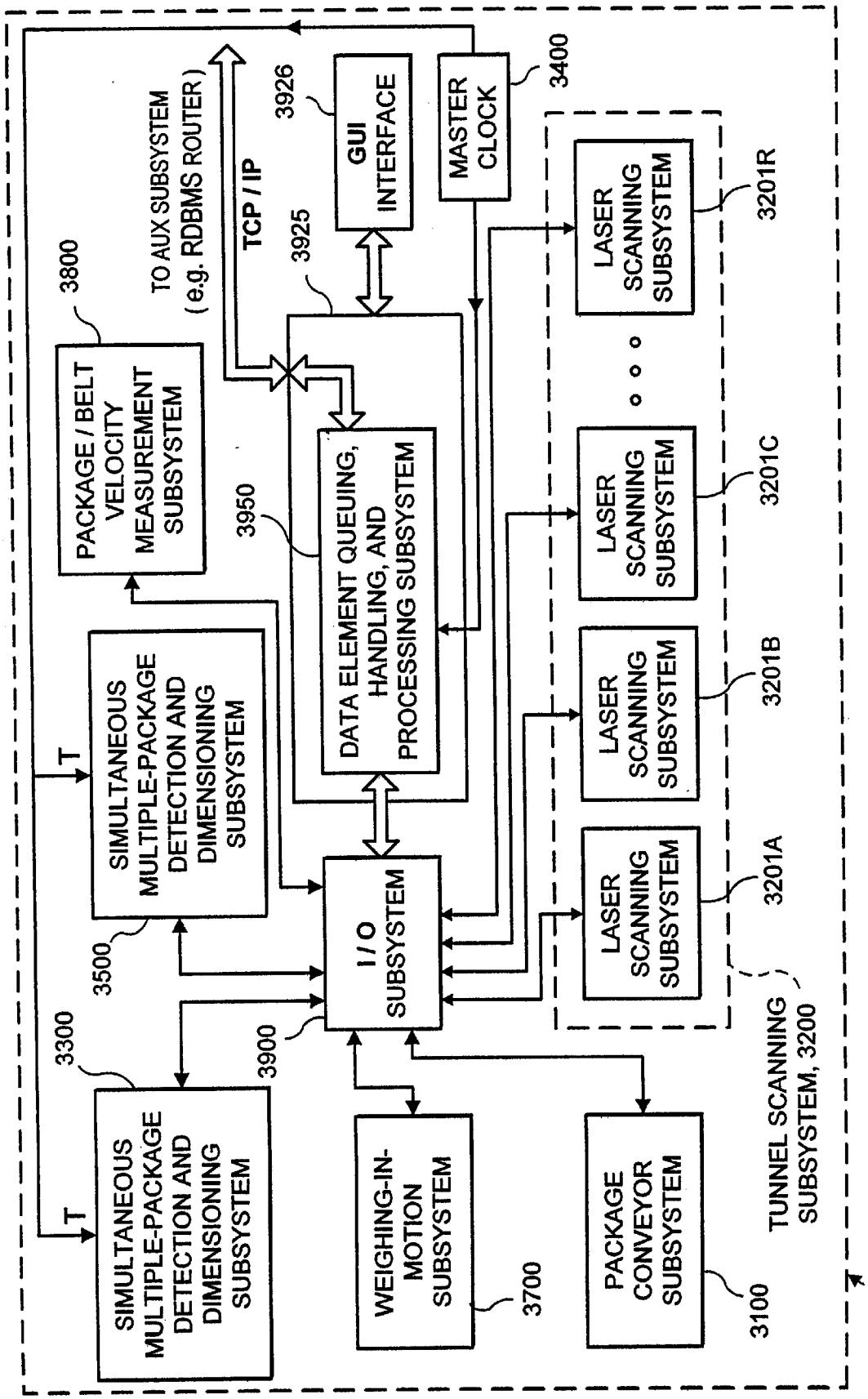
Figure 49:
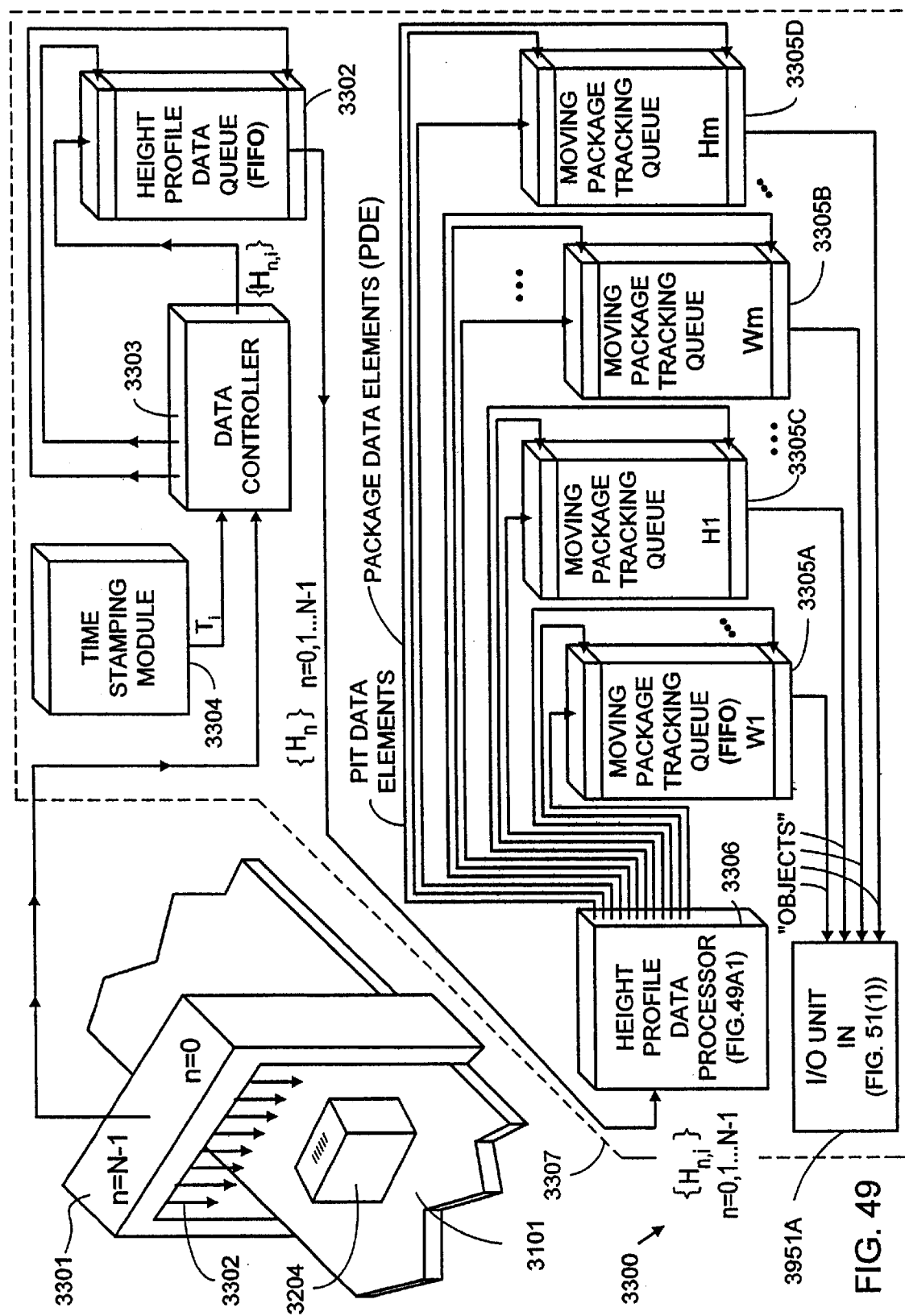
Figure 49B:
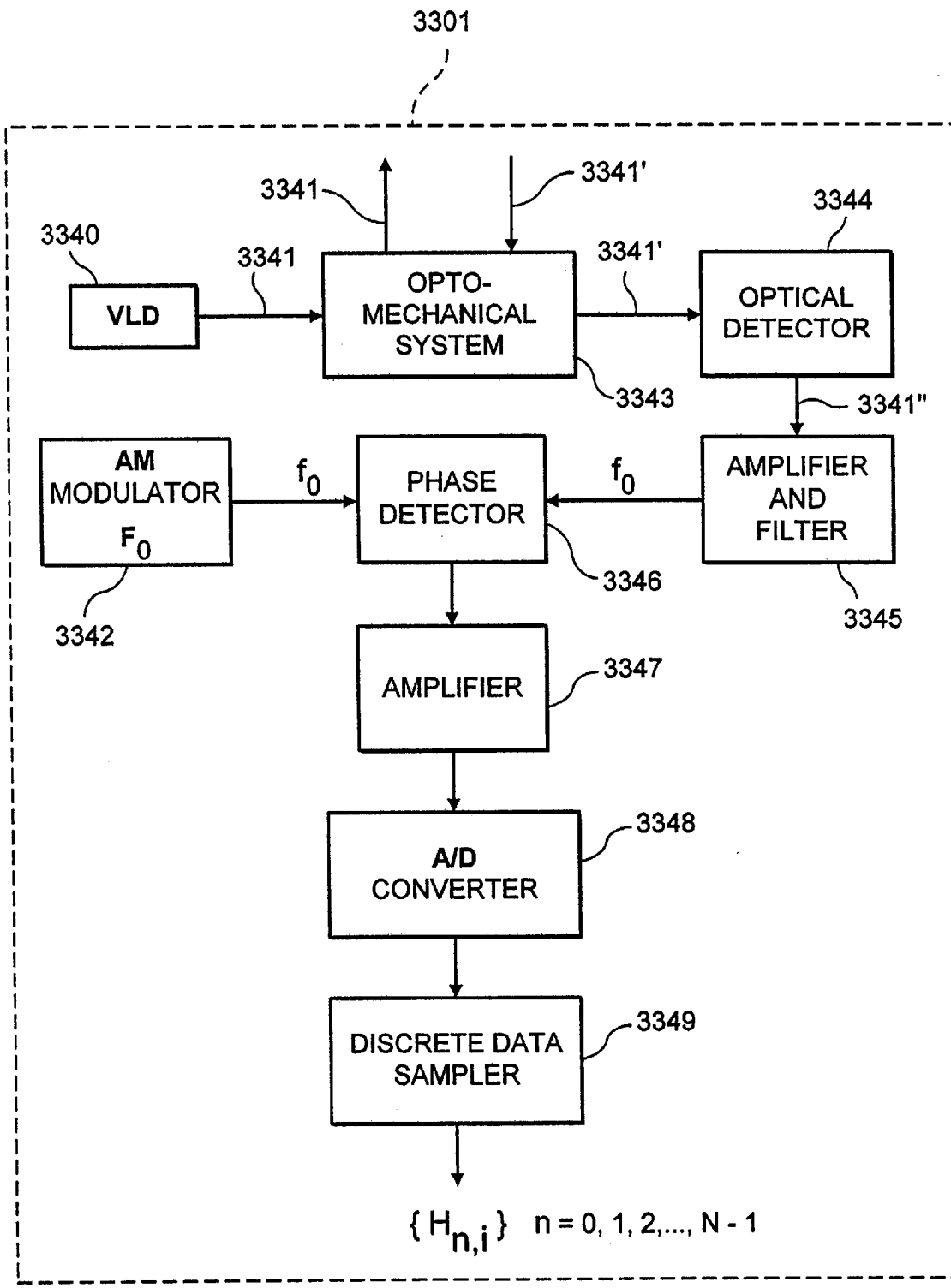
Figure 50:
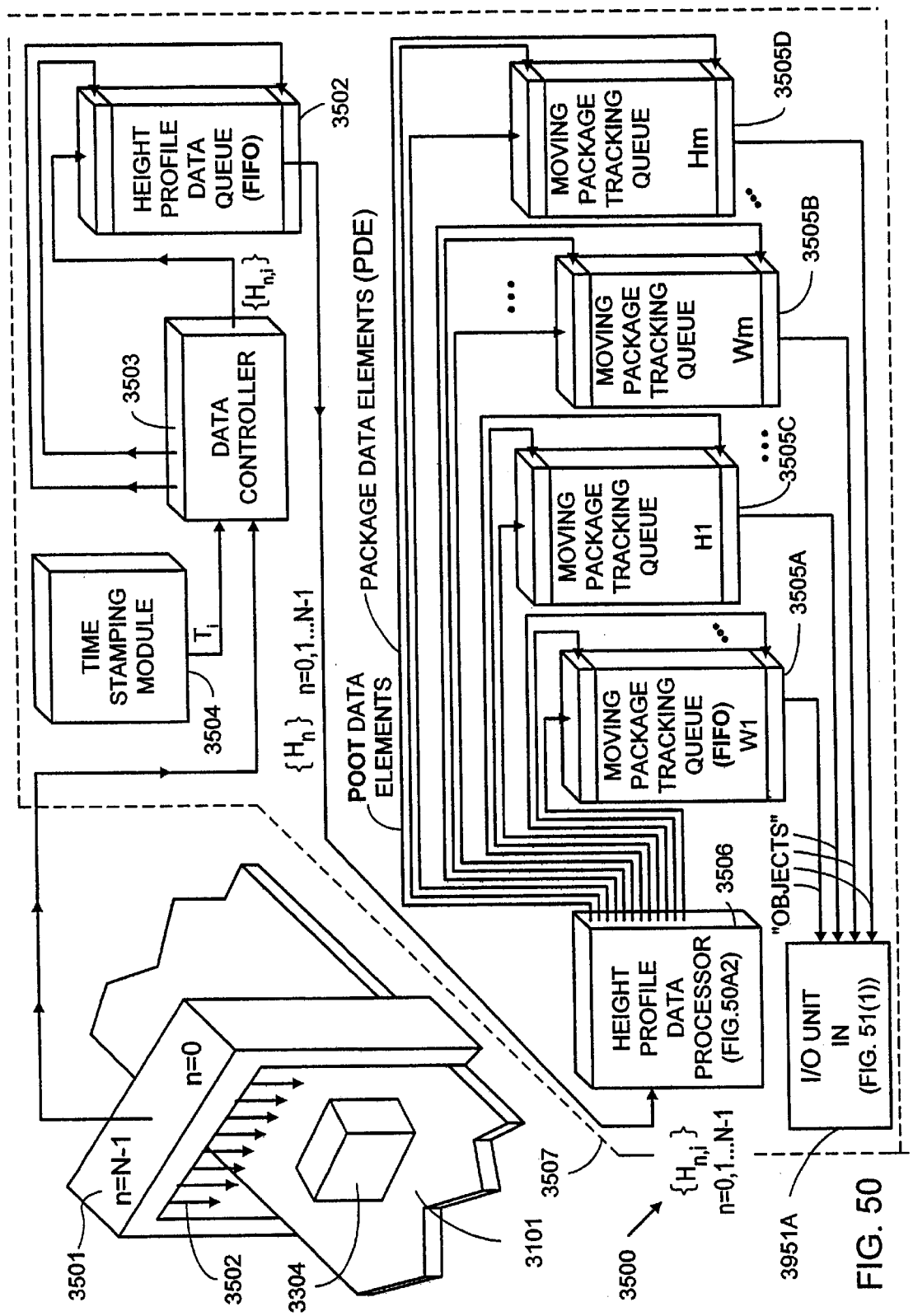
Figure 51A:
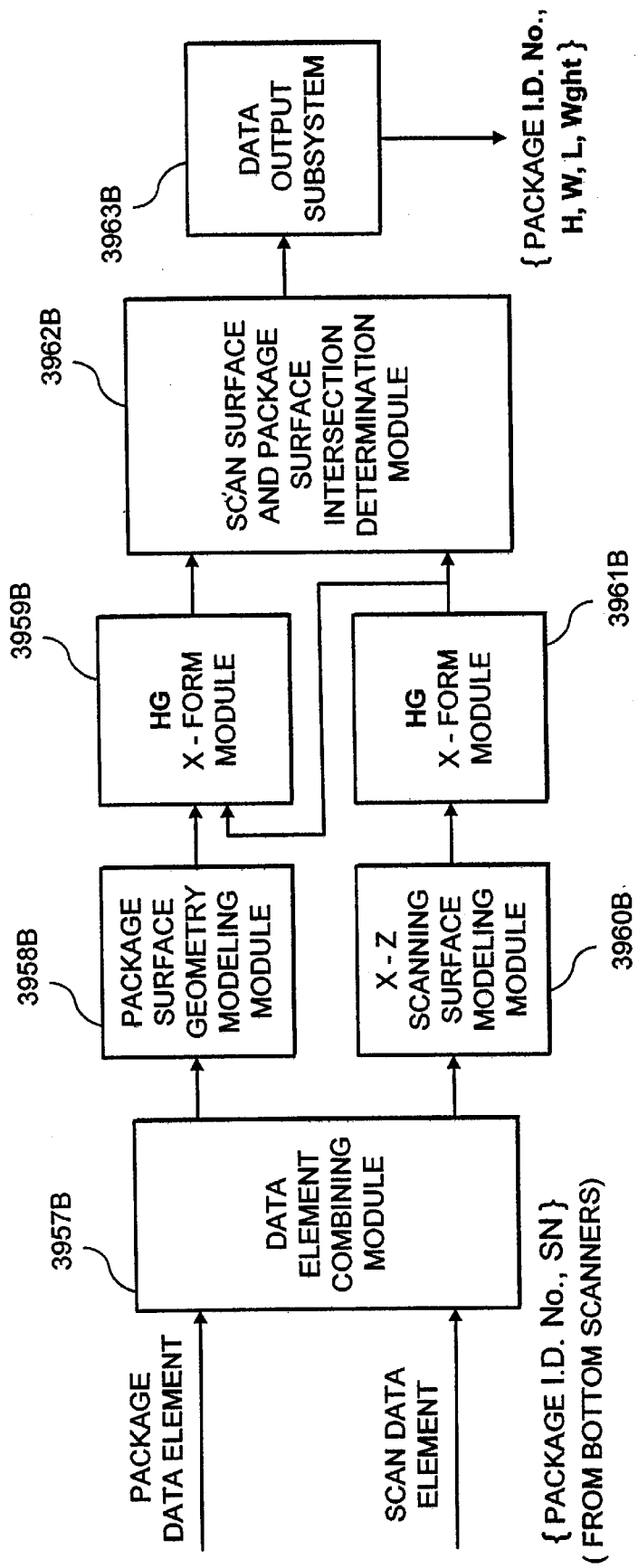
Figure 53A:
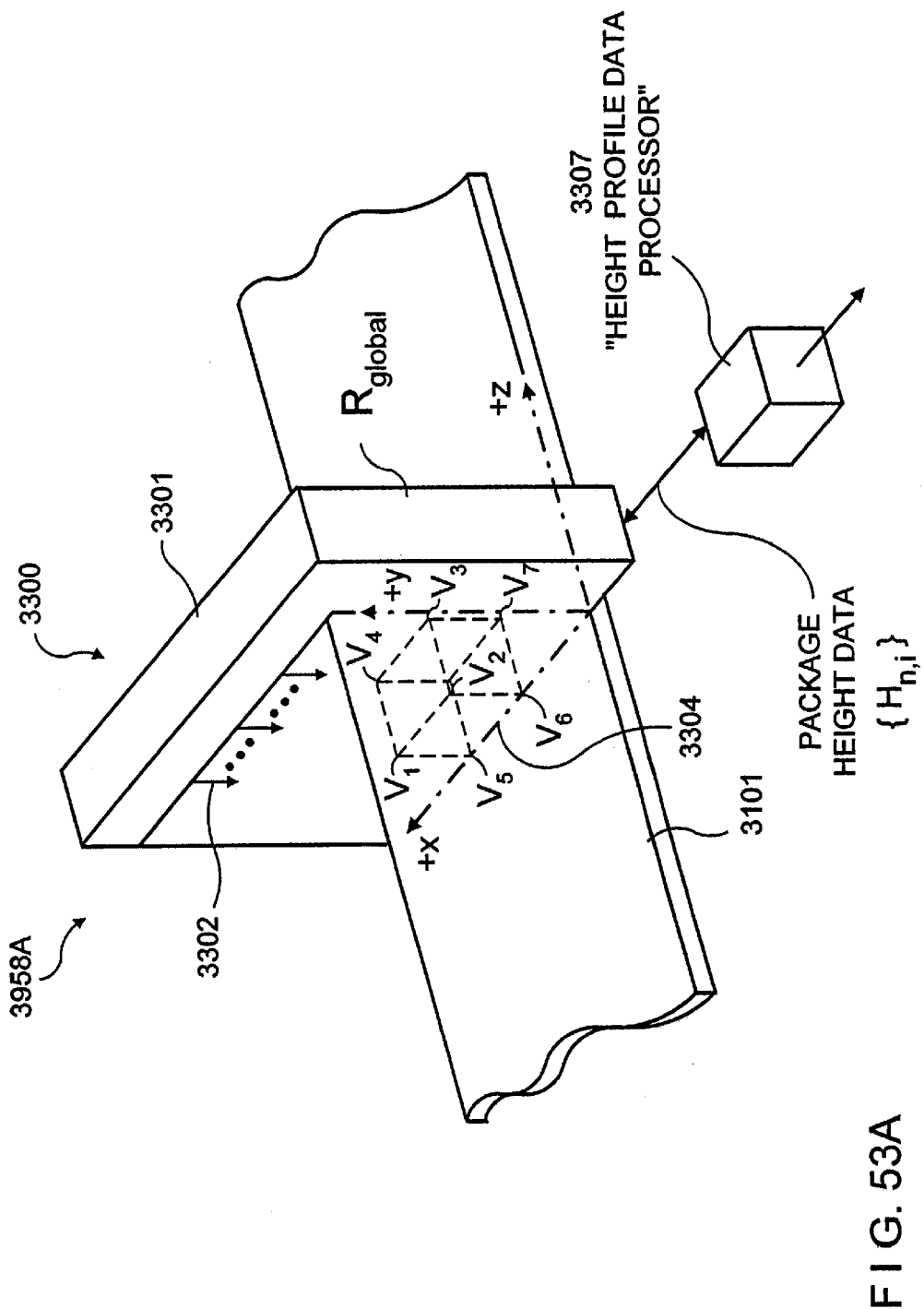
Figure 55:
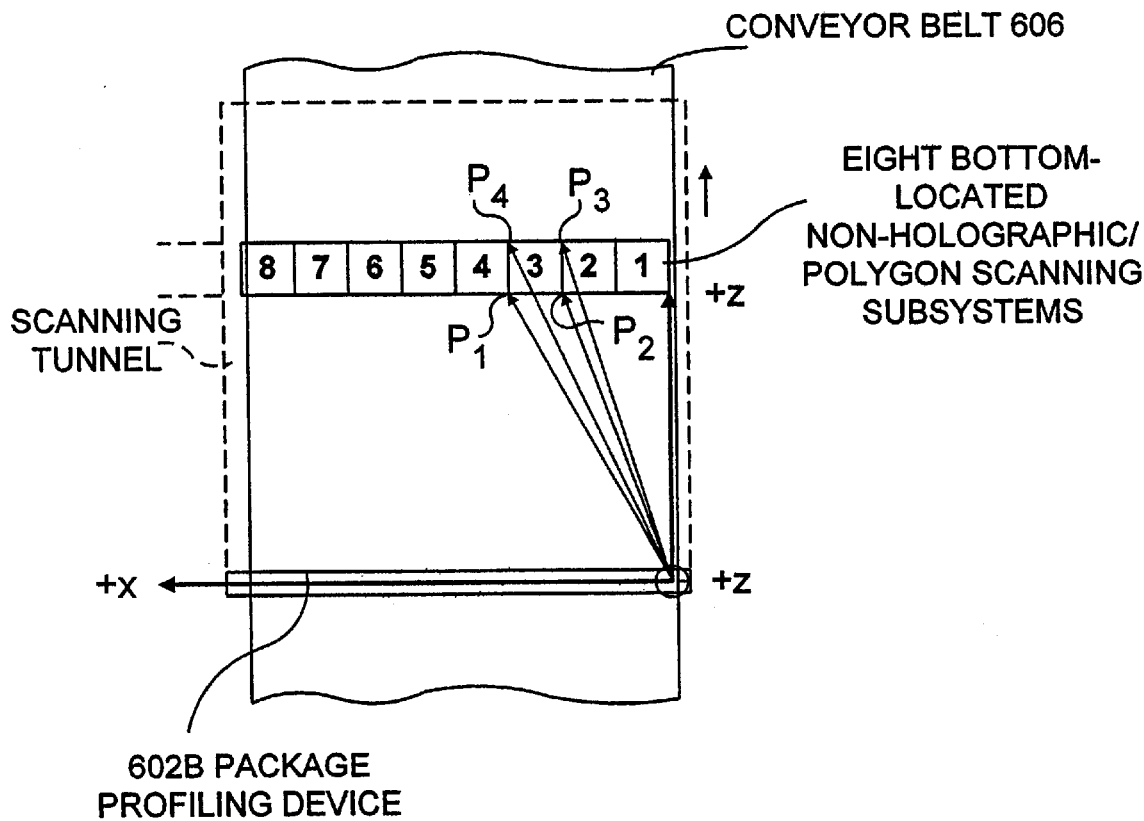
Figure 57:
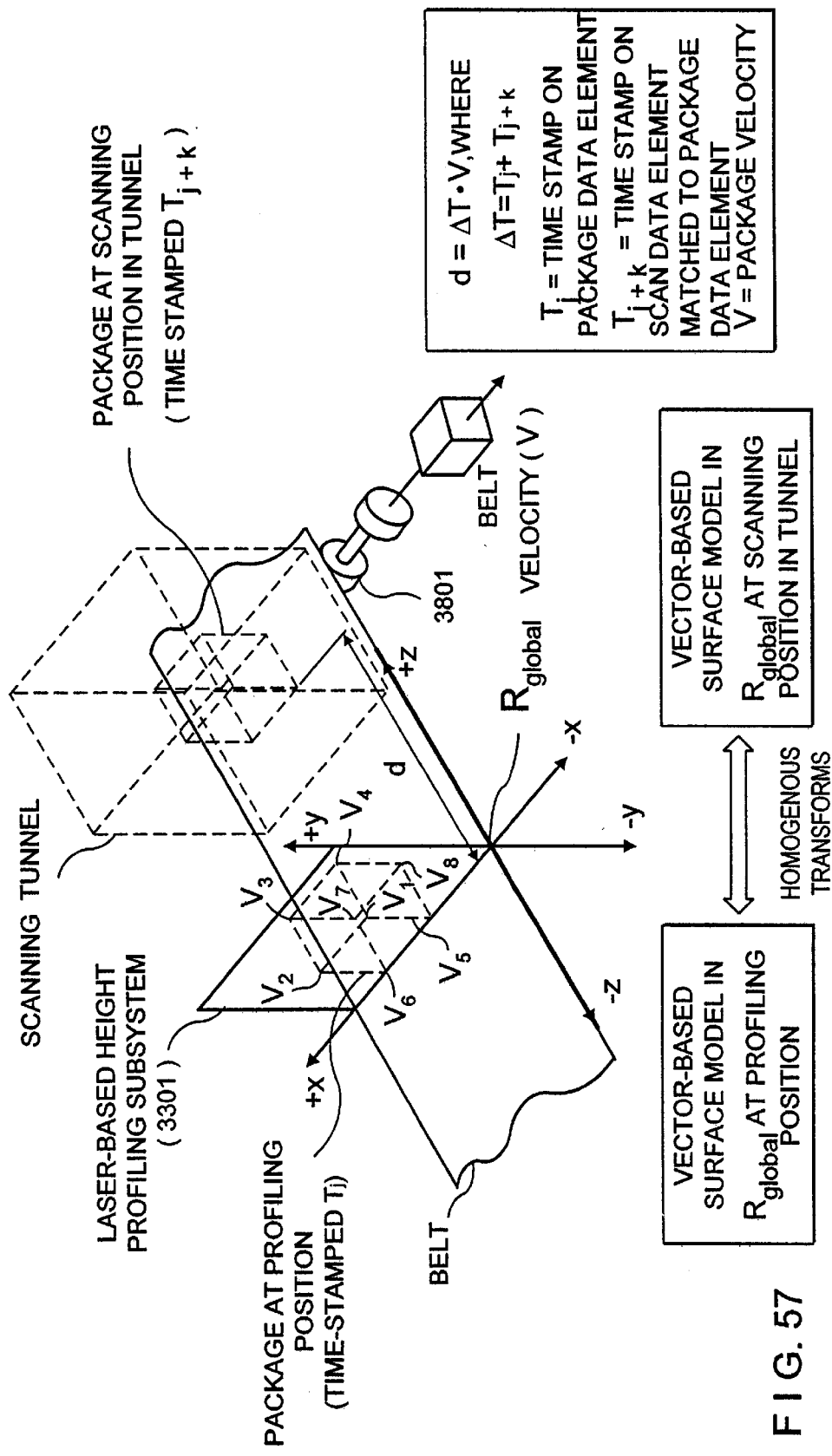
Figure 58A:
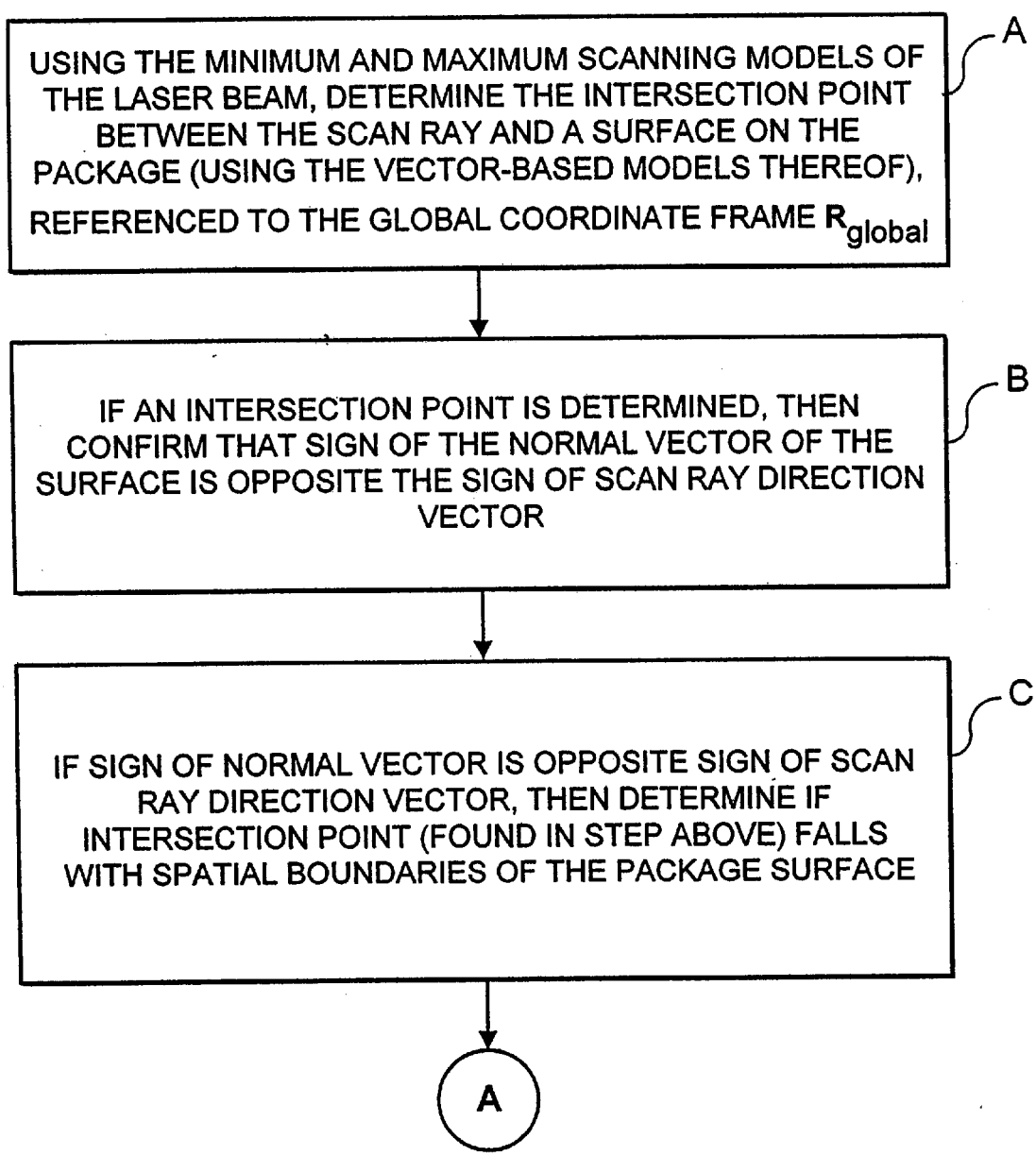
Figure 58B:
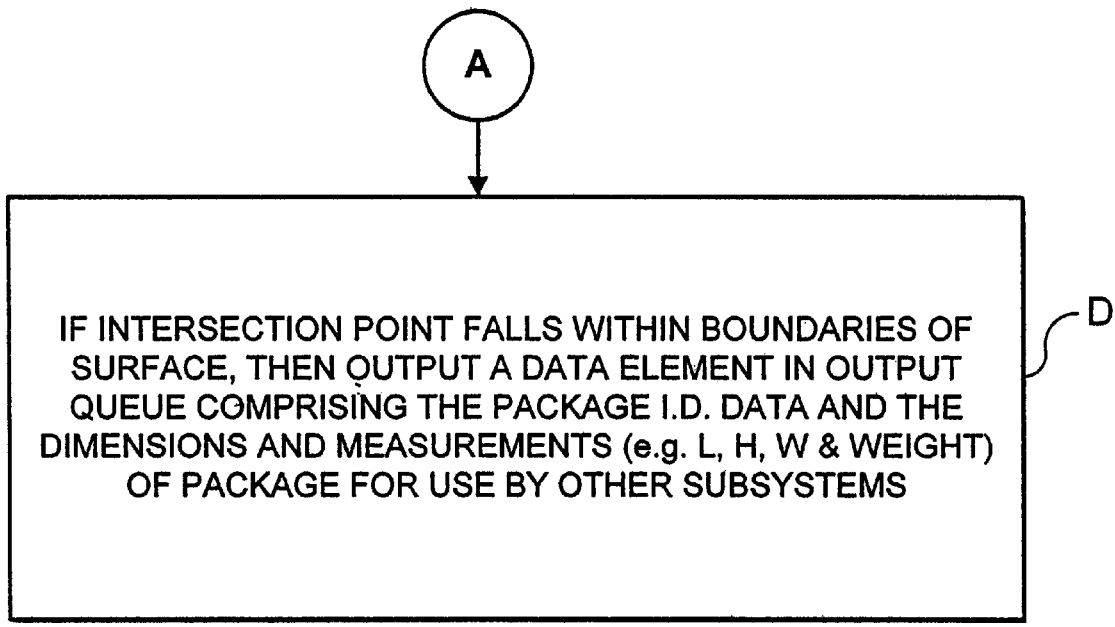
Figure 59A:
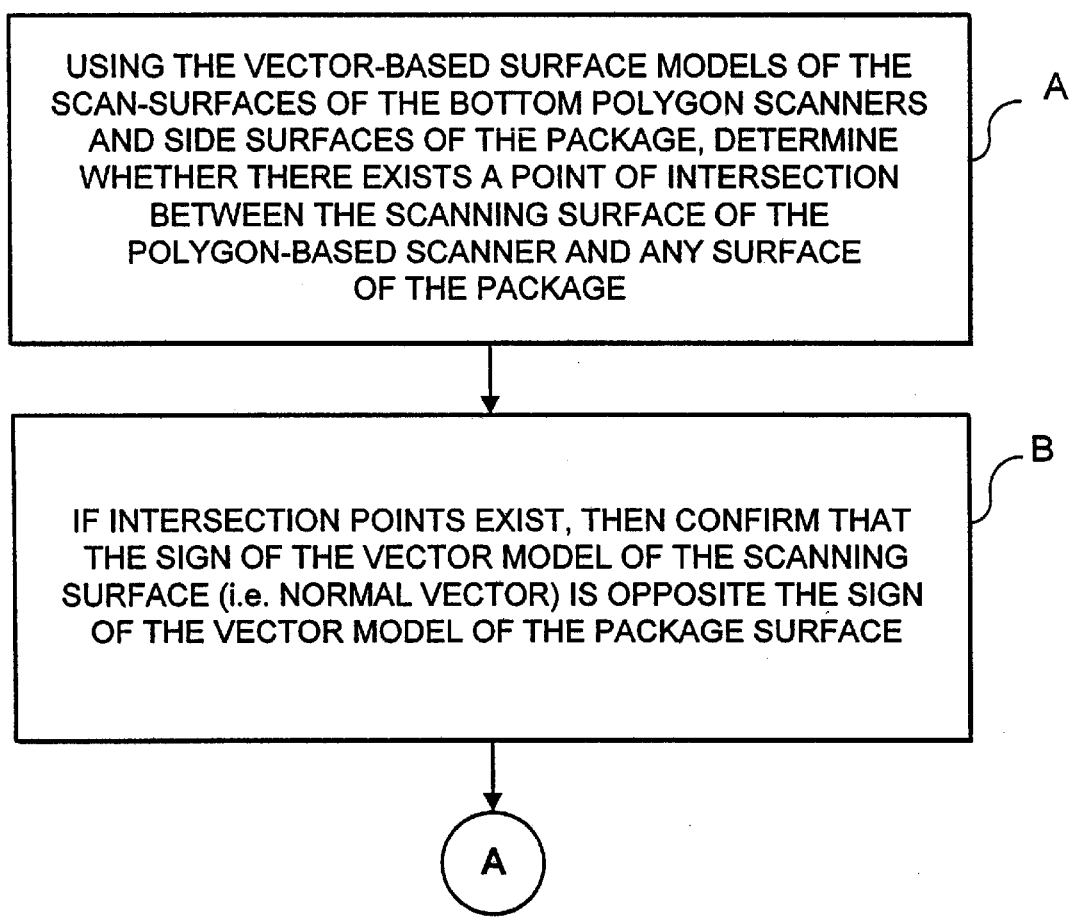
Figure 59B:
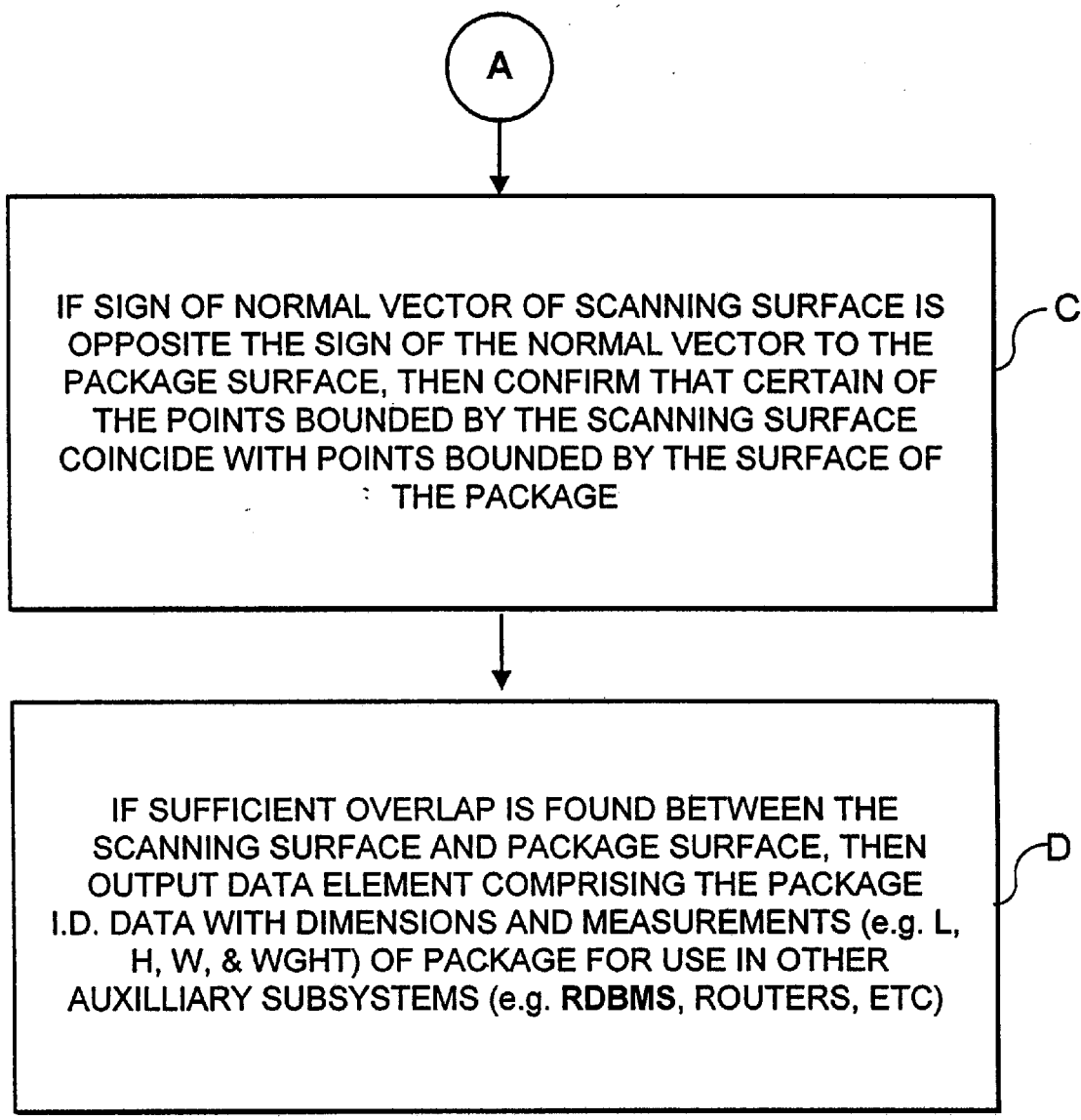

FIGS. 42A and 42B set forth a table of rules used to handle the data elements stored in the system event queue in the data element queuing, handling and processing subsystem of FIG. 41;

FIG. 43 is a schematic representation of the system and method used herein to create vector-based models of each package location region within the tunnel scanning system of the second illustrative embodiment;

FIGS. 44A and 44B, taken together, set forth is a flow chart setting forth a preferred procedure for creating a vector-based model for each package location region within the tunnel scanning system of the second illustrative embodiment;

FIG. 45 is a schematic representation graphically illustrating how a vector-based scanning beam model created within a local scanner coordinate reference frame $R_{localscannerj}$ can be converted into a corresponding vector-based model created within the global scanner coordinate preference frame $R_{global}$ using homogeneous transformations;

FIG. 46 is a flow chart setting forth a preferred procedure for determining whether the scan beam (rays) associated with a particular scan beam data element produced by a holographic E scanning subsystem within the system of FIG. 33 intersects with the package location region associated with the package scanned at the scanning position associated with the scan beam data element, and thus whether to correlate a particular package identification data element with particular package measurement data element or like token acquired by the system;

FIG. 47 is a perspective view of an automated tunnel-type laser scanning package identification and weighing system constructed in accordance with the third illustrated embodiment of the present invention, wherein multiple packages, arranged in stacked and/or side-by-side configurations, are transported along a high speed conveyor belt, dimensioned, weighed and identified in a fully automated manner without human intervention;

FIG. 48 is schematic block diagram of the system of FIG. 47, showing the subsystem structure thereof as comprising a scanning tunnel including holographic and non-holographic laser scanning subsystems, a first simultaneous multiple-package detection and dimensioning subsystem installed on the input side of the tunnel scanning subsystem, a second simultaneous multiple-package detection and dimensioning subsystem installed on the output side of the tunnel scanning subsystem, a package/belt velocity detection subsystem, a package weighing-in-motion subsystem, a data-element queuing, handling and processing subsystem, an input/output (I/O) subsystem, a conveyor belt subsystem, and a master clock for establishing a global time reference when time-stamping data elements generated throughout the system;

FIG. 49 is a schematic representation of the first simultaneous multiple-package detection and dimensioning subsystem installed on the input side of the tunnel scanning subsystem, showing its various constituent subcomponents;

FIG. 49A is a schematic representation of the height profile data analyzer employed in the subsystem of FIG. 49, comprising a data controller, time-stamping module, a height profile data element queue, a height profile data analyzer, and a plurality of moving package tracking queues assigned to different spatial regions above the conveyor belt of the system located on the input side of the tunnel scanning subsystem;

FIG. 49B is a schematic block diagram of the laser scanning mechanism employed in the simultaneous multiple-package detection and dimensioning subsystem shown in FIG. 49;

FIG. 50 is a schematic representation of the second simultaneous multiple-package detection and dimensioning subsystem installed on the output side of the tunnel scanning subsystem, showing its various constituent subcomponents;

FIG. 50A is a schematic representation of the height profile data analyzer employed in the subsystem of FIG. 50, comprising a data controller, time-stamping module, a height profile data element queue, a height profile data analyzer, and a plurality of moving package tracking queues assigned to different spatial regions above the conveyor belt of the system located on the output side of the tunnel scanning subsystem;

FIG. 50B is a schematic block diagram of the laser scanning mechanism employed in the simultaneous multiple-package detection and dimensioning subsystem shown in FIG. 50;

FIGS. 51 and 51A, taken together, provide a schematic representation of the data element queuing, handling and processing subsystem of the present invention shown in FIGS. 47 and 48;

FIGS. 52A and 52B set forth a table of rules used to handle the data elements stored in the scan beam data element (SBDE) queue in the data element queuing, handling and processing subsystem of FIG. 51;

FIG. 53A is a schematic representation of the surface geometry model created for each package surface by the package surface geometry modeling subsystem (i.e. module) deployed with the data element queuing, handling and processing subsystem of FIGS. 49 and 49A, illustrating and showing how each surface of each package transported through package dimensioning/measuring subsystem is mathematically represented (i.e. modeled) using at least three position vectors (referenced to x=0, y=0, z=0) in the global reference frame $R_{global}$, and a normal vector drawn to the package surface indicating the direction of incident light reflection therefrom;

FIG. 53B is a table setting forth a preferred procedure for creating a vector-based surface model for each surface of each package transported through the package detection and dimensioning subsystem of the system hereof;

FIG. 54 is a table setting forth a preferred procedure for creating a vector-based ray model for laser scanning beams which have been produced by a holographic laser scanning subsystem of the system hereof, that may have collected the scan data associated with a decoded bar code symbol read thereby within the tunnel scanning subsystem;

FIG. 55 is a schematic representation of the vector-based 2-D surface geometry model created for each candidate scan beam by the scan surface modeling subsystem (i.e. module) shown in FIG. 51A, and showing how each omnidirectional scan pattern produced from a particular polygon-based bottom scanning unit is mathematically represented (i.e. modeled) using four position vectors (referenced to x=0, y=0, z=0) in the global reference frame $R_{global}$, and a normal vector drawn to the scanning surface indicating the direction of laser scanning rays projected therefrom during scanning operations;

FIG. 56 is a schematic representation graphically illustrating how a vector-based model created within a local scanner coordinate reference frame $R_{localscannerj}$ can be converted into a corresponding vector-based model created within the global scanner coordinate reference frame $R_{global}$ using homogeneous transformations;

FIG. 57 is a schematic representation graphically illustrating how a vector-based package surface model created within the global coordinate reference frame $R_{global}$ at the "package profiling position" can be converted into a corresponding vector-based package surface model created within the global scanner coordinate reference frame $R_{global}$ at the "scanning position" within the tunnel using homogeneous transformations, and how the package travel distance (d) between the package profiling and scanning positions is computed using the package velocity (v) and the difference in time indicated by the time stamps placed on the package data element and scan beam data element matched thereto during each scan beam/package surface intersection determination carried out within the data element queuing, handling and processing subsystem of FIGS. 51 and 51A;

FIGS. 58A and 58B, taken together, provide a procedure for determining whether the scan beam (rays) associated with a particular scan beam data element produced by a holographic scanning subsystem intersects with any surface on the package that has been scanned at a particular scanning position, and thus whether to correlate a particular package identification data element with particular package measurement data element acquired by the system; and FIGS. 59A and 59B, taken together, provide a procedure for determining whether the scanning surface associated with a particular scan beam data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system.

DETAILED DESCRIPTION OF THE ILLUSTRATIVE EMBODIMENTS OF THE PRESENT INVENTION

Referring to the figures in the accompanying Drawings, the preferred embodiments of the automated package identification and measurement system of the present invention will be described in great detail, wherein like elements will be indicated using like reference numerals.

Figure 1:
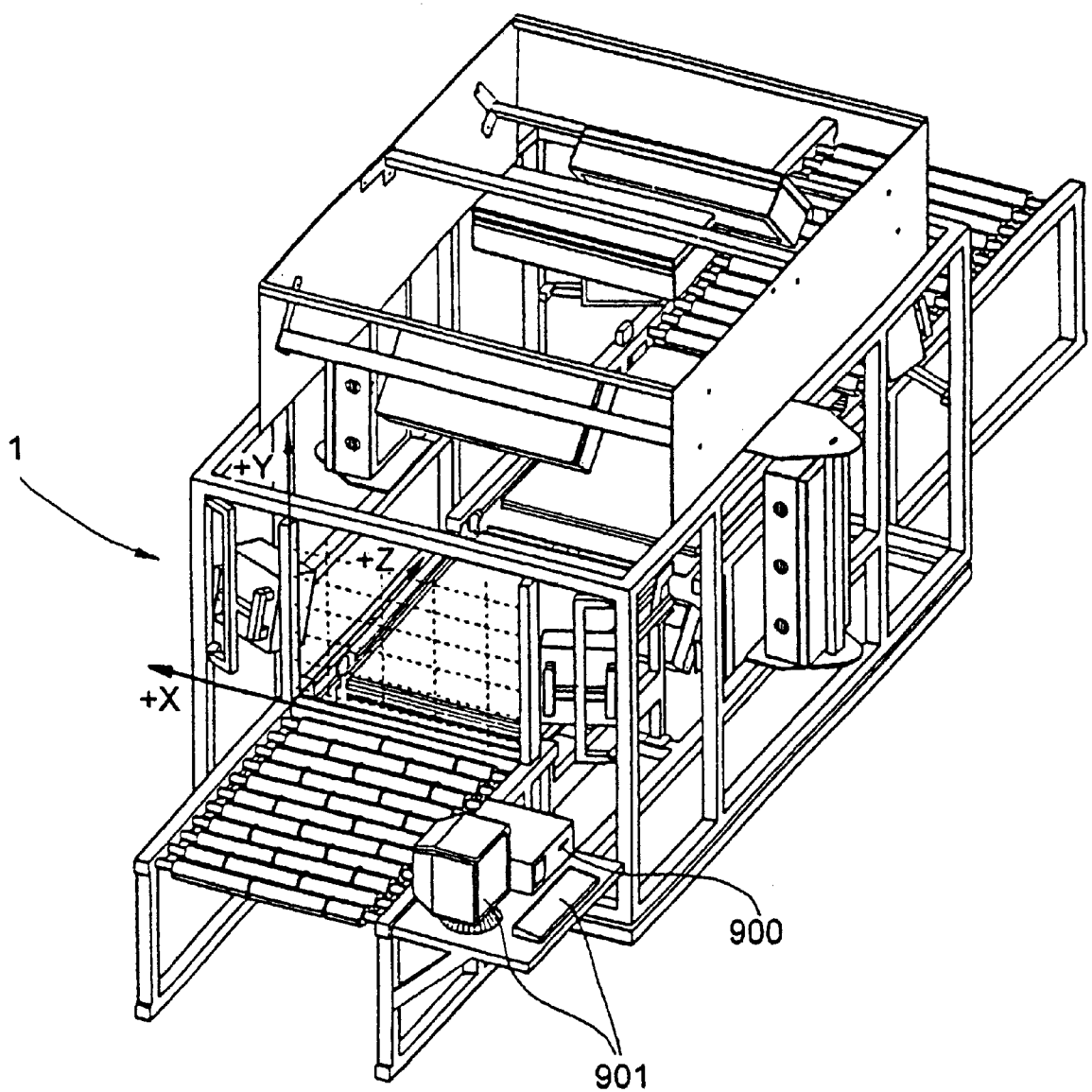
FIG. 1 is a perspective view of an automated tunnel-type laser scanning package identification and measurement (e.g. dimensioning and weighing) system constructed in accordance with the first illustrated embodiment of the present invention.
Figure 1A:
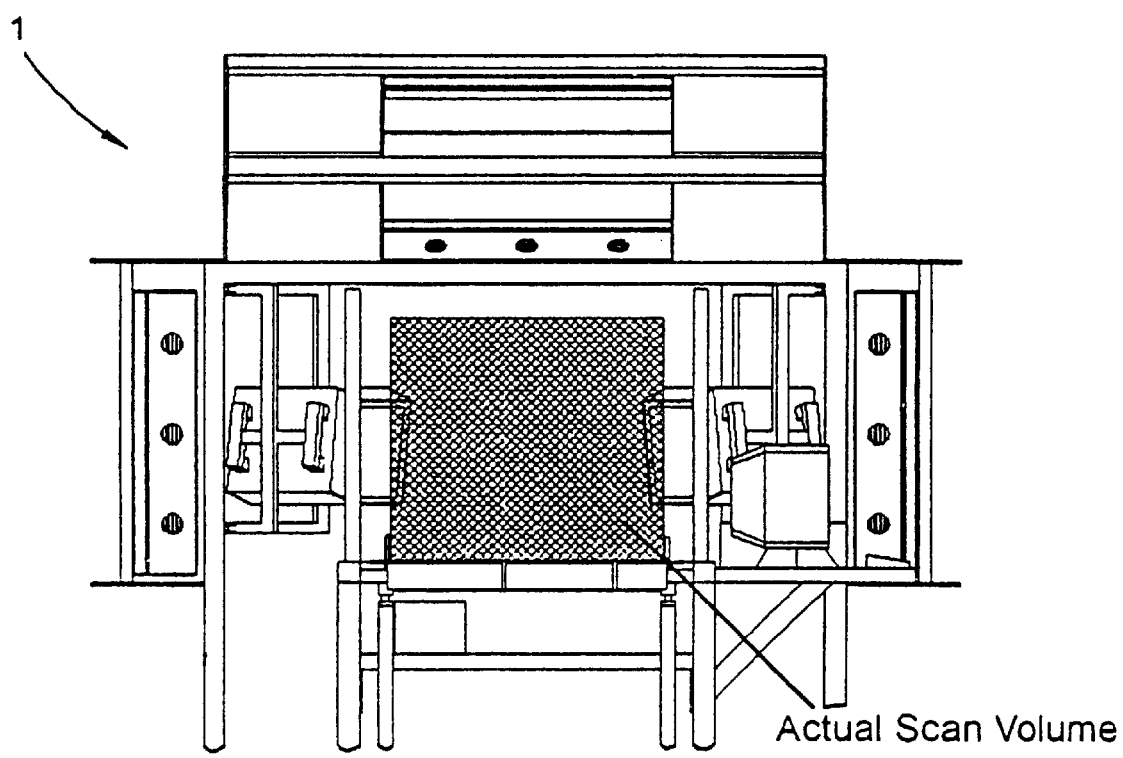
FIG. 1A is an elevated end view of the system shown in FIG. 1.
Figure 1B:
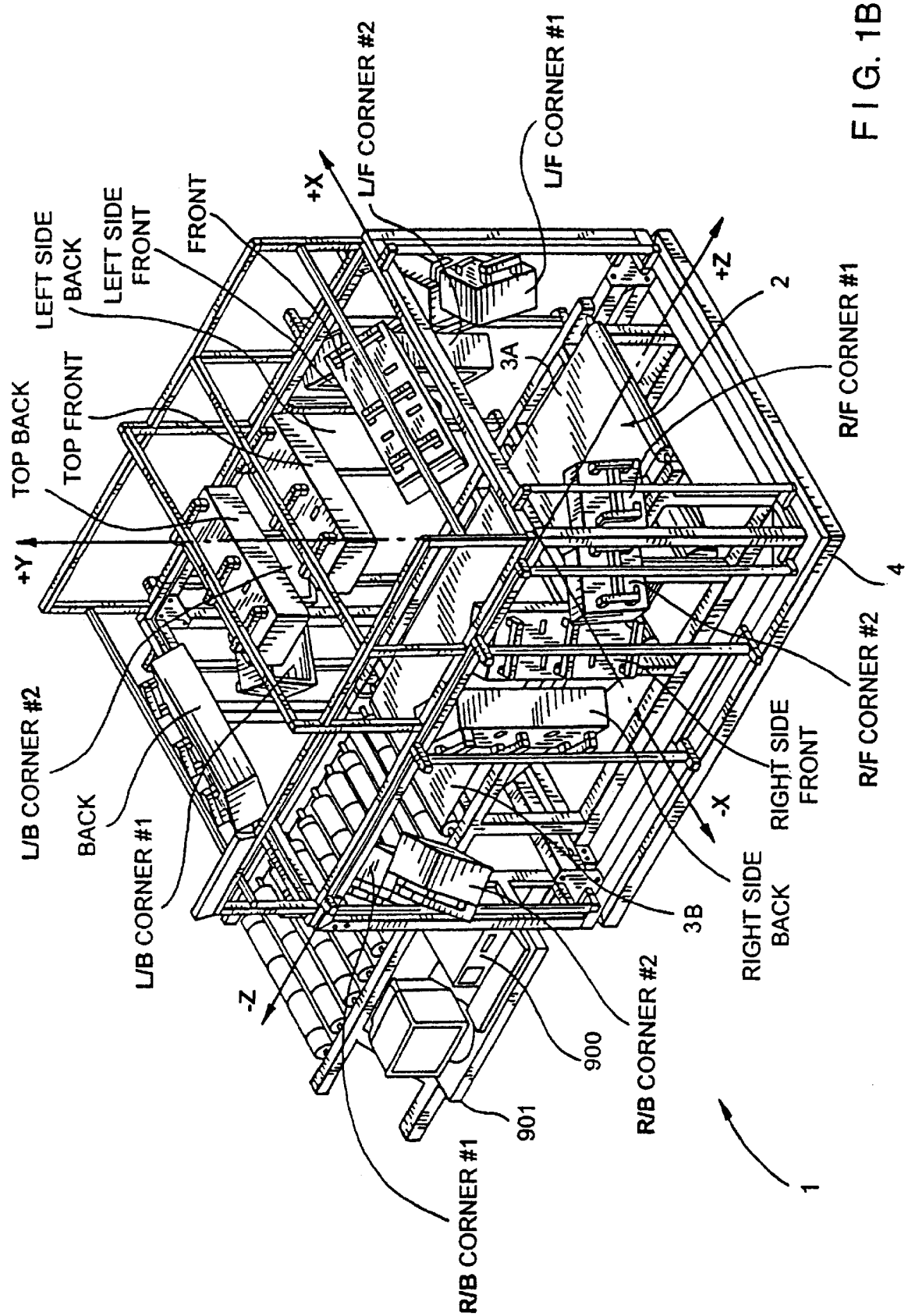
FIG. 1B is a first perspective view of the tunnel-type package identification and measurement system of the first illustrative embodiment of the present invention.

Automated Tunnel-type Laser Scanning Package Identification and Measurement System of the First Illustrative Embodiment of the Present Invention In FIG. 1, there is shown an automated tunnel-type laser scanning package identification and measuring (e.g. dimensioning and weighing) system designed to meet the needs of demanding customers, such as the United States Postal Service (USPS), which requires "hands-free" bar code (or code symbol) scanning of at least six-sided packages, wherein the label containing the code symbol to be read could be positioned in any orientation on any one of the six or more sides of the box or container structure. As used hereinafter, the term "hands-free" shall mean scanning of bar codes on boxes or parcels that are travelling past the scanners in only one direction on some sort of conveyor system. In this illustrative embodiment, the package should be singulated in a conventional manner.

Figure 4:
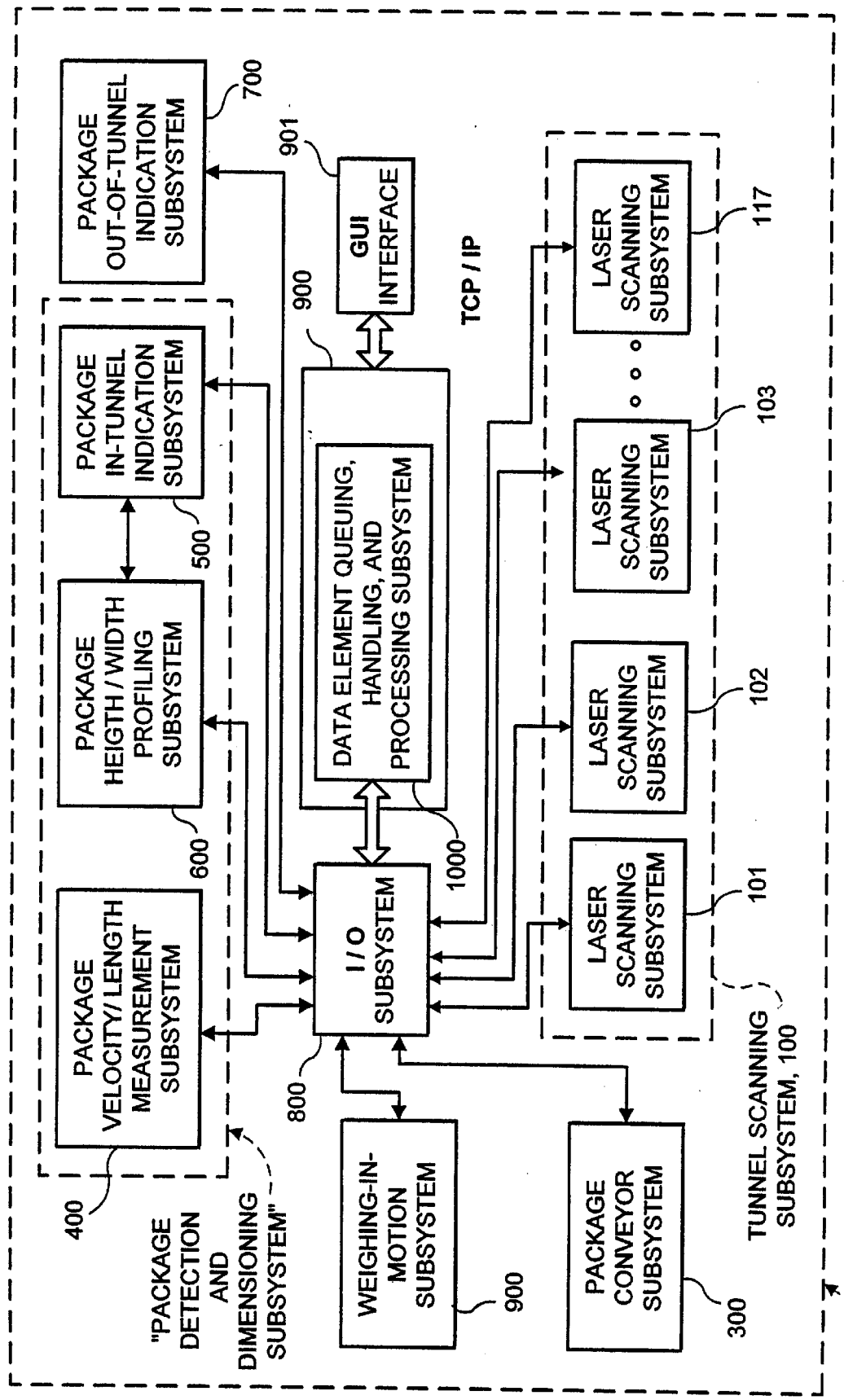
Figure 22:
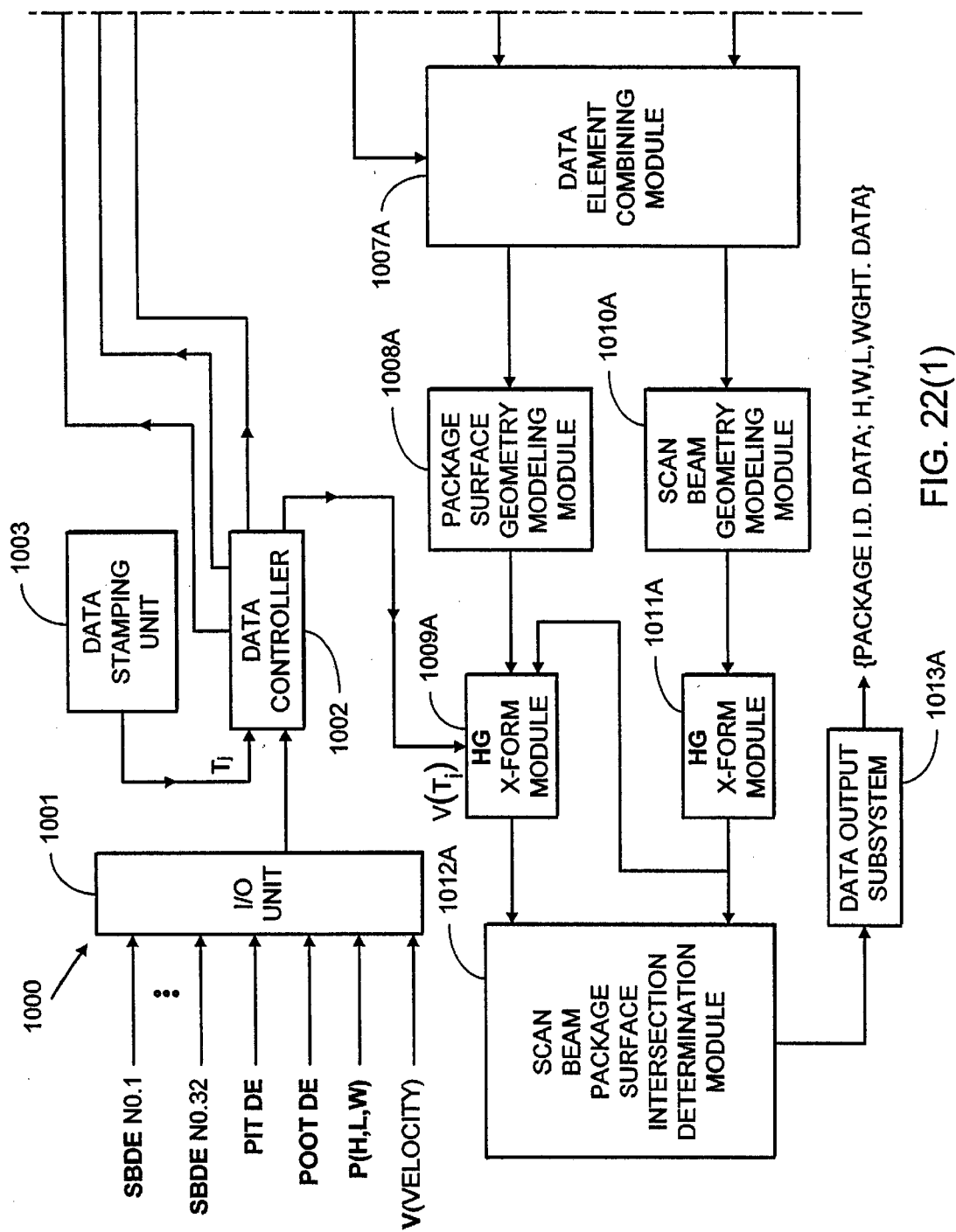
FIGS. 22 and 22A taken together provide a schematic representation of the data element queuing, handling and processing subsystem of the present invention shown in FIG. 4.
Figure 22:
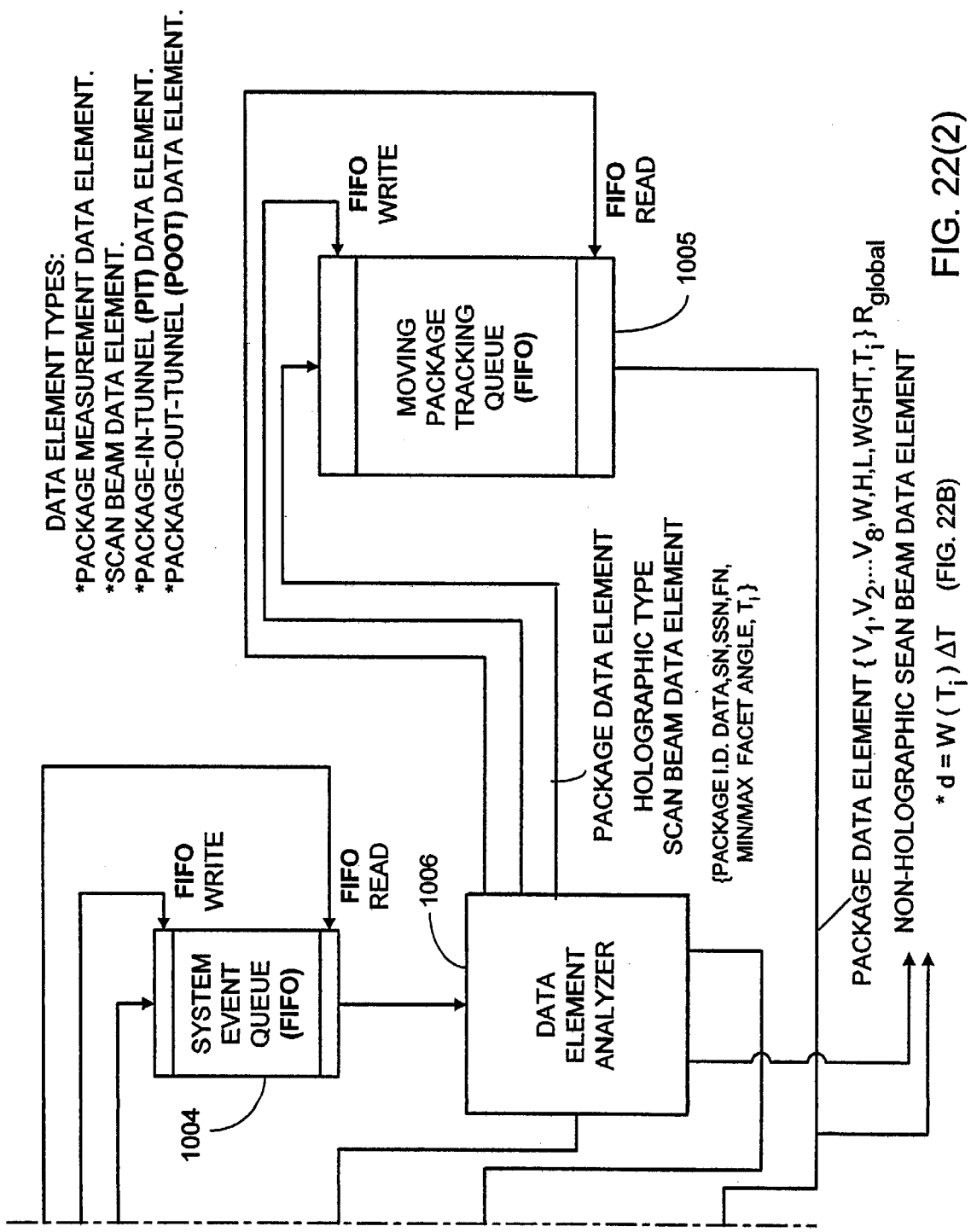

As shown in FIG. 4, the automated tunnel scanning system of the first illustrative embodiment indicated by reference numeral 1 comprises an integration of subsystems, namely: a high-speed package conveyor system 300 having a conveyor belt 302A and 302B having a width of at least inches to support one or more package transport lanes along the conveyor belt; a tunnel scanning subsystem 100 including an arrangement of holographic and non-holographic laser scanning bar code symbol reading subsystems 101 through 117 supported overhead and below the conveyor belt by a support frame 150 so as to produce a truly 3-D omnidirectional scanning volume above the conveyor belt, for scanning bar codes on packages transported therethrough independent of the package or bar code orientation; a package velocity and length measurement subsystem 400; a package-in-the-tunnel indication subsystem 500 realized as a 2-D light sensing structure mounted along the conveyor belt, on the input side of the tunnel, for automatically detecting the presence of each package moving into the scanning tunnel; a package (x-y) dimensioning subsystem 600, employing the 2-D light sensing structure of subsystem 500, for producing x-y profile data of detected packages; a package-out-of-the-tunnel indication subsystem 700 realized as realized as a IR light sensing, object-detecting device mounted along the conveyor belt, on the output side of the tunnel, for automatically detecting the presence of packages moving out of the scanning tunnel; a weighing-in-motion subsystem 900 for weighing packages as they are transported along the conveyor belt; an input/output subsystem 800 for managing the inputs to and output from the system of FIG. 1; and a data management computer 900 with a graphical user interface (GUI) 901, for realizing a data element queuing, handling and processing subsystem 1000 as shown in FIG. 22, as well as performing other data and system management functions.

Figure 1C:
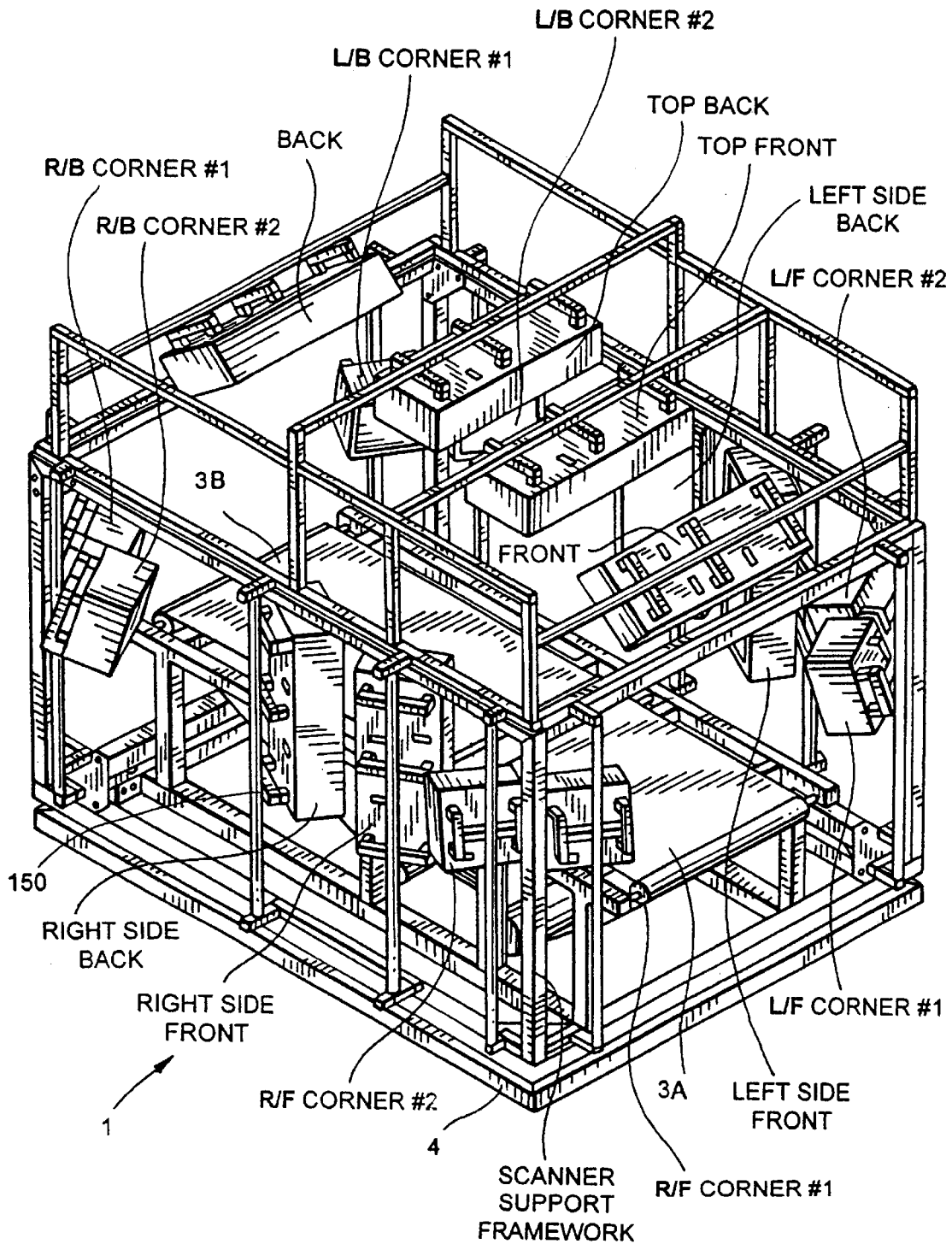
FIG. 1C is a second perspective view of the tunnel-type package identification and measurement system of FIG. 1, shown in larger scale and with a portion of its conveyor structure removed from about the tunnel laser scanning subsystem.
Figure 1D:
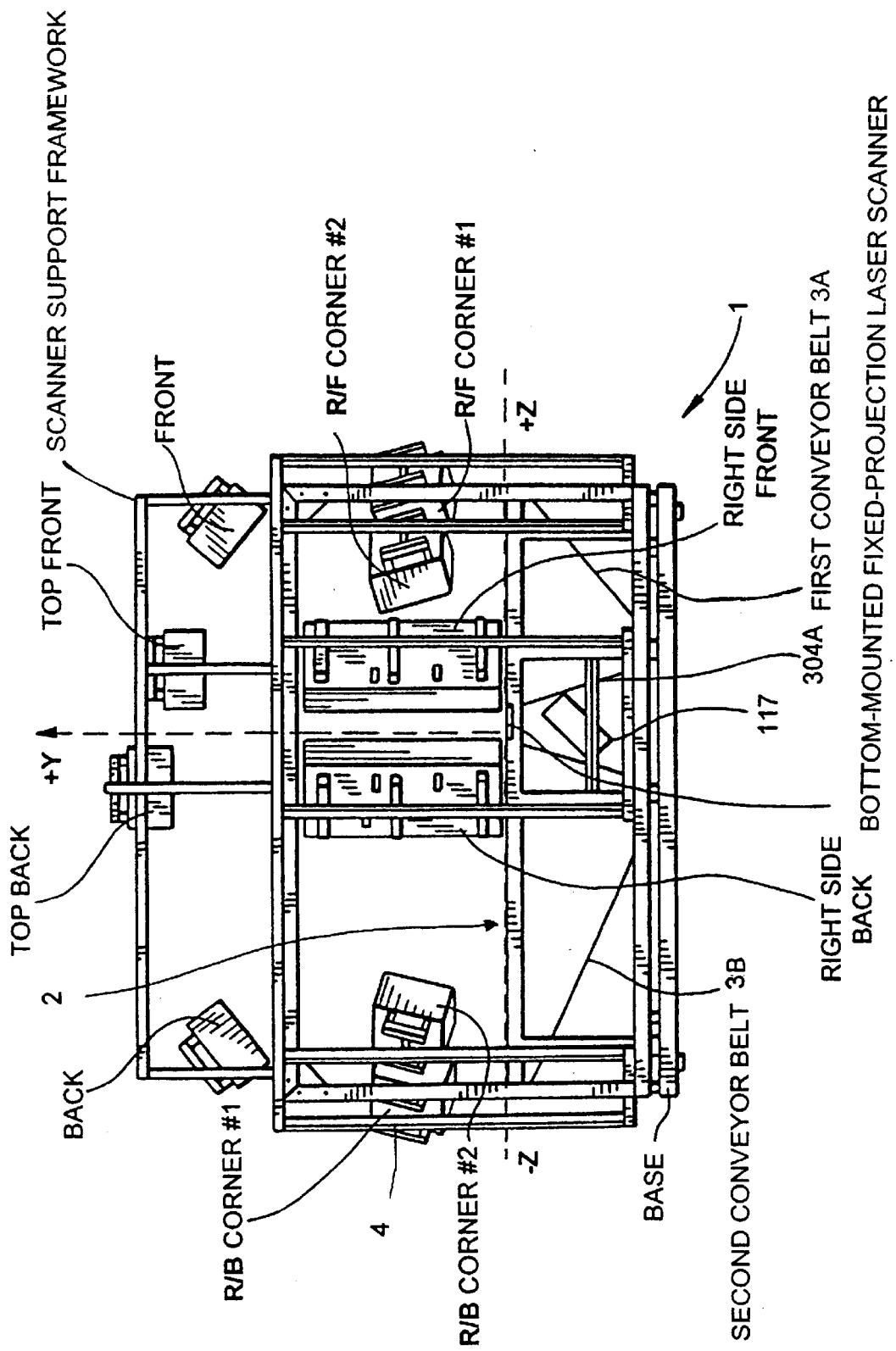
FIG. 1D is an elevated side view of the tunnel-type package identification and measurement system of the first illustrative embodiment, showing clearly the bottom-mounted laser scanning subsystem.
Figure 1E:
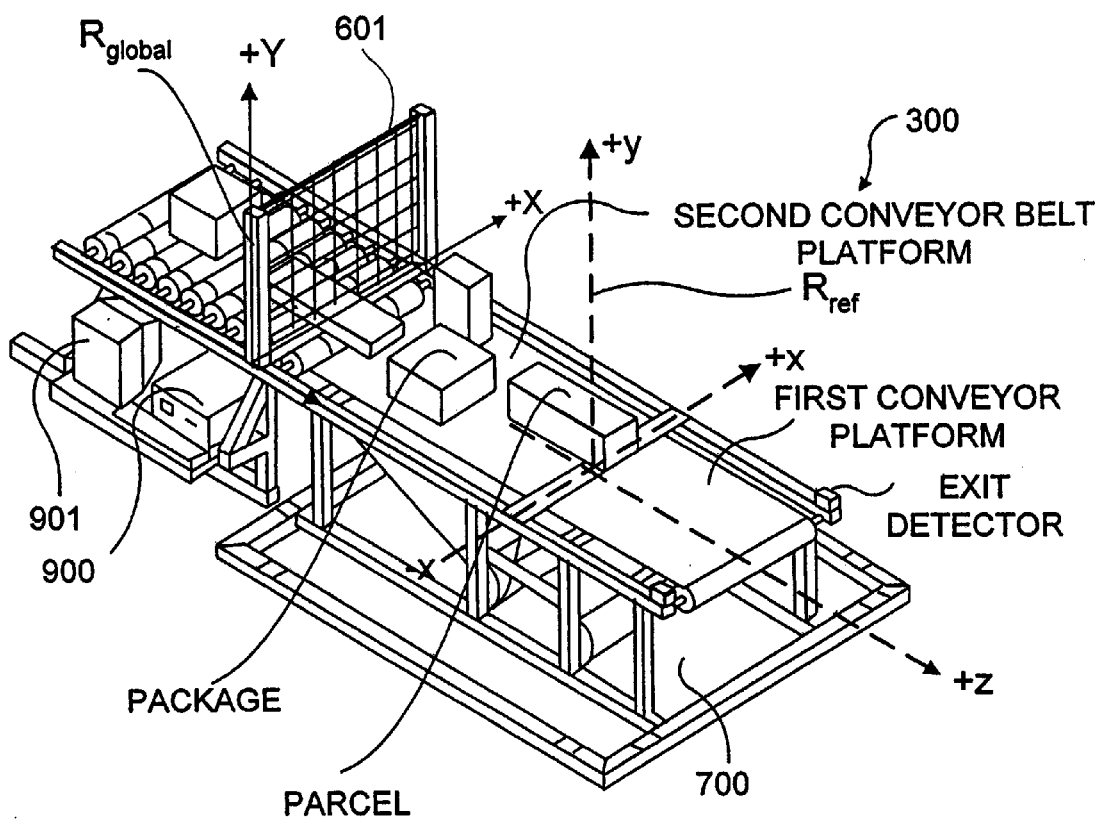
FIG. 1E is a perspective view of the tunnel-type package identification and measurement system of the first illustrative embodiment, removed from the scanner support framework, in order to clearly show the O-ring conveyor platform for staggering packages prior to entering the 3-D scanning volume, the light curtain associated with the packaging dimensioning subsystem for determining the total volume of the package, and whether there are multiple packages entering the 3-D scanning volume, a scanner management computer system (i.e. Station) with a graphical user interface (GUI) for easily configuring the scanning subsystems within the system and monitoring the flow of packages into the scanning tunnel, and an exit sensor for detecting the exit of each scanned package within the scanning tunnel.
Figure 1F:
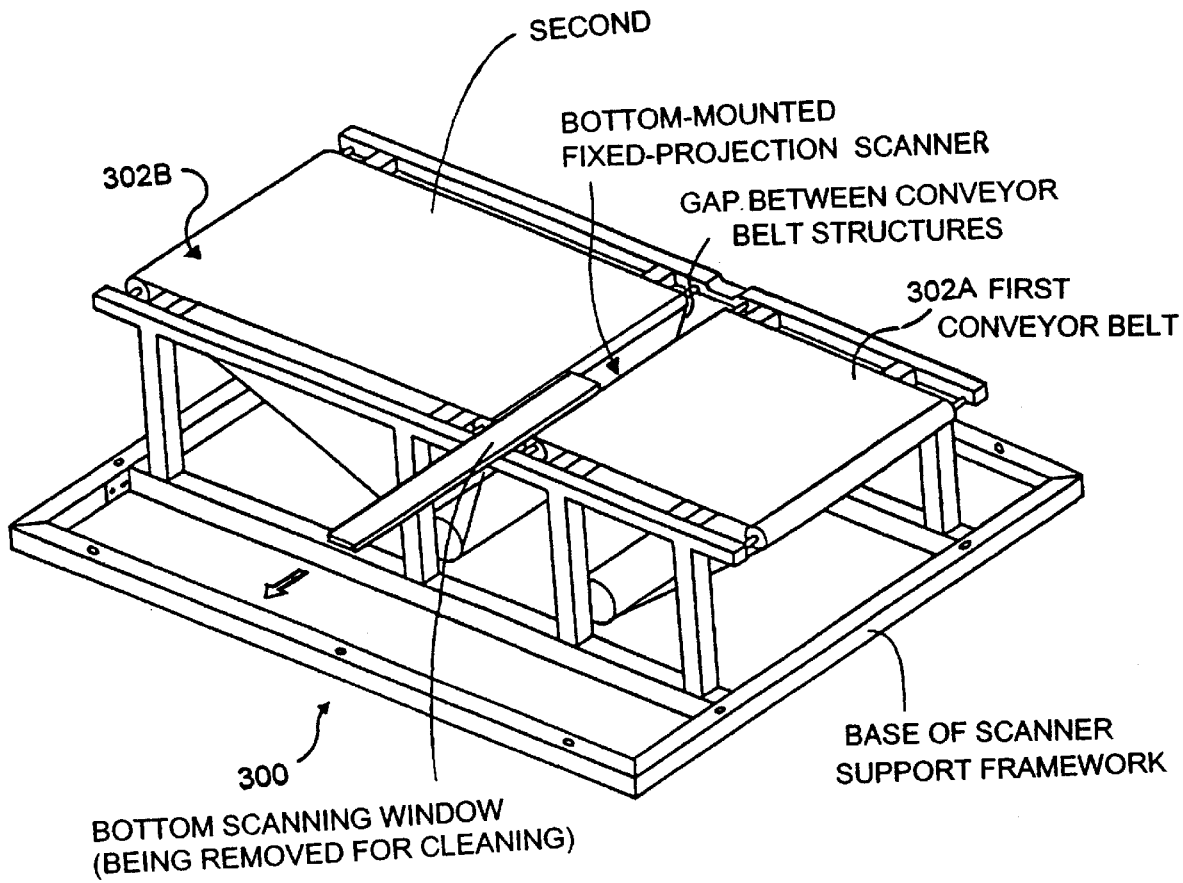
FIG. 1F is a perspective view of the split-section conveyor subsystem and its bottom-mounted laser scanning projection subsystem, and user-interface/workstation, shown detached from the scanner support framework shown in FIGS. 1, 1A and 1B.

Laser Scanning Tunnel Subsystem of First Illustrative Embodiment of Present Invention As shown in FIGS. 1 through 1F, the tunnel scanning system of the first illustrative embodiment 1 comprises an arrangement of laser scanning subsystems (i.e. scanners) 101 through 117 which, by virtue of their placement, relative to the conveyor belt subsystem 300, essentially form a "tunnel" scanning subsystem over and about the conveyor belt of the conveyor subsystem. In the field of package sortation of any sort, whether it be mail, luggage (as in an airport terminal) or other items or boxes, this type of code symbol scanning system is known as a "tunnel scanning system" by those skilled in the art.

The tunnel scanning system of the illustrative embodiment, shown in great detail in the drawings, has been designed and constructed to meet a specific set of customer-defined scanning parameters. For example, the bar code label could be on any one side of a box having six sides. The bar code label could be in any orientation. Furthermore, the object bearing the bar code label to be read would be moving past the scanners of the on a conveyor belt travelling at speeds in excess of 400 feet per second. In the illustrative embodiment, the conveyor belt belts 302A and 302B are moving at 520 feet per second. The types of codes to be read include such codes as Code 39, Code 128 and others. The aspect ratio of the bar codes to be read is on the order of 10 mils and up.

The tunnel scanning system of the present invention can be used in various types of applications, such as for example, where the bar codes are read to determine (a) identification of incoming packages, (b) identification of outgoing packages, and (c) sortation of outgoing packages. For sortation types of applications, the information derived from the bar code will be used not only to identify the package, but also to direct the package along a particular path using deflectors, routers and other instruments well known in the package and parcel handling art.

In the illustrative embodiment, the volume to be scanned within the tunneling subsystem (e.g. its 3-D scanning volume) is approximately: 1 meter wide (i.e. the width of the conveyor belt); ten feet long; and 1 meter tall (i.e. the height of the tallest possible box going through). The laser scanning pattern produced by the concerted operation of the holographic laser scanning subsystems identified in the drawings, and described above, fills this entire 3-D scanning volume with over 400,000 scan lines per second. The 3-D scanning volume of the tunnel scanning system, measured with respect to the surface of the conveyor belt, begins at the surface of the conveyor belt in order to scan flat items (such as envelopes), and extends up approximately 1 meter ("h") above the surface of the conveyor belt subsystem.

Figure 2A:
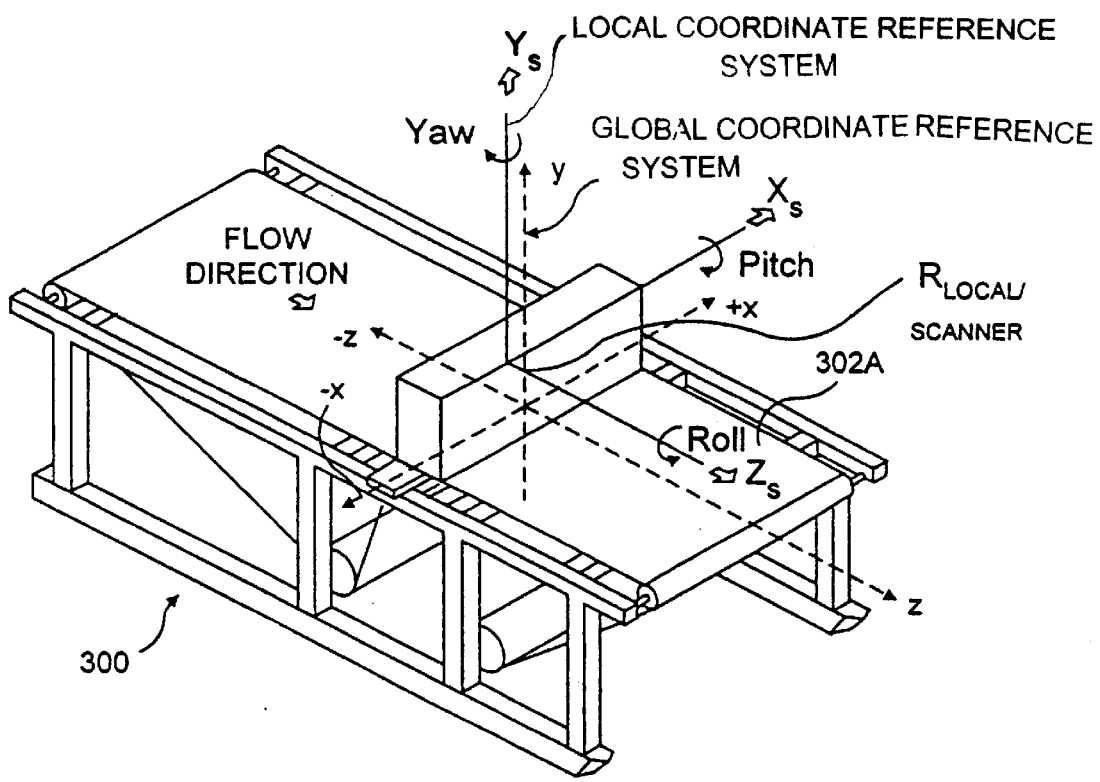
FIG. 2A is a perspective view of the split-conveyor subsystem removed from scanner support framework of the system of the first illustrative embodiment, showing a coordinate reference framework symbolically embedded within the conveyor subsystem and shown with graphical indications describing the directions of yaw, pitch and roll of each triple-scanning disc holographic scanner supported from the scanner support framework of the tunnel scanning system shown in FIGS. 1 and 1A.

As shown in FIGS. 1 through 1C, sixteen holographic laser scanning subsystems 101 through 116 are mounted on a lightweight scanner support framework 4, at positions specified in Tunnel Scanner Positioning Data Table shown in FIG. 2C. The terms (e.g. "Top/Front", Top/Back", etc.) used in this Table to identify the individual holographic scanning subsystems of the tunnel scanning system hereof are used throughout the drawings, rather than reference numerals. The one fixed-projection scanner subsystem 1117, identified by the label "Bottom" or 117, is mounted between the gap provided between the first and second conveyor platforms comprising the conveyor subsystem 300 of the tunnel scanning subsystem 100.

Figure 5A:
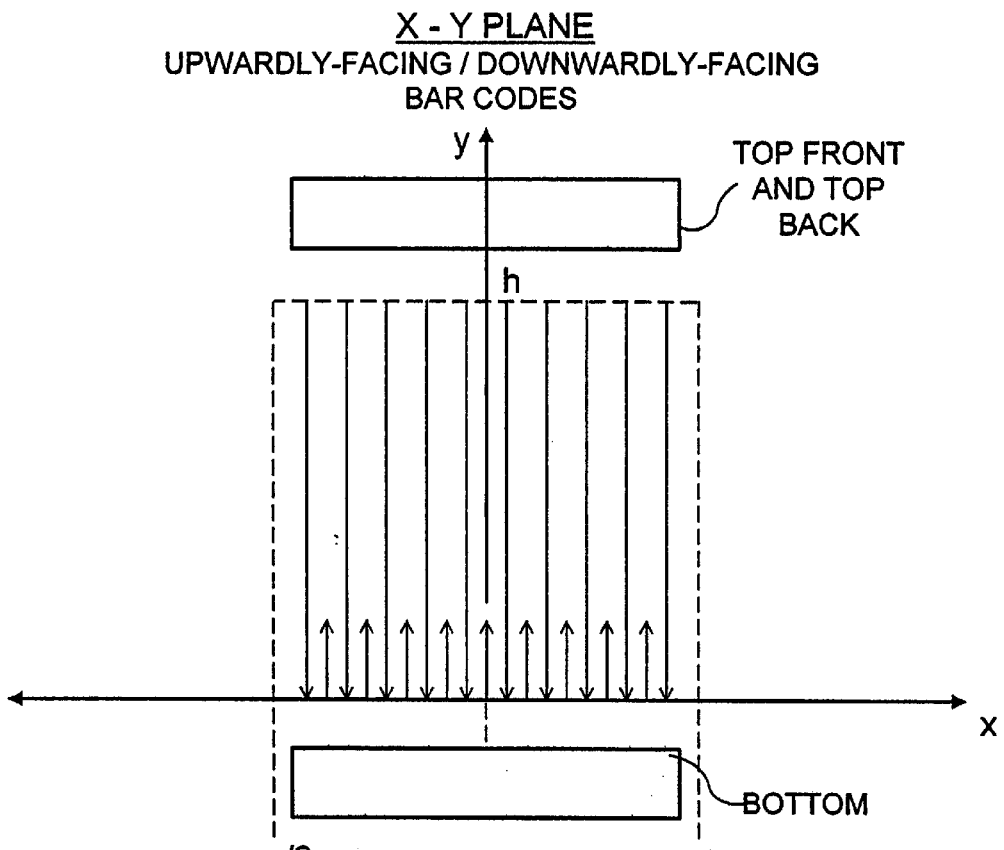
FIG. 5A is a schematic diagram showing the directions of omni-directional scanning provided in the X-Y plane of the 3-D scanning volume of the tunnel scanning system of the first illustrative embodiment of the present invention, by the Front and Back holographic laser scanning subsystems, and bottom-mounted fixed projection scanning subsystem employed therein.
Figure 5B:
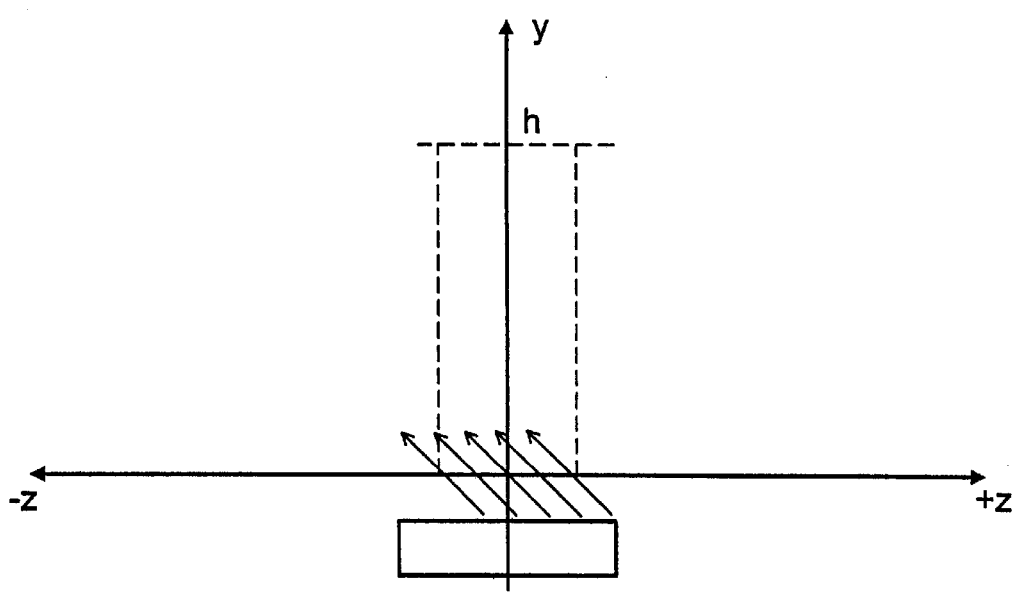
FIG. 5B is a schematic diagram showing the direction of omni-directional scanning provided in the Y-Z plane of the 3-D scanning volume of the tunnel scanning system of the first illustrative embodiment, by the bottom-mounted fixed-projection laser scanning subsystem employed therein.
Figure 6:
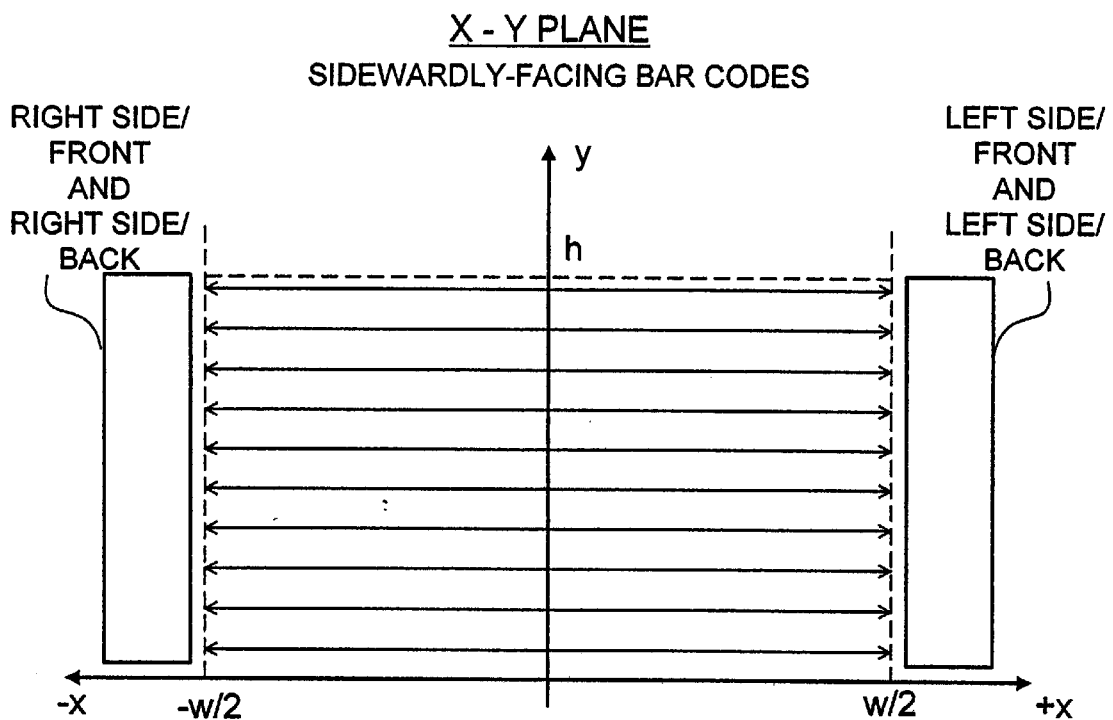

Each of the holographic scanners (denoted in R/F Corner #1, RI/F Corner #2, R/B Corner #1, R/B Corner #2, L/F Corner #1, L/F Corner #2, L/B Corner #1, L/B Corner #2,) mounted within the corners of the scanner support framework are single-disc holographic scanning subsystems, having five focal planes, formed using six laser scanning stations, each of which includes a VLD, a beam folding mirror, parabolic light collection mirror, signal processing circuit boards and the like, are designed and constructed using the methods detailed in Applicant's copending application Ser. Nos. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and 08/573,949 filed Dec. 18, 1995, each incorporated herein by reference. The design parameters for the twenty facet holographic scanning disc shown in FIG. 3A4, and the supporting subsystem used therewith, are set forth in the Table of FIG. 3A5. Notably, the design parameters set forth in the table of FIG. 3A5 are defined in detail in the above-referenced U.S. Patent Applications. The scanning pattern projected on the middle (third) focal/scanning plane of each such single-disc holographic scanning subsystem is shown in FIG. 3A6.

The various omnidirectional scanning directions provided for within the 3-D scanning volume of the tunnel-scanning system of the present invention are schematically illustrated, in FIGS. 5A through 9B. These illustrations indicate how each of the laser scanning subsystems within the tunnel scanning system contribute to produce the truly omnidirectional scanning performance attained by the tunnel scanner hereof.

As shown, the two triple-disc holographic scanners (denoted as Top Front and Top Back) are mounted above the conveyor belt by way of the scanner support framework. The four triple-disc holographic scanners (denoted as Left Side Front, Left Side Back, Right Side Front and Right Side Back) are mounted on the left and right sides of the scanner support framework. Each of these triple-disc holographic scanning subsystems is shown in greater detail in FIGS. 3B1 through 3B8. Each of these holographic scanning subsystems has five focal planes, formed using three sets (groups) of six laser scanning stations, arranged about a twenty-facet scanning disc. Each laser scanning station about the scanning disc includes a VLD, a beam folding mirror, parabolic light collection mirror, signal processing circuit boards and the like. Each holographic laser scanning subsystem within these triple-disc scanners are designed and constructed using the methods detailed in Applicant's copending application Ser. Nos. 08/949,915 filed Oct. 14, 1997, now U.S. Pat. No. 6,158,659; Ser. No. 08/854,832 filed May 12, 1997; Ser. No. 08/886,806 filed Apr. 22, 1997;

Ser. No. 08/726,522 filed Oct. 7, 1996; and Ser. 08/573,949 filed Dec. 18, 1995, each incorporated herein by reference. The design parameters for each twenty facet holographic scanning disc shown in FIG. 3B2, and the supporting subsystem used therewith, are set forth in the Table of FIGS. 3B3A and 3B3B. Notably, the design parameters set forth in the table of FIGS. 3B3A and 3B3B are defined in detail in the above-referenced US Patent Applications. The scanning pattern projected on the middle (third) focal/scanning plane of each such triple-disc holographic scanning subsystem is shown in FIG. 3B8.

Figure 2B:
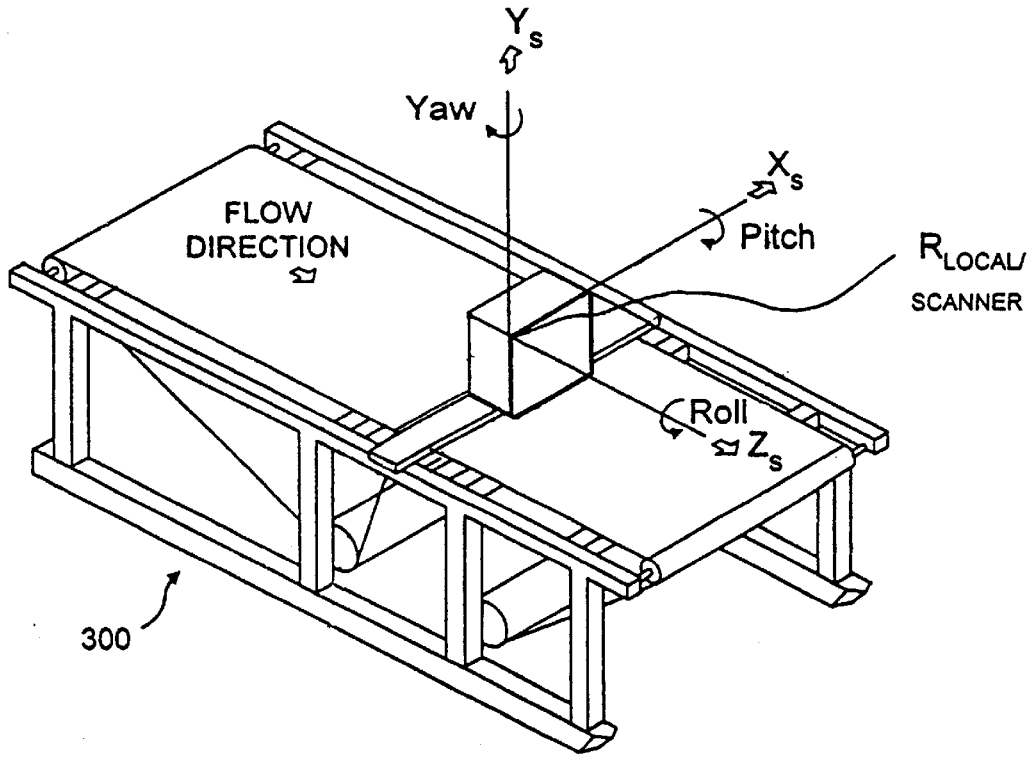
FIG. 2B is a perspective view of the split-conveyor subsystem removed from scanner support framework of the package identification and measurement system of the first illustrative embodiment, showing a coordinate reference framework symbolically embedded within the conveyor system and schematically depicted with graphical indications describing the directions of yaw, pitch and roll of each single-scanning disc holographic scanner supported from the scanner support framework of the tunnel scanning subsystem shown in FIGS. 1 and 1A.

As shown, the two triple-disc holographic scanners (denoted as Front and Back) are mounted above the conveyor belt by way of the scanner support framework. Each of these triple-disc holographic scanning subsystems is shown in greater detail in FIGS. 3C1 and 3C2. Each of these holographic scanning subsystems has five focal planes, formed using three sets (groups) of six laser scanning stations, arranged about a twenty-facet scanning disc. Each laser scanning station about the scanning disc has a VLD, a beam folding mirror, parabolic light collection mirror, signal processing circuit boards and the like. Each holographic laser scanning subsystem within these triple-disc scanners are designed and constructed using the methods detailed in Applicant's copending application Ser. Nos. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and 08/573,949 filed Dec. 18, 1995, each incorporated herein by reference. The design parameters for each twenty facet holographic scanning disc shown in the table of FIG. 3A4, and the supporting subsystem used therewith, are set forth in the Table of FIG. 3A5. Notably, the design parameters set forth in the table of FIG. 3A5 are defined in detail in the above-referenced US Patent Applications. The scanning pattern projected on the middle (third) focal/scanning plane of each such-triple-disc holographic scanning subsystem is shown in FIG. 3C2.

Figure 7:
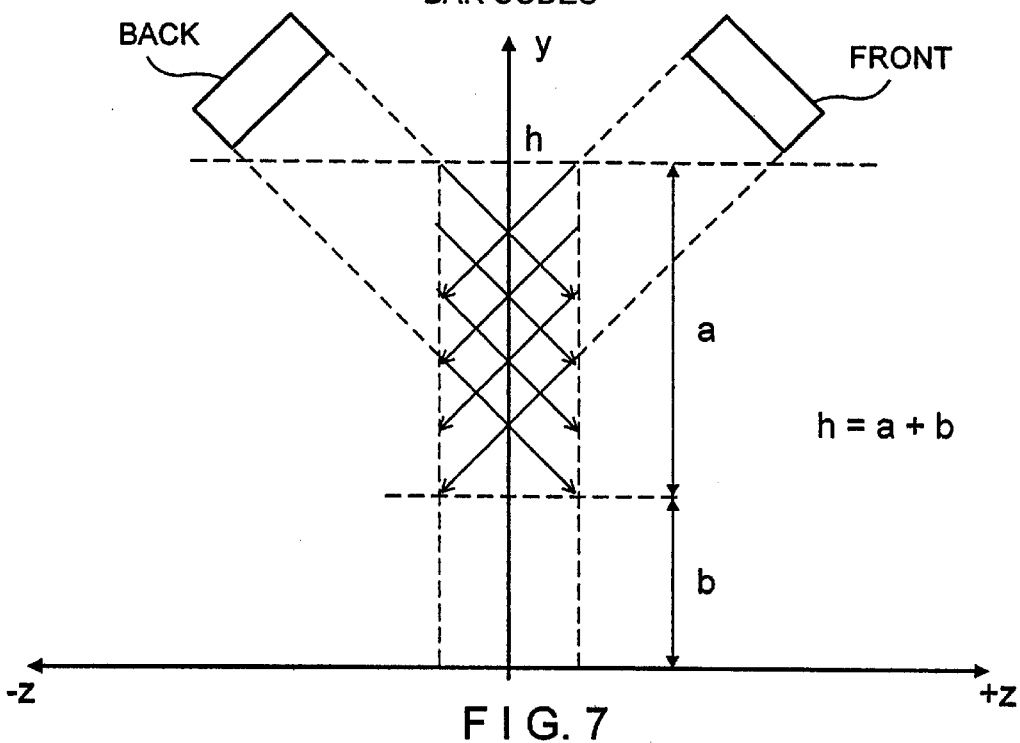

The bottom-mounted fixed projection scanner (denoted as Bottom) employed in the tunnel scanning system hereof is shown in greater detail in FIGS. 3D1 through 3D7. As shown in FIG. 3D1, the bottom-mounted scanner comprises eight fixed-projection laser scanning subsystems 6, shown in FIG. 3D2, that are mounted along optical bench 7 shown in FIG. 3D1. Each fixed projection scanning subsystem 6 comprises: four stationary mirrors 7 arranged about a central reference plane passing along the longitudinal extent of the optical bench 8 of the subsystem; and eight-sided motor driven polygon scanning element 10 mounted closely to the nested array of mirrors 8; a light collecting mirror 9 mounted above the nested array along the central reference plane; a laser diode 11 for producing a laser beam which is passed through collecting mirror 9 and strikes the polygon 10; and a photodetector 12, mounted above the polygon scanning element, for detecting reflected laser light in a manner well known in the art to produce scan data signals for signal processing.

In FIG. 3D4 and 3D5, the partial scan pattern produced by individual stationary mirrors in each subsystem 6 are shown. The complete pattern generated by each subsystem 6 is shown in FIG. 3D6. The composite omnidirectional scanning pattern generated by the eight subsystems 6 working together in the bottom scanner is shown in FIG. 3D7.

As shown in the system diagram of FIGS. 3A7A through 3A7C, each holographic laser scanning unit of the present invention comprises a number of system components, many of which are realized on a control (i.e. mother board) board 200, a plurality (e.g. six) analog signal processing boards 201A–201-F, and six digital signal processing boards 202A–202F. For sake of simplicity, it will be best to describe these system components by describing the components realized on each of the above-described boards, and thereafter describe the interfaces and interaction therebetween.

In the illustrative embodiment shown in FIG. 3A7A, each analog scan data signal processing board 201A–201F has the following components mounted thereon: and an associated photodetector 215A (through 215F) (e.g. a silicon photocell) for detection of analog scan data signals as described; and an analog signal processing circuit 235A (through 235F) for processing In the illustrative embodiment, each photodetector 215A through 215F is realized as an opto-electronic device and each analog signal processing circuit 235A aboard the analog signal processing board is realized as an application Specific Integrated Circuit (ASIC) chip. These chips are suitably mounted onto a small printed circuit (PC) board, along with electrical connectors which allow for interfacing with other boards within the scanner housing. With all of its components mounted thereon, each PC board is suitably fastened to the photodetector support frame 220, along its respective central reference frame, as shown in FIG. 3A2.

In a conventional manner, the optical scan data signal $D_0$ focused onto the photodetector (215A) during laser scanning operations is produced by light rays of a particular polarization state (e.g. S polarization state) associated with a diffracted laser beam being scanned across a light reflective surface (e.g. the bars and spaces of a bar code symbol) and scattering thereoff. Typically, the polarization state distribution of the scattered light rays is altered when the scanned surface exhibits diffuse reflective characteristics. Thereafter, a portion of the scattered light rays are reflected along the same outgoing light ray paths toward the holographic facet which produced the scanned laser beam. These reflected light rays are collected by the scanning facet and ultimately focused onto the photodetector of the associated light detection subsystem by its parabolic light reflecting mirror disposed beneath the scanning disc. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to the light reflection characteristics of the scanned surface (e.g. the scanned bar code symbol). The function of the analog signal processing circuitry is to band-pass filter and preamplify the electrical analog scan data signal $D_1$, in order to improve the SNR of the output signal.

In the illustrative embodiment, each digital scan data signal processing board 202A through 202F is constructed in substantially the same manner. On each of these signal processing boards, the following devices are provided: an analog-to-digital (A/D) conversion circuit 238A through 238F realized as a first application specific integrated circuit (ASIC) chip; a programmable digitizing circuit 239A through 239F realized as a second ASIC chip; a start-of-facet-sector pulse (SOFSP) generator 236A through 236F realized as a programmable IC chip, for generating SOFSPs relative to home-offset pulses (HOP) generated by a HOP generator circuit on the mother board 200, and received by the SOFSP generator; an EPROM 237A through 237F for storing parameters and information represented in the tables of FIGS. 10B, 10D, 10E1 and 10E2; and a programmed decode computer 240A through 240F is realized as a microprocessor and associated program and data storage memory and system buses, for carrying out symbol decoding operations and recovery of SOFSPs from the digitizer circuit 239A in a synchronous, real-time manner as will be described in greater detail hereinafter. In the illustrative embodiment, the ASIC chips, the microprocessor, its associated memory and systems buses are all mounted on a single printed circuit (PC) board, using suitable electrical connectors, in a manner well known in the art.

The function of the A/D conversion circuit (238A) is to perform a simple thresholding function in order to convert the electrical analog scan data signal $D_1$ into a corresponding digital scan data signal $D_2$ having first and second (i.e. binary) signal levels which correspond to the bars and spaces of the bar code symbol being scanned. In practice, the digital scan data signal $D_2$ appears as a pulse-width modulated type signal as the first and second signal levels thereof vary in proportion to the width of bars and spaces in the scanned bar code symbol.

The function of the programmable digitizing circuit 239A of the present invention is two-fold: (1) to convert the digital scan data signal $D_2$, associated with each scanned bar code symbol, into a corresponding sequence of digital words (i.e. a sequence of digital count values) $D_3$ representative of package identification (I.D.) data; and (2) to correlate with the digital count values, time-based (or position-based) information about the facet sector on the scanning disc that generated the sequence digital count data (corresponding to a scanline or portion thereof) that was used to read the decoded bar code symbol on the package scanned in the scanning tunnel. Notably, in the digital word sequence $D_3$, each digital word represents the time length duration of first or second signal level in the corresponding digital scan data signal $D_2$. Preferably, the digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the holographic laser scanner of the present invention.

In bar code symbol scanning applications, the each programmed decode computer (240A through 240F) of the present invention has two primary functions: (1) to receive each digital sword sequence $D_3$ produced from its respective digitizing circuit 239A through 239F, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated with the decode computer; and (2) to generate a specification for the laser scanning beam (or plane-sector) that was used to collect the scan data underlying the decode bar code symbol. In the illustrative embodiment hereof, the specification for the laser scanning beam (or plane-sector) is expressed as the minimum and maximum facet angles delimited by the facet sector involved in the scanning of the decoded bar code symbol. Such minimum and maximum facet angles are indicated in the last column of the table shown in FIG. 11C. The second function of the programmed decode processor 240A through 240F is described in greater detail in FIGS. 11C and 11D.

In more general scanning applications, the first function of the programmed decode computer 240A hereof is to receive each digital word sequence $D_3$ produced from the digitizing circuit 239A, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art.

Figure 8A:
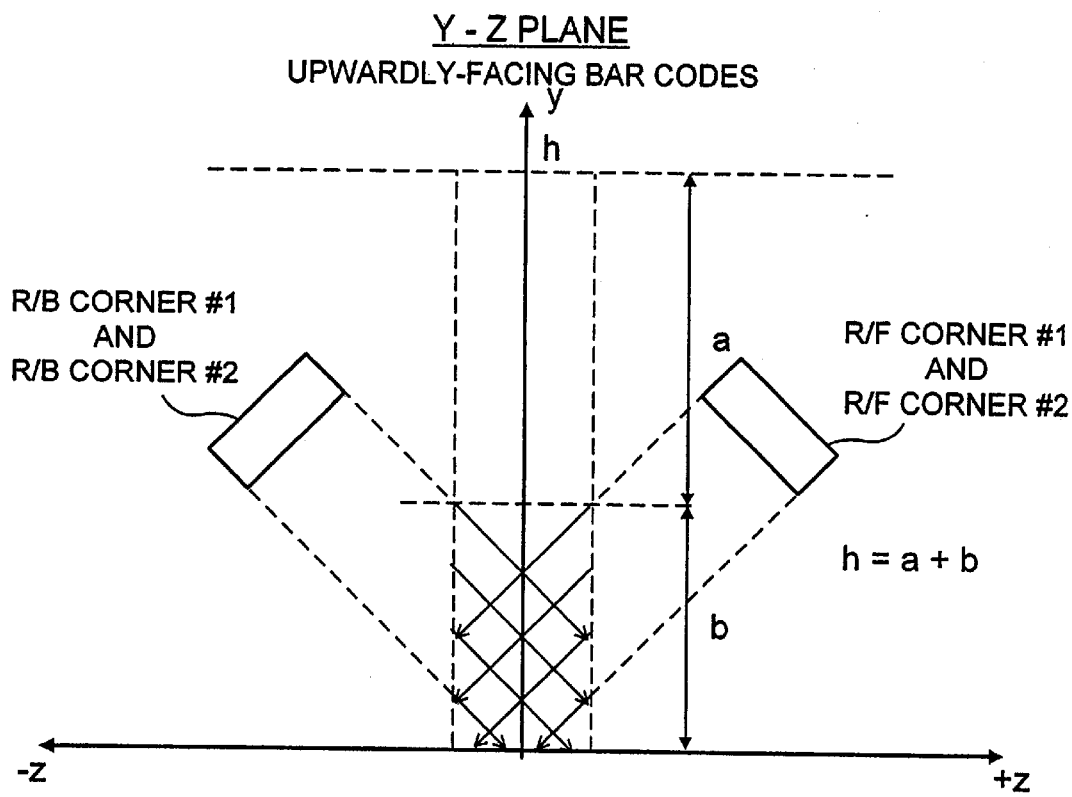
Figure 8B:
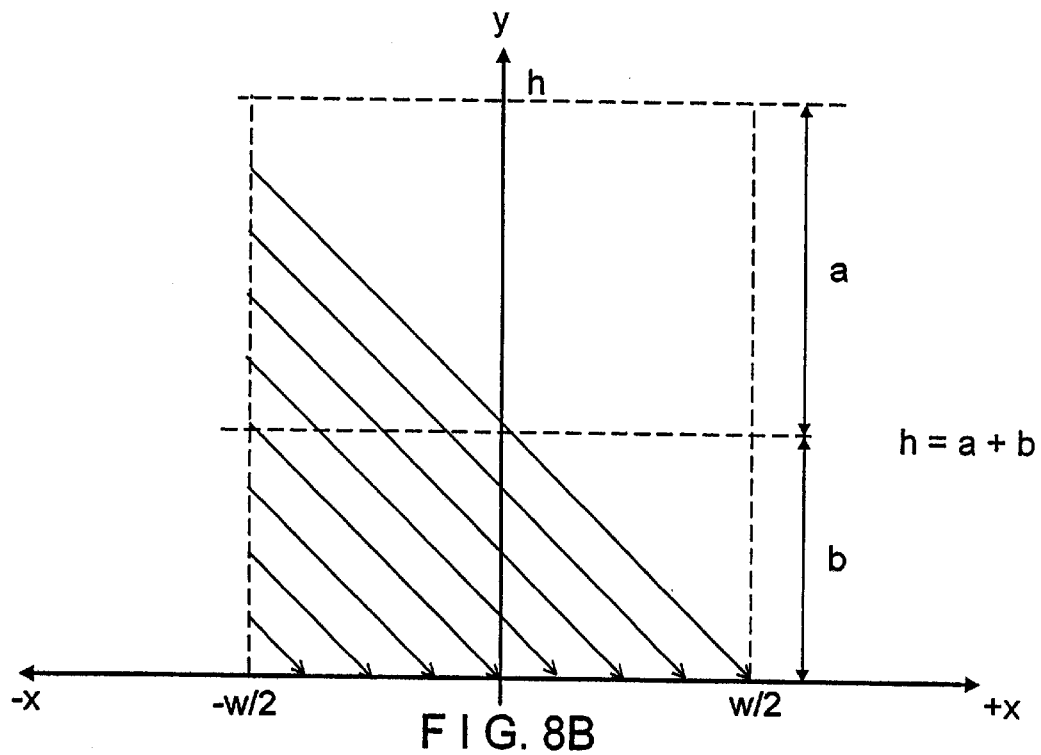
Figure 9A:
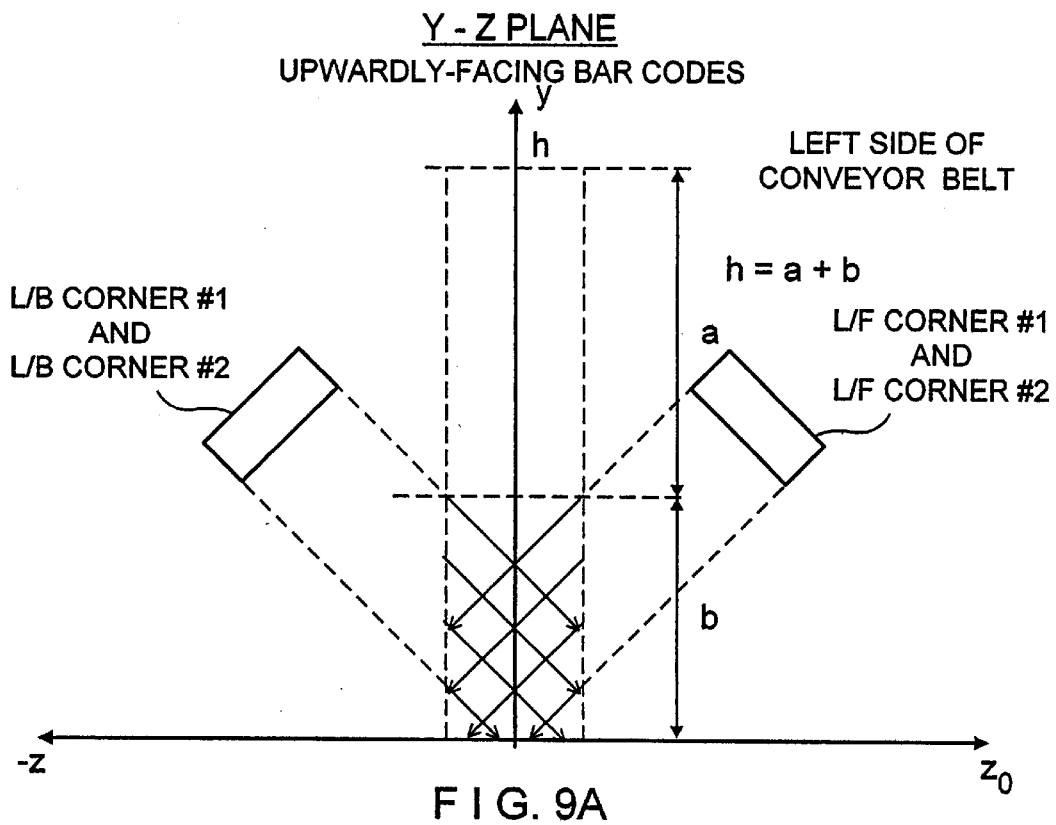
FIG. 9A is a schematic diagram showing the direction of omni-directional scanning provided in the Y-Z plane of the 3-D scanning volume of tunnel scanning system of the first illustrative embodiment of the present invention, by the holographic laser scanning subsystems (indicated by L/B Corner #1, L/B Corner #2, L/F Corner #1 and L/B Corner #2) employed therein.
Figure 9B:
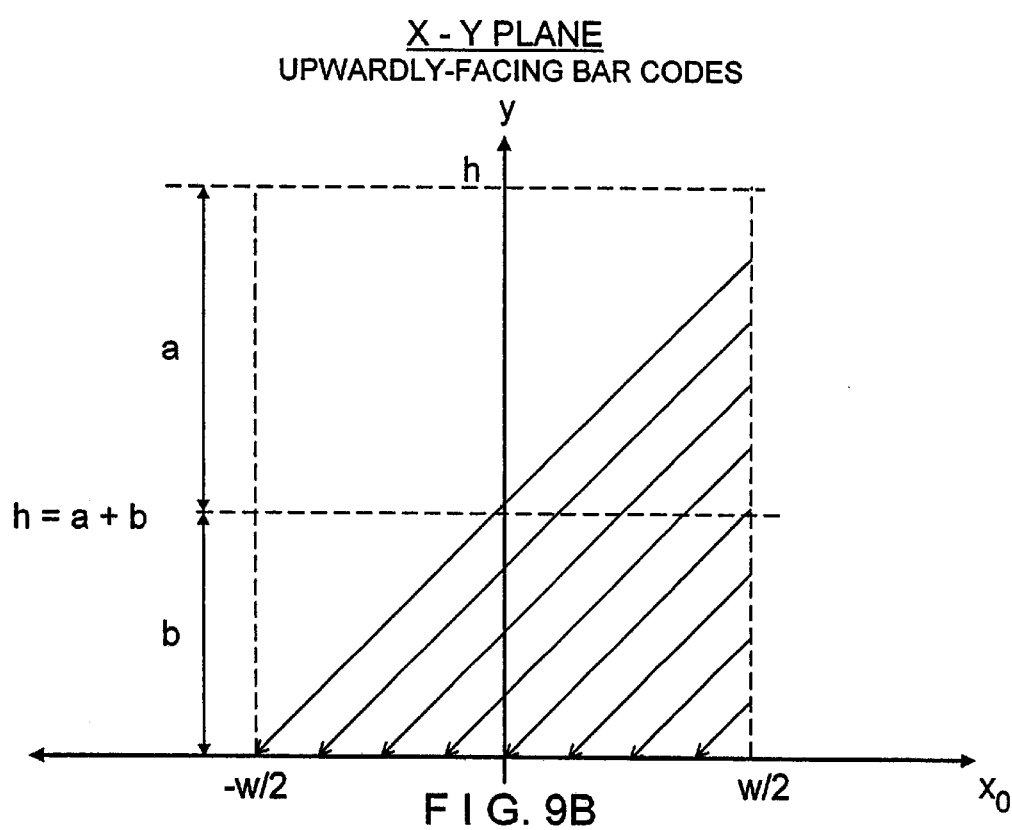
FIG. 9B is a schematic diagram showing the direction of omni-directional scanning provided in the X-Y plane of the 3-D scanning volume of tunnel scanning system of the first illustrative embodiment of the present invention, by the holographic laser scanning subsystems (indicated by L/B Corner #1, L/B Corner #2, L/F Corner #1 and L/B Corner #2) employed therein.

As shown in FIG. 3A7B, the control board 200 comprises a number of components mounted on a small PC board, namely: a programmed microprocessor 442 with a system bus and associated program and data storage memory, for controlling the system operation of the holographic laser scanner and performing other auxiliary functions; first, second, third, forth, fifth and sixth serial data channels 243A through 243F, for receiving serial data input from the programmable decode computers 420A through 240F; an input/output (I/O) interface circuit 248 for interfacing with and transmitting symbol character data and other information to data management computer system 900; a home pulse detector 245 realized as the electronic circuit shown in FIG. 3A8C, for detecting the home pulse generated when the laser beam 250 (from VLD 251 in home pulse marking sensing module 251 in FIG. 3A8A) is directed through home-pulse gap (between Facets Nos. 5 and 12) and sensed by photodetector 252; and a home-offset-pulse (HOP) generator 244 realized as an ASIC chip, for generating a set of six home-offset-pulses (HOPs) in response to the detection of each home pulse by circuit 245. In the illustrative embodiment, each serial data channel 243A through 243F is realized as an RS232 port, although it is understood that other structures may be used to, realize the function performed thereby. The programmed control computer 242 also produces motor control signals, and laser control signals during system operation. These control signals are received as input by a power i supply circuit 252 realized on the power supply PC board. Other input signals to the power t supply circuit 252 include a 900 Volt, 60 Hz line voltage signal from a standard power distribution circuit. On the basis of the received input signals, the power supply circuit produces as output, (1) laser source enable signals to drive VLDs 253A, 253B and 253C, respectively, and (2) a motor enable signal in order to drive the scanning disc motor 211 coupled to holographic scanning disc 130.

Figure 10:
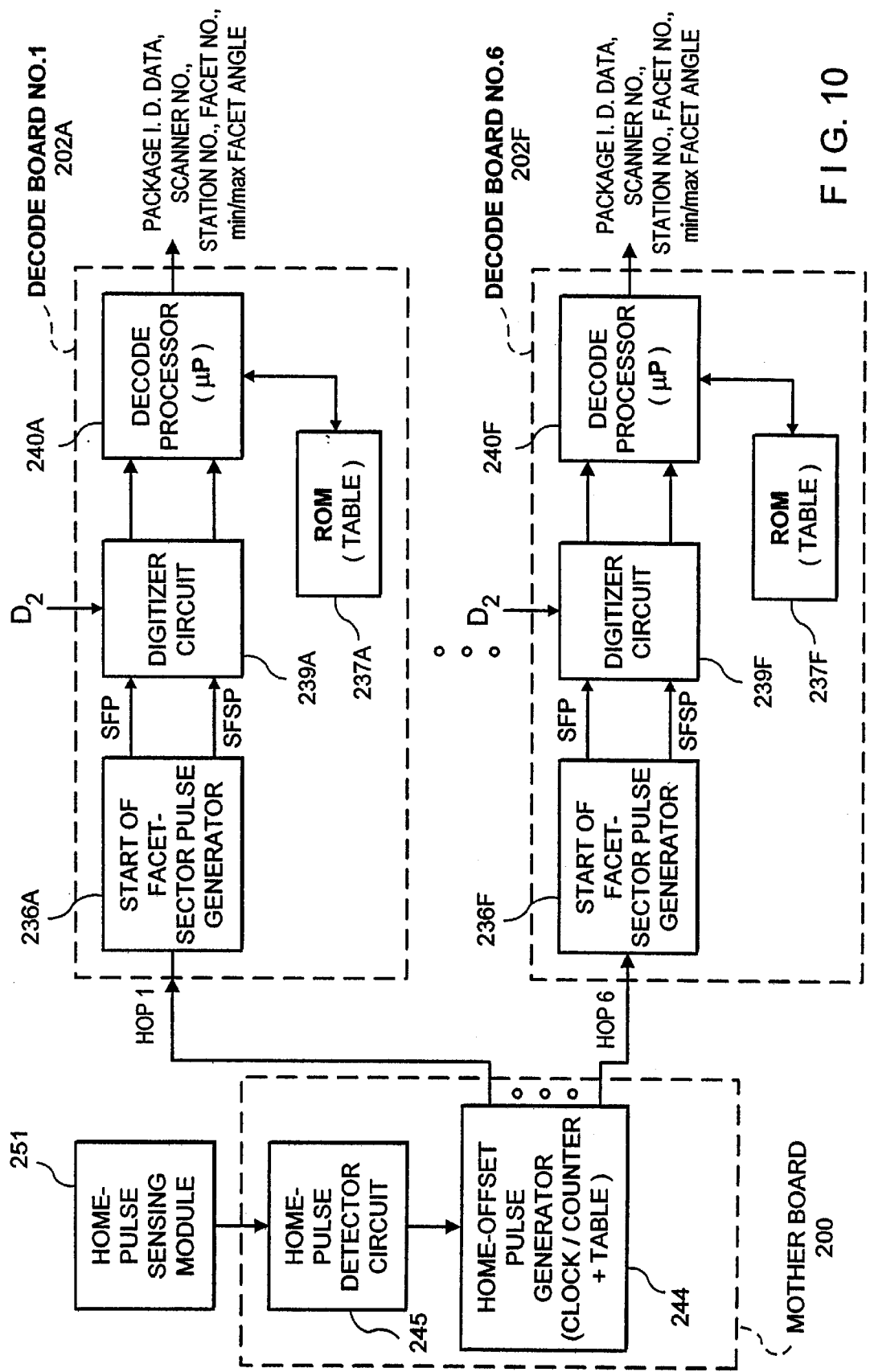
FIG. 10 is a schematic representation of the components on the motherboard and decode processing boards associated with holographic scanning disc employed within the tunnel scanning subsystem of the first illustrative embodiment of the present invention, showing the home-pulse detector and home-offset pulse (HOP) generator on the mother (control) board, and the start-of-facet-sector pulse (SOFSP) generator, digitizer circuitry, decode signal processor and ROM containing relative timing information about each SOFSP in relation to the HOP sent to the decode processing board from the control board of the present invention.
Figure 11:
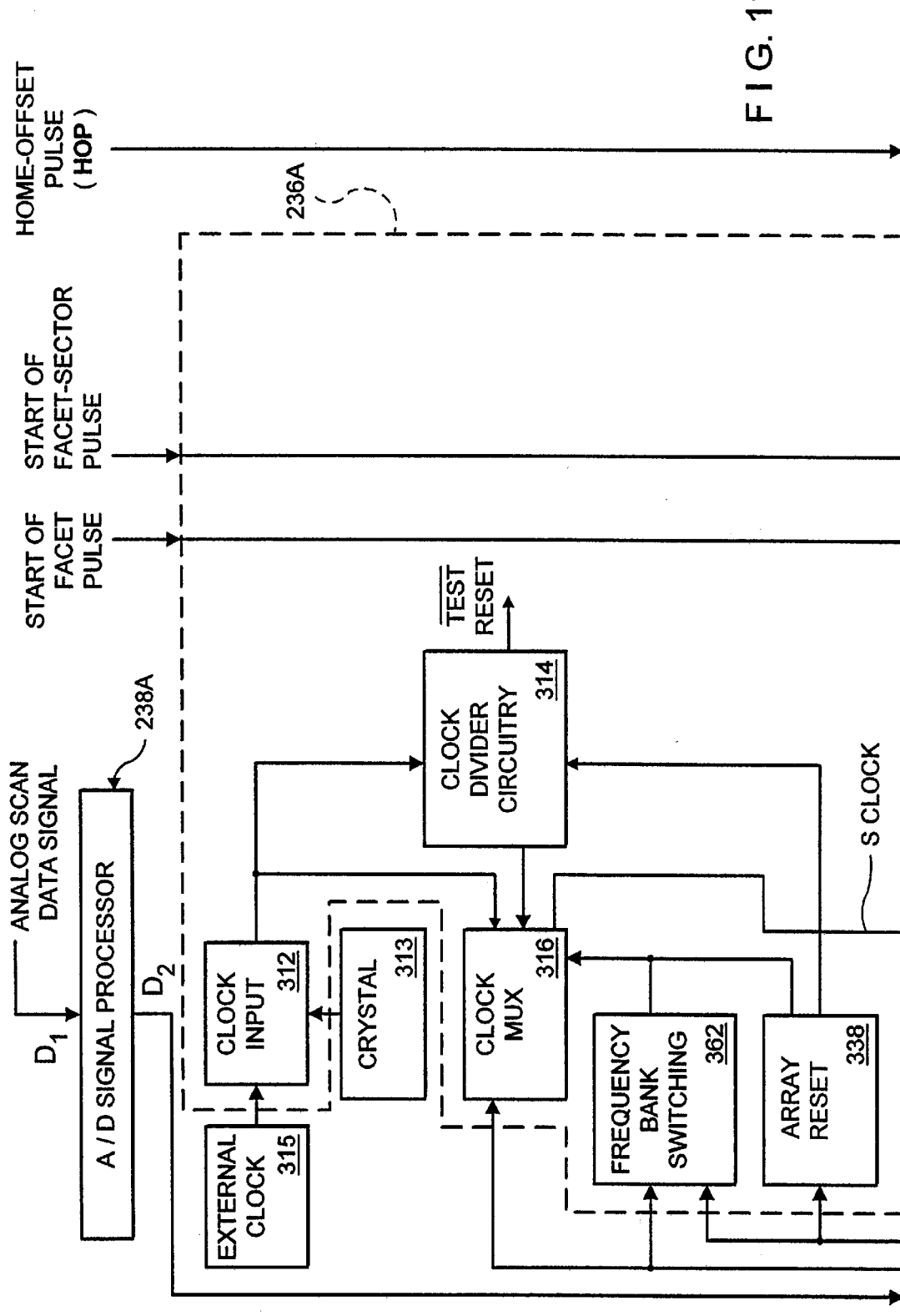
FIG. 11 is a schematic diagram of the digitizing circuit shown in FIG. 10, using a pair of dual FIFO memory storage buffers to synchronously track digital scan data and information about the facet-sectors on the optically-encoded holographic scanning disc of FIG. 12 used to generate the laser scanning beam that was used to collect such digital scan data from a bar code symbol on a package transported through the tunnel scanning subsystem of the first illustrative embodiment of the present invention.
Figure 11A:
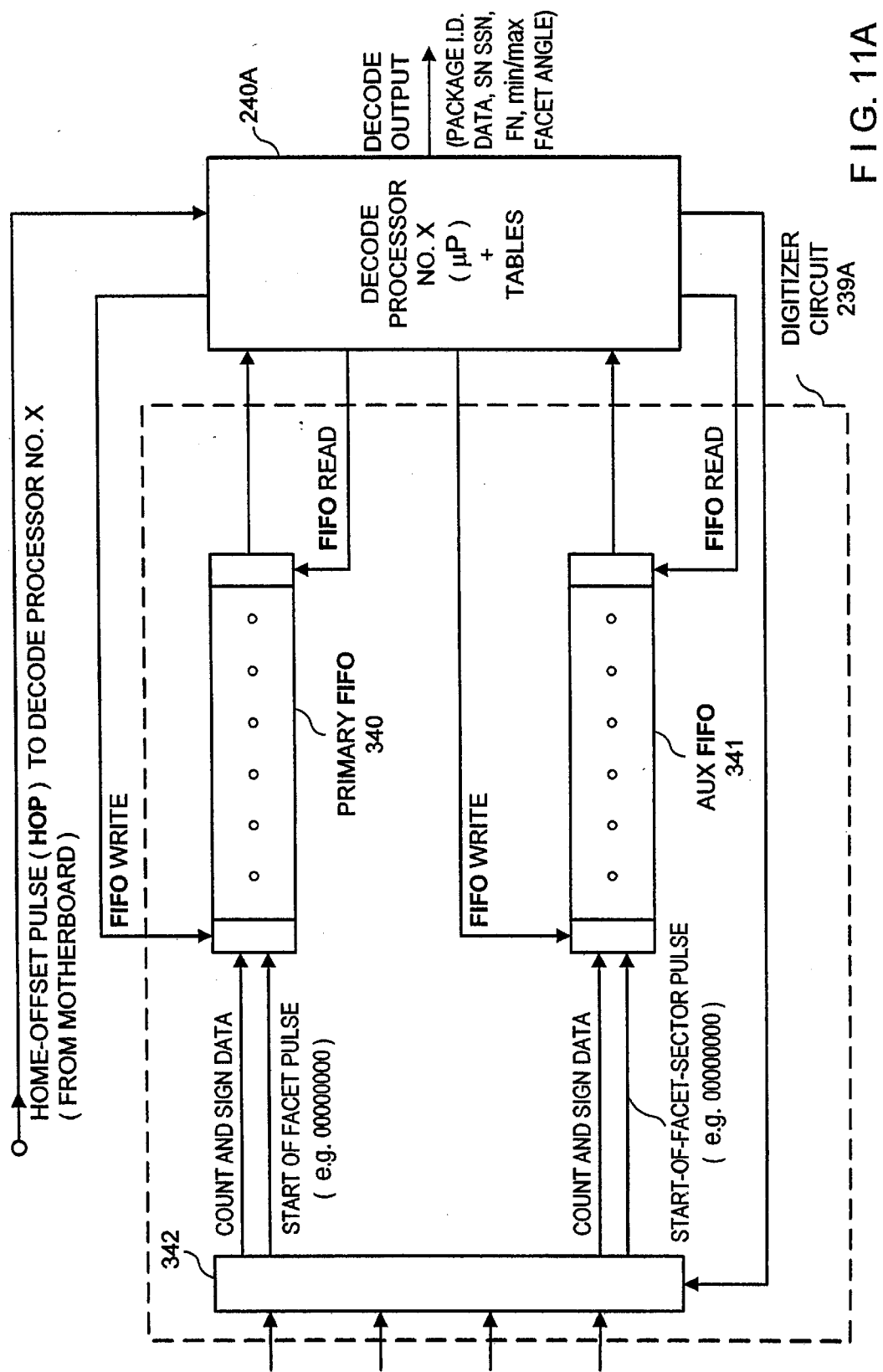
Figure 11D:
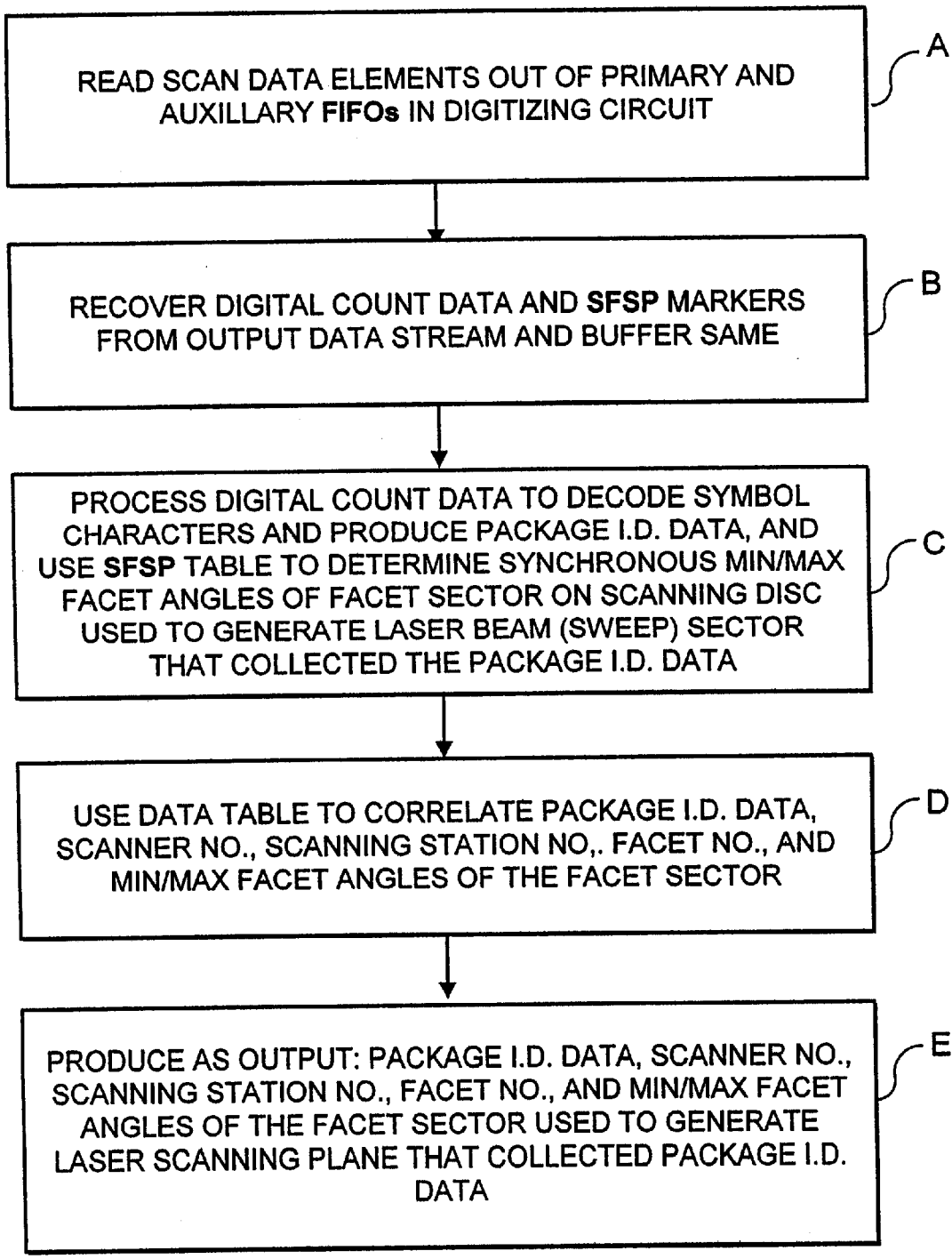
FIG. 11D is a high level flow chart describing the steps of the process carried out by the decode processor of the present invention shown in FIG. 11A.

First Method of Determining Laser Beam Position in Holographic Laser Scanners Under Constant Scanning Motor Speed Conditions FIGS. 10 through 11D, a first method is shown for determining the position of the laser scanning beam in the holographic laser scanning subsystems having constant scanning motor speed, and synchronously encoding facet sector information with digital count data in the digitizer circuit of each decode board. In general, this method involves optically encoding the "home pulse mark/gap" along the edge of the holographic scanning disc, and upon detecting the same, generating home offset pulses (HOPs) which are used to automatically generate the start of each facet pulse (SOFPs), and the SOFPs in turn are used to automatically generate the start-of-facet-sector pulses (SOFSPs) aboard each decode board. The details of this process will be described hereinbelow.

Figure 10C:
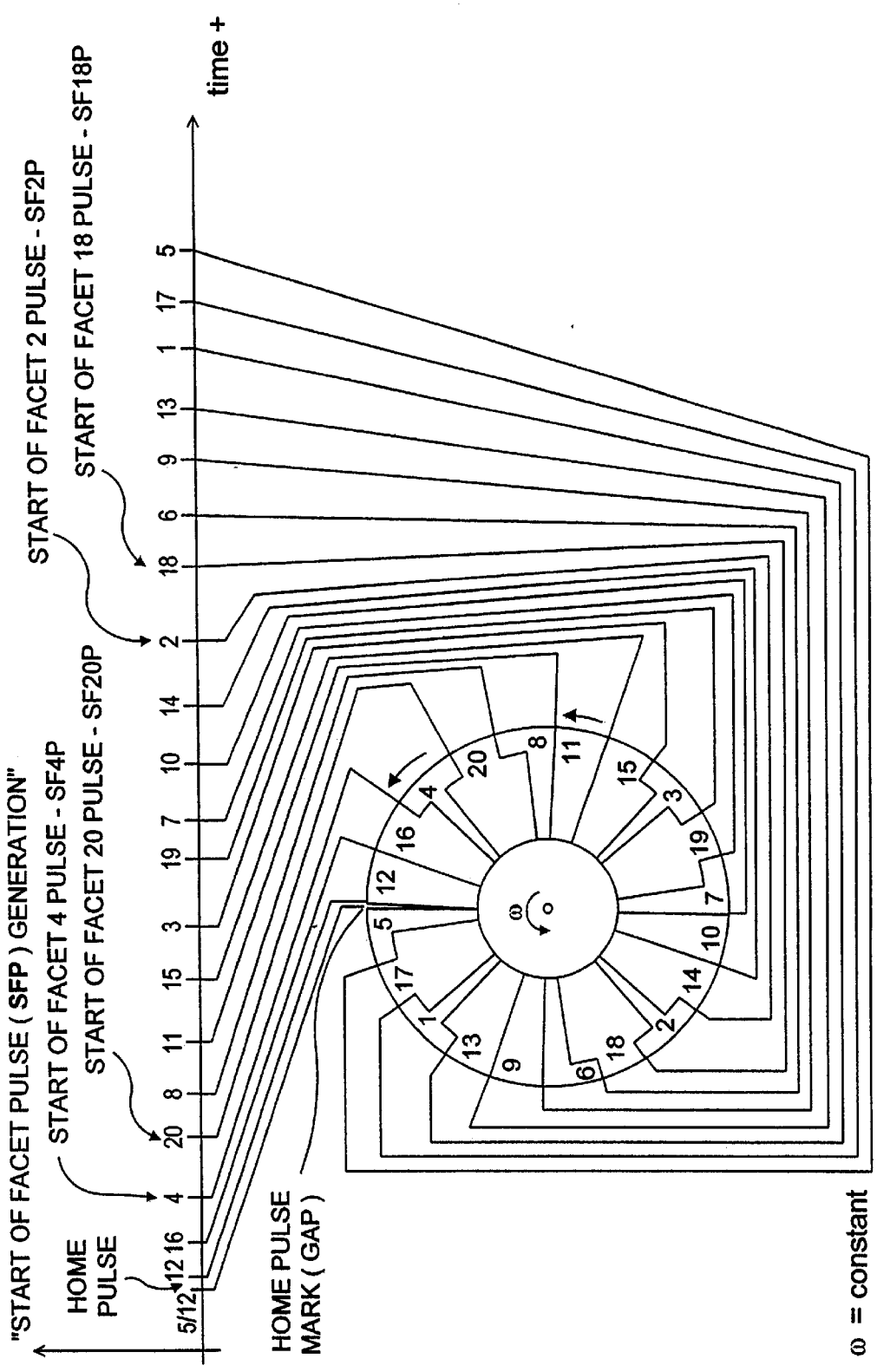
FIG. 10C is a schematic representation of the operation of the start-of-facet pulse (SOFP) generator employed within each SOFSP generator of the present invention, wherein start of facet pulses are generated within the SOFP generator relative to the home-offset pulse (HOP) received from the HOP generator on the mother/control board associated with each holographic scanning disc.
Figure 10F:
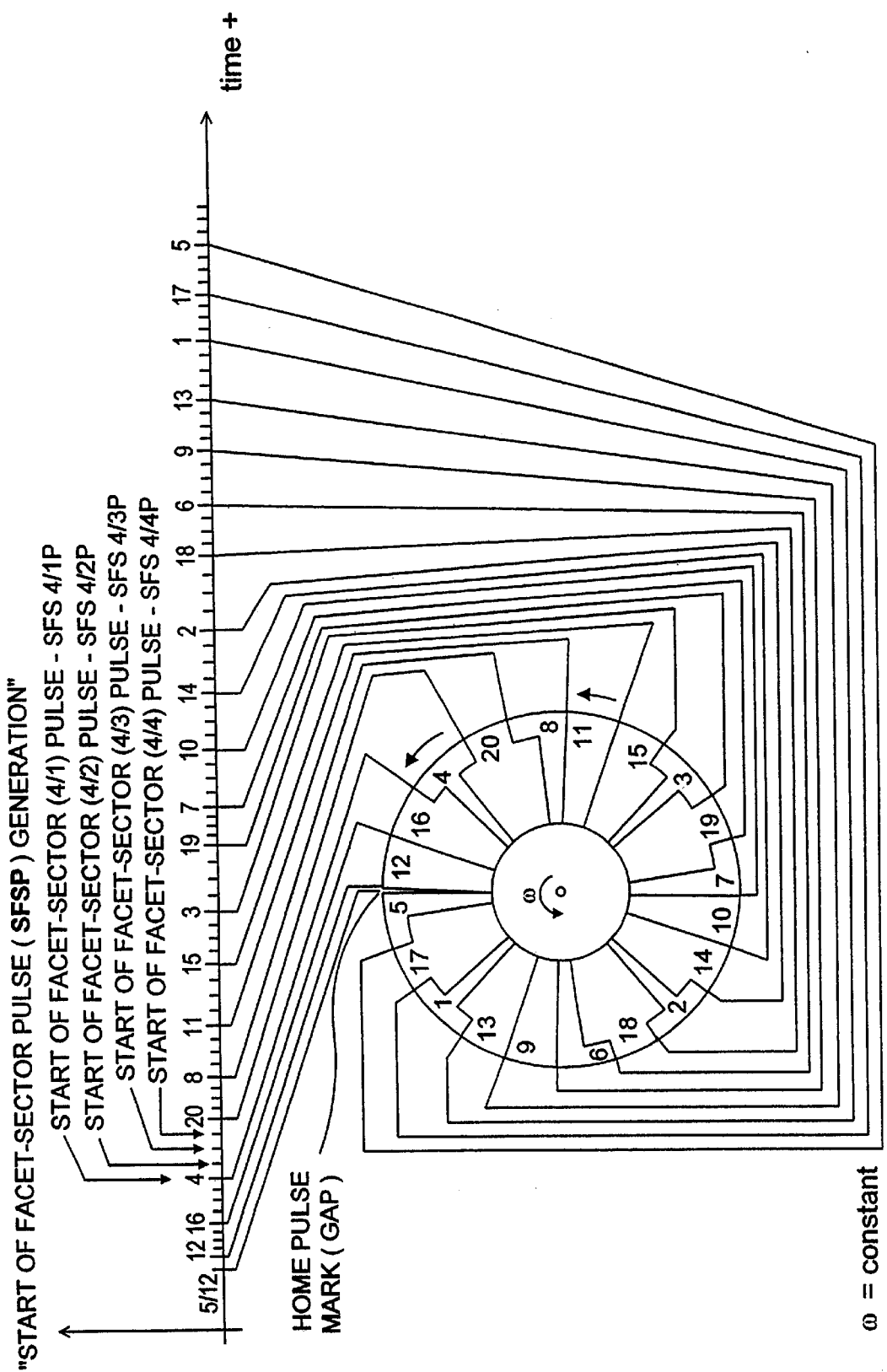
FIG. 10F is a schematic representation of the operation of the start-of-facet-sector pulse (SOFSP) generator of the present invention, wherein start of facet sector pulses (SOFSPs) are generated within the SOFSP generator relative to the home-offset pulse (HOP) received from the HOP generator on the mother/control board associated with each holographic scanning disc.

Referring now to FIGS. 10 through 11D, it is noted that each home offset pulse produced from HOP generating circuit 244 is provided to the SOFSP generator 236A through 236F on the decode processing board. When the HOP pulse is received at the SOFSP generator 236A through 236F on a particular decode processing board, the home pulse gap on the scanning disc 130 is starting to pass through the laser beam directed therethrough at the scanning station associated with the decode signal processing board. As shown in FIGS. 10 through 11D, timing information stored in the tables shown in these figures is used by the SOFSP generator 236A to generate a set of SOFSPs in response to the received HOP pulse during each revolution of the scanning disc. This enables a digital number count (referenced from the HOP) to be generated and correlated along with the digital data counts produced within the digitizer circuit 239A in a synchronous manner. As shown in FIG. 10A, each SOFSP generator 236A through 236B comprises: a clock 260 for producing clock pulses (e.g. having a pulse duration of about 4 microseconds); a SOFP generation module 261 for generating SOFPs using the table of FIG. 10B in accordance with the process depicted in FIG. 10C; a SOFSP generation module 262 for generating SOFSPs using the table of FIG. 10D and production rules set forth in FIGS. 10E1 and 10E2, in accordance with the process depicted in FIG. 10F; and a control module 263 for controlling the SOFP generator 261 and the SOFSP generator 262, and resetting the clock 260 upon each detection of a new HOP from the HOP generator on the mother control board 200 associated with the holographic scanning unit.

As shown in FIG. 11A, the digitizer circuit 239A of the present invention comprises a number of subcomponents. In particular, a scan data input circuit 322 is provided for receiving digital scan data signal $D_2$. A clock input 132 is provided from an external fixed frequency source 313, e.g., a 40 MHz crystal, or another external clock 315 to produce a pulse train. The output of the clock input circuit 312 is provided to the clock divider circuitry 314. That circuit 314 includes dividers for successively dividing the frequency of the clock pulses by a factor of two to produce a plurality of clock frequencies, as will be described in detail later. This plurality of clock signals is provided to a clock multiplexer 316. As shown in FIG. 11, the 40 MHz clock input signal is also provided directly to the clock multiplexer 316. The clock multiplexer 316 selects the desired output frequencies for the device 10 based upon control signals received from clock control circuitry in the programmable processor 240A and in associated circuitry. The output of the clock multiplexer 316 comprises an S clock signal which provides the basic timing for the digitizer circuit 239A, as well as the input to digital counters. The processing of the input (bar code) scan data $D_2$ is provided from signal processor 238A. The scanner input circuit 322 provides output signals which represent the detected bar code signal to be processed and are provided to the transition and sign detecting circuit 324. That circuit detects the transition from a bar to a space or a space to a bar from the input signals provided thereto, and also determines whether the symbol occurring before the transition is a bar or a space. Thus, the transition and sign detector 324 provides a signal bearing the "sign: information (referred to as the "SIGN" signal) which is provided to multiplexer 342, and thus a primary first-in, first-out (FIFO) memory which serves as the input of programmable processor 240A. The transition and sign circuit 324 also provides a signal to the sequencing means 328 to commence operation of the sequencing circuit 328. The sequencing circuit 328 sequences the digitizer circuit through a predetermined number of steps which begin at the occurrence of each symbol transition and which will be described in detail later. Sequencing circuit 328 provides a FIFO write signal to the FIFO input of primary FIFO 340 and the auxiliary FIFO 341, at the proper time to enable it to accept data thereinto.

The sequencing circuit 328 provides input signals to digitizing counting circuit 330 so that the starting and stopping of the counters, occurring with the detection of each transition, is properly sequenced. The counting circuit 330 also receives an input signal from the clock multiplexer 316 (S Clock). This signal runs the counters at the selected rate when they are enabled by the sequencing means 328. The clock multiplexer 316, the sequencer circuit 328 and the counting circuit 330 each supply signals to the interface circuit 333 which enables it to properly pass the digitized count data to the primary and auxiliary FIFOs 340 and 341, via multiplexer 342, as shown in FIGS. 11 and 11A. The clock multiplexer 316 is arranged to provide two banks of available frequencies for the device to use, namely, an upper and a lower bank. The selection of frequencies from the upper bank or the lower bank is determined by a frequency bank switching circuit 362. The frequency bank switching circuit 362 also provides an input to an array reset 38 which provides a signal to reset the clock divider 314 on command. The clock divider circuitry 314 also generates a TEST reset signal by inverting the array reset signal. The TEST reset signal resets the remainder of the circuit 239A. The command which initiates this reset condition is normally generated by a testing device (not shown) connected to device 239A and used to test it upon its fabrication.

As shown in FIGS. 11 and 11A, digital count data or a string of zeros (representative of correlated SOFP data or count values from the HOP) are written into the primary FIFO using multiplexer 342 and write enable signals generated by the sequencing circuit 238. The SOFP marker (i.e. string of zeros) is written over the data in the primary FIFO 340 whenever the SOFP count data is presented to the digitizer circuit. Also, digital count data or a string of zeros (representative of correlated SOFSP data or SFS count values from the HOP) are written into the auxiliary FIFO 341 using multiplexer 342 and write enable signals generated by the sequencing circuit 238. The SOFSP marker (i.e. string of zeros) is written over the data in the auxiliary FIFO 341 whenever the SOFP count data is presented to the digitizer circuit. With such a data encoding scheme, the decoder 240A is allowed to decode process the scan count data in the FIFOs, as well as determine which facet sector produced the laser scanning beam. The later function is carried out using the tables set forth in FIGS. 11B1 through 11C and the method described in the flow chart of FIG. 11D. As shown in FIG. 11A, the output of the 240A is a scan beam data element comprising the package ID data, the scanner number (SN), the laser scanning station number (SSN), facet number (FN) and minimum and maximum facet angles subtending the facet sector involved in generating the laser beam used to read the decoded bar code symbol representative of the package ID data. Additional details concerning the design and construction of digitizer circuit (239A) can be found in Applicant's U.S. Pat. No. 5,343,027 incorporated herein by reference in its entirety.

Figure 12:
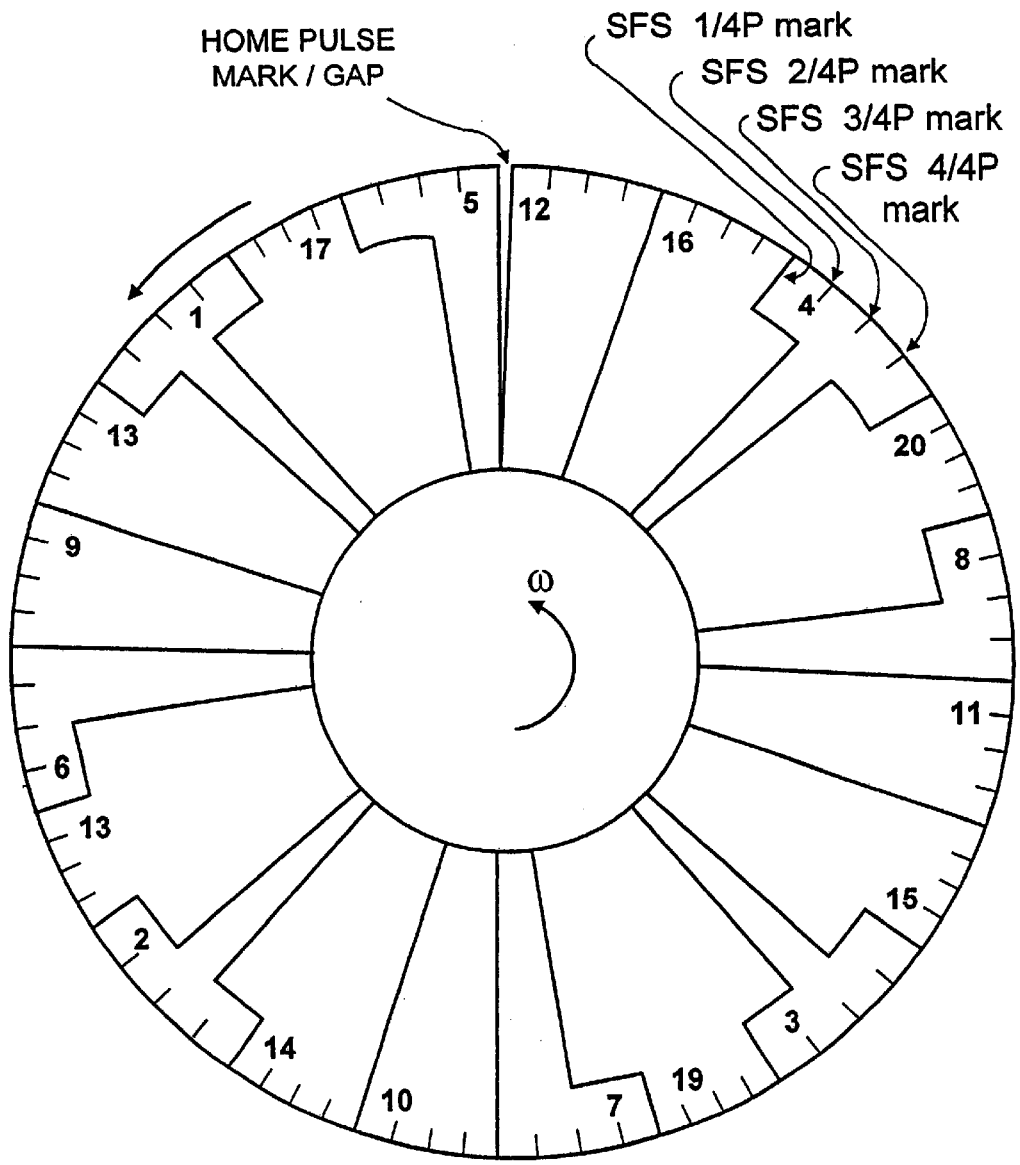
FIG. 12 is a schematic diagram of the holographic scanningdisc that contains an optically-encoded home-pulse mark as well as a series of start-of-facet-sector (SOFS) marks about the outer edge thereof for indicating where each facet sector along the disc begins, relative to the home pulse mark.
Figure 13A:
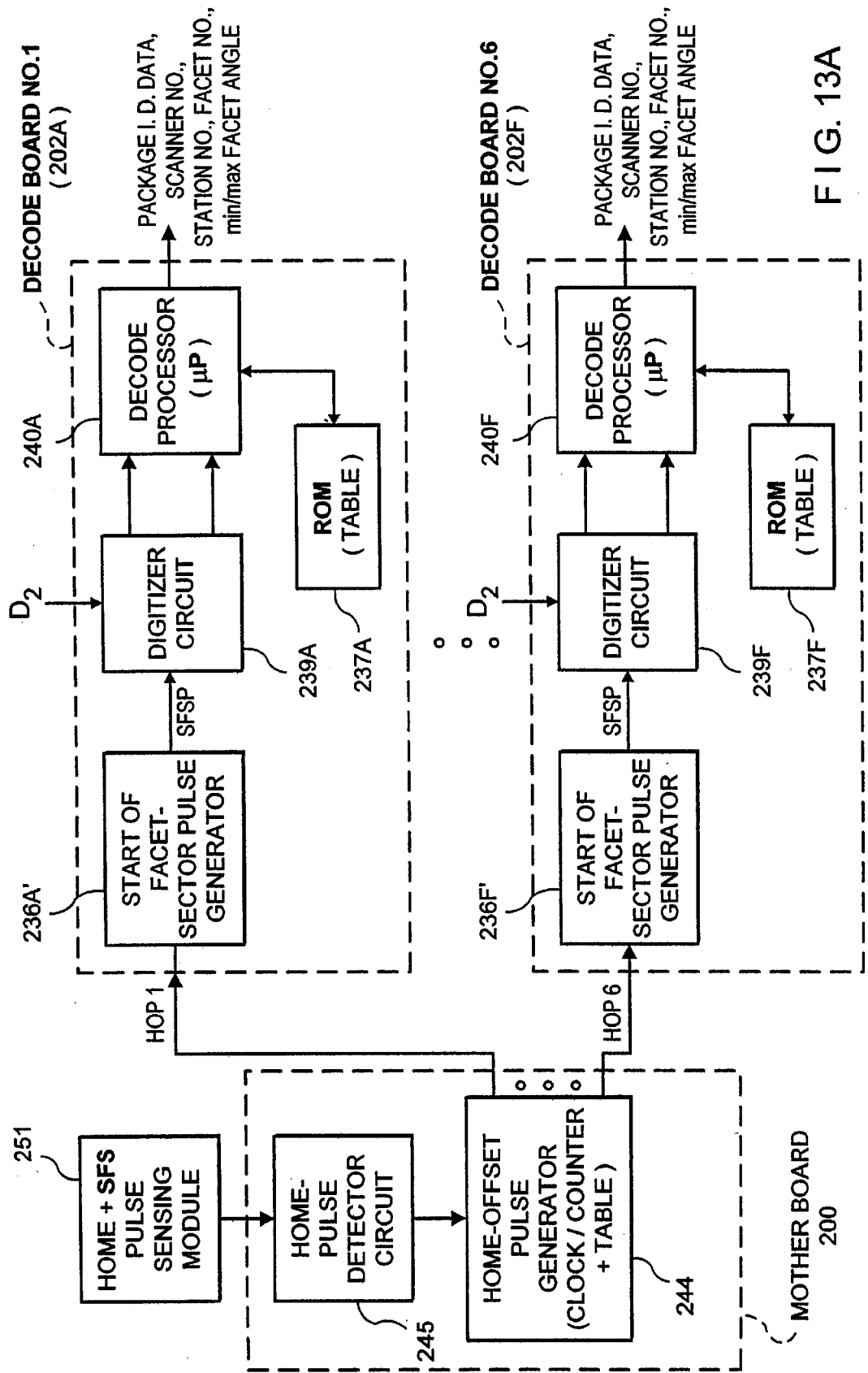
FIG. 13A is a schematic representation of the components on the motherboard (i.e. control board) and decode processing boards associated with an optically-encoded holographic scanning disc which can be employed within the tunnel scanning subsystem of the present invention, showing the home-pulse detector and home-offset pulse (HOP) generator on the mother board, and the start-of-facet-sector pulse (SOFSP) generator, digitizer circuitry, decode signal processor and ROM containing relative timing information about each SOFSP in relation to the HOP sent to the decode processing board from the control board of the present invention.
Figure 13B:
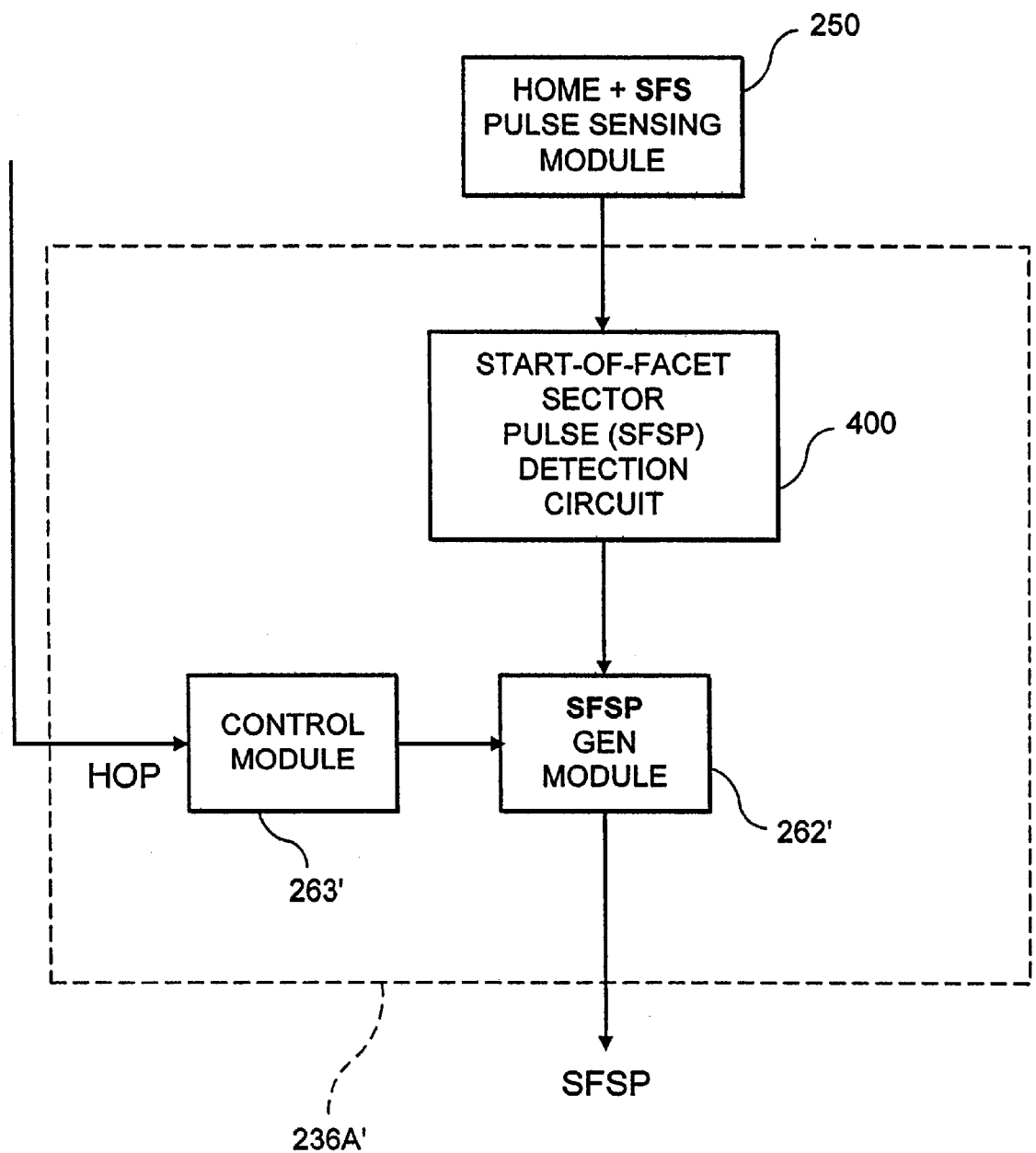
FIG. 13B is a schematic representation of the start-of-facet-sector pulse (SOFSP) generator employed on each decode board shown in FIG. 13A.
Figure 13D:
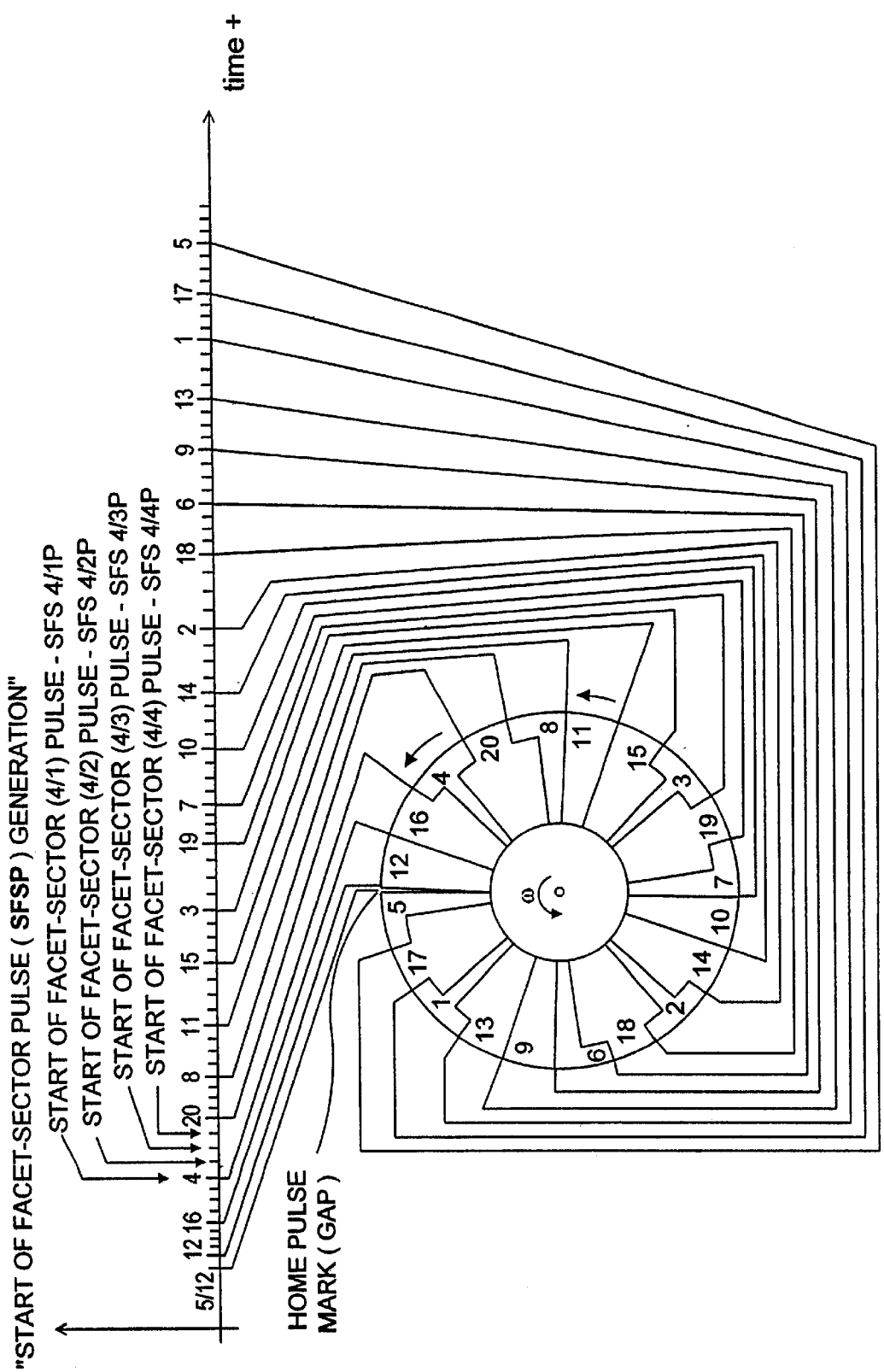
FIG. 13D is a schematic representation of the operation of the start-of-facet sector pulse (SOFSP) generator shown FIG. 13B, wherein start of facet sector pulses are generated therewithin relative to the home-offset pulse (HOP) received from the HOP generator on the mother/control board associated with each holographic scanning disc.

Second Method of Determining Laser Beam Position in Holographic Laser Scanners Under Constant Scanning Motor Speed Conditions FIGS. 12A through 14C, an alternative method is shown for determining the position of the laser scanning beam holographic laser scanning subsystems under constant scanning motor speed and synchronously encoding facet section information with digital count data in the digitizer circuit of each decode board. This method involves optically encoding the start of each facet sector (SFS) mark along the outer edge of the holographic scanning disc 130, as shown in FIG. 12A.

This optical encoding process can be carried out when mastering the scanning disc using a masking pattern during laser exposure. The home pulse gap sensing module described above can be used to detect the home pulse gap as well as the SFS marks along the edge of the scanning disc. As shown, the home gap generates a home pulse while the SFS marks generate a i series of SOFSPs during each revolution of the scanning disc. The home pulse is detected on the home pulse detection circuit on the motherboard and is used to generate HOPs as in the case described above. The HOPs are transmitted to each decode board where they are used to reference (i.e. count) how many SOFSPs have been counted since the received HOP, and thus determine which facet sector the laser beam is passing through as the scanning disc as it rotates. Digital counts resentative of each SOFSP are synchronously generated by the SOFSP generator aboard each decode board and are loaded into the auxiliary FIFO 341, while correlated digital count scan data is loaded into both the primary and auxiliary FIFOs in a manner similar to that described above. As illustrated in FIG. 14C, the decode processor can uses the information in the tables of FIGS. 13C and 13D to determine which SOFSP counts correspond to which minimum and maximum facet angles in accordance with the decode processing method of the present invention described in FIG. 12E. The advantage of this method is that it is expected to be less sensitive to variations in angular velocity of the scanning disc.

The above-described methods for determining the position of laser scanning beams in holographic laser scanning systems involve recovering laser position information using a "home-pulse" mark on the holographic disc rotated a constant angular velocity. However, it has been discovered that such techniques work satisfactorily only when the angular velocity of the scanning disc is maintained very close to the designed nominal angular velocity during start-up and steady-state operation. In many applications, it is difficult or otherwise unfeasible to maintain the angular velocity of the scanning disc constant such modes of operation, even when using speed locking/control techniques known in the electrical motor arts. Thus in many applications there will be a need for a laser beam position determination system and method that works for any scanning disc motor speed as well as under small accelerations (and decelerations) of the scanning disc motor, hereinafter referred to as varying scanning motorspeed conditions.

Figure 14:
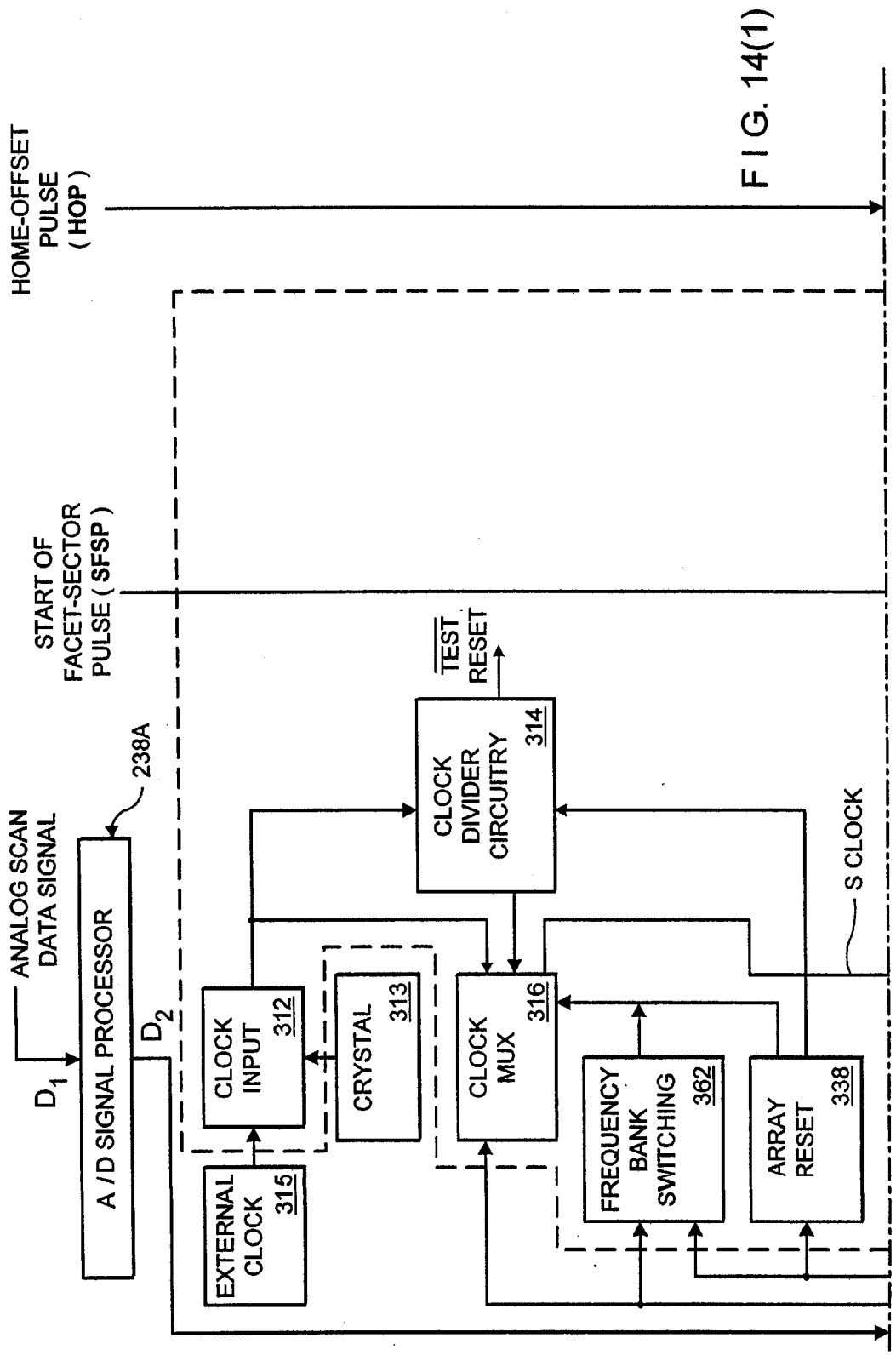
FIG. 14 is a schematic diagram of the digitizing circuit shown in FIG. 13A using a pair of dual FIFO memory storage buffers to synchronously track digital scan data and information about the facet-sectors on a holographic scanning disc used to generate the laser scanning beam that was used to collected such digital scan data from a bar code symbol on a package transported through the tunnel scanning subsystem hereof.
Figure 14:
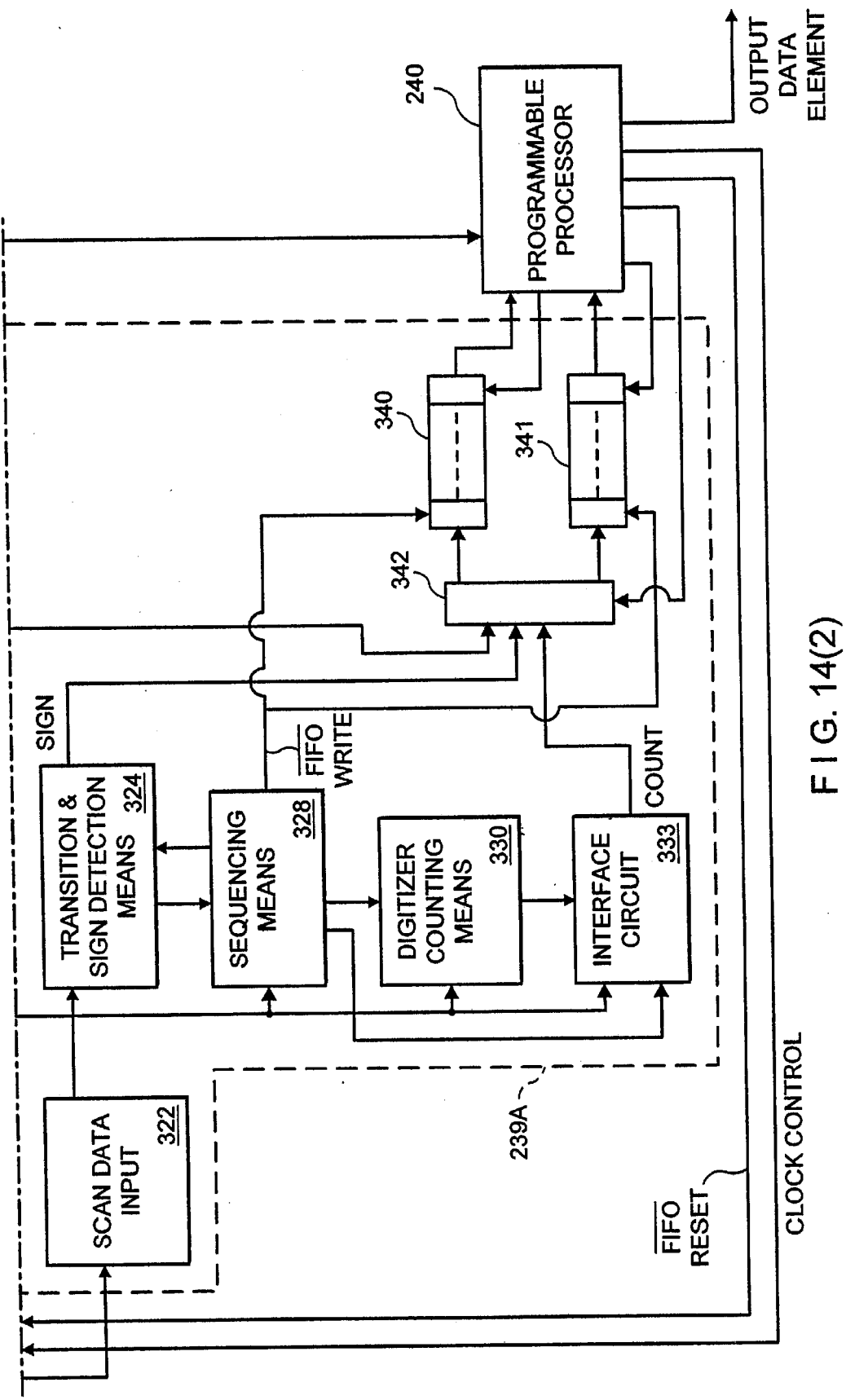
Figure 14A:
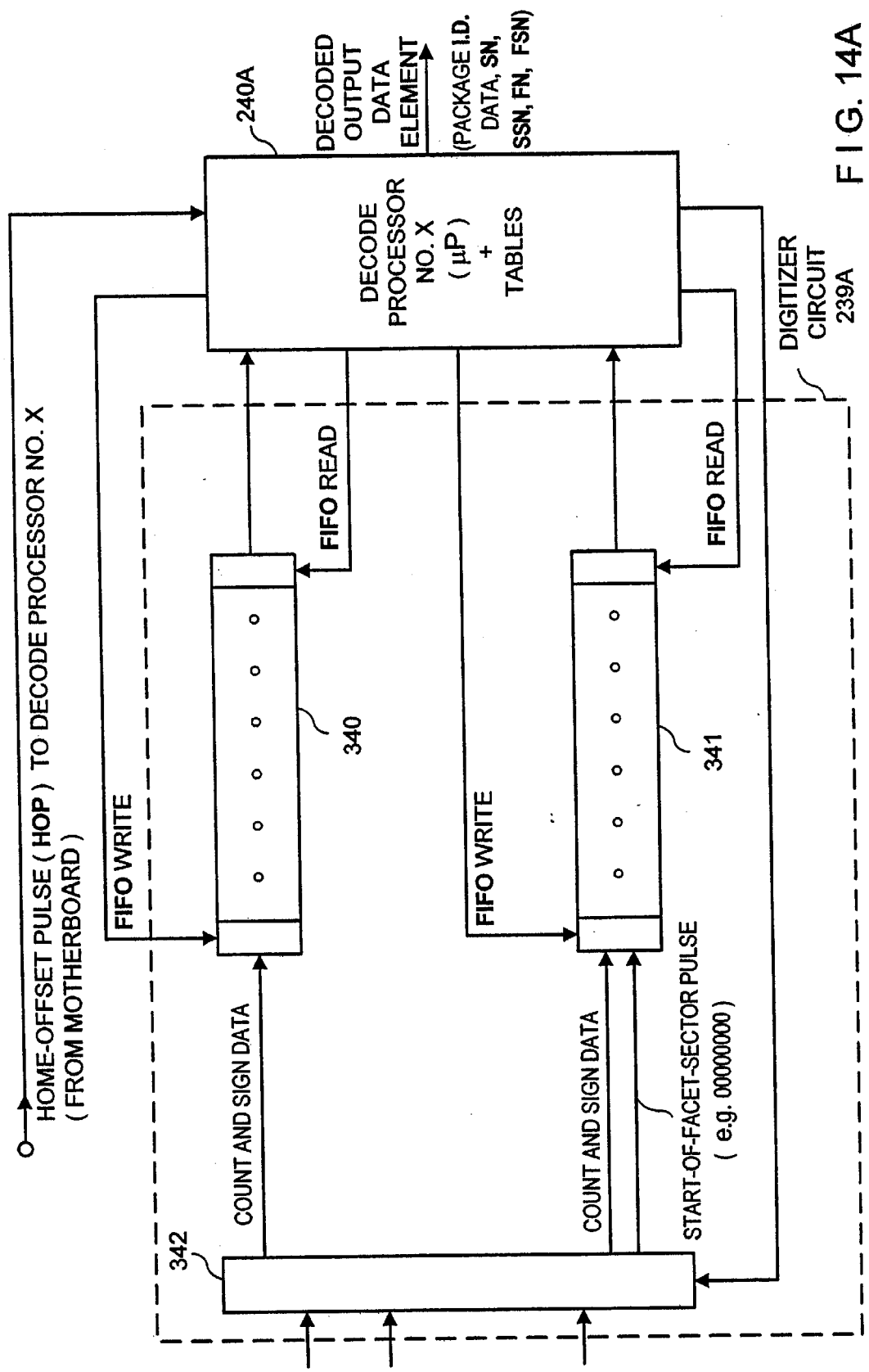
FIG. 14A is a schematic diagram showing the digitizing circuit of FIG. 14 in greater detail.
Figure 14D:
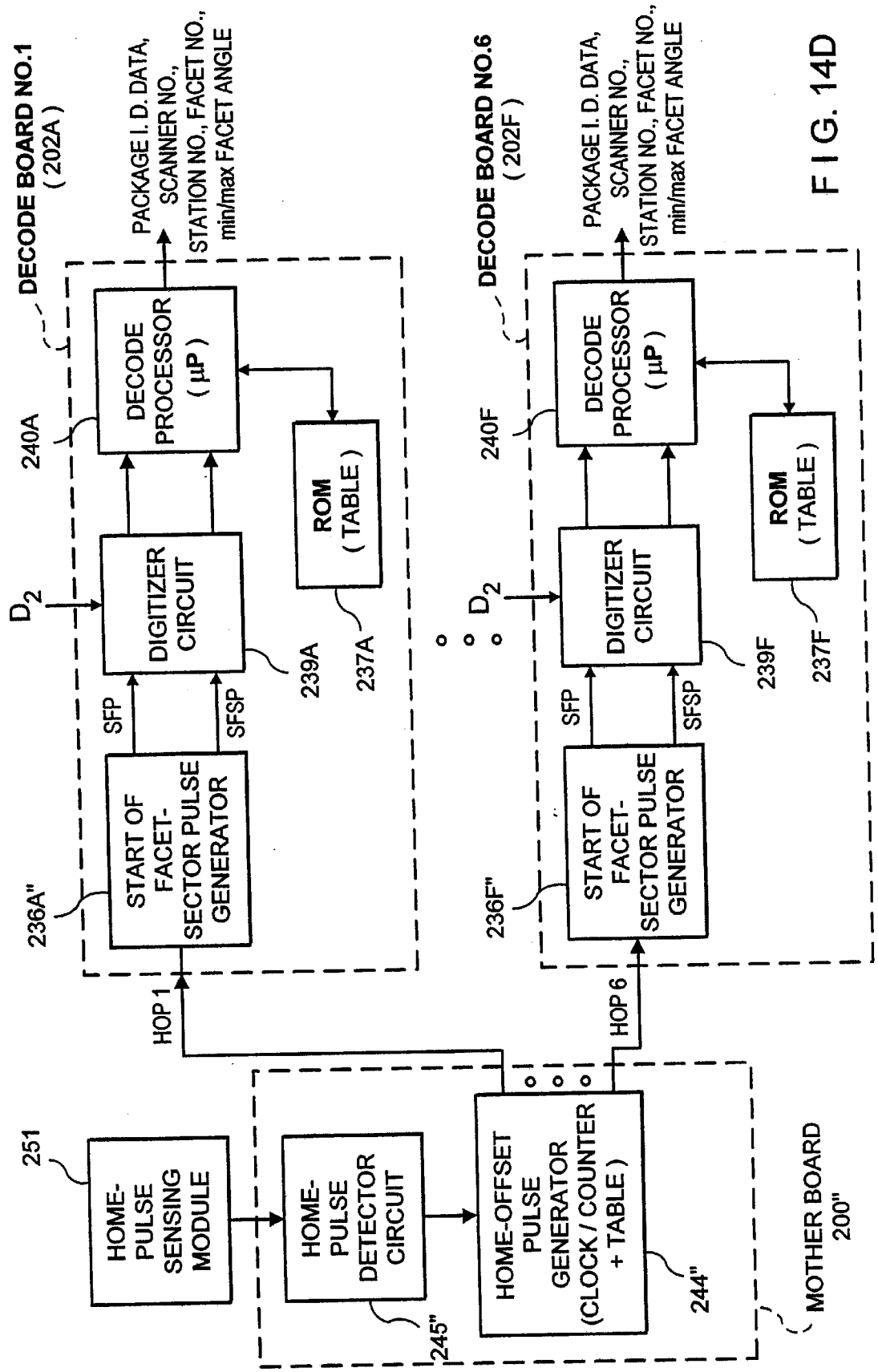
FIG. 14D is a flow chart describing the operation of the SOFSP generator aboard each decode board, wherein start of facet pulses (SOFPs) are automatically generated within the SOFP generation module relative to the home-offset pulse (HOP) received by the control module in the SOFSP generator independent of the angular velocity of the holographic scanning disc of the subsystem, and wherein start of facet sector pulses (SOFSPs) are automatically generated within the SOFSP generation module relative to SOFPs generated by the SOFP generation module, independent of the angular velocity of the holographic scanning disc of the subsystem.
Figure 14F:
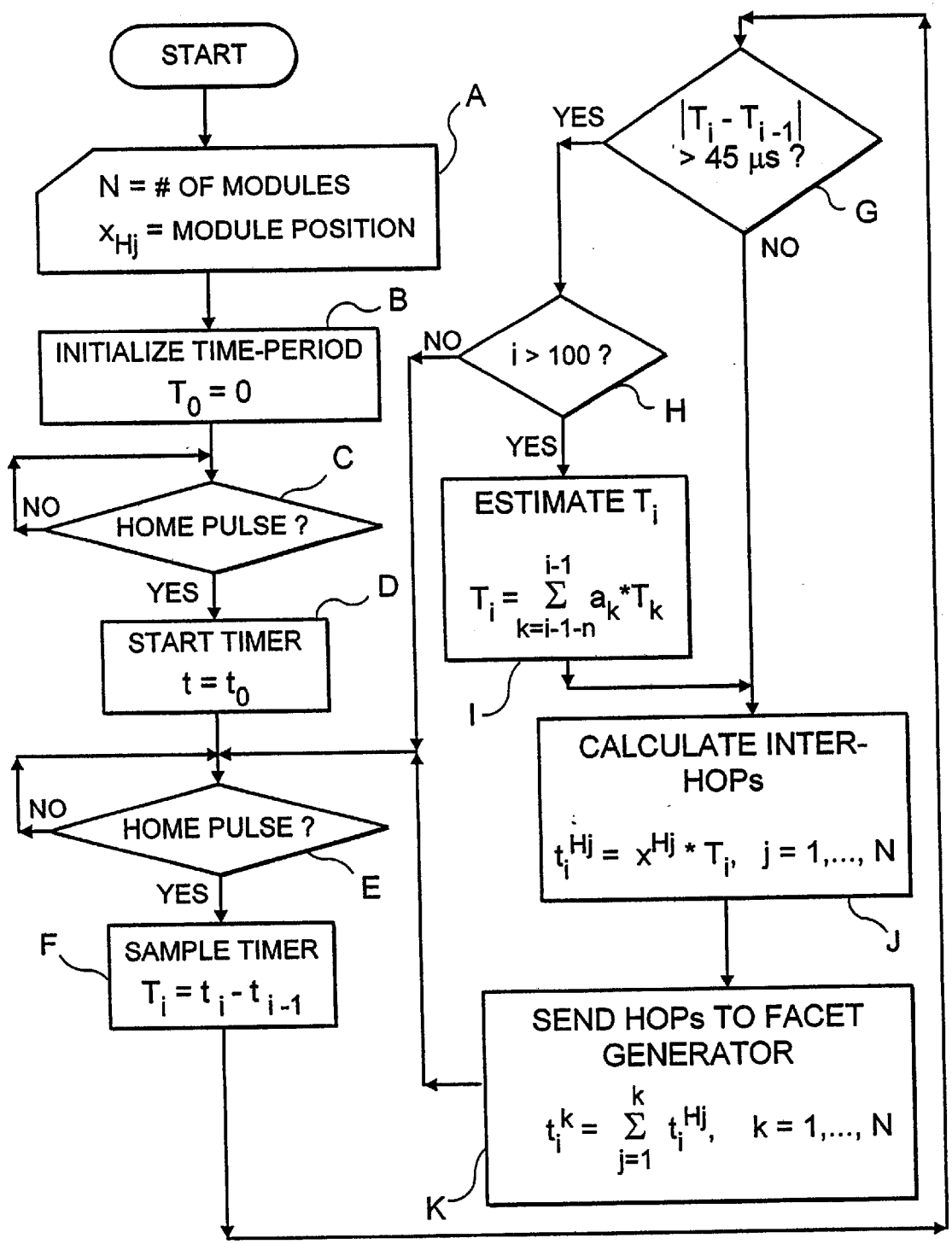
Figure 14G:
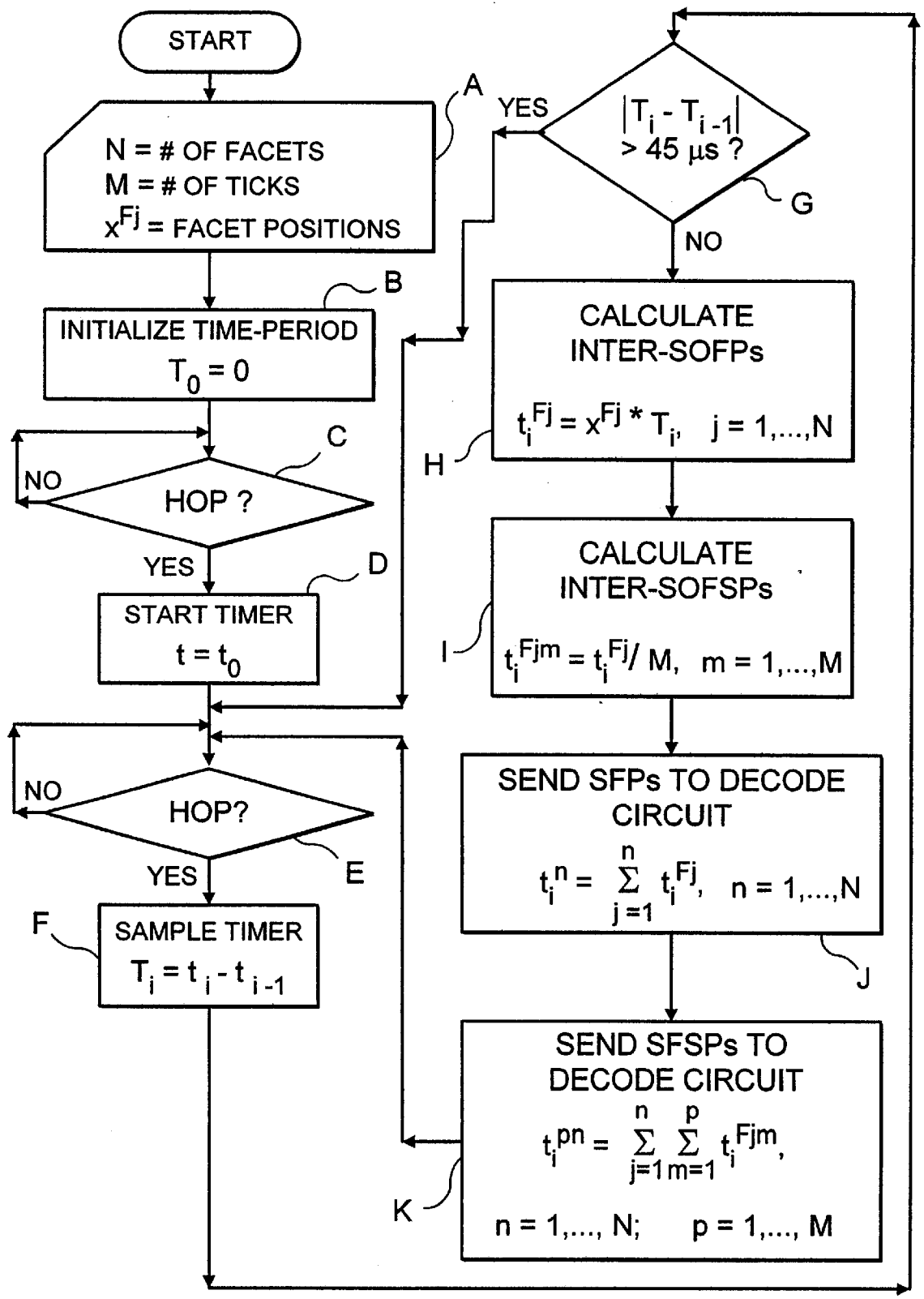

Laser Position Determination in Holographic Laser Scanners Under Varying Scanning Motor Speed Conditions FIGS. 14D through 14G, a novel system and method are illustrated for accurately determining the position of laser scanning beams in holographic laser scanning subsystems under varying scanning disc motor speed conditions. In this embodiment of the present invention, a holographic scanning disc having a home pulse mark or gap as shown in FIG. 3B2 can be used to generate the required laser scanning pattern. Also, as shown in FIG. 3B1, each holographic scanning disc is provided with a home pulse sensing module 251 and home pulse detection circuit 245" as shown in FIG. 14D.

As illustrated in FIG. 14D, each time the home pulse mark or gap on the scanning disc 130 passes the home pulse sensing module 251, a home pulse (HP) is automatically generated from the home pulse detection circuit 245". Each time a home pulse is generated from the home pulse detection circuit 245", a set of home offset pulses (HOPs) are sequentially produced from HOP generation circuit 244' in accordance with the process depicted in FIGS. 14D and 14G. The number of HOPs produced in response to each detected HP is equal to the number of laser scanning stations (i.e. scanning modules), N, arranged about the laser scanning disc. As shown in FIG. 14D each generated HOP is provided to the SOFSP generator (236A" through 236F" on the decode processing board (202A through 202F) associated with the HOP. When the HOP pulse is received at the SOFSP generator on its respective decode signal processing board, the home pulse mark or gap on the scanning disc 130 is then starting to pass through the laser beam directed therethrough at the laser scanning station associated with the decode signal processing board. During each revolution of the scanning disc, the SOFSP generation module 261" within each SOFSP generation circuit 236A" through 236F" generates a set of start of facet pulses (SOFPs) relative to the HOP, and also a set of start of facet sector pulses (SOFSPs) relative to each SOFSP. This enables a SOFP and a SOFSP (referenced from the HOP) to be generated by each SOFSP generation circuit 236A" through 236F", and provided to the digitizer circuit 239A through 239F so that the SOFP and SOFSP data can be correlated with the digital data counts produced within the digitizer circuits in a synchronous manner. Within the decode processor, SOFP and SOFSP data can be translated into laser beam position data expressed in terms of the minimum and maximum angles that delimit the facet sector producing the scan data from which the bar code symbol was decoded.

In the illustrative embodiment, the HOP generation circuit 244A" is implemented using an 87C51 microcontroller. The microcontroller uses two inputs: the home-pulse detected signal from the home pulse detection signal 245" connected to an interrupt pin of the 87C51; and a "motor-stable" signal from the scanning motor controller. The microcontroller has as many outputs as there are laser scanning stations (i.e. scanning modules) in each laser scanning subsystem. Each output pin is dedicated to sending HOPs to a particular laser scanning station within the subsystem.

In general, each SOFSP generation circuit (236" through 236F") is realized as a programmed microprocessor. However, for purposes of understanding the SOFSP generation circuit, it will be helpful to schematically represent it as comprising a number of subcomponents, as shown in FIG. 14B. As shown therein, each SOFSP generator 236A' through 236B' comprises: a clock 260' for producing clock pulses (e.g. having a pulse duration of about 4 microseconds); a SOFP generation module 261' for generating SOFPs in accordance with the process depicted in FIG. 14D; a SOFSP generation module 262' for generating SOFSPs in accordance with the process depicted in FIG. 14D; and a control module 263' for controlling the SOFP generator 261' and the SOFSP generator 262', and resetting the clock 260' upon each detection of a new HOP from the HOP generator 244' on the mother control board 200' associated with the holographic scanning unit.

In the illustrative embodiment, the SOFP/SOFSP generation circuit 236A" (through 236F") has been implemented using an programmed 87C52 microcontroller mounted on each decoding board associated with a particular scanning station. The HOP for the corresponding scanning station is received on an interrupt pin of the microcontroller. The microcontroller outputs three signals to the decode processor 240A (through 240F): (i) SOFPs; (ii) SOFSPs; and (iii) a signal processor adjustment signal which constitutes a level high (or low) when the facet that passes the scanning station's laser is a facet on a near (or far) focal plane.

The operation of the HOP generation circuit 244' and the SOFSP generation circuit 236A' (through 236F') will now be described within reference to the flow charts set forth in FIG. 14C and 14D. In these flow charts described below, the following list of symbols are used:

$t_i$=timer value at start of home-pulse for the $i^{th}$ rotation of the disc;

$T_i$=time-period of the $(i-1)^{th}$ rotation of the disc;

$x^{Hi}$=angular value of the position of the laser of the $j^{th}$ scanning station (i.e. scanning module) of the system, relative to the previous scanning station (home-pulse laser for scanning station 1);

$x^{Fj}$=angular width of the $j^{th}$ facet of the disc;

$x^{Fjm}$=angular width of the $m^{th}$ sector (i.e. segment) of the $j^{th}$ facet of the disc;

$t_i^{Hj}$=time elapsed between the $j^{th}$ HOP and the $(j-1)^{th}$ HOP of the $i^{th}$ rotation of the disc;

$t_i^{Fj}$=time elapsed between the Start of Facet Pulse (SOFP) of facet j and facet j−1 of the $i^{th}$ rotation of the disc;

$t_i^{Fjm}$=time elapsed between the Start of Facet Segment Pulse (SOFSP) of sector m and sector m−1 of facet j of the $i^{th}$ rotation of the disc;

$t_i^n$=time at which the $n^{th}$ HOP/SOFP of the $i^{th}$ rotation of the disc is outputted; and $t_i^{pn}$=time at which the $p^{th}$ SOFSP of the $n^{th}$ facet of the $i^{th}$ rotation of the disc is outputted.

Each time the "start of home-pulse mark" is detected, the home-pulse pickup circuit 251 described hereinabove automatically produces a negative going output pulse which is provided to the HOP generation circuit 244', as shown in FIG. 14A. The HOP generation circuit 244' uses this negative going output pulse to calculate the times at which the home-pulse mark reaches the different modules (i.e. laser scanning stations) and, in response to such calculated times, to automatically generate and provided HOPs to the SOFSP generation circuit 236A' (through 236F'). The calculation is based on the important assumption that the motor speed for the $i^{th}$ rotation is very close to the motor speed for the $(i-1)^{th}$ rotation.

As indicated at Block A in FIG. 14C, the process within the SOFSP generation circuit 236A" defines N as the number of laser scanning stations (i.e. scanning modules) in the holographic scanner, and $x^{Hi}$ as the angular offset (i.e. position) of a laser scanning station from the home-pulse sensing module (i.e. pickup) 251. At Block B in FIG. 14C, the process involves initializing the time period or setting $T_0=0$. Then at Block C, the HOP generation circuit determines whether a home pulse (HP) has been detected at its input port. Until an HP is detected, the circuit remains at this control block. When a HP is detected, then at Block D the circuit starts the timer therewithin (i.e. $t=t_0$). Then at Block E, the circuit determines whether another HP has been detected. As shown, the circuit remains at this control block until the next HP is detected. When the HP is detected, then at Block F the circuit samples the timer. The time-period of rotation of the scanning disc is calculated from two consecutive home-pulse detections as follows: $T_i=t_i-t_{i-1}$, where $T_i$ is the time-period for the $i^{th}$ rotation of the disc. Then at Block G, the circuit determines whether the time-period for the $i^{th}$ rotation is "close" to that for the $(i-1)^{th}$ rotation.

As indicated at Block G, a measure of "closeness" is defined as: $|T_i-T_{i-1}|<45$ uS. If the time measure is not close, i.e. $|T_i-T_{i-1}|<45$ uS, then If the time-period of rotation for the $i^{th}$ and $(i-1)^{th}$ rotation does not satisfy, $|T_i-T_{i-1}|<45$ uS, the circuit checks at Block H to determine whether the scanning disc has rotated at least a 100 times (experimental value). If the scanning disc has not rotated at least a 100 times, then the circuit proceeds to Block E and waits for the next home-pulse and carries out the control process over again. Since it is critical to the performance of the scanner that every scan be associated with laser position information, the time-period has to be accurately predicted when for some reason the time-period between two consecutive rotations of the disc differs by more than 45 uS (experimental value). The assumption here is that the scanning motor speed cannot change suddenly between two rotations.

If the scanning disc has rotated at least a 100 times (i.e.>100), then the circuit proceeds to Block I and estimates the time-period of the current rotation $T_i$ by using the time period data for the past n rotations of the disc, given by the following expression:

$$T_i = \sum_{k=i-1-n}^{i-1} a_k * T_k$$

Where the n coefficients $a_{i-1-n}$ through $a_{i-1}$ can be calculated beforehand (and offline) as follows.

If $T_i$ is the actual time-period of rotation i of the disc, a least squares estimate of the time-period for rotation i+1 can be calculated by minimizing the function, $$E = \sum_{k=i-1-n}^{i-1} \left(T_k^* - \sum_{j=1}^{n} a_j T_{k-j}^*\right)^2 \text{ with respect to each } a_j(j=1, ..., n)$$

The final expressions for the minimized "optimal" values of the coefficients aj are given by:

$$a_j = \left(\sum_k T_k^* T_{k-j}^*\right) \bigg/ \left(\sum_k \sum_j T_{k-j}^*\right).$$

A good value for n with reasonable computational complexity was found to be 5.

As indicated at Block J, the circuit then calculates the "inter-HOPS" $t_i^{Hj}$ which is the time taken by the home-pulse mark to reach to scanning station j from scanning station j−1. This measure is given-by the expression: $t_i^{Hj}=x^{Hj}*T_i$, j=1, . . . ,N Finally, at Block K, the circuit sends (i.e. transmits) HOPs to the SOFSP generation circuit of each laser scanning station (for the ith rotation) at each instant of time given by the expression:

$$t_i^k \sum_{j=1}^{k} t_i^{Hj}, k = 1, ..., N$$

Thereafter, the control process returns to Block E as indicated in FIG. 14C. If at Block G, the time measure is "close" (i.e. $|T_i-T_{i-1}|<45$ uS), then the circuit proceeds directly to control Block J.

As described above, the HOP generation circuit 244" on the mother board 200 accurately predicts when the home-pulse mark on the scanning disc arrives at each scanning station and sends out a negative going pulse to each laser scanning station. In contrast, the SOFP generation circuit 236A' uses the HOPs to calculate when each facet/facet sector passes the laser module in each laser scanning station. Notably, an important assumption here is that the scanning motor speed does not vary too much between two consecutive rotations of the scanning disc.

As indicated at Block A in FIG. 14C, the process within the SOFSP generation circuit 236A" defines the following parameters: N as the number of laser scanning stations (i.e. scanning modules) in the holographic scanner; M as the number of sectors (or "Ticks") on each facet of the scanning disc: $x^{Fj}$ as the angular width of facet j of the scanning disc; and $x^{Fjm}$ as the angular width of sector m of facet j of the scanning disc.

At Block B in FIG. 14C, the process involves initializing the time period or setting $T_0=0$. Then at Block C, the SOFSP generation circuit determines whether a home pulse (HP) has been detected at its input port. Until an HP is detected, the SOFSP generation circuit remains at this control block. When a HP is detected, then at Block D the SOFSP generation circuit starts the timer therewithin (i.e. $t=t_0$). Then at Block E, the SOFSP generation circuit determines whether another HP has been detected. As shown, the SOFSP generation circuit remains at this control block until the next HP is detected. When the HP is detected, then at Block F the SOFSP generation circuit samples the timer contained therewithin. The time-period of rotation of the scanning disc is calculated from two consecutive home-pulse detections as follows: $T_i=t_i-t_{i-1}$, where $T_i$ is the time-period for the $i^{th}$ rotation of the disc. Then at Block G, the SOFSP generation circuit determines whether the time-period for the $i^{th}$ rotation is "close" to that for the $(i-1)^{th}$ rotation.

As indicated at Block G, a measure of "closeness" is defined as: $|T_i-T_{i-1}|<45$ uS. If the time measure is not close, then the time-period of rotation for the $i^{th}$ and $(i-1)^{th}$ rotation does not satisfy, $|T_i-T_{i-1}|<45$ uS, and the SOFSP generation circuit returns to Block E, as indicated in FIG. 14D and looks for another HOP, without sending any SOFP/SOFSP. If the time-period of rotation for the $i^{th}$ and $(i-1)^{th}$ rotation does satisfy, $|T_i-T_{i-1}|<45$ uS, then the SOFSP generation circuit proceeds to Block H where the time between start of facet pulses (SOFSs) for facets j−1 and j of the disc for the $i^{th}$ rotation is calculated using the expression:

$$t_i^{Fj}=x^{Fj}*T_i, j=1,\ldots,N$$

Then at Block I, the SOFSP generation circuit calculates the "inter-HOPs" which are defined as the time between start of sector pulses m−1 and m for facet j, corresponding to rotation i of the disc. Such inter-HOPs are calculated by the expression:

$$t_i^{Fjm}=t_i^{Fj}/M, m=1,\ldots,M$$

At Block J, the SOFP generation circuit sends out (to the decode processor) SOFPs at the times given by the expression:

$$t_i^n = \sum_{j=1}^{n} t_i^{Fj}, n = 1, \ldots, N$$

Likewise, he SOFSP generation circuit sends out (to the decode processor) SOFSPs at the times given by the expression:

$$t_i^{pn} = \sum_{j=1}^{n} \sum_{m=1}^{p} t_i^{Fjm}, n = 1, \ldots, N; p = 1, \ldots, M$$

Using the transmitted SOFPs/SOFSPs, correlated with bar code scan data at the digitizer circuit 239A (through 239F), the decode circuit 240A (240F) can then specify the laser beam position in terms of the minimum and maximum angle of the scanning facet sector that generated the bar code scan data that has been correlated therewith using the dual-FIFO digitizer circuit 240 of the present invention. Typically, calculations for leach SOFP/SOFSP will be performed in a pipelined fashion since the total computation time far exceeds the time between any two SOFSPs. The laser beam position determination subsystem illustrated in FIGS. 14A through 14D and described hereinabove, has been built and tested in holographic tunnel scanning system employing holographic laser scanners having 5 laser scanning stations, scanning discs with 16 facets and 20 facet sectors/segments, and scanning motor speed variations within the range of between 4800 rpm and 5800 rpm. The system can handle small scanning-motor accelerations (and decelerations).

Notably, the above-described subsystem has limitations on the number of sectors (or segments) that each facet can be resolved into along the scanning disc. While a large number of sectors per facet will guarantee more accurate laser beam position information, the subsystem is limited by the computational time required to output each SOFSP. Average computational times for outputting SOFPs was found to be about 20 uS, and about 12 uS for SOFSPs.

Figure 15:
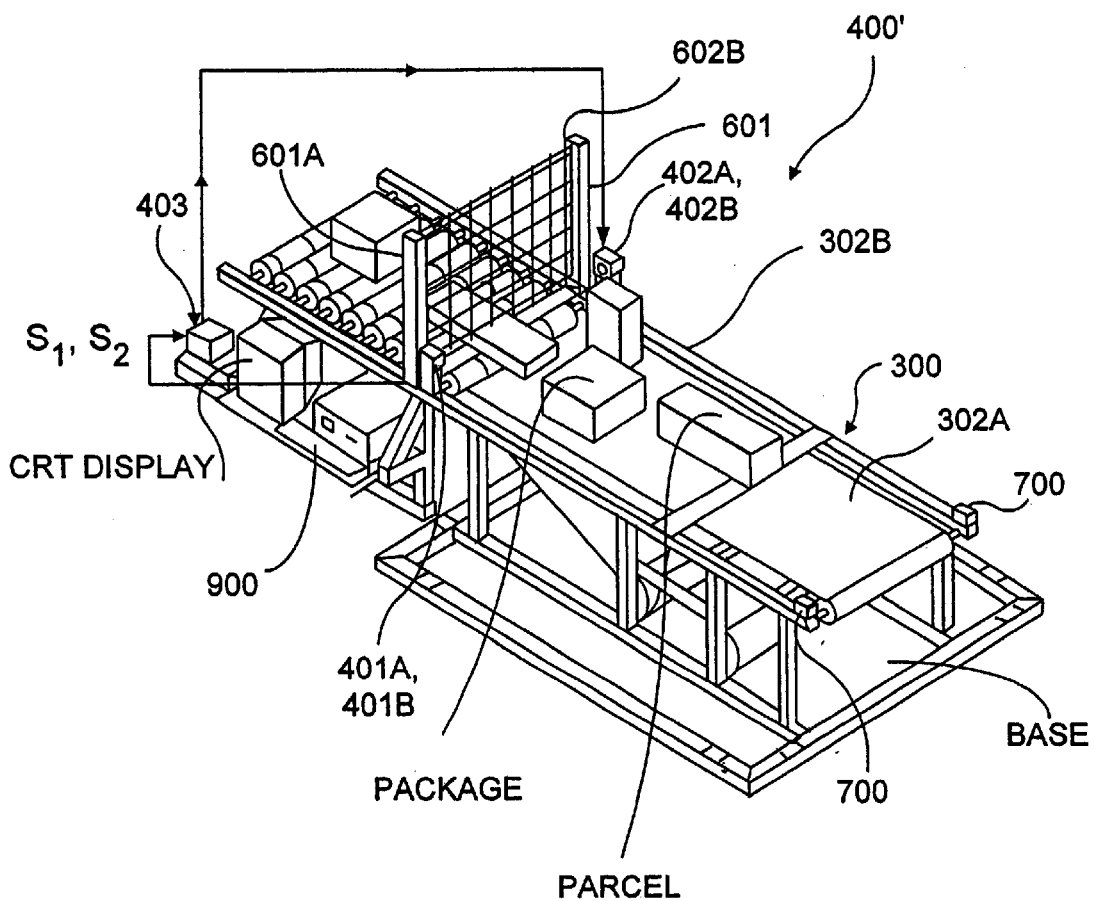
FIG. 15 is a schematic representation of the package velocity and length measurement subsystem of the present invention configured in relation to the tunnel conveyor and package dimensioning/profiling subsystems of the system of the first illustrative embodiment of the present invention.
Figure 15C:
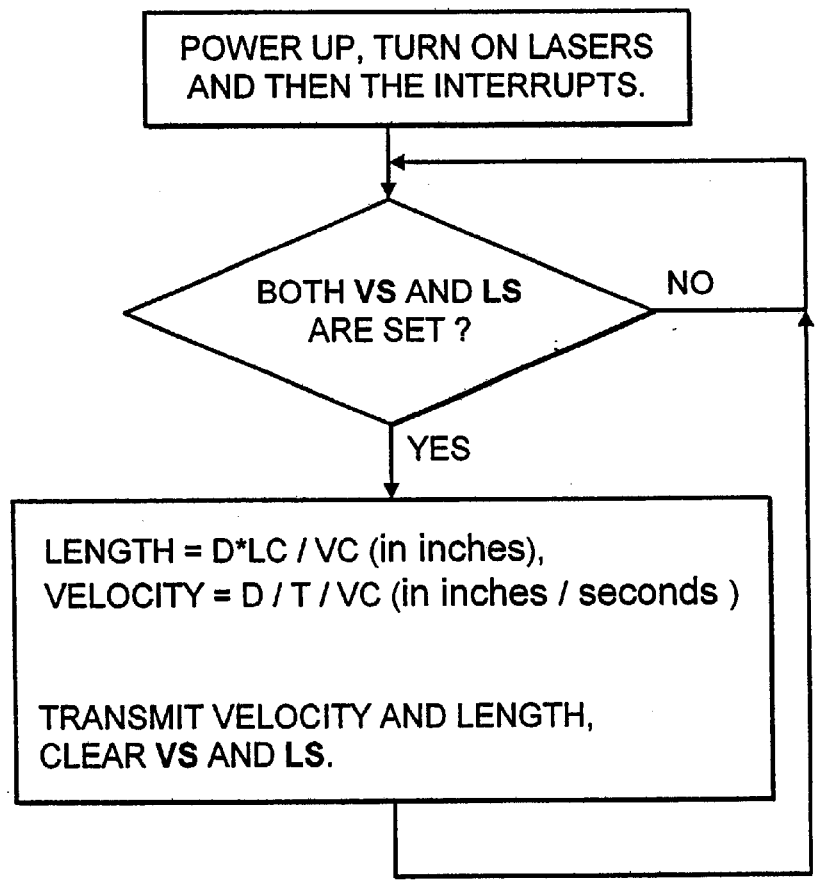

The Laser-based Package Velocity and Length Measurement Subsystem of the First Illustrative Embodiment of the Present Invention In FIG. 15, the package velocity and length measurement subsystem 400 is configured in relation to the tunnel conveyor subsystem 500 and package dimensioning/profiling subsystem 600 of the illustrative embodiment. In FIG. 15A, a direct transmit/receive configuration of the dual-laser based package velocity and measurement subsystem 400' is installed at the location of the vertical and horizontal light curtains 601 and 602 employed in the package profiling subsystem 600. As shown in FIG. 15A, subsystem 400' comprises a pair of laser diodes (D1 and D2) 401A and 401B, respectively, spaced apart by about 2 inches and mounted on one side of the conveyor belt; a pair of photodiodes 402A and 402B spaced apart by about 2 inches and mounted on the other side of the conveyor belt, opposite the pair of laser diodes 401A and 401B; and electronic circuits, including a programmed microprocessor 403, for providing drive signals to the laser diodes 401A and 401B, and for receiving and processing the electrical data signals P1 and P2 produced by the photodiodes 402A and 402B so that information representative of the length (L) and velocity (V) of the package 404 moving on the conveyor belt is automatically computed in accordance with the flow chart shown in FIGS. 15C1 through 15C3.

In FIG. 15B, a retro-reflection configuration of the dual-laser based package velocity and measurement subsystem 400 is shown installed at the location of the vertical and horizontal light curtains 601 and 602 employed in the package profiling subsystem 600. The dual laser diodes 405A and 406B used in the dual-laser based package velocity and length measurement subsystem 400 can be driven using the VLD driver circuitry 406A and 406B circuitry shown in FIG. 15B1. In FIG. 15B2, electronic circuitry 407A and 407B is shown for conditioning the signals received by the photoreceivers 407A and 407B in this subsystem is shown in FIG. 15B2. The velocity (v) and length (L) of the package transported through the package velocity and measurement subsystem 400 can be computed using 409 carrying out the algorithm disclosed in FIGS. 15C1 through 15C3. As shown in FIG. 15B, the laser beam transmitted from laser diode 405A is retro-reflected by retro-reflector 410A mounted on support structure 411 disposed opposite the support structure 412 supporting laser diodes 405A and 405B and photodiodes 408A and 408B. As shown in FIG. 15B, the laser beam from laser diode 405A is reflected off retro-reflector 410A and is detected by photodiode 408A, whereas the laser beam from laser diode 405B is reflected off retro-reflector 410B and is detected by photo diode 148B. As when in FIG. 15B, the output signals from photodetectors 408A and 408B are provided to photoreceiving circuits 407A and 408B respectively, for processing and are then provided to micro-computing system 409 so that the Length (L) and Velocity (V) of the moving package are computed in accordance with the algorithm described in FIGS. 15C1 through 15C3. In the illustrative embodiment shown in FIGS. 15B and 15B1, laser diode 405A and photodiode 408A are packages as a first laser transceiver module indicated at Block 413, whereas laser diode 408B and photodiode 408B are packaged as a second laser transceiver module 414. As shown in FIG. 15B, micro-computing system 409 comprises a microprocessor (CPU) 409A display device 409B and keyboard 409C.

Figure 16:
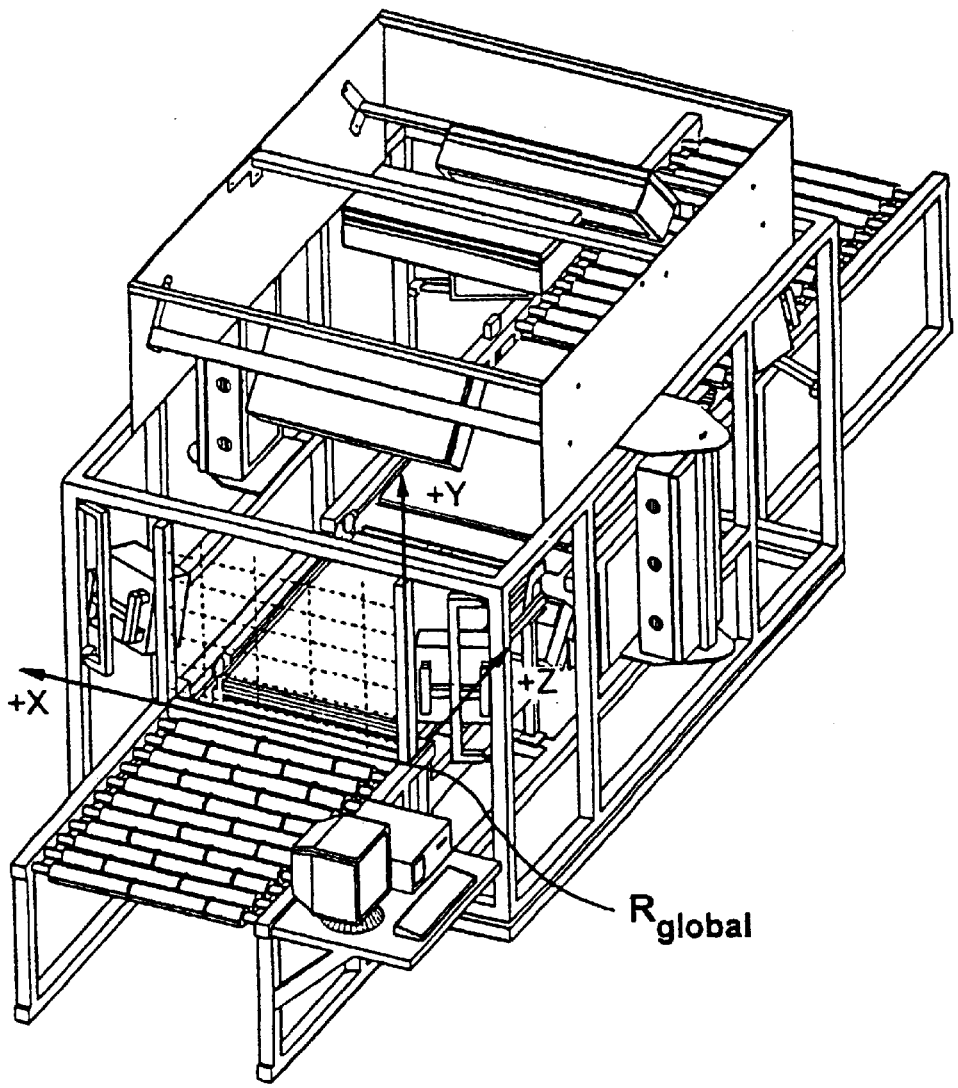
FIG. 16 is a perspective view of the automated package identification and measurement system of the present invention, showing the location of the package dimensioning/profiling subsystem (and package-in-tunnel signaling subsystem) in relation thereto and the global coordinate reference system $R_{global}$ symbolically embedded within the structure thereof, as shown.

The Package Dimensioning/Profiling Subsystem of the First Illustrative Embodiment of the Present Invention As shown in FIGS. 16 and 16A, the global coordinate reference system $R_{global}$ is symbolically embedded within the structure of the package x-y dimensioning/profiling subsystem 600 (and also the package-in-tunnel signaling subsystem 500). As shown in FIG. 16A, the vertically arranged light transmitting and receiving structures 601A and 601B dimensioning/profiling subsystem, as well as horizontally arranged light transmitting and receiving structures 602A and 602B, are arranged in a manner generally known in the package handling art. As shown in FIG. 16A, the vertically arranged light transmitting and receiving structures 601A and 601B are controlled by a height control unit 603, which produces, as output, signal $S_H$ consisting of time-sampled package height data collected along the vertical extent of the scanning tunnel aperture, similarly, horizontally arranged light transmitting and receiving structures 603 are controlled by a width control unit 604, which produces, as output, a signal $S_W$ consisting of time-sampled package height data collected along the horizontal extent of the scanning tunnel aperture. The output data streams from height and width control units 603 and 604, and the package length/velocity measurement subsystem 400, are provided as input to an H/W data processor 605, programmed to produce (i) package profile dimension data element (e.g. H, weight, etc. as well as (ii) a package-in-tunnel (PIT) Indication (token) Data Element for each package detected by subsystem 600.

In the illustrative embodiment, package dimensioning/profiling subsystem 600 is realized by integrating (i) the profiler system (Model No. P101-144-200) from KORE, Inc. of Grand Rapids, Mich., and (ii) the package velocity and measurement subsystem 400 described above, and providing programmed H/W data processor 605 in accordance with the principles of the present invention. The primary function of the package dimensioning/profiling subsystem 600 is to obtain x and y coordinates associated with the profile of each package as it passes through the light curtain arranged in the x-y plane of the global coordinate reference system $R_{global}$. The function of the package velocity and length measurement subsystem 400 is to obtain the z coordinate(s) (i.e. the run-length L) of the package relative to the global reference system, at the time of package profiling (i.e. when the package has past the dual laser beam transceiver of this subsystem). Notably, the package dimensioning/profiling subsystem 600 carries out the function of the package-in-tunnel signaling subsystem 500. That is, each time a package is detected at the entry side of the scanning tunnel, the subsystem 600/500 automatically generates a package-in-tunnel (PIT) data element for transmission to the data element queuing, handling and processing subsystem 1000 to be described in greater detail below.

In the tunnel scanning system of the first illustrative embodiment, packages must be transported along the conveyor belt in a singulated manner (i.e. physically arranged so that one package is positioned behind the other package with a space disposed therebetween). In the event that this condition is not satisfied, the package dimensioning/profiling subsystem 600 is designed to automatically detect that packages within the system have not been properly singulated (i.e. are arranged in a side-by-side and/or stacked configuration) and generate control signal which causes a downstream package deflector to reroute the multiple packages through a package singulator unit and then rerouted through the scanning tunnel system without human intervention.

For example, subsystem 600 can simultaneously detect when two boxes 608 and 609 moving along conveyor 606, pass through non-singulated with a small gap or space 610 between the boxes, as shown in FIGS. 17A through 17C. In this case, the horizontal light curtain $T_W$, $R_W$ of the package dimensioning subsystem 600 will automatically detect the gap 610.

Figure 18A:
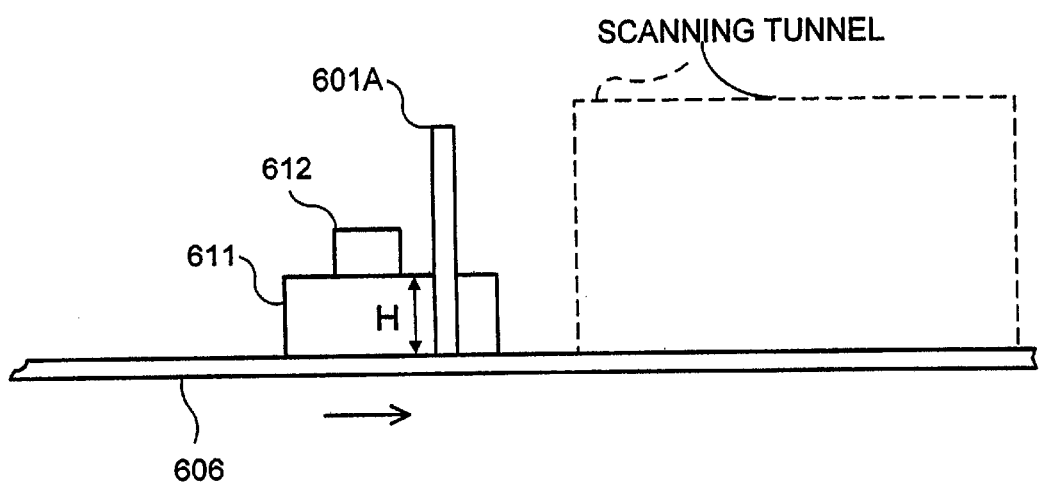
FIG. 18A is an elevated side view of a pair of stacked packages conveyed along the conveyor belt subsystem, wherein one package is being transported through and thus profiled by the package dimensioning/profiling subsystem of FIG. 16, while the other package has not yet been profiled by the subsystem.
Figure 18B:
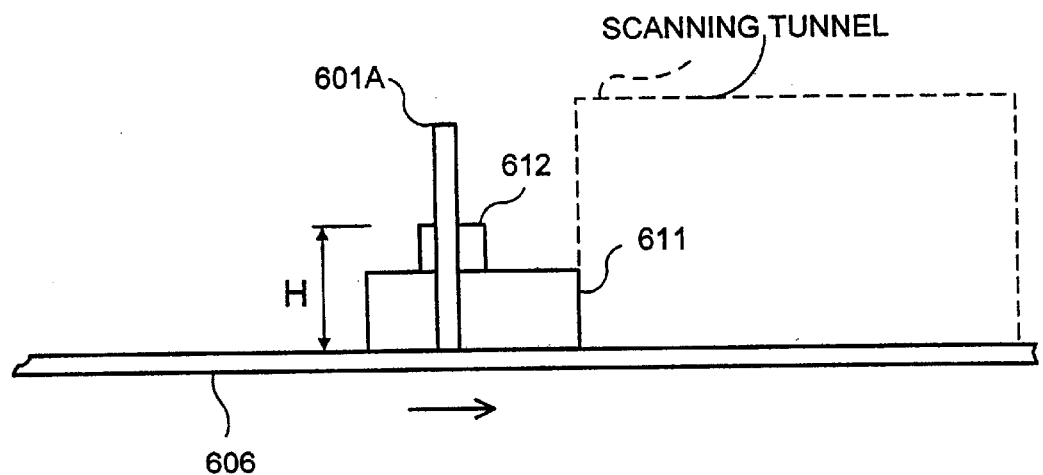
FIG. 18B is an elevated side view of a pair of stacked packages conveyed along the conveyor belt subsystem, wherein both packages are being transported through and thus profiled by the package dimensioning/profiling subsystem of FIG. 16.
Figure 18C:
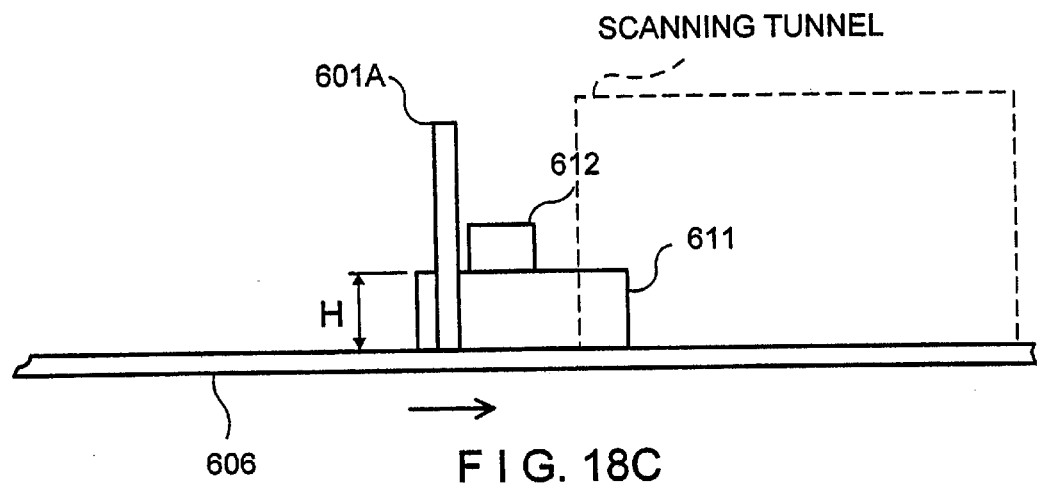
FIG. 18C is an elevated side view of a pair of stacked packages conveyed along the conveyor belt subsystem, wherein one package is being transported through and thus profiled by the package dimensioning/profiling subsystem of FIG. 16, while the other package has already been profiled by the subsystem.
Figure 19:
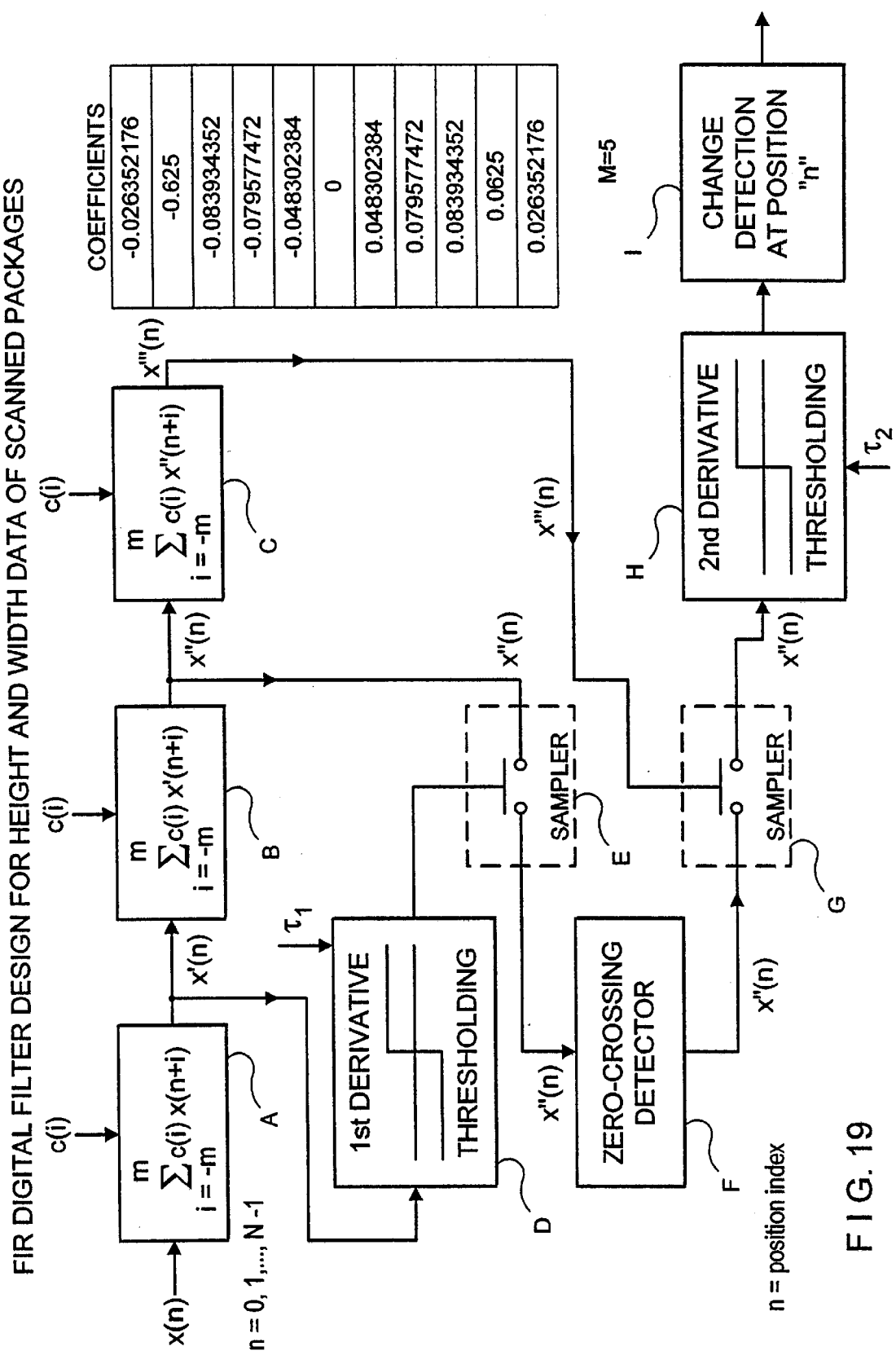
FIG. 19 is a schematic diagram of an improved third-order finite-impulse-response (FIR) digital filter system that can be used to filter data streams produced from the width and height profiling data channels of the package dimensioning/profiling subsystem of FIG. 16, in order to detect sudden changes in width and height profiles along the conveyor belt, within the context of a method of simultaneous package detection and tracking being carried out on a real-time basis in accordance with the principles of the present invention.
Figure 19A:
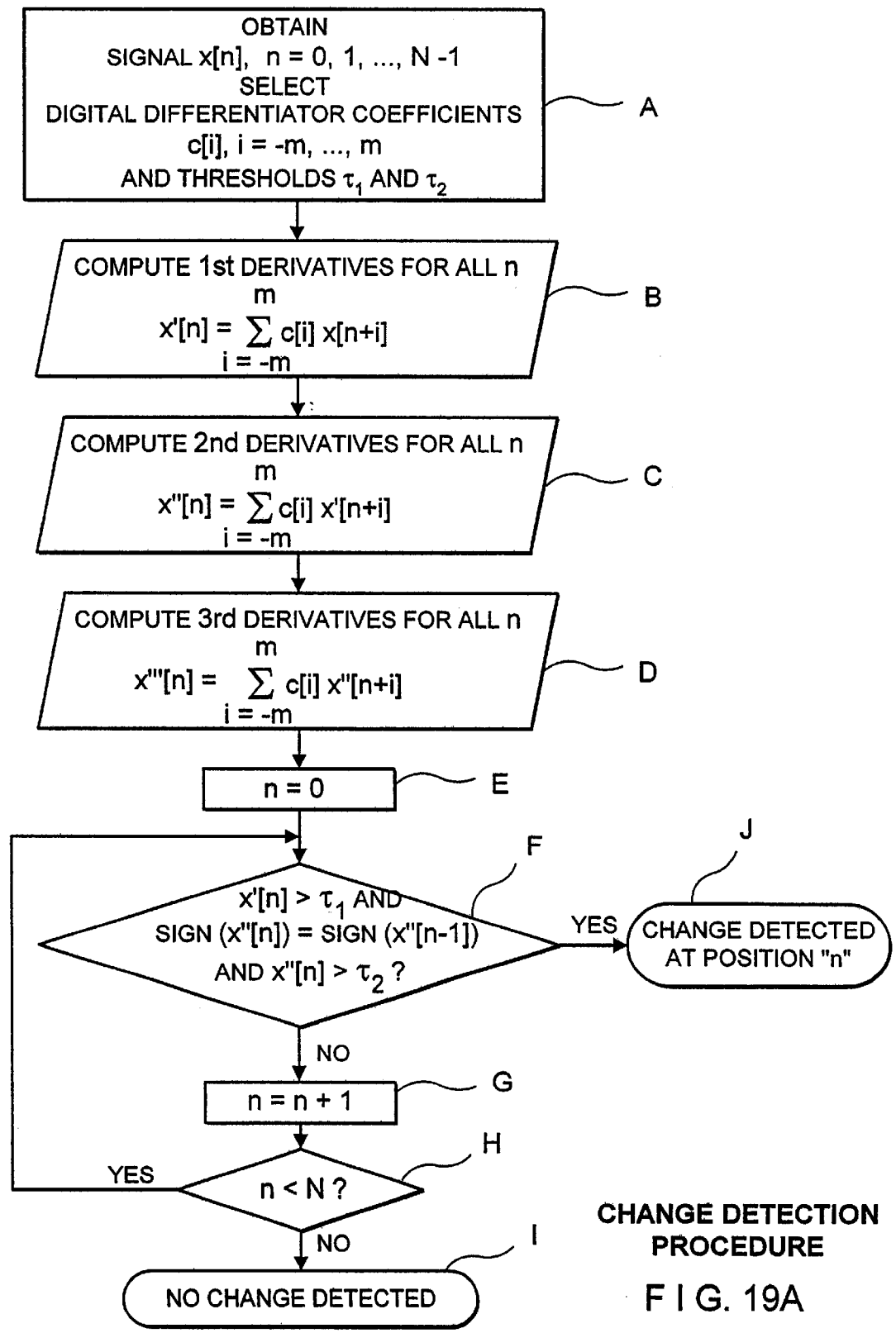
FIG. 19A is a flow chart describing the operation of the FIR digital filter system of FIG. 19 and how it detects sudden changes in the width and height data streams produced by the package dimensioning/profiling subsystem of FIG. 16.
Figure 19B:
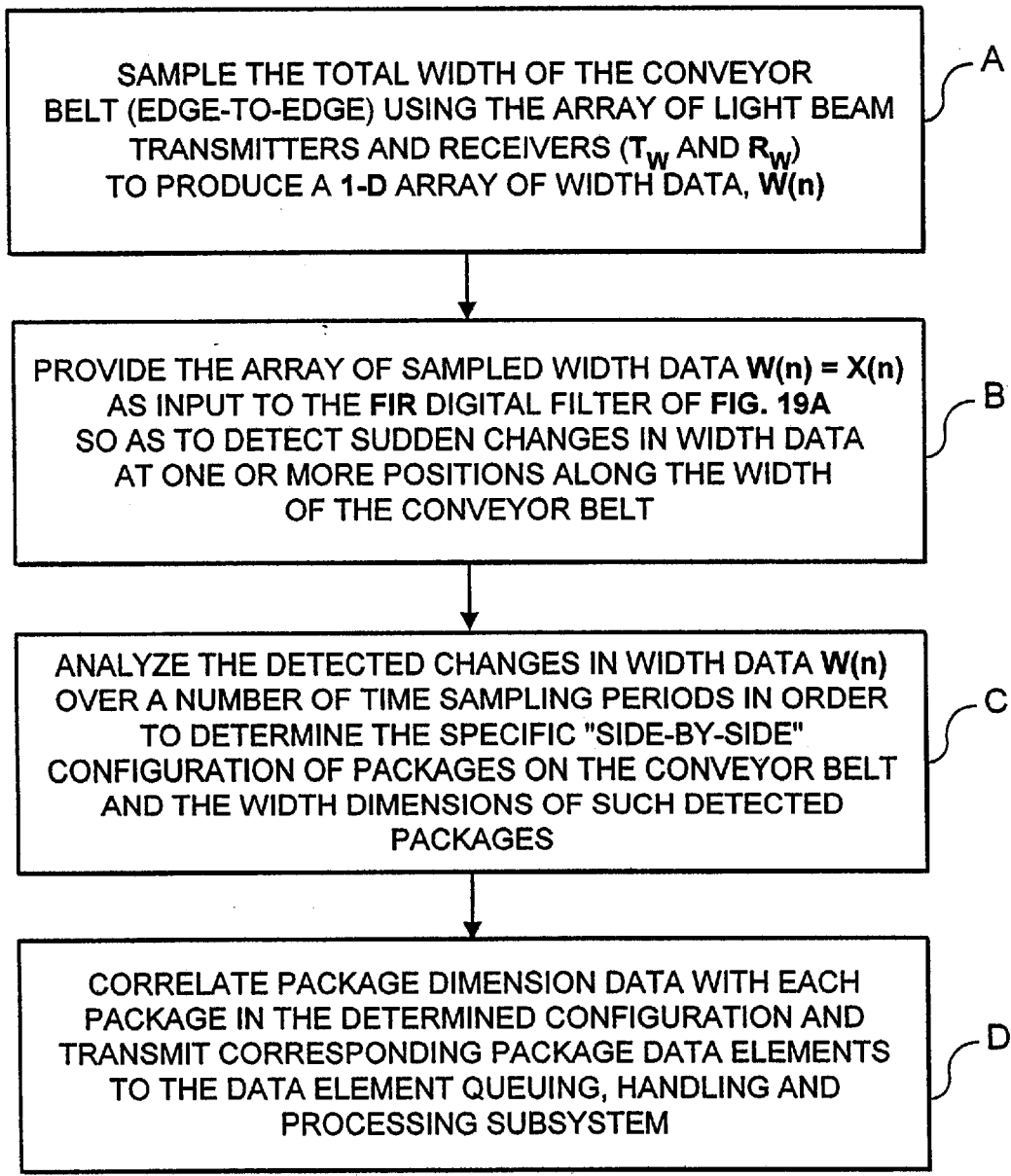
FIG. 19B is a flow chart describing the method of simultaneously detecting "side-by-side" configurations of packages along a conveyor belt using the FIR digital filter system of FIG. 19 to detect sudden changes in the width data streams produced by the package dimensioning/profiling subsystem of FIG. 16.

When the two boxes 611 and 612 are close to each other or when one is on top of the other, as shown in FIGS. 18A through 18C, subsystem 600 employs a simultaneous package detection method based on package width (or height) measurements. This method of simultaneous package detection is best described by considering the width measurement taken by the subsystem over time as being expressible as $[x_1, x_2, \ldots x_n]$. According to the simultaneous package detection/tracking method hereof, the subsystem 600 employs a novel FIR digital filter system, as illustrated in FIGS. 19, 19A and 19B.

In general, the FIR digital filter formulation has a transfer function which fits the linear operation of differentiation where $d/dt\ e^{iwt}=iwe^{iwt}$. In the frequency domain, this implies that the transfer function is of the form:

$$H(w)=iw.$$

Letting the digital filter be of the form $Y_a=(N/Z_{K=-N})\ C_k x_{n-k}$ with coefficients $C_k=-C_k$, the transfer function can be expressed as:

$$H(w)=[2c_1 \sin w + 2c_2 \sin 2w + \ldots + 2c_N \sin Nw]i.$$

A Fourier Series approximation of the function can be expressed as:=

$$H(w) = \begin{cases} iw & |w| < w_c \\ c & |w| > w_c \end{cases}$$

The resulting filter will have a passband of $[o, w_c]$. This is a low pass (smoothing) differentiator for $w_c < \pi$. The filter coefficients can be computed using the formula $C_k=(a_k+ib_k)/2$ where k=0.

Where $a_k = \upsilon$ and $b_k = (1/\pi)I_{-\pi}u(w)\sin kwdw$
$b_k = (2/\pi)I_0^{wc}i\omega \sin kwdw$
$C_k = (-1/\pi)((\sin kw_c k) - (\omega_c \cos kw_c/k))$
Notably, $w_c$ is a value in the range of $[0,\pi]$ when $w_c = \pi$, and also $C_k = (1/k)(-1)^k$ Using the above formulation, a digital filter can be designed for the simultaneous package detection method of subsystem 600. For the 1st derivative, a low pass stop frequency of $f_c + 0$ (1 is used where $w_c = 2\pi$). This will help filter out the noise during measurement operations in subsystem 600. For the 2nd derivative, an all pass band ($w_c = \pi$) is used. To improve the detection performance, in particular to reduce flash-alarm rate, the present invention teaches using a 3rd derivative to sample the $2^{nd}$ derivative zero crossings and thus ensure that false-alarms do not happen due to the lowering of the 1 st derivative threshold in the digital filter design.

As illustrated in FIG. 19, the digital filter method of the present invention comprises: (A) computing the $1^{st}$ spatial derivative (or gradient function) of x(n) for all spatial samples n; (B) computing the $2^{nd}$ spatial derivative of x(n) for all samples n; (C) computing the $3^{rd}$ spatial derivative of x(n) for all spatial samples n; (D) determine whether the 1st spatial derivative signal x'(n) is greater than the threshold $\tau_1$; (E) using the thresholded 1st spatial derivative signal x'(n) to sample the $2^{nd}$ spatial derivative signal x"(x); (F) detecting the zero-crossings of x"(n) to produce a zero-crossing signal; (G) sampling the detected zero-crossing signal using the $3^{rd}$ spatial derivative signal x'"(n) to produce a sampled zero-crossing signal; (H) thresholding the sampled zero-crossing signal against the threshold $\tau_2$ to detect sudden changes in the value of x(n); and (I) analyzing the changes in the value of x(n) over a number of time sampling periods in order to determine whether packages are configured side-by-side, stacked or singulated manner.

In FIG. 19A, the digital filter method the present invention is represented in a flow chart, indicating the particular operations carried out in a real-time sequential manner.

As indicated at Block A in FIG. 19A, a sampled position signal x(n) is obtained where n=0,1,2, ..., N−1; the digital filter coefficients c[i] are selected; and thresholds $\tau_1$ and $\tau_2$ are obtained using empirical methods. At Block B in FIG. 19A, the $1^{st}$ spatial derivative of x(n), denoted x'(n), is computed for all samples n. At Block C in FIG. 19A, the $2^{nd}$ spatial derivative of x),denoted x"(x), is computed for all samples n. A Block D in FIG. 19A, the $3^{rd}$ spatial derivative of x(n), denoted x'"(x), is computed for all samples n. At Block E in FIG. 19A, the position index n is set to zero. At Block F in FIG. 19A, the filter determines whether the 1st spatial derivative signal x'(n) is greater than the threshold $\tau_1$, whether sign (x"[x])≠sign (x"[n−1]) and whether x"[n]>$\tau_2$. If any one of these conditions are not satisfied, then at Block G the position index n is incremented by 1 (i.e. n=n+1) and then, at Block H, a check is made to determine whether the position index n is less than N. If not, then at Block I, no change is detected. If n<N, then the process flow returns to Block F, as indicated at Block F. If at Block F, all three of the conditions listed therein are satisfied, then at Block J a change is detected at position n across the width of the conveyor belt.

Notably, the digital FIR filter system illustrated in FIGS. 19 and 19A is used as a basic filtering module within H/W Data Processor 605 of FIG. 16A. During the operation of the system of the present invention, the H/W Data Processor 605 carries out the simultaneous package detection process of the present invention to be described hereinbelow with reference to FIGS. 19B and 19C.

In general, there are two basic scenarios to consider when carrying out the simultaneous package detection method of the present invention: (1) when one box is disposed beside another, as shown in FIGS. 17A through 17C; and (2) when one box is disposed on top of another as shown in FIGS. 18A through 18C. The cases of more than 2 boxes can be easily extended from these two box scenarios.

Considering the side-by-side boxes case, shown in FIGS. 17A through 17C, it is noted that the light transmitting and receiving structures (Tw, Rw) 602A and 602B, respectively, are used to measure the width of the packages when they move through the light curtain structure of FIG. 16A, as it is often referred to by those skilled in the art. In the case of side-by-side boxes, the measurement of package width will change while packages are passing through the light curtain structure. The method of simultaneously detecting packages arranged in a "side-by-side" configuration is illustrated in the flow chart of FIG. 19B.

As indicated at Block A in FIG. 19B, the first step in the method involves obtaining an array of N sampled width measurements W(n) along the total width of the conveyor belt (i.e. edge to edge) as the conveyor belt with packages thereon is transported through the light curtain shown in FIG. 16A. Collection of the array of width data elements, denoted by W(n) for n=0, 1, 2, ..., N−1, is achieved using the array of light beam transmitters and receivers 602A and 602B, shown in FIG. 16A. Naturally, the spatial sampling rate (and thus the number and position of the N samples along the conveyor belt) is selected so that enough width measurements are taken and gaps between packages can be detected.

As indicated at Block B in FIG. 19B, second step in the method involves providing the array of sampled width data W(n) as input to the digital filter system of FIG. 19 so as to detect sudden changes in width data at one or more positions along the width of the conveyor belt. The first spatial derivative of the discrete set of width samples W(n)is defined as W'(n)=W(n)−W(n−1) where n=1, 2, ... N. The second spatial derivative of the discrete set of height samples W(n)is defined as W"(n)=W'(n)−W'(n−1) where n=1,2, ... N. The third spatial derivative of the discrete set of width samples W(n)is defined as W'"(n)=W(n)"−W"(n−1) where n=1,2, ... N. The digital filter system of FIG. 19 differentiates the sudden changes in values of W(n) from noise (e.g. measurement errors and slight irregularities in the box shape). As illustrated at Block F in FIG. 19A, the decision rules for the simultaneous detection method are:

(1) determine that the boxes are "side-by-side" if W'(n) >$\tau_1$, sign(W"[n])≠sign(W"[n−1]) and W"(n)>$\tau 2$' for any n; and (2) otherwise, determine that the boxes are singulated.

Notably, sign ( ) denotes the algebraic sign function which is used to find zero crossings in the 2nd spatial derivative signal W"(n). Simulations show that the above decision rules are work well with regard to noise, and always correctly locate abrupt changes in width data, which is necessary to determine that boxes are arranged in aside-by-side configuration.

As indicated at Block C in FIG. 19B, the third step of the method involves analyzing the detected changes in the width data array W(n) for n=0, 1, 2, ..., N−1 for a number of time sampling periods, so as to determine the specific "side-by-side" configuration of packages on the conveyor belt.

As indicated at Block D in FIG. 19B, the fourth and last step of the method involves correlating the package dimension data (if collected) with each package in the detected "side-by-side" configuration, and transmitting a special "multiple-in-tunnel" package indicating data element (e.g. MPIT data element) to the data element queuing, handling and processing subsystem 1000 indicates within subsystem 1000 that there is ether an irregular-shaped package in the tunnel or multiple side-by-side packages in the tunnel. Subsystem 1000 can then generate a control signal to cause a downstream package router to route such multiple packages through a package singulation unit, and then once again through the scanning tunnel system without human intervention. Considering the "stacked" boxes case, shown in FIGS. 18A through 18C, it is noted that the light transmitting and receiving structures (Tw, Rw) 601A and 601B, respectively, are used to measure the height of the packages when they move through the light curtain structure shown in FIG. 16A. In the case of stacked boxes, the measurement of the package height will change while packages are passing through the light curtain. The method of simultaneously detecting packages arranged in a "stacked" configuration is illustrated in the flow chart of FIG. 19C.

Figure 19C:
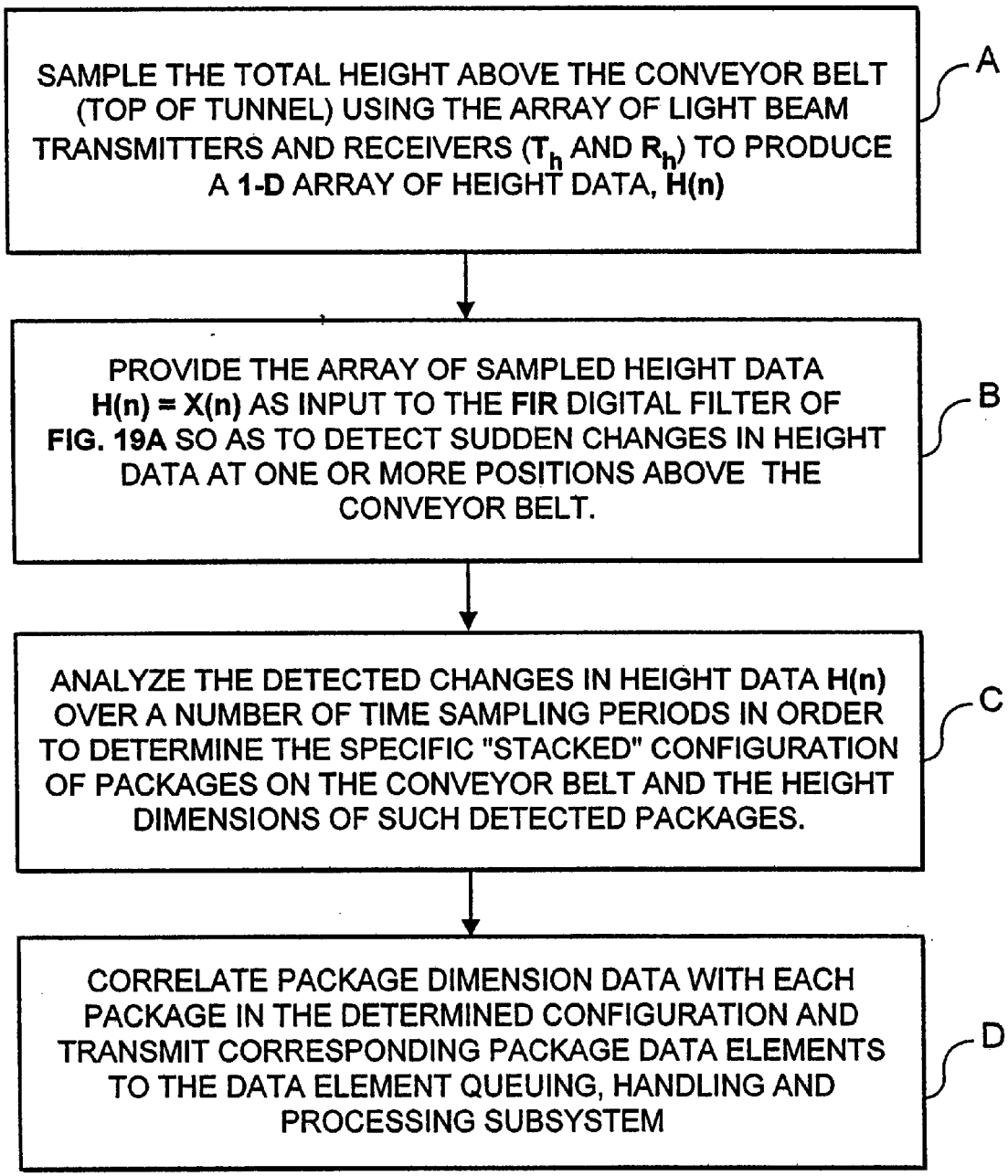
FIG. 19C is a flow chart describing the method of simultaneously detecting "stacked" configurations of packages along a conveyor belt using the FIR digital filter of FIG. 19 to detect sudden changes in the height data streams produced by the package dimensioning/profiling subsystem of FIG. 16.

As indicated at Block A in FIG. 19C, the first step in the method involves obtaining an array of N sampled height measurements W(n) along the total height of the tunnel aperture (i.e. top to bottom) as the conveyor belt with packages thereon is transported through the light curtain P structure shown in FIG. 16A. Collection of the array of height data elements, denoted by H(n) for n=0, 1, 2, . . . , N−1, is achieved using the array of light beam transmitters and receivers 601A and 601B, shown in FIG. 16A. Naturally, the sampling rate (and thus the position of the N samples above the conveyor belt) is selected so that enough height measurements are taken.

As indicated at Block B in FIG. 19C, second step in the method involves providing the array of sampled height data H(n) as input to the digital filter system of FIG. 19 so as to process the data array(s) and detect sudden changes in height data at one or more positions above the height of the conveyor belt. The first spatial derivative of the discrete set of height samples H(n) is defined as H'(n)=H(n)−H(n−1) where n=1,2, . . . , N. The second spatial derivative of the discrete set of height samples H(n) is defined as H"(n)=H'(n)−H'(n−1) where n=1,2, . . . N. The third spatial derivative of the discrete set of height samples H(n) is defined as H'''(n)=H(n)"−H"(n−1) where n=1,2, . . . N. The digital filter system of FIG. 19 differentiates the sudden changes in values of H(n) from noise (e.g. measurement errors and slight irregularities in the box shape). As illustrated at Block F in FIG. 19A, the decision rules for the simultaneous detection method operating on sampled height data, are:

(1) determine that the boxes are "stacked" if H(n)>$\tau_1$, sign(H"[n])≠sign(H"[n−1]) and H"(n)>$\tau_2$, for any n; and (2) otherwise, determine that the boxes are singulated.

Notably, sign ( ) denotes the algebraic sign function which is used to find zero crossings in the 2nd spatial derivative signal H"(n). Simulations show that the above decision rules are work well with regard to noise, and always correctly locate abrupt changes in height data, which is necessary to determine that boxes are arranged in a stacked configuration.

As indicated at Block C in FIG. 19C, the third step of the method involves analyzing the detected changes in the height data array H(n) for n=0, 1, 2, . . . , N−1 for a number of time sampling periods, so as to determine the specific "stacked" configuration of packages on the conveyor belt.

As indicated at Block D in FIG. 19C, the fourth and last step of the method involves correlating the package dimension data (if collected) with each package in the detected "side-by-side" configuration, and transmitting corresponding package indicating data elements (e.g. PIT data elements) to the data element queuing, handling and processing subsystem 1000. As will become apparent hereinafter, these PIT data elements enable detected packages to be tracked within the overall system and eventually linked up with corresponding package identification data acquired by the bar code symbol reading subsystems employed within the Tunnel Scanning System.

Using the package detection method described above, any arrangement of non-singulated boxes on the conveyor belt can be automatically detected and successfully tracked.

The sampling rate for the above described digital filtering method, denoted by T, can be determined as follows. Let the speed of the box/conveyor be denoted by 1), and the minimum tolerance for package separation be denoted as D. Then considering the necessary data points to perform the second derivative, the following expression must hold true:

$$T \neq 3D/v$$

Using this rule for a 600 ft/min. conveyor belt, if the minimum tolerance is 50 mm (2 in.), then the sampling period is about 5 ms, which corresponds to a sampling frequency of about 200

Figure 20A:
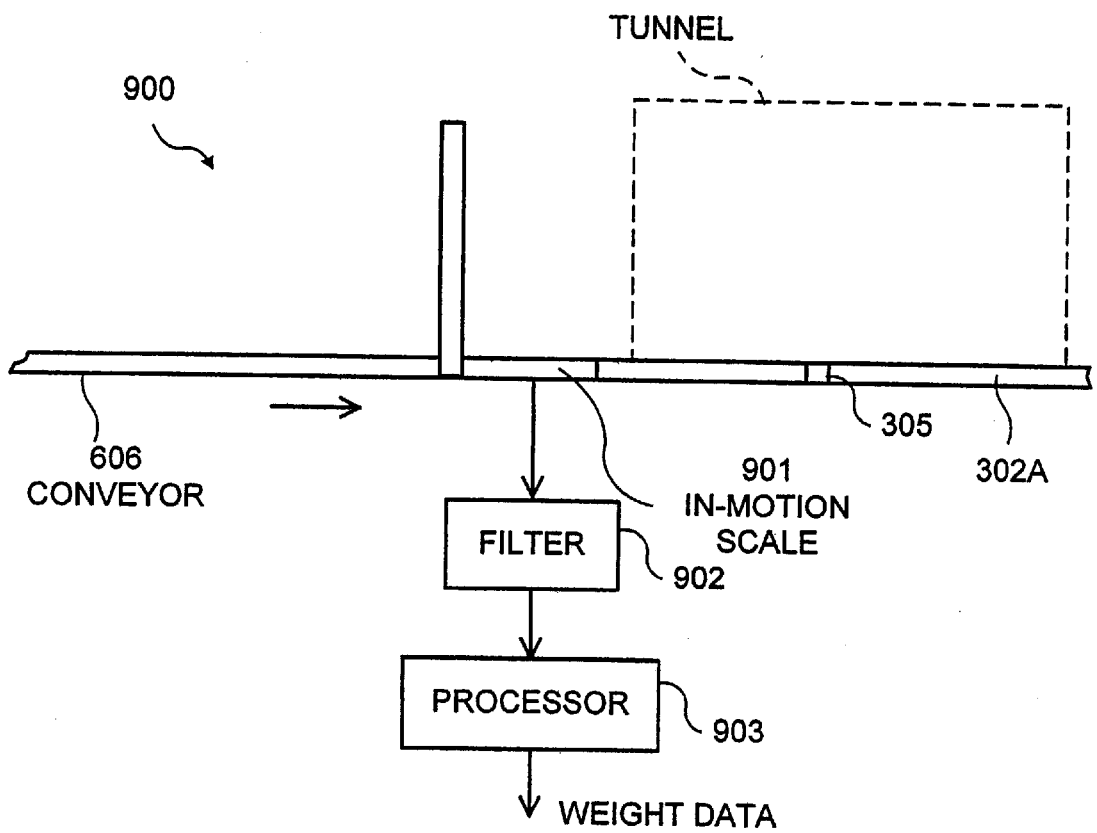
FIG. 20A is an elevated side schematic view of the in-motion weighing subsystem employed in the system of the first illustrative embodiment of the present invention, wherein the scale and data processing subcomponents thereof are shown arranged about the package dimensioning/profiling subsystem of FIG. 16.
Figure 20B:
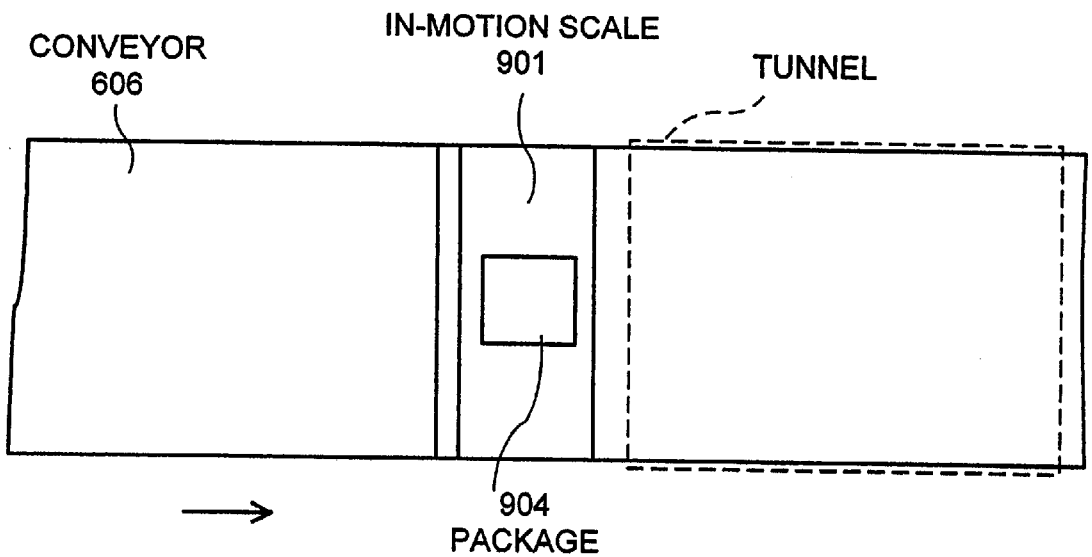
FIG. 20B is a plan view of the in-motion weighing subsystem shown in FIG. 20A, wherein a moving package is shown being weighed on the scale component as it is transported along the conveyor belt of the system of the first illustrative embodiment.

The In-motion Package Weighing Subsystem of the First Illustrative Embodiment of the Present Invention As shown in the FIG. 20 and 20A, the in-motion package weighing subsystem 900 is preferably arranged about the package dimensioning/profiling subsystem 600. As shown, the in-motion weighing subsystem 900 comprises: a scale platform 901 integrated with the conveyor belt 606, for producing analog or digital weight signals indicative of the weight of a package(s) 904 moving across the scale platform 901; a filtering circuit 902 for filtering the analog or digital weight signals in order to remove noise components and artifacts therefrom; and a signal processor 903 for processing the filtered weight signals in order to produce a digital word representative of the measured weight of the package. Notably, the in-motion weighing subsystem of the illustrative embodiment can be used to realize using the 9480 EXPRESSWEIGH™ In-Motion Variable Box and Package Weighing System from Mettler-Toledo, Inc. of Worthington, Ohio.

Figure 21:
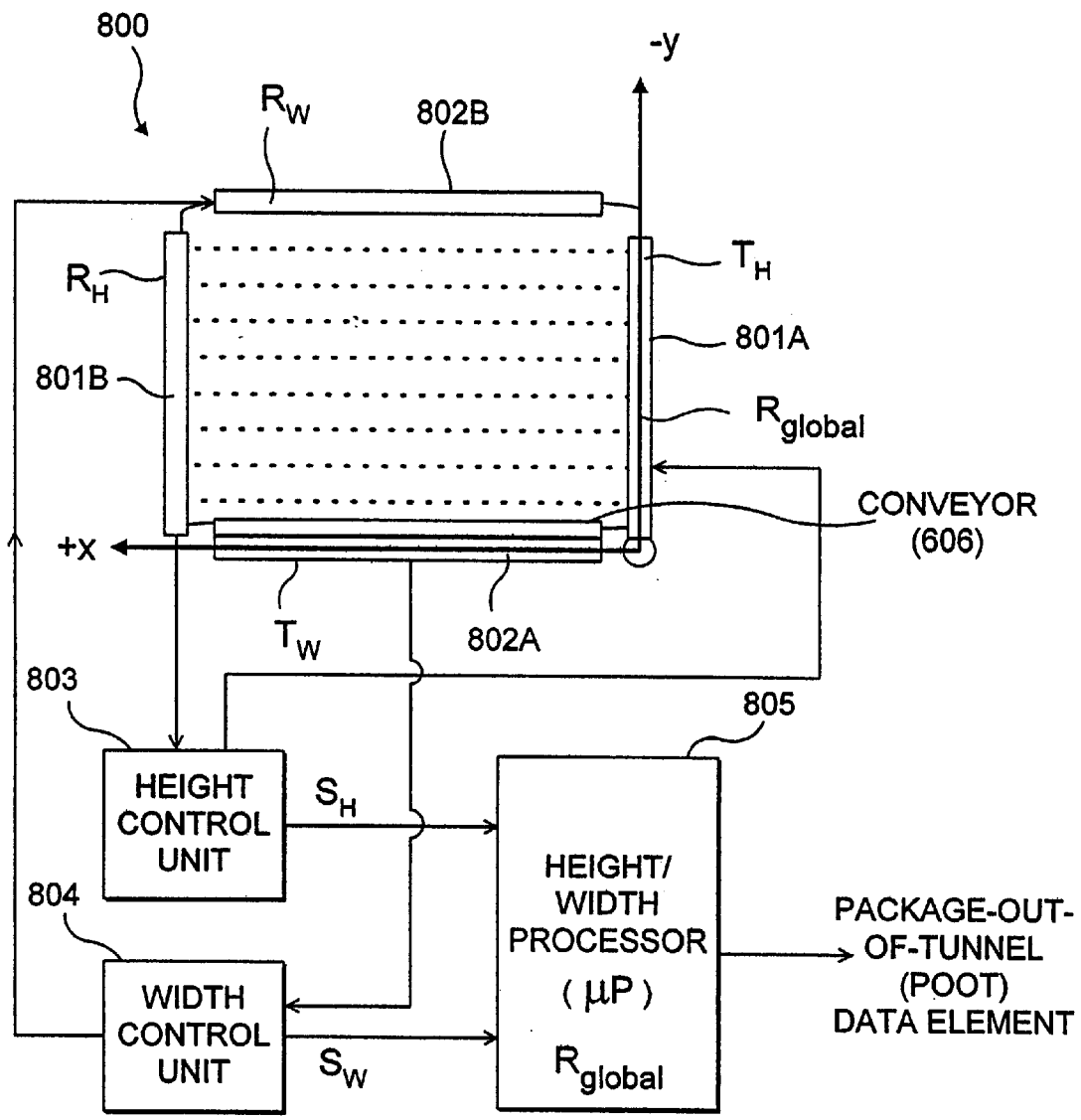
FIG. 21 is a schematic diagram of the package-out-of-tunnel signaling subsystem employed in the automated package identification and measuring system of the first illustrative embodiment of the present invention.

The Package-in-tunnel Signaling Subsystem of the First Illustrative Embodiment of the Present Invention The package-in-tunnel indication subsystem 500 can be realized in a variety of ways. One way shown in FIG. 21, is to use a light transmitting/receiving structure as employed in package identification and measuring system 600, and generating a package-out-of-tunnel (POOT) data element upon detecting the exit of each package from the scanning tunnel. As shown in FIG. 21, the vertically arranged light transmitting and receiving structures 801A and 801B, as well as horizontally arranged light transmitting and receiving structures 802A and 802B, are arranged in a manner generally known in the package handling art. As shown in FIG. 21, the vertically arranged light transmitting and receiving structures 801A and 801B are controlled by a height control unit 803, which produces, as output, a signal $S_H$ consisting of time-sampled package height data collected along the vertical extent of the scanning tunnel aperture, similarly, horizontally arranged light transmitting and receiving structures 803 are controlled by a width control unit 804, which produces, as output, a signal $S_W$ consisting of time-sampled package height data collected along the horizontal extent of the scanning tunnel aperture. The output data streams from height and width control units 803 and 804, and the package length/velocity measurement subsystem 400, are provided as input to an H/W data processor 805, programmed to produce a package-out-of-tunnel (POOT) Indication (token) Data Element for each package detected by 800. In the illustrative embodiment, subsystem 800 is realized by integrating (i) the profiler system (Model No. P101-144-200) from KORE, Inc. of Grand Rapids, Mich., and providing programmed HIW data processor 805 which includes the digital filter system described in FIGS. 19 through 19C in order to simultaneously detect side-by-side configured packages, stacked packages, as well as singulated packages in the manner described in great detail hereinabove.

As shown in FIG. 21, the best location for this subsystem is at the exit plane of the scanning tunnel. The POOT data element is provided to the data element queuing, handling and processing subsystem 1000, in the manner similar to that of all other data elements generated from the package dimensioning/profiling subsystem 600, scanning units associated with the tunnel scanning subsystem, and package-in-tunnel indication subsystem 500.

Figure 22A:
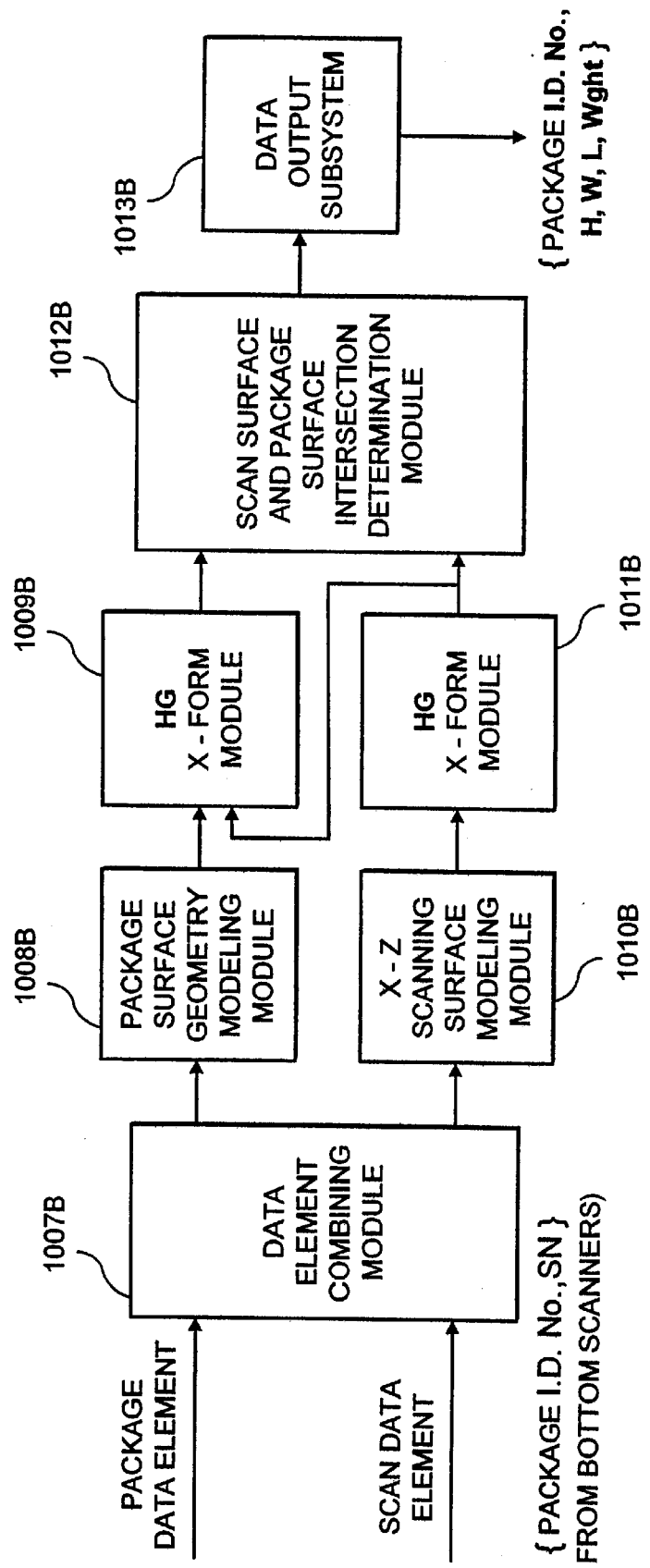

The Data Element Queuing, Handling and Processing Subsystem of the First Illustrative Embodiment of the Present Invention In FIGS. 22 and 22A, the structure and function of data element queuing, handling and processing subsystem 1000 is shown in greater detail. As shown in FIG. 22, all data elements entering subsystem 1000 are provided to an I/O subsystem 1001, the output port of which is connected to a data element time-stamping unit 1002 that is controlled by a timing/control unit 1003. In the illustrative embodiment, there are four possible types of data elements that might be loaded into the system event queue 1004, realized as a FIFO data structure known in the computing art. As shown in FIG. 22, the four possible data element types are: package data elements; scan beam data elements; package-in-tunnel (PIT) data elements; and package out-of-tunnel (POOT) data elements.

As shown in FIG. 22, the data element queuing, handling and processing subsystem 1000 further comprises a number of other modules, namely: a moving package tracking queue 1005, realized as a FIFO data structure known in the computing art, for queuing package data elements, package-in-tunnel (PIT) data elements and package out-of-tunnel (POOT) data elements; and a data element analyzer 1006 (e.g. programmed microprocessor and associated memory structures) for reading the different types of data elements from the output of the system event queue 1004 and analyzing and handling the same according to the Data Element Handling Rules set forth in FIGS. 23A1 and 23A2.

As shown in FIG. 22, scan beam data elements generated from "holographic type" laser scanning subsystems must be processed using a system of data processing modules illustrated in FIG. 22. As shown in FIG. 22, this system of data processing modules comprises a data element combining module 1007A for combining (i) each scan beam data element generated from "holographic-type" laser scanning subsystems and accessed from the system event queue 1004 with (ii) each and every package data element in the moving package tracking queue 1005, so as to produce a plurality of combined data element pairs; a package surface geometry modeling module 1008A for generating a geometrical model for the package represented by the package data element in each combined data element pair produced by the data element combining module 1007A; a homogeneous transformation (HG) module 1009A for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance z from the package dimensioning position); a scan beam geometry modeling module 1010A for generating a geometrical model for the laser scanning beam represented by the scan beam data element in each combined data element pair produced by the data element combining module 1007A; a homogeneous transformation (HG) module 1011A for transforming (i.e. converting) the coordinates of each scanning beam geometry model referenced to the local frame of reference symbolically embedded within the holographic laser scanning system, into scanning beam geometry model coordinates referenced to the global coordinate reference $R_{global}$ at the "scanning position" within the scanning tunnel; a scan beam and package surface intersection determination module 1012A for determining, for each combined data element pair produced from the data element combining module, whether the globally-referenced scan beam model produced by the HG transformation module 1009A intersects with the globally-referenced package surface model produced by the HG transformation module 1011A, and if so, then the data output subsystem 1013A produces, as output, package identification data, package dimension data (e.g. height, width data etc.), and package weight data, for use by auxiliary systems associated with the tunnel scanning system of the present invention.

As shown in FIGS. 22 and 22A, scan beam data elements generated from "non-holographic type" laser scanning subsystems must be processed using a different system of data processing modules than that shown in FIG. 22. As shown in FIG. 22A, this system of data processing modules comprises: a data element combining module 1007B (similar to module 1007A) for combining (i) each scan beam data element generated from the "non-holographic-type" bottom-located laser scanning subsystems and accessed from the system event queue 1004 with (ii) each and every package data element in the moving package tracking queue 1005, so as to produce a plurality of combined data element pairs; a package surface geometry modeling module 1008B (similar to module 1008A) for generating a geometrical model for the package represented by the package data element in each combined data element pair produced by the data element combining module 1007B; a homogeneous transformation (HG) module 1009B (similar to module 1009A) for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance z from the package dimensioning position); a X-Z scanning surface (geometry) modeling module 1010B for generating a geometrical model for the laser scanning surface represented by the scan beam data element in each combined data element pair produced by the data element combining module 1007B; a homogeneous transformation (HG) module 1011B for transforming (i.e. converting) the coordinates of each x-z scanning surface geometry model referenced to the local frame of reference symbolically embedded within the non-holographic bottom laser scanning subsystem, into scanning beam geometry model coordinates referenced to the global coordinate reference $R_{global}$ at the "scanning position" within the scanning tunnel; a scan beam and package surface intersection determination module 1012B for determining, for each combined data element pair produced from the data element combining module, whether the globally-referenced scanning surface model produced by the HG transformation module 1009B intersects with the globally-referenced package surface model produced by the HG transformation module 1011B, and if so, then the data output subsystem 1013B produces, as output, package identification data, package dimension data (e g. Height, width data etc.), and package weight data, for use by auxiliary systems associated with the tunnel scanning system of the present invention.

Having described the overall structure and function of the data element queuing, handling and processing subsystem 1000, it is appropriate at this juncture to now briefly describe the operation thereof with reference to FIGS. 22 and 22A.

Prior to loading into the system event queue 1004, each data element is time-stamped (i.e. $T_j$) by the timing stamping module 1002 driven by a master clock within timing/control unit 103 referenced to the global reference frame $R_{global}$. All data elements in the system event queue 1004 are handled by a data element analyzer/handler 1006 which is governed by the table of Data Element Handling Rules set forth in FIGS. 23A1 and 23A2. In general, subsystem 1000 is best realized by an computing platform having a multi-tasking operating system capable of handling multiple "threads" at the same time.

Each package moving through the scanning tunnel will be represented by a data element (i.e. an object in an object-oriented programming environment e.g. Java programming environment) stored in a moving package tracking queue 1005 operably connected to the data element handler 1006. Package data elements are placed in the moving package tracking queue 1005 and matched with each scan beam data element accessed from the system event queue 1004 using a data element combining module 1007A. Scan beam data elements generated from holographic-based scanning units are processed along the scan data processing channel illustrated by blocks 1008A, 1009A, 010A, 1011A, 1012A, and 1013A set forth in the lower right hand corner of FIG. 22, whereas scan beam data elements generated from non-holographic based scanning units (e.g. from the bottom-located polygon scanners in the tunnel) are processed along a different scan data processing channel illustrated by blocks 1008B, 1009B, 101B, 1011B, 1012B, and 1013B set forth on FIG. 22A. This is because scan beam data elements generated from holographic-based scanning units have been generated from laser scanning beams (or finite scanning sectors) which can be tracked with scan package identification data by tracking facet sectors on the scanning disc in issue. While a similar technique can be used for polygon-based scanners (e.g. tracking "mirror sectors" instead of HOE-based facet sectors), a different approach has been adopted in the illustrative embodiment. That is, the scanning surface (e.g. 3×5") of each polygon scanning unit along the bottom scanner is accorded a vector-based surface model, rather than ray-type model used for package identification data collected using holographic scanning mechanisms.

Figure 24:
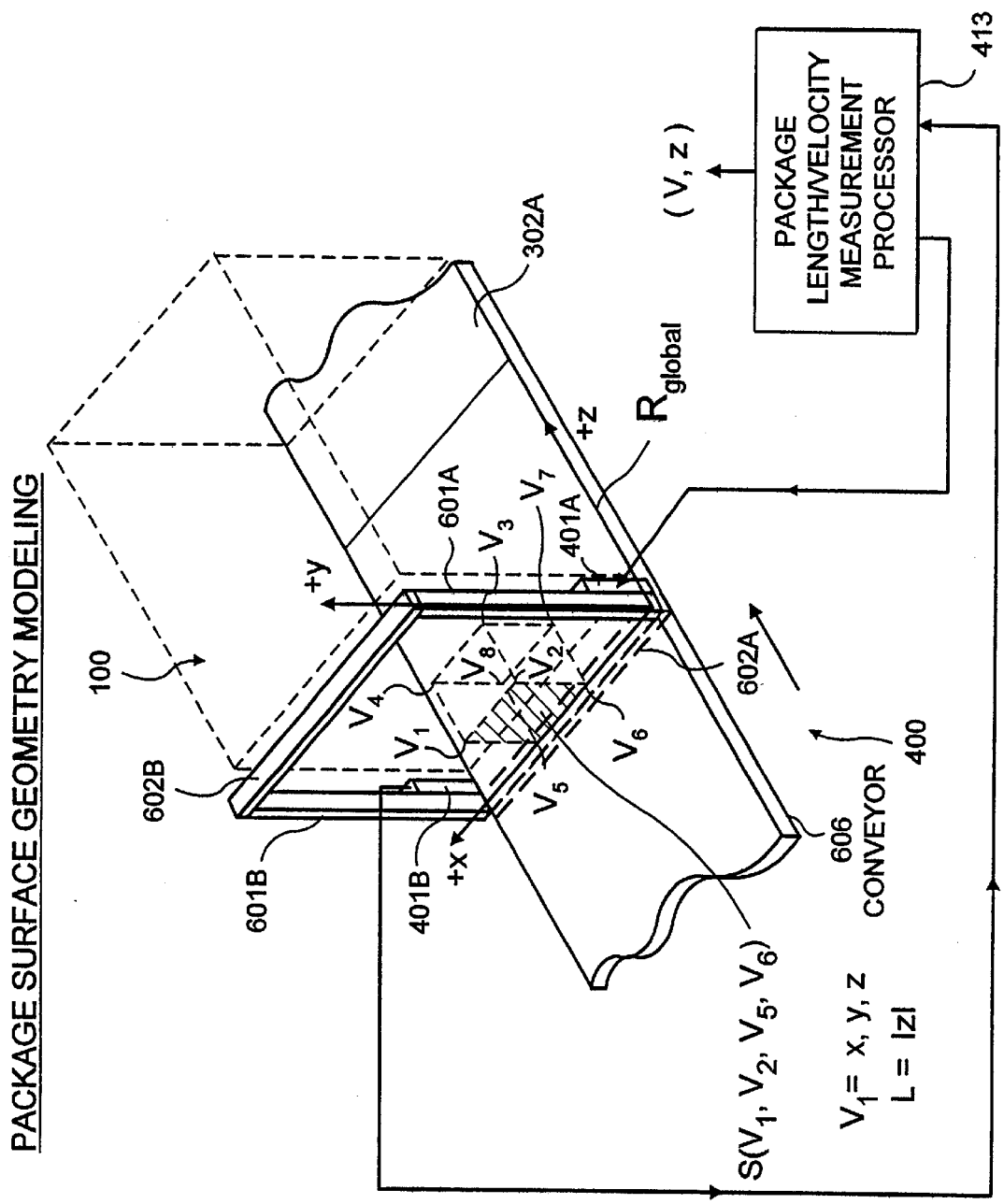
FIG. 24 is a schematic representation of the surface geometry model created for each package surface by the package surface geometry modeling subsystem (i.e. module) deployed with the data element queuing, handling and processing subsystem of FIG. 22, illustrating how each surface of each package (transported through package dimensioning/measuring subsystem and package velocity/length measurement subsystem) is mathematically represented (i.e. modeled) using at least three position vectors (referenced to x=0, y=0, z=0) in the global reference frame $R_{global}$, and a normal vector drawn to the package surface indicating the direction of incident light reflection therefrom.

The Package Surface Geometry Modeling Subsystem of the First Illustrative Embodiment of the Present Invention As shown in FIG. 24, a surface geometry model is created for each package surface by the package surface geometry modeling subsystem (i.e. module) 1008A deployed with the data element queuing, handling and processing subsystem 1000 of FIG. 22. In the illustrative embodiment, each surface of each package transported through package dimensioning/measuring subsystem 600 and package velocity/length measurement subsystem 400 is mathematically represented (i.e. modeled) using at least three position vectors (referenced to x=0, y=0, z=0) in the global reference frame $R_{global}$, and a normal vector to the package surface indicating the direction of incident light reflection therefrom. The table of FIG. 24A describes a preferred procedure for creating a vector-based surface model for each surface of each package transported through the package dimensioning/measuring subsystem 600 and package velocity/length measurement subsystem of the system 400 hereof.

Figure 25A:
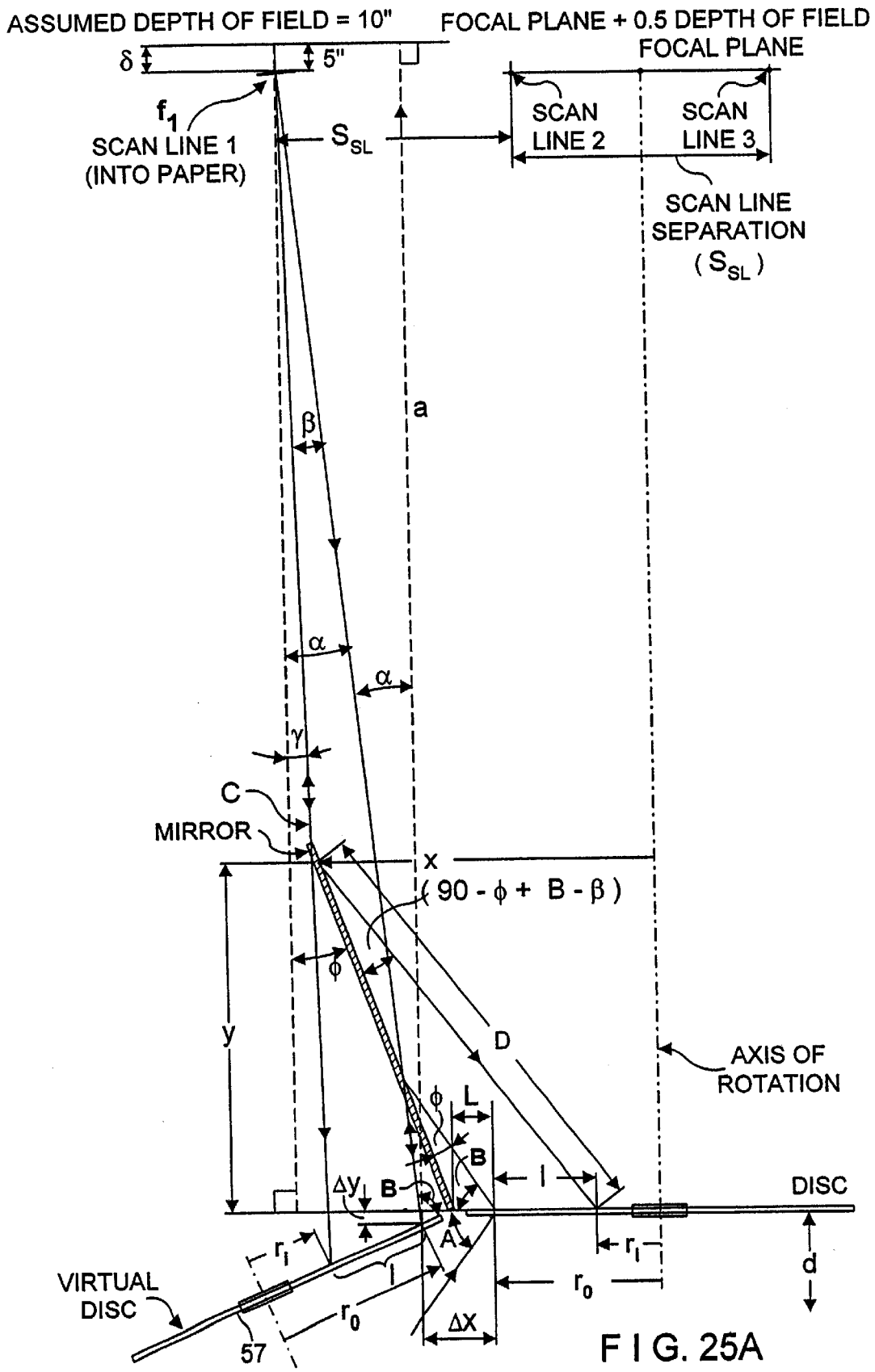

The Scan Beam Geometry Modeling Subsystem of the First Illustrative Embodiment of the Present Invention As shown in FIGS. 25A through 25A1, a vector-based model is created by the scan beam geometry modeling subsystem (i.e. module) 1010A of FIG. 22, for the propagation of the laser scanning beam (ray) emanating from a particular point on the facet, to its point of reflection on the corresponding beam folding mirror, towards to the focal plane determined by the focal length of the facet.

Figure 26:
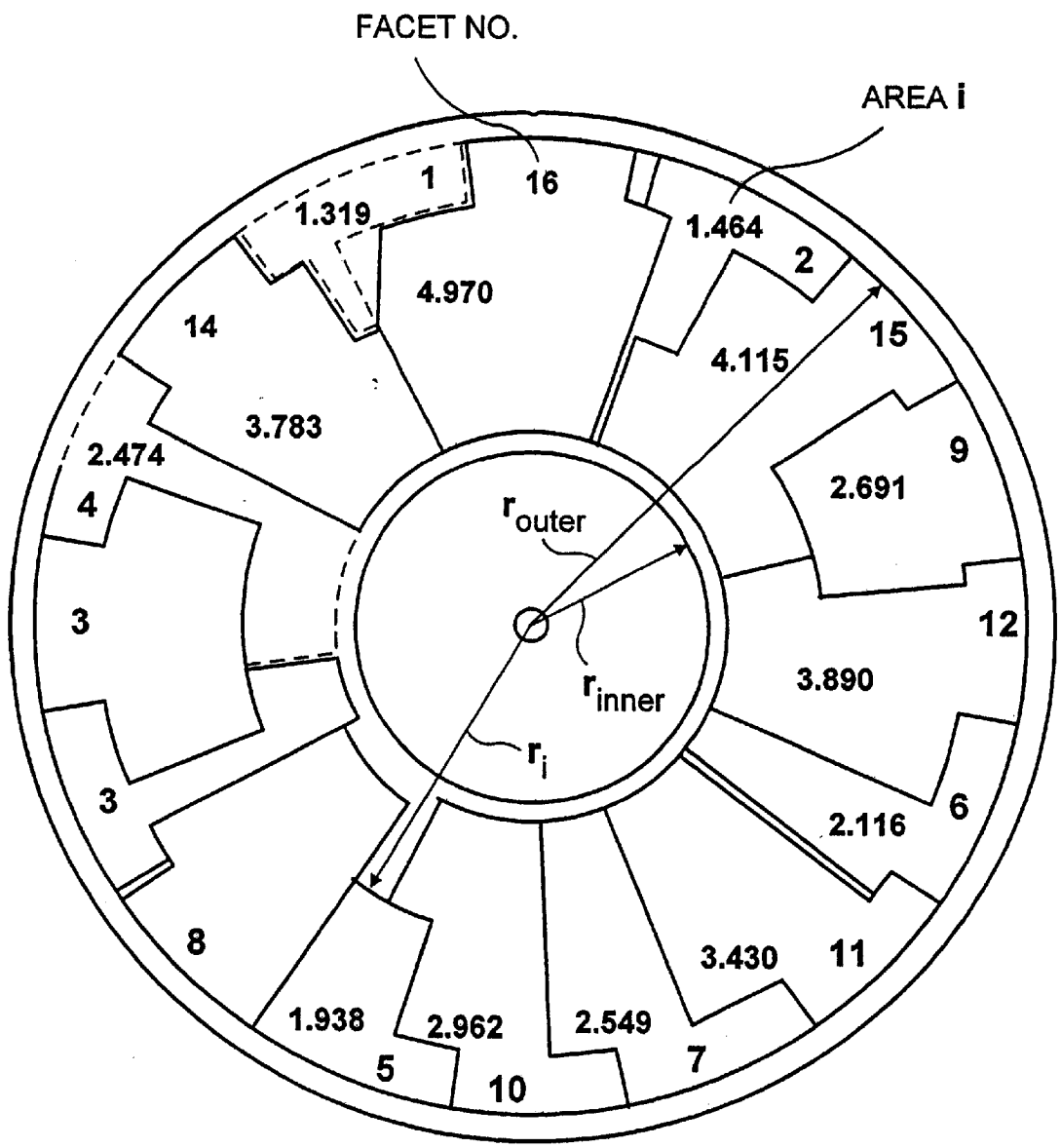
FIG. 26 is a schematic representation of the laser scanning disc shown in FIGS. 25A and 25A1, labeled with particular parameters associated with the diffraction-based geometric optics model of FIGS. 25A and 25A1.

The table set forth in FIGS. 25B1 through 25B3 define the parameters used to construct the diffraction-based geometric optics model of the scanning facet and laser scanning beam shown in FIGS. 25A and 25A1. Details of this modeling procedure can be found in Applicant's copending application Ser. No. 08/726,522 filed Oct. 7, 1996; and Ser. No. 08/573,949 filed Dec. 18, 1995. FIG. 26 provides a schematic representation of the laser scanning disc shown in FIGS. 25A and 25A1, labeled with particular parameters associated with the diffraction-based geometric optics model of FIGS. 25A and 25A1.

In FIG. 27, a preferred procedure is described for creating a vector-based ray model for laser scanning beams which have been produced by a holographic laser scanning subsystem of the system hereof, that may have collected the scan data associated with a decoded bar code symbol read thereby within the tunnel scanning subsystem.

Figure 28:
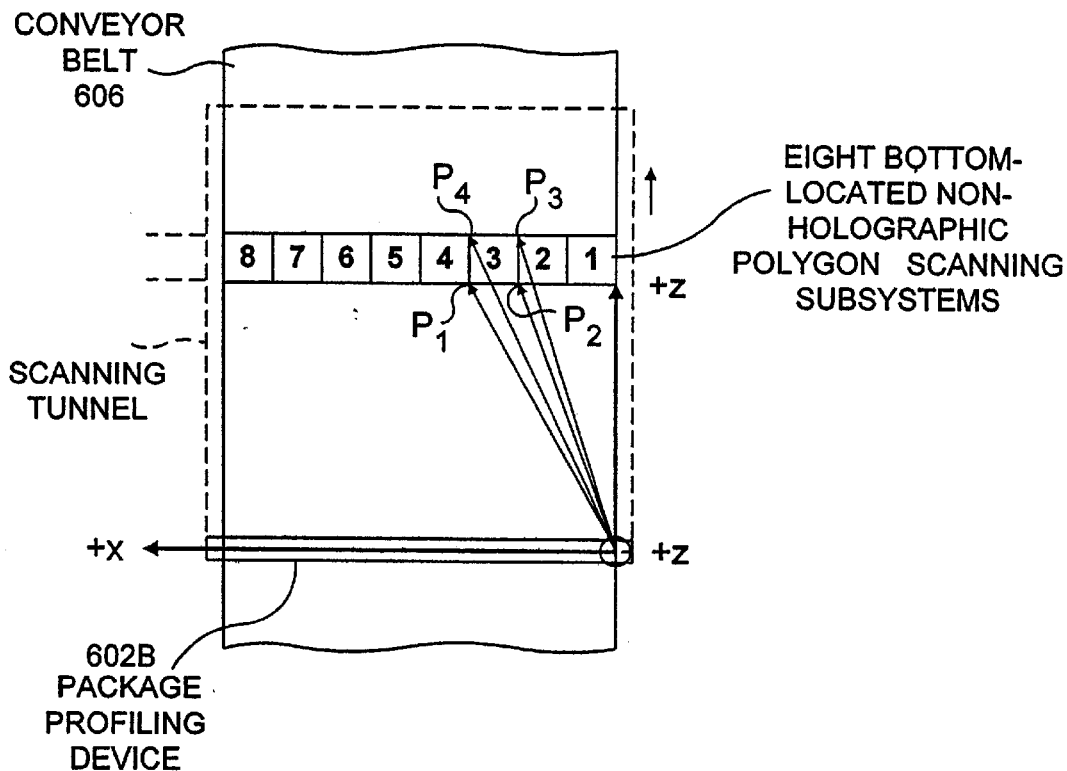
FIG. 28 is a schematic representation of the vector-based 2-D surface geometry model created for each candidate scan beam by the scan surface modeling subsystem (i.e. module) shown in FIG. 22A, and showing how each omnidirectional scan pattern produced from a particular polygon-based bottom scanning unit is mathematically represented (i.e. modeled) using four position vectors (referenced to x=0, y=0, z=0) in the global reference frame $R_{global}$, and a normal vector drawn to the scanning surface indicating the direction of laser scanning rays projected therefrom during scanning operations.

The Scan Surface Modeling Subsystem of the First Illustrative Embodiment of the Present Invention FIG. 28 schematically shows how the scan surface modeling subsystem (i.e. module) shown of FIG. 22A can be used to define a vector-based 2-D surface geometry model for each candidate scan beam generated by the polygonal-based bottom scanners in the tunnel scanning system. As shown in FIG. 28, each omnidirectional scan pattern produced from a particular polygon-based bottom scanning unit is mathematically represented (i.e. modeled) using four position vectors (referenced to x=0, y=0, z=0) in the global reference frame $R_{global}$, and a normal vector to the scanning surface indicating the direction of laser scanning rays projected therefrom during scanning operations.

The Homogeneous (HG) Transformation Module of the First Illustrative Embodiment of the Present Invention FIG. 29 schematically describes how the homogeneous (HG) transformation module 1009A of FIG. 22 uses homogeneous transformations to convert a vector-based model within a local scanner coordinate reference frame $R_{localscanner_j}$ into a corresponding vector-based model created within the global scanner coordinate reference frame $R_{global}$. This mathematical technique is essential in that it converts locally-referenced coordinates used to represent a laser beam (which scanned a bar code symbol) into globally-referenced coordinates used to represent the same laser scanning beam.

Figure 30:
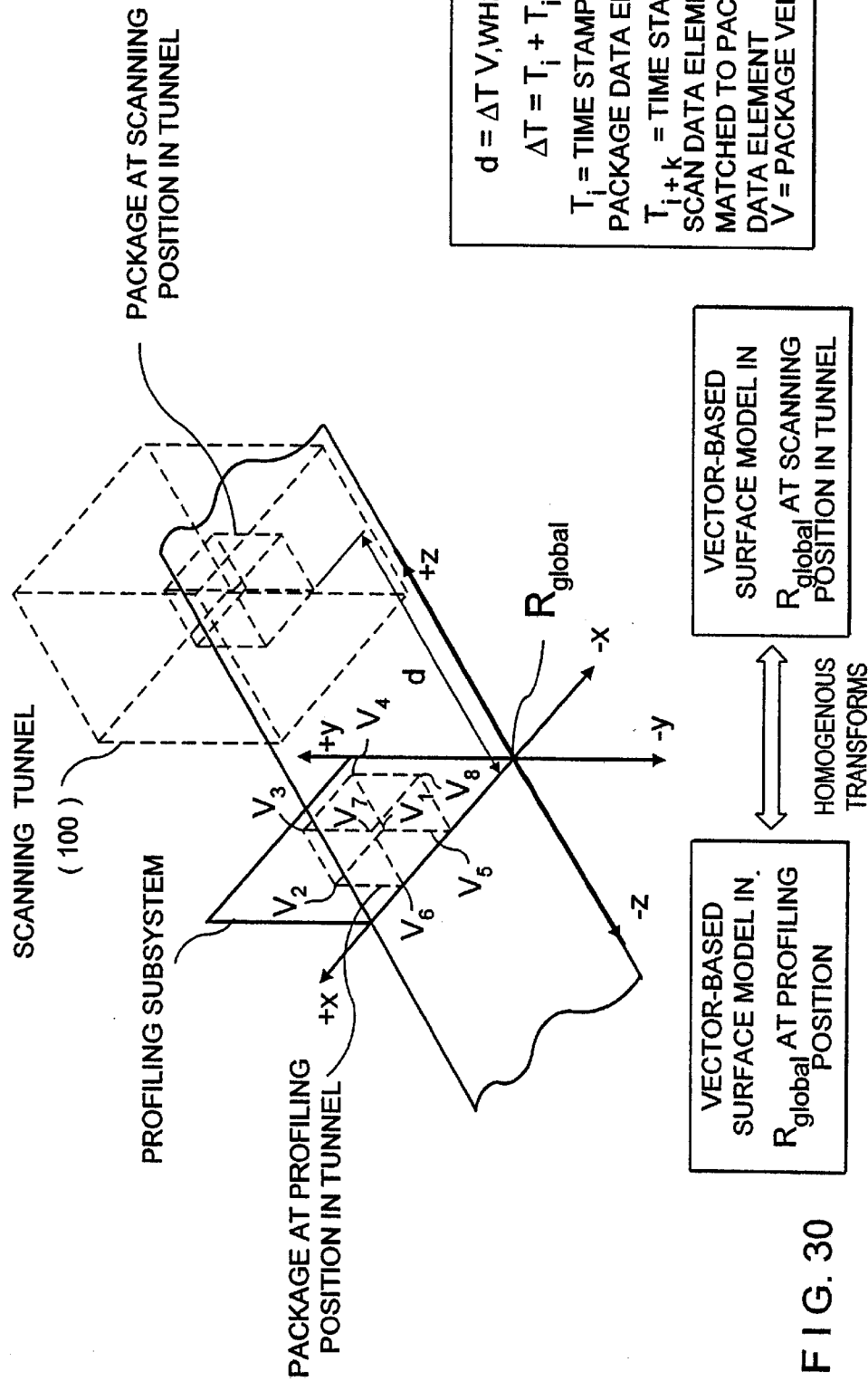
FIG. 30 is a schematic representation graphically illustrating how a vector-based package surface model created within the global coordinate reference frame $R_{global}$ at the "package profiling position" can be converted into a corresponding vector-based package surface model created within the global scanner coordinate reference frame $R_{global}$ at the "scanning position" within the tunnel using homogeneous transformations, and how the package travel distance (d) between the package profiling and scanning positions is computed using the package velocity (v) and the difference in time indicated by the time stamps placed on the package data element and scan beam data element matched thereto during each scan beam/package surface intersection determination carried out within the data element queuing, handling and processing subsystem of FIGS. 22 and 22A.

FIG. 30 describes how the homogeneous (HG) transformation module 1100A of FIG. 22 uses homogeneous transformations to convert a vector-based package surface model specified within the global coordinate reference frame $R_{global}$ at the "package profiling position", into a corresponding vector-based package surface model created within the global coordinate reference frame $R_{global}$ specified at the "scanning position" within the tunnel scanning system. This mathematical technique is essential in that it converts locally-referenced coordinates used to represent a package surface into globally-referenced coordinates used to represent the same package surface. Notably, this method of coordinate conversion involves computing the package travel distance (z=d) between the package profiling and scanning positions using (1) the package or conveyor belt velocity (v) and the difference in time (i.e. ΔT=T1−T2) indicated by the time stamps (T1 and T2) placed on the package data element and scan beam data element, respectively, matched thereto during each scan beam/package surface intersection determination carried out within module 1012A in the data element queuing, handling and processing subsystem 1000 of FIGS. 22 and 22A. Notably, this package displacement distance z=d between the profiling and scanning positions is given by the mathematical expression d=v ΔT.

Figure 31A:
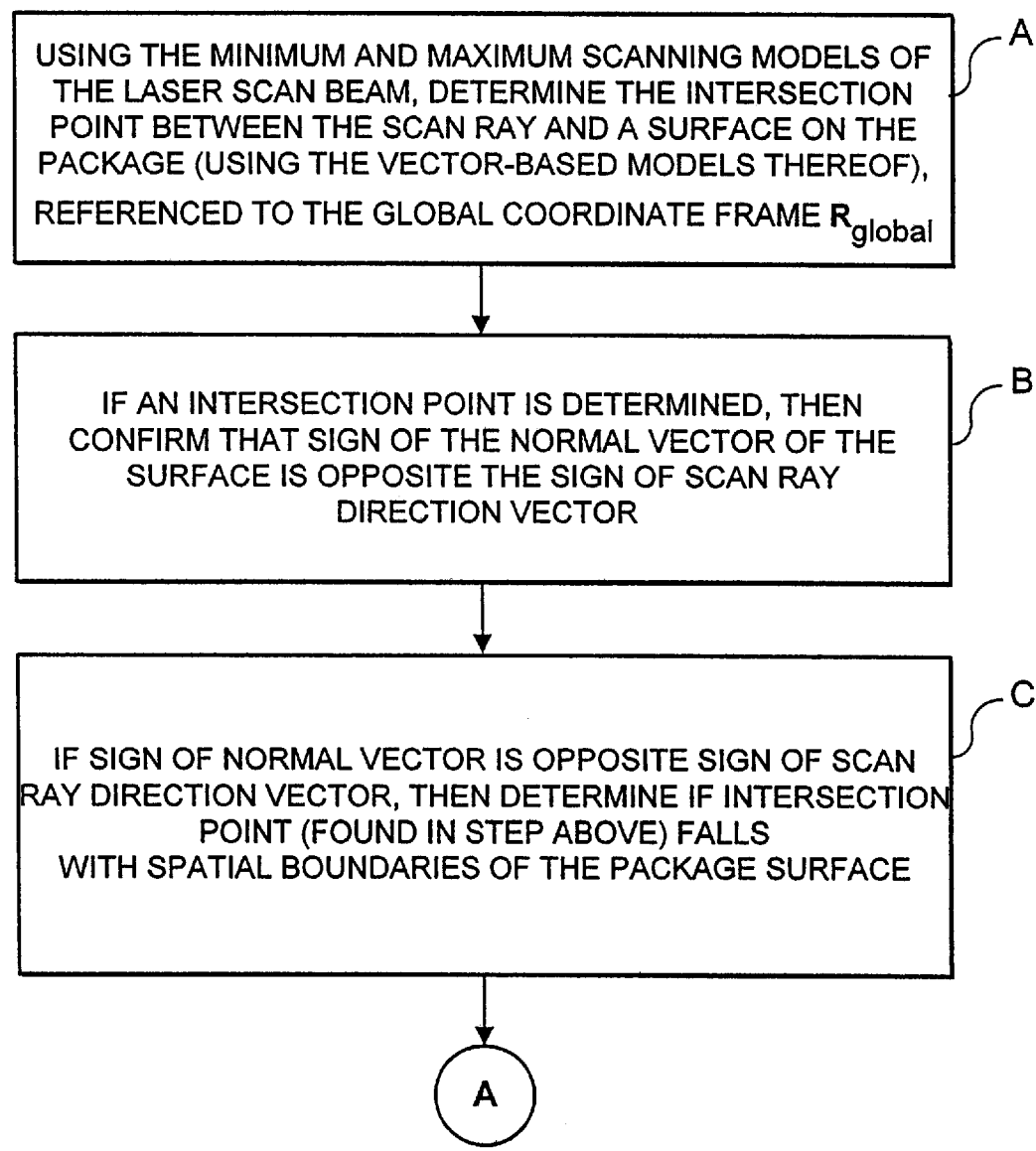
FIGS. 31A and 31B, taken together, provide a procedure for determining whether the scan beam (rays) associated with a particular scan beam data element produced by a holographic scanning subsystem intersects with any surface on the package that has been scanned at a particular scanning position, and thus whether to correlate a particular package identification data element with particular package measurement data element acquired by the system.
Figure 31B:
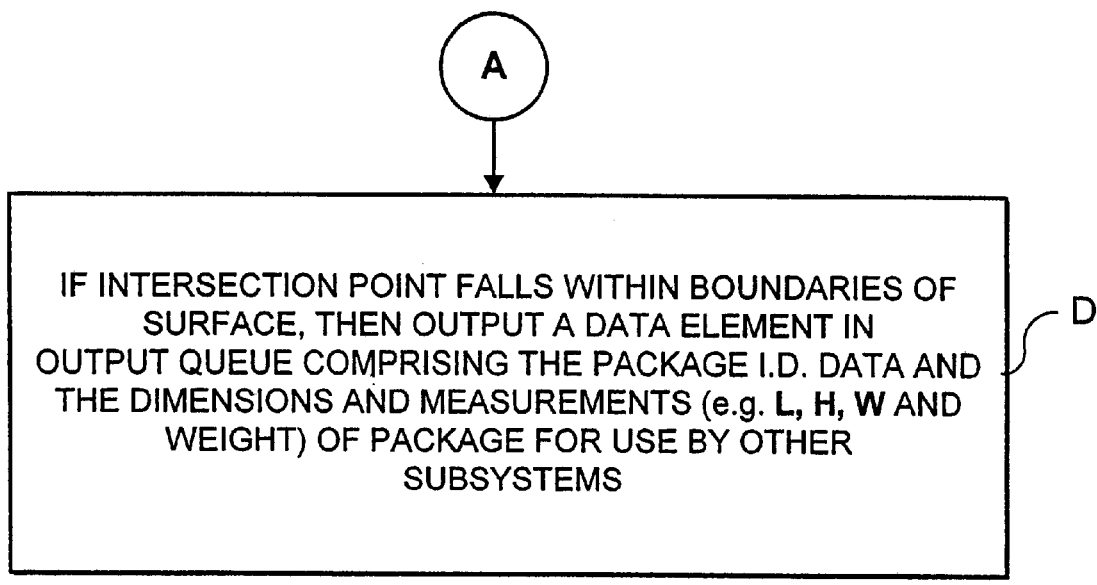

The Scan Beam and Package Surface Intersection Determination Subsystem of the First Illustrative Embodiment of the Present Invention for Use with Scan Beam Data Elements Produced by Holographic Scanning Subsystems FIGS. 31A and 31B, taken together, describes a procedure which is carried out within the scan beam and package surface intersection determination module 1012A of the illustrative embodiment in order to determine whether (i) the scan beam (rays) associated with a particular scan beam data element produced by a holographic scanning subsystem intersects with (ii) any surface on the package that has been scanned at a particular scanning position, and thus whether to correlate a particular package identification data element with particular package measurement data element acquired by the system.

As indicated at Block A in FIG. 31A, the first step of the procedure involves using the minimum and maximum scan rays models of the laser scan beam to determine the intersection point between the scan ray and a surface on the package (using the vector-based models thereof) referenced to the global coordinate reference frame. As indicated at Block B in FIG. 31A, if an intersection point has been determined at Block A, then confirm that the sign of the normal vector of the surface is opposite the sign of the scan ray direction vector. As indicated at Block C in FIG. 31A, if the sign of the normal vector is opposite the sign of the scan ray direction vector, then determine if the intersection point (found at Block A) falls within the spatial boundaries of the package surface. As indicated at Block D in FIG. 31B, if the intersection point falls within the boundaries of the surface, then output a data element to the output queue in the data output subsystem 1013A, wherein the data element comprises package identification data and data representative of the dimensions and measurements of the package by the system for use by other subsystems. When a scan beam data element taken from the system event queue 1004 is correlated with a package data element using the above described method, then the subsystem 1000 outputs a data element (in an output data queue 1013A) containing the package ID data and the package dimensional and measurement data. Such data elements can be displayed graphically, printed out as a list, provided to sorting subsystems, shipping pricing subsystems, routing subsystems and the like.

Figure 32A:
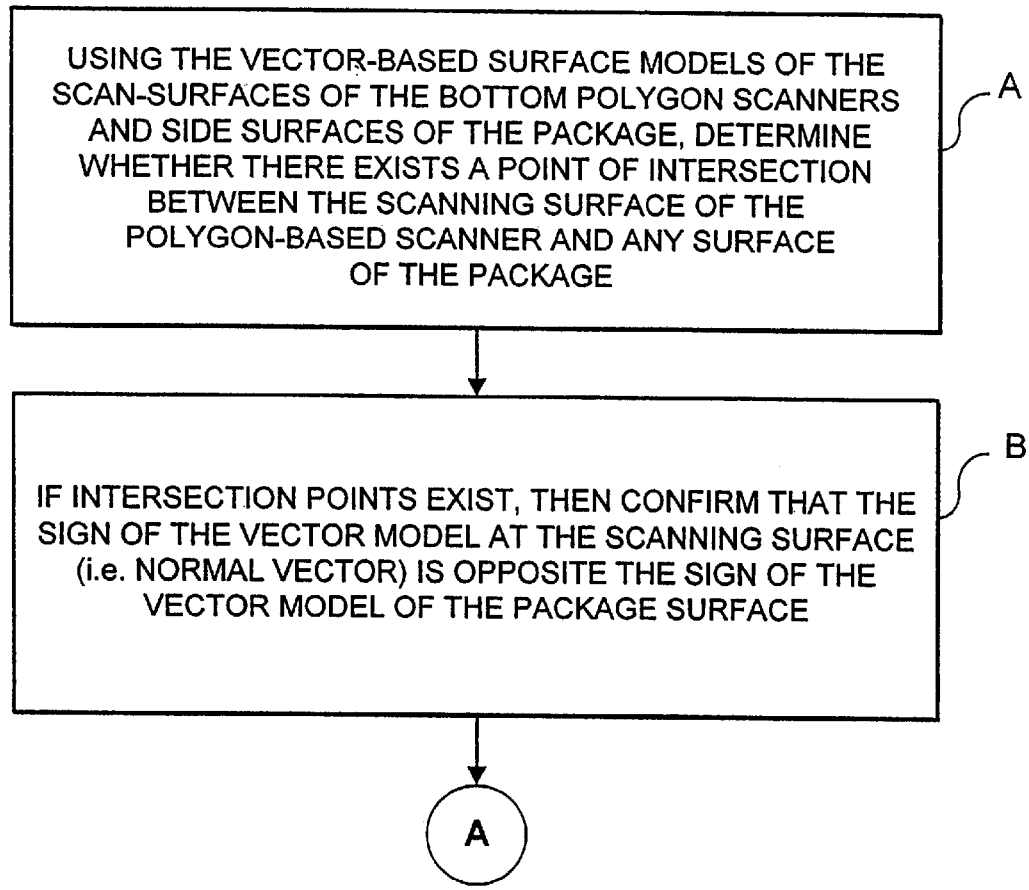
FIGS. 32A and 32B, taken together, provide a procedure for determining whether the scanning surface associated with a particular scan beam data element produced by a non-holographic (e.g. polygon-based) bottom-located scanning subsystem intersects with any surface on the package that has been scanned at a particular scanning position, and thus whether to correlate a particular package identification data element with particular package measurement data element acquired by the system.
Figure 32B:
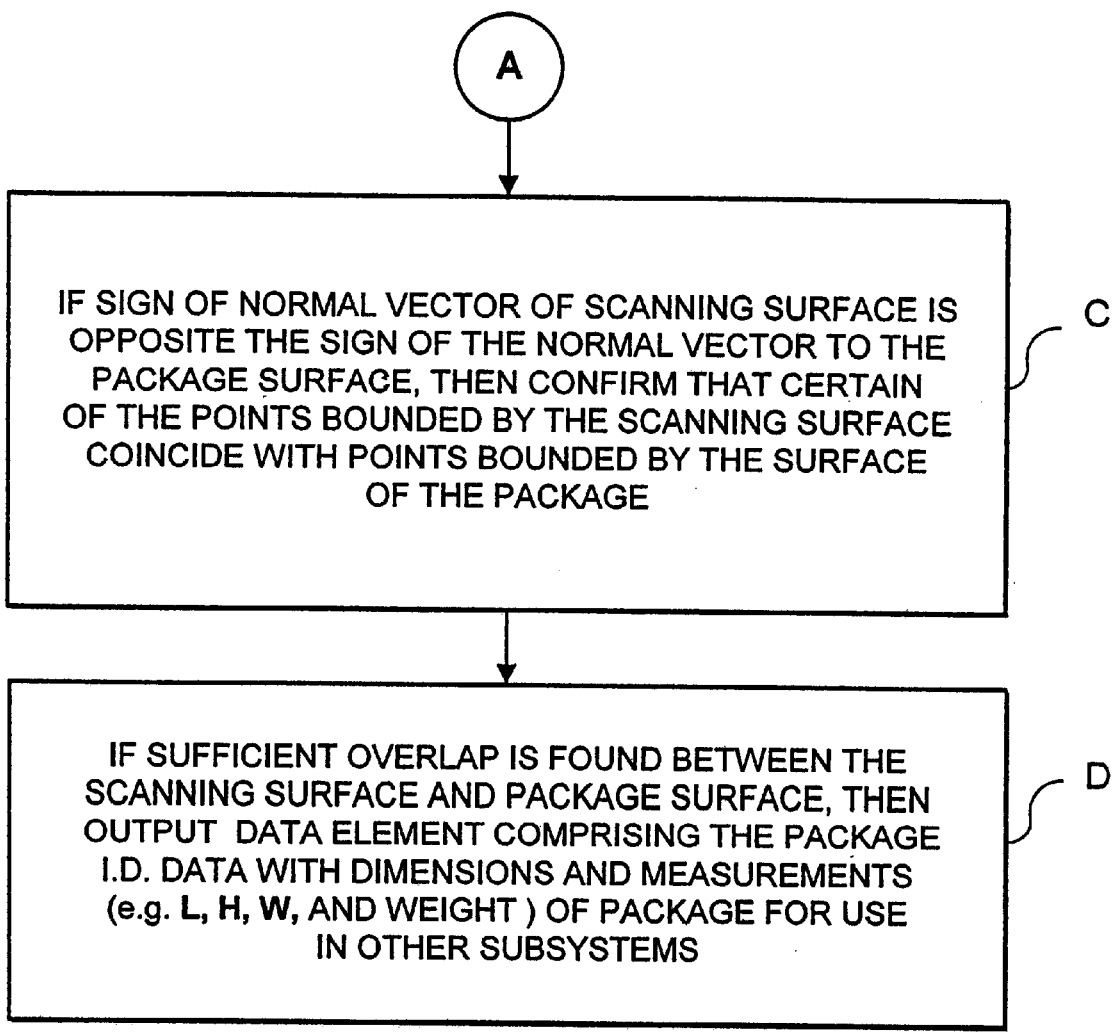

The Scan Surface and Package Surface Intersection Determination Subsystem of the First Illustrative Embodiment of the Present Invention for Use with Scan Beam Data Elements Produced by Non-holographic Scanning Subsystems FIGS. 32A and 32B, taken together, describes a procedure which can be carried out within the scan surface and package surface intersection determination module 1012B of FIG. 22A in order to determine whether the scanning surface associated with a particular scan beam data element produced by a non-holographic (e.g. polygon-based) "bottom-located" scanning subsystem spatially intersects with any surface on the package that has been scanned at a particular scanning position, and thus whether to correlate a particular package identification data element with particular package measurement data element acquired by the system.

As indicated at Block A in FIG. 32A, the first step of the procedure involves using the vector-based surface models of the laser scan surfaces of the bottom polygon scanners and side surfaces of the packages so as to determine whether or not there exists a point of intersection between the scanning surface of the polygon-based scanners and any surface of the package. As indicated at Block B in FIG. 32A, if an intersection point exists, then confirm that the sign of the vector model of the scanning surface (i.e. the normal vector) is opposite the sign of the vector model of the package surface. As indicated at Block C in FIG. 32B, if the sign of the normal vector of the scanning surface is opposite the sign of the normal vector to the package surface, then confirm that certain of the points bounded by the scanning surface coincide with points bounded by the surface of the package. As indicated at Block D in FIG. 32B, if sufficient overlap is found to exist between the scanning surface and the package surface, then output a data element to the output queue in the data output subsystem 1013B, wherein the data element comprises package identification data and data representative of the dimensions and measurements of the package by the system for use by other subsystems. When a scan beam data element taken from the system event queue 1004 is correlated with a package data element using the above described method, then the subsystem 1000 outputs a data element (in an output data queue 1013B) containing the package ID data and the package dimensional and measurement data. Such data elements can be displayed graphically, printed out as a list, provided to sorting subsystems, shipping pricing subsystems, routing subsystems and the like.

Notably, the smaller the facet sectors on the scanning disc, then the better resolution the system hereof will have with regarding to correlating package identification data with package measurement data. As the facet sector gets small, the corresponding minimum and maximum facet angles generated from the decoder device hereof will get closer and closer, approaching a single scanning ray in the ideal situation.

Automated Tunnel-type Laser Scanning Package Identification and Weighing System Constructed According to a Second Illustrated Embodiment of the Present Invention Package Identification and Measurement Referring now to FIGS. 33 through 34, the "dual-lane" automated tunnel-type laser scanning system of the second illustrated embodiment 2000 will now be described in detail. As in the first illustrative embodiment depicted in FIGS. 1 through 32B, the system of the second illustrative embodiment is designed to identify and measure packages that are singulated along a conveyor subsystem in a conventional manner.

Figure 34:
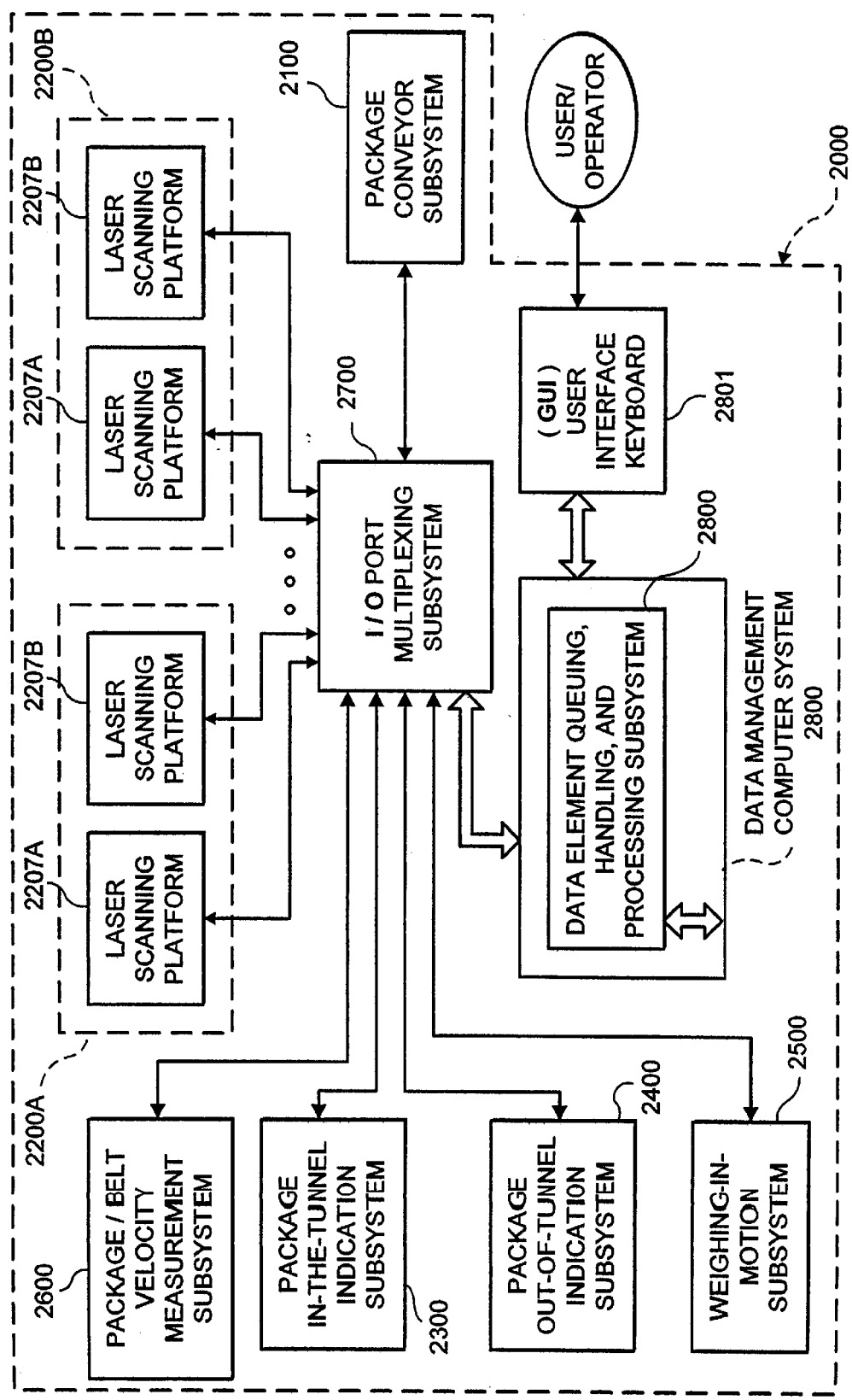
FIG. 34 is a schematic block diagram illustrating the holographic laser scanning subsystems, the package-in-tunnel indication subsystem, the package velocity detection subsystem, the package-out-of-tunnel subsystem, the package weighing-in-motion subsystem, the data-element queuing, handling and processing subsystem, the input/output port multiplexing subsystem, and the conveyor belt control subsystem.

Overview of the Tunnel Scanning System of the Second Illustrative Embodiment of the Present Invention As shown in FIGS. 33 and 34, the automated tunnel scanning system of the second illustrative embodiment indicated by reference numeral 2000 comprises an integration of subsystems, namely: a high-speed package conveyor system 2100 having a conveyor belt 2101 having a width of at least 60 inches to support a pair of package transport lanes along the conveyor belt; a pair of dual-disc holographic laser scanning bar code symbol reading subsystems 2200A and 2200B supported overhead above the conveyor belt 2101 by a support frame 2102 so as to produce a 3-D omnidirectional scanning volume 2103 thereabove, for scanning bar codes 2104 on packages 2105 transported therethrough; a package-in-the-tunnel indication subsystem 2300 realized as a pair of IR-based package detectors 2301A and 2301B directed over the first and second conveyor lanes (CL1 and CL2) 2102A and 2102B of the conveyor belt, respectively, for automatically detecting the presence of packages 2205 moving within lanes of the conveyor belt and into the scanning tunnel; a package-out-of-the-tunnel indication subsystem 2400 realized as a pair of IR-based package detectors 2401A and 2401B directed over the first and second conveyor lanes (CL1 and CL2) 2102A and 2102B of the conveyor belt, respectively, for automatically detecting the presence of packages moving within lanes of the conveyor belt and out of the scanning tunnel; a weighing-in-motion subsystem 2500 for weighing packages as they are transported along the conveyor belt 2101; a package/belt velocity detection subsystem 2600 realized using a roller wheel 2601 engaged against the undersurface of the conveyor belt 2101, an optical shaft incremental encoder 2602 connected to the axle of the roller wheel 2601 and producing an electrical pulse output stream per revolution of the roller wheel, and a programmed microprocessor 2603 for processing the output pulse stream and producing digital data representative of the velocity of the conveyor belt (and thus package transported thereby) at any instant in time; an input/output subsystem 2700 for managing the data inputs to and data outputs from the system of FIG. 33; and a data management computer 2800, with a graphical user interface (GUI) 2701, for realizing a data element queuing, handling and processing subsystem 2900 as shown in FIG. 41, as well as other data and system management functions.

The High-speed Conveyor Belt Subsystem of the Second Illustrative Embodiment As shown in FIGS. 33, the high-speed conveyor belt subsystem 2 100 of the illustrative embodiment comprises: a plurality of rollers 2102 spaced apart and supported by a support frame structure (not shown in FIG. 33); a belt structure 2101, extending between and supported by a belt support structure 2103, and having a width of at least 60 inches to provide a pair of package transport lanes CL1 and CL2 along the conveyor belt subsystem; a drive motor 2104 for imparting torque to the rollers; and a belt velocity controller 2106 for controlling the velocity of the belt and thus packages during system operation.

Figure 35:
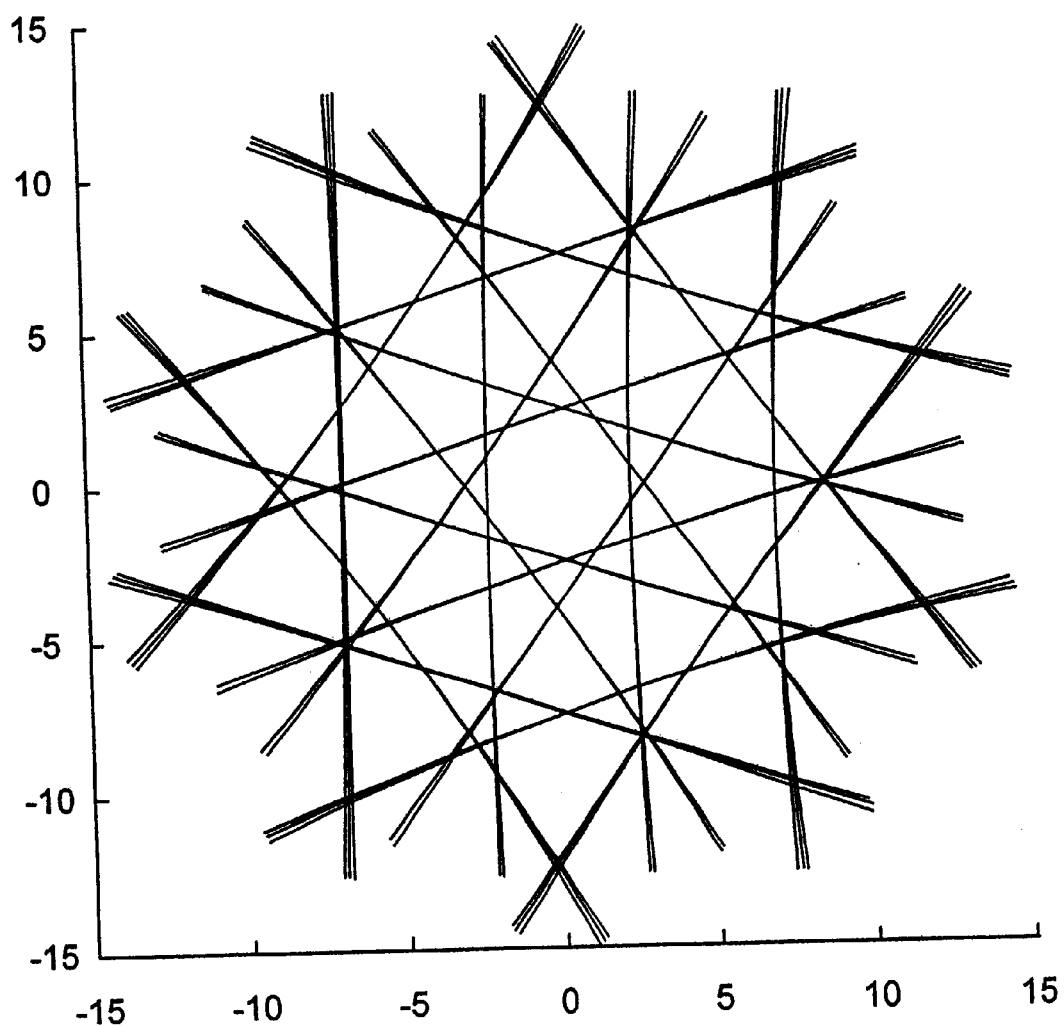
FIG. 35 is a schematic representation of the laser scanning pattern projected from each disc in the dual-disc holographic laser scanning subsystem employed in the tunnel-type scanning system of the second illustrative embodiment of the present invention.

Dual-disc Holographic Laser Scanning Bar Code Symbol Reading Subsystems of the Present Invention As shown in FIG. 33, each dual-disc holographic laser scanning bar code symbol reading subsystem 2200A and 2200B is supported overhead above the conveyor belt 2101 by a support frame 2202. During system operation, each dual-disc holographic laser scanning subsystem 2200A and 2200B produces a 3-D omnidirectional scanning volume 2203 having four focal planes for omnidirectional scanning of bar codes on package transported therethrough. The omnidirectional laser scanning pattern projected from each scanning disc, within a particular focal plane of the scanning volume, is schematically depicted in FIG. 35. The subsystems comprising the scanning tunnel system of FIG. 33 are schematically depicted in FIG. 34.

Figure 39A:
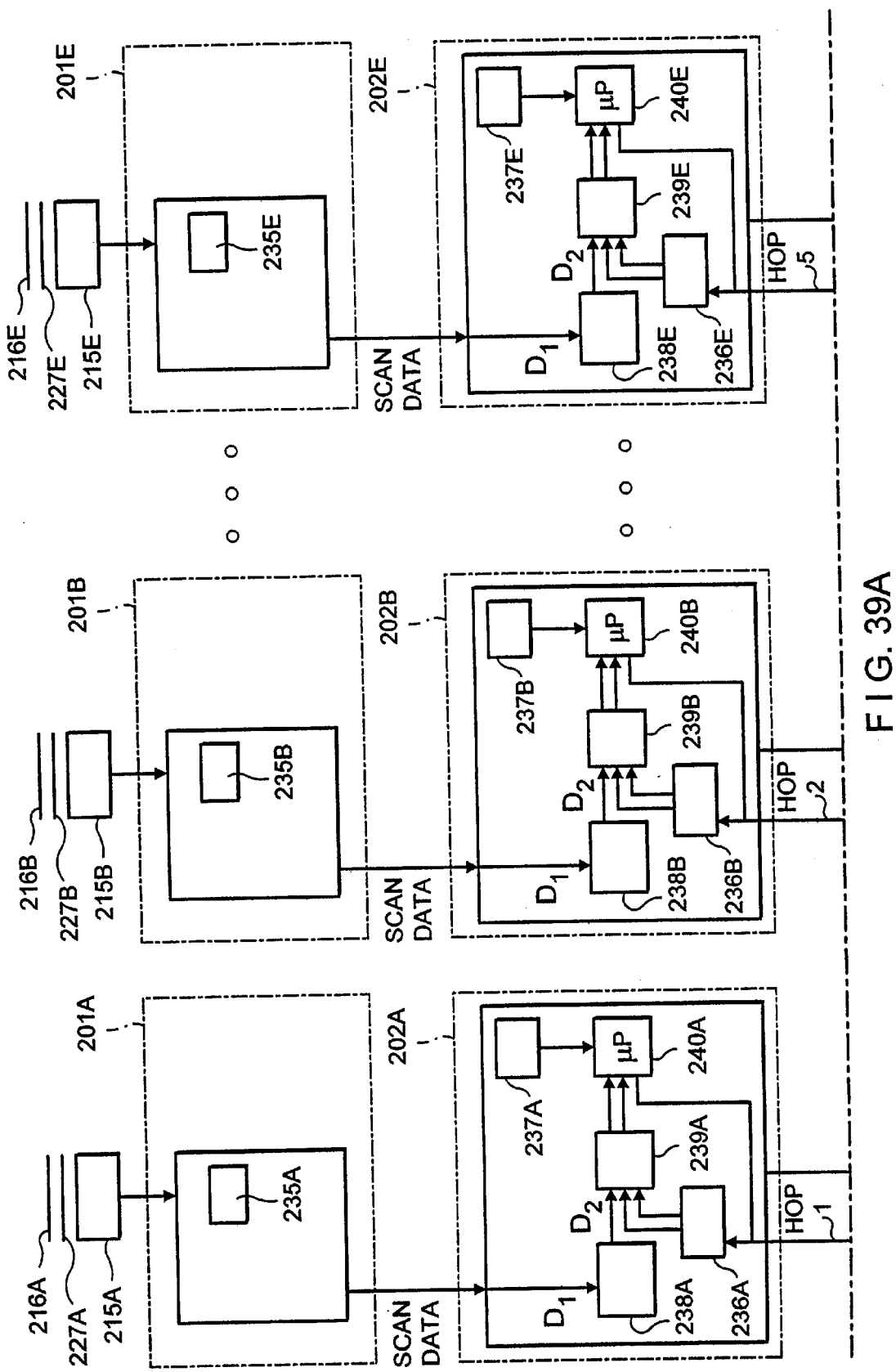
FIGS. 39A through 39C, taken together, show the sub-components configured together on the analog signal processing boards, decode signal processing boards and within the housing of the single-disc holographic laser scanning subsystems of the second illustrative embodiment of the present invention.
Figure 39B:
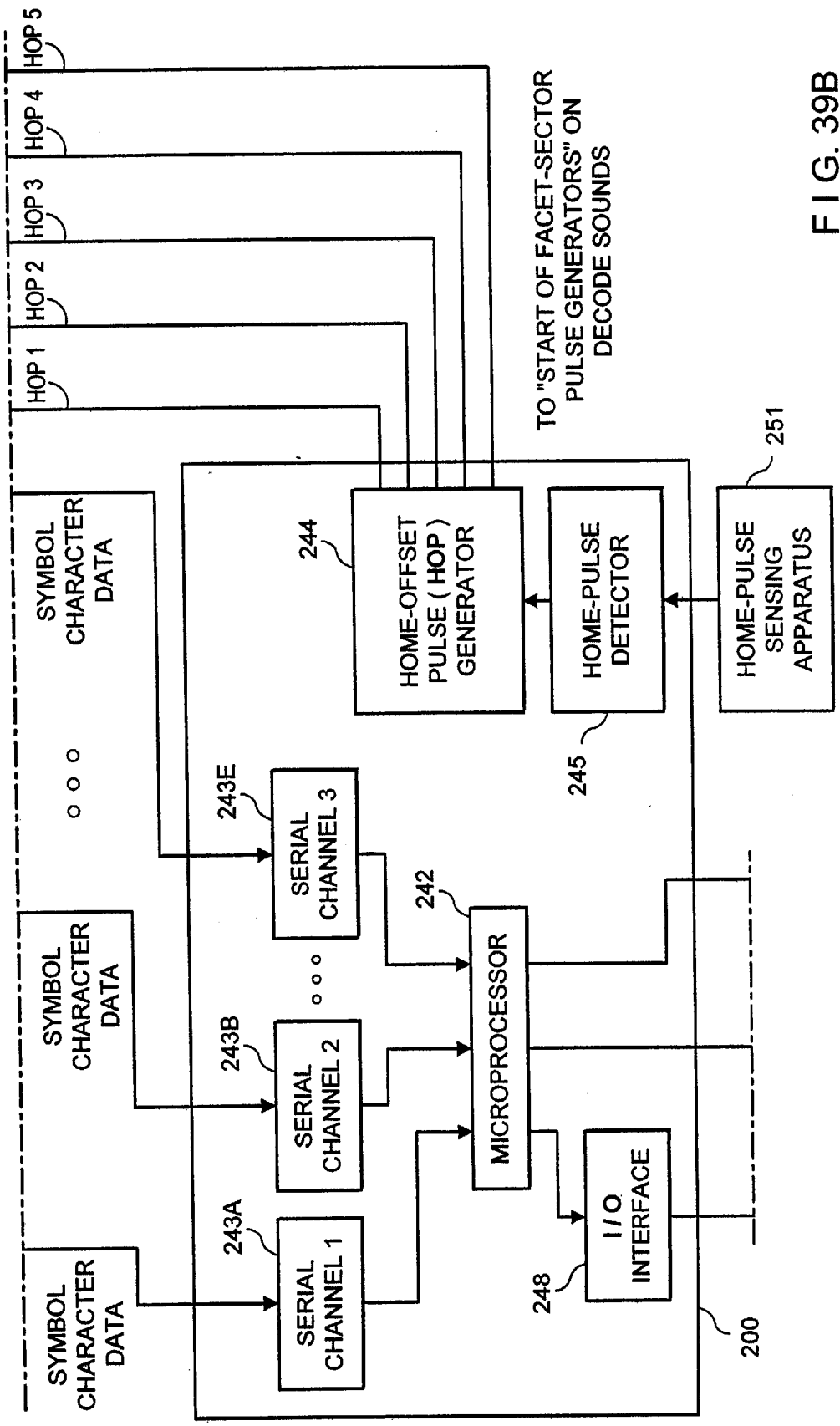
Figure 39C:
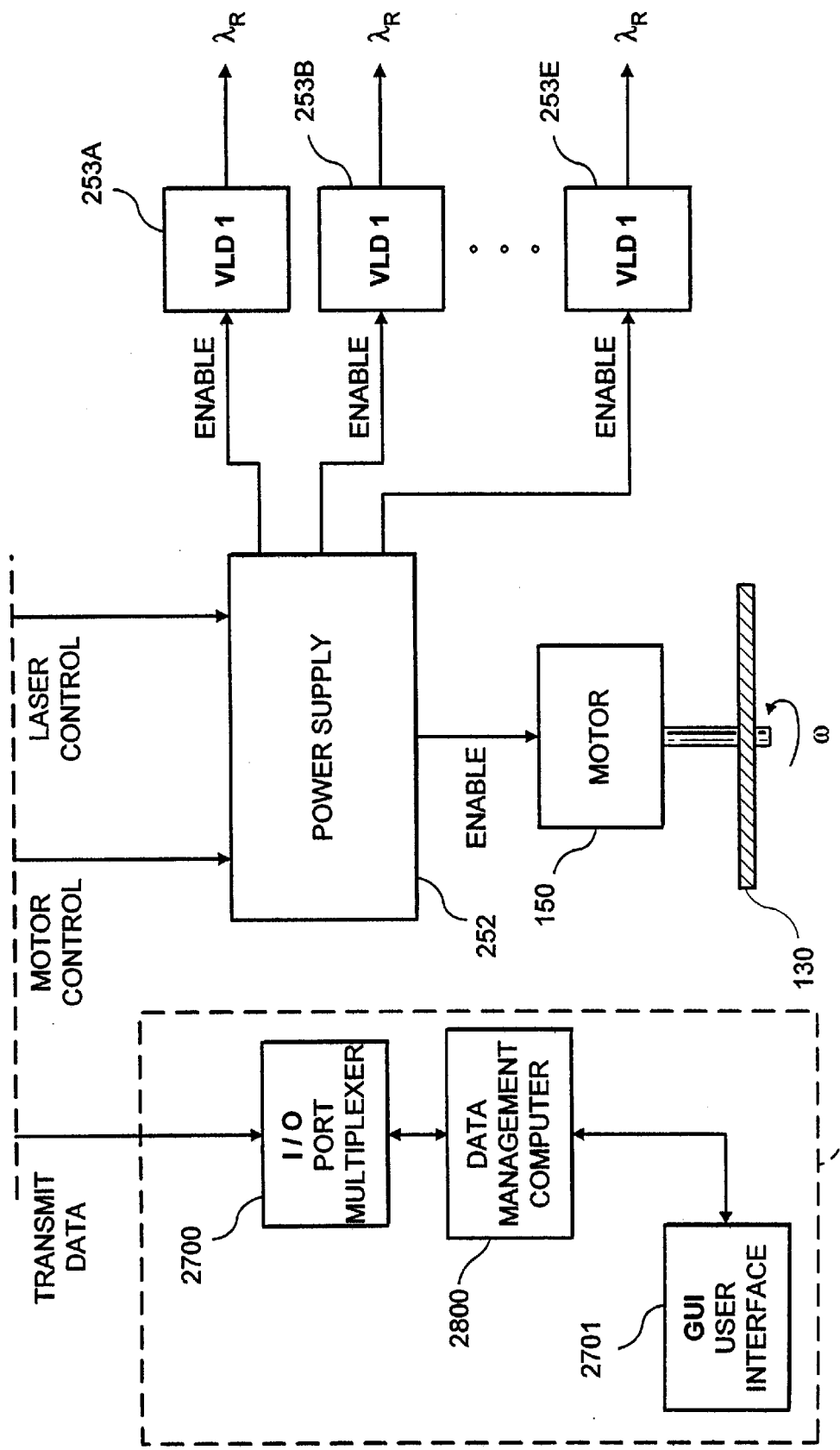

As shown in FIG. 36, each dual-disc holographic laser scanning subsystem 2200A, 2200B comprises a pair of laser scanning platforms 2207A and 2207B, each mounted within a common housing 2208. As shown in FIG. 36, each laser scanning platform 2207A, 2207B in the illustrative embodiment comprises five laser scanning stations 2210A through 2210E arranged about a holographic scanning disc 2211. It is understood, however, that in other embodiments of the present invention, more or less than five scanning stations may be arranged about the scanning disc in various ways as the particular application requires. As shown in FIG. 37, each holographic scanning disc 2211 employed in the laser scanning subsystem of FIG. 36 has sixteen holographic facets, each being realized as transmission-type volume holograms in the illustrative embodiments. As shown in FIGS. 39A through 39C, each single-disc holographic laser scanning platform 2210A through 2210E comprises essentially the same assembly of subcomponents as that depicted in FIGS. 3A7A through 3A7C, described in great detail hereinabove. Preferably, each holographic laser scanning platform employed therein is designed and constructed using the methods detailed in Applicant's copending application Ser. Nos. 08/949,915 filed Oct. 14, 1997; Ser. No. 08/854,832 filed May 12, 1997; Ser. No. 08/886,806 filed Apr. 22, 1997; Ser. No. 08/726,522 filed Oct. 7, 1996; and 08/573,949 filed Dec. 18, 1995, each incorporated herein by reference. The design parameters for the holographic scanning facets on each holographic scanning disc in these subsystems are set forth in the Table of FIG. 38. Notably, the design parameters set forth in the table of FIG. 38 are defined in detail in the above-referenced US Patent Applications.

Package-in-the-tunnel Indication Subsystem of the Second Illustrative Embodiment of the Present Invention The package-in-the-tunnel indication subsystem 2300 depicted in FIGS. 33 and 34 are realized as a pair of IR-based package detectors 2301A and 2301B which are mounted on the edges of the first and second conveyor lanes (CL1 and CL2) 2102A and 2102B of the conveyor belt, respectively. Each IR-based package detector 2301A and 2301B comprises an infared (IR) transmitter 2302 in synchronous operation with an IR receiver 2303, as taught in U.S. Pat. No. 5,789,730 to Rockstein, et al., incorporated herein by reference. The function of each synchronous IR transmitter and receiver 2302 and 2303 is to automatically detect the presence of a package (i.e. object) moving into the scanning tunnel along the conveyor belt lane assigned thereto. Notably, in the illustrative embodiment, where there are dual package conveyor lanes, the IR range of each IR-based package detector is adjusted so that it extends only half the width of the conveyor belt. In alternative single-lane systems, only a single IR-based package detector is required to construct the package-in-the-tunnel indication subsystem 2300, and in such embodiments, the range of the IR-based package detector will extend across the entire length of the conveyor belt., Package-out-the-tunnel Indication Subsystem of the Second Illustrative Embodiment of the Present Invention The package-out-of-the-tunnel indication subsystem 2400 depicted in FIGS. 33 and 34 are also realized as a pair of IR-based package detectors 2401A and 2401B which are mounted on the edges of the first and second conveyor lanes (CL1 and CL2) 2102A and 2102B of the conveyor belt, respectively. Each IR-based package detector 2401A and 2401B comprises an infared (IR) transmitter 2402 in synchronous operation with an IR receiver 2403, as taught in U.S. Pat. No. 5,789,730, supra, incorporated herein by reference. The function of each synchronous IR transmitter and receiver 2402 and 2403 is to automatically detect the presence of a package (i.e. object) moving out of the scanning tunnel along the conveyor belt lane assigned thereto. Notably, in the illustrative embodiment, where there are dual package conveyor lanes, the IR range of each IR-based package detector 2401A and 2401B is adjusted so that it extends only half the width of the conveyor belt. In alternative single-lane systems, only a single IR-based package detector is required to construct the package-out-of-the-tunnel indication subsystem 2400, and in such embodiments, the range of the IR-based package detector will extend across the entire length of the conveyor belt.

Figure 40A:
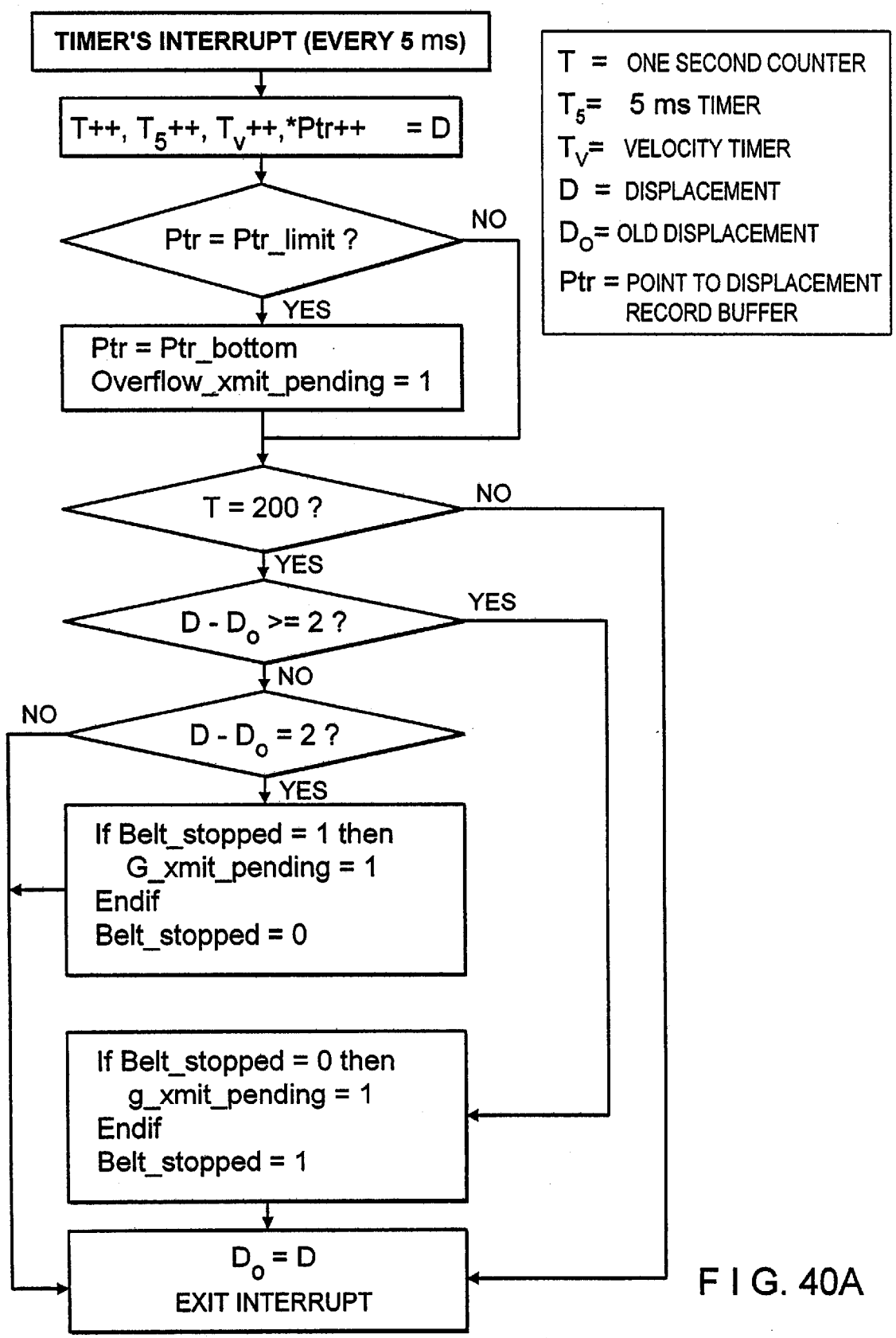
FIGS. 40A through 40C, taken together, sets forth a flow chart describing the computational process used by the conveyor belt velocity detection subsystem of FIG. 33, to compute the velocity of the conveyor belt of the system of the second illustrative embodiment of the present invention.
Figure 40B:
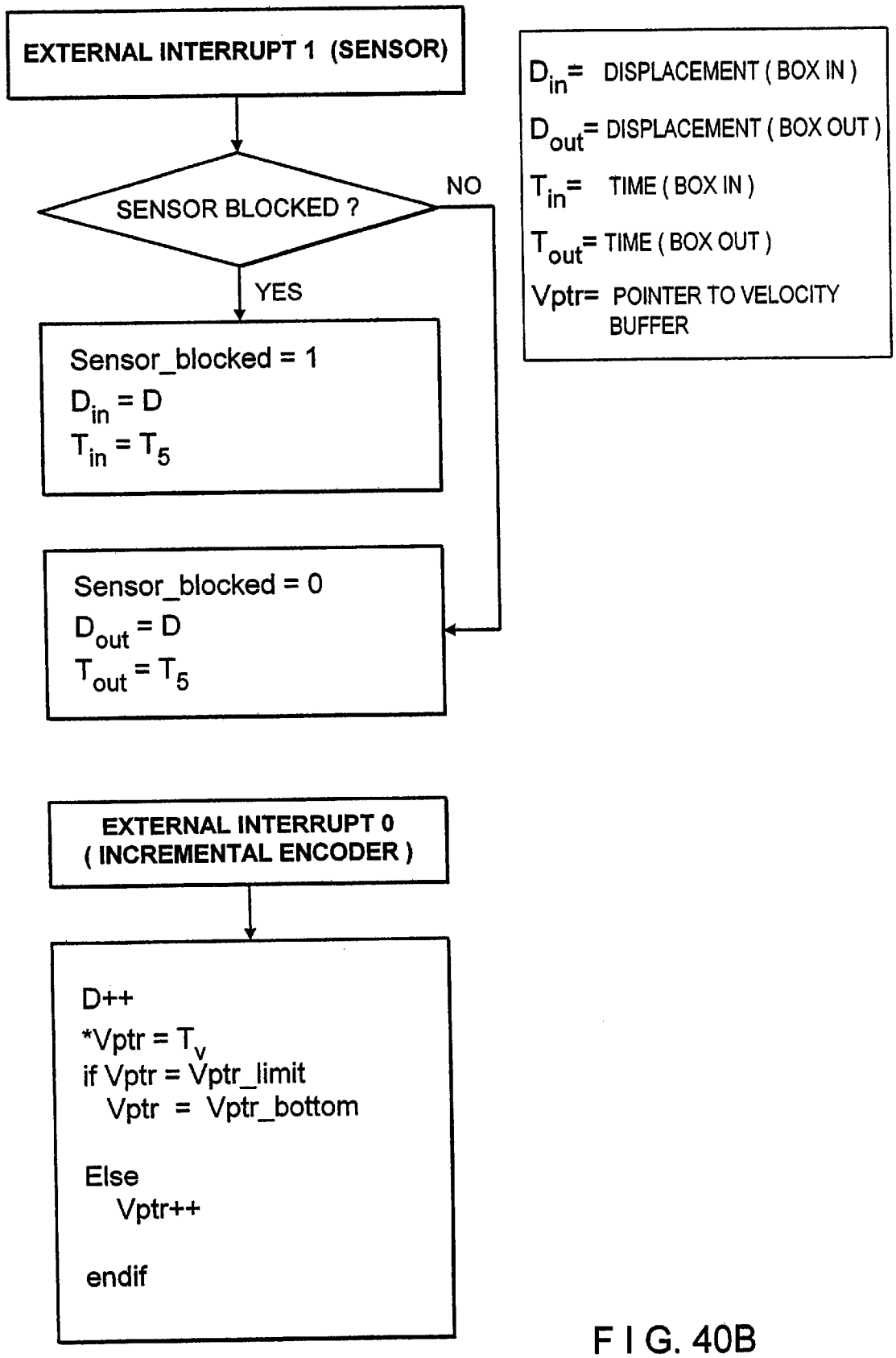
Figure 40C:
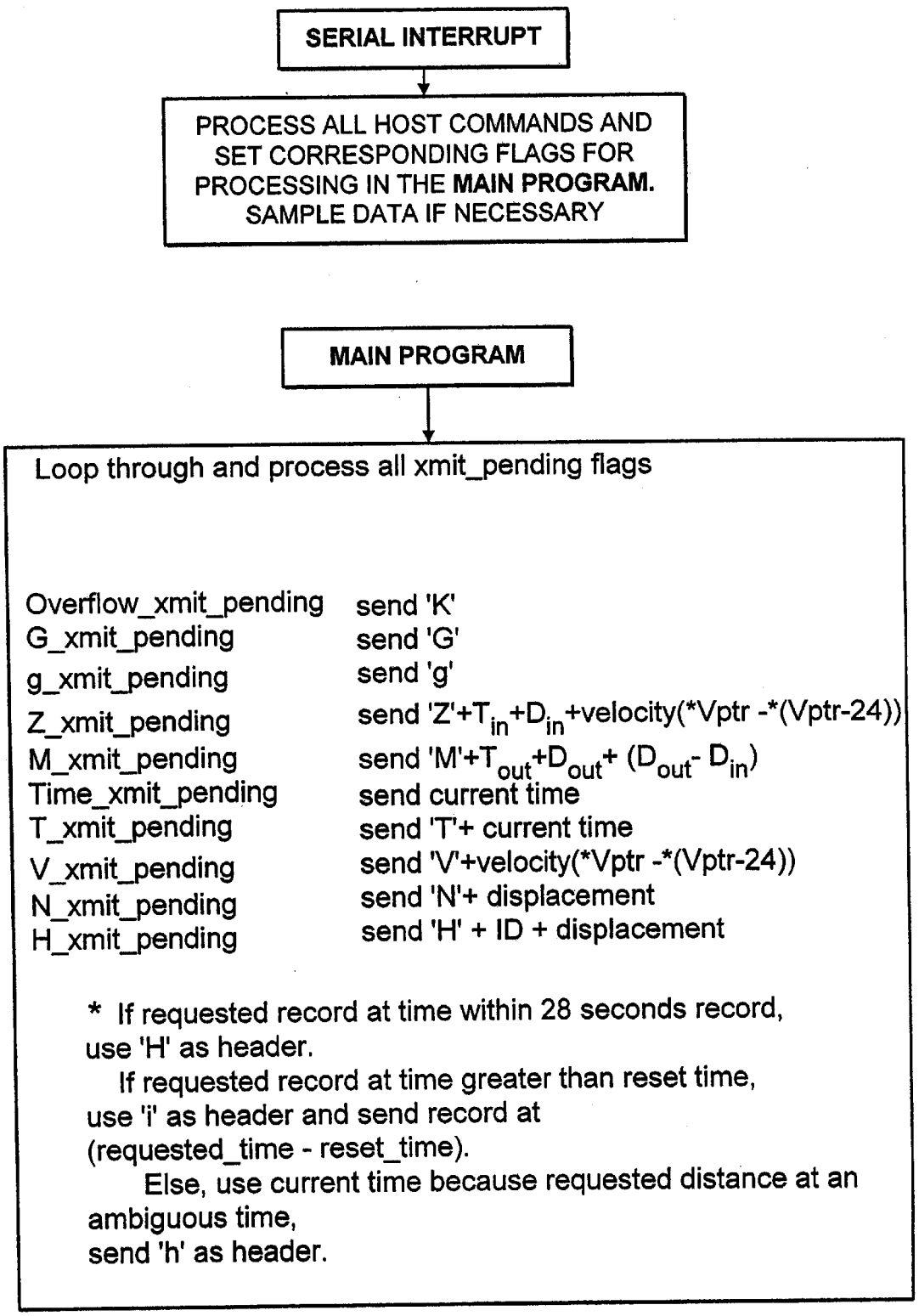

Package/Belt Velocity Detection Subsystem of the Second Illustrative Embodiment of the Present Invention As illustrated in FIG. 33, the package/belt velocity detection subsystem 2600 of the illustrative embodiment is realized engaging a roller wheel 2601 (with a one linear foot circumference) against the undersurface of the conveyor belt 2101 and connecting a Model RG/RJ Optical Shaft Incremental encoder 2602 from PhotoCraft, Inc. of Elbum, Ill., to the axle of the roller wheel 2601. The function of the shaft encoder 2602 is to automatically generate a predetermined number of electrical pulses for each revolution of the roller wheel 2601 in order to indicate that the belt 2101 has undergone one linear foot of travel. These electrical pulses are provided to the high-speed input port of a programmed microprocessor 2603 which count the electrical pulses and generate a digital data element representative of the physical displacement of the conveyor belt, z=A. By timing the displacement of each linear foot of conveyor belt travel, the programmed microprocessor 2603 can calculate the instantaneous velocity of the conveyor belt and produce a digital data element representative thereof for use by the data element queuing, handling and processing subsystem 2800. In the illustrative embodiment, the programmed microprocessor 2603 also carries out the computational process depicted in the flow chart set forth in FIGS. 40A through 40C in order to compute the A instantaneous velocity of the conveyor belt of the system of the second illustrative embodiment of the present invention.

Weighing-in-motion Subsystem of the Second Illustrative Embodiment of the Present Invention As shown in the FIG. 33, the in-motion package weighing subsystem 2500 is preferably arranged about the package in-the-tunnel detection subsystem 2400. As shown, the in-motion weighing subsystem 2500 comprises: a pair of scale platforms 2501A and 2501B mounted along conveyor lanes CL1 and CL2, respectively, and each producing analog or digital weight signals indicative of the weight of a package(s) 2205 moving across the scale platforms 2501A and 2501B; a filtering circuit 2502 for filtering the analog or digital weight signals in order to remove noise components and artifacts therefrom; and a signal processor 2503 for processing the filtered weight signals in order to produce a digital data element representative of the measured weight of the package, for provision to the data element queuing, handling and processing subsystem 2800, via the I/O subsystem 2700. Notably, the in-motion weighing subsystem 2700 of the illustrative embodiment can be realized using the EXPRESSWEIGH™ Model 9480 In-Motion Variable Box and Package Weighing System from Mettler-Toledo, Inc. of Worthington, Ohio.

Input and Output Subsystem of the Second Illustrative Embodiment of the Present Invention In the second illustrative embodiment shown in FIG. 33, the function of the input/output (I/O) subsystem 2700 is to manage the data inputs to and the data outputs from the data management computer system 2800. In the illustrative embodiment, I/O subsystem 2700 can be realized using one or more rack-mounted I/O adapter boxes, such as the RocketPort Series RM16-RJ45 multiport serial controller having sixteen I/O ports, sold by the Comtrol Corporation, of Saint Paul, Minn.

Data Element Oueuing Handling and Processing Subsystem of the Second Illustrative Embodiment of the Present Invention As illustrated in FIG. 34, data management computer 2800 is used to carry out the data element queuing, handling and processing subsystem 2900 in the second illustrative embodiment of the system of the invention. In FIG. 41, the structure and function of data element queuing, handling and processing subsystem 2900 is shown in greater detail.

As shown in FIG. 41, all data elements entering subsystem 2900 are provided to an I/O module 2901 having a plurality of input ports, and an output port which is connected to a data element time-stamping unit 2902 that is controlled by a timing/control unit 2903. In the illustrative embodiment, there are four (4) general types of data elements that might be loaded into the system event queue 2904, realized as a FIFO data structure known in the computing arts: (1) scan beam data elements; (2) package (weight) data elements; (3) package-in-tunnel (PIT) data elements; (4) package out-of-tunnel (POOT) data elements.

As shown in FIG. 41, the data element queuing, handling and processing subsystem 2900 further comprises a number of other modules, namely: a moving package tracking queue 2905 realized as a FIFO data structure known in the computing art, for queuing package (weight) data elements, package-in-tunnel (PIT) data elements, and package out-of-tunnel (POOT) data elements; and a data element analyzer 2906 (e.g. programmed microprocessor and associated memory structures) for reading the different types of data elements from the output of the system event queue 2904 and analyzing and handling the same according to the Data Element Handling Rules set forth in FIGS. 42A and 42B.

As shown in FIG. 41, scan beam data elements generated from the holographic laser scanning subsystems 2200A and 2200B are processed using a number of data processing modules, namely: a data element combining module 2907 for combining (i) each scan beam data element generated from holographic laser scanning subsystems 2200A and 2200B and accessed from the system event queue 2904 with (ii) each and every package data element in the moving package tracking queue 2905 so as to produce a plurality of combined data element pairs; a package location region (geometrical) modeling module 2908 for generating a vector-based (geometrical) model for the package location region indicated by the package data element in each combined data element pair produced by the data element combining module 2907; a scan beam geometry modeling module 2909 for generating a geometrical model for the laser scanning beam indicated by the scan beam data element in each combined data element pair produced by the data element combining module 2909; a homogeneous transformation (HG) module 2910 for transforming (i.e. converting) the coordinates of each scanning beam geometry model referenced to the local frame of reference (symbolically embedded within the holographic laser scanning system) into scanning beam geometry model coordinates referenced to the global coordinate reference $R_{global}$ at the "scanning position" within the scanning tunnel; a scan beam and package location region intersection determination module 2911 for determining, for each combined data element pair produced from the data element combining module, whether the globally-referenced scan beam model produced by the HG transformation module 2910 intersects with the globally-referenced package location region model produced by the package location region modeling module 2908, and if so, then the data output subsystem 2912 produces, as output, package identification data and package weight data for use by auxiliary systems associated with the tunnel scanning system of the second illustrative embodiment of the present invention.

Having described the overall structure and function of the data element queuing, handling and processing subsystem 2910 it is appropriate at this juncture to now briefly describe the operation thereof with reference to FIG. 41.

Prior to loading into the system event queue 2904 each data element is time-stamped (i.e. $T_j$) by the time-stamping module 2902 driven by a master clock within timing/control unit 2903 referenced to the global reference frame $R_{global}$. All data elements in the system event queue 2904 are handled by a data element analyzer/handler 2906 whose operation is governed by the Data Element Handling Rules set forth in the table of FIGS. 42A and 42B. In general, the data element queuing, handling and processing subsystem 2900 is best realized by an computing platform having a multi-tasking operating system (e.g. UNIX) capable of handling multiple "threads" at the same time.

Each package moving through the scanning tunnel shown in FIG. 33 will be represented by a data element (i.e. an object in an object-oriented programming environment e.g. Java programming environment) stored in the moving package tracking queue 2905. Package data elements are placed in the moving package tracking queue 2905 and matched with each scan beam data element accessed from the system event queue 2904 using the data element combining module 2906. Scan beam data elements generated from holographic-based scanning units 2200A and 2200B are processed along the scan data processing channel illustrated by blocks 2908, 2909, 2910 and 2911 set forth in FIG. 41.

The Package Location Region Modeling Subsystem of the Present Invention

As shown in FIG. 43, for each package scanned within the tunnel scanning subsystem, a vector-based model of the package location region is created by the package location region modeling subsystem (i.e. module) 2920 deployed with the data element queuing, handling and processing subsystem 2900 of FIG. 41. Notably, in the illustrative embodiment of FIG. 33, the "package location region" at the point of scanning within the tunnel is the subject matter of the modeling subsystem 2908, rather than the geometry of the package itself as was the case in the system of the first illustrative embodiment shown in FIG. 1 through 32B. This is because the dimensions of the package are not determined in this illustrative embodiment, as they were in the first illustrative embodiment of the system of the present invention shown in FIG. 33. In the second illustrative embodiment, each package location region 2920 is mathematically represented (i.e. modeled) using a set of vectors (referenced to x=0, y=0, z=0) in the global reference frame $R_{global}$. The flow chart of FIGS. 44A and 44B describes a preferred modeling procedure for creating a vector-based model of the package location region at the point of package scanning within the tunnel scanning subsystem of FIG. 33.

As indicated at Block A in FIG. 44A, the first step in the modeling procedure involves determining whether the detected package is located in the first conveyor lane (CL1) or the second conveyor lane (CL2). As indicated at Block B in FIG. 44A, the second step uses (i) the time stamp (Tj) placed on the package data element associated with the detected package, and (ii) the time stamp (Tj+k) placed on the scan beam data element matched to the package data element by the data element combining module 2907.

As indicated at Block B in FIG. 44A, the above-identified time stamps (Tj) and (Tj+k) are used to compute the distance "d" traveled by the package using the following formula: d=$\Delta$T V, where $\Delta$T=(Tj+k)−(Tj), and v=package velocity determined by the package/belt velocity detection subsystem 2600. As indicated at Block C in FIG. 44A, if the detected package resides in the first conveyor lane (CL1), then the subsystem assigns thereto a "package location region" model specified by the vector model: $0 \leq x \leq W/2$; $0 \leq y$; $d-\Delta d \leq z \leq d+\Delta d$ in the global reference system, wherein $\Delta d$ is the prespecified focal zone depth associated with the laser scanning beam scanning the package at its scanning position at time (Tj+k).

As indicated at Block D in FIG. 44B, if the detected package resides in the second conveyor lane (CL2), then the subsystem assigns thereto a package location region model specified by the vector model: $W/2 \leq x \leq W$; $0 \leq y$; $d-\Delta d \leq z \leq d+\Delta d$ in the global reference system, wherein $\Delta d$ is the prespecified focal zone depth associated with the laser beam scanning the package at its scanning position at time (Tj+k).

The Scan Beam Geometry Modeling Subsystem of the Second Illustrative Embodiment of the Present Invention In the tunnel scanning system of FIG. 33, the scan beam geometry modeling subsystem (i.e. module) depicted in FIGS. 25A through 26 is employed in the subsystem 2909 shown in FIG. 41. Thus, the function of the scan beam geometry modeling subsystem (i.e. module) 2909 of FIG. 41 is to create a vector-based model for the propagation of the laser scanning beam (ray) (i) emanating from a particular point on the facet, (ii) to its point of reflection on the corresponding beam folding mirror, and (iii) towards to the focal plane determined by the focal length of the facet. This modeling method is similar to the method illustrated in FIGS. 25B1 through 26 and described hereinabove, and therefore will not be repeated to avoid obfuscation of the present invention.

The Homogeneous (HG) Transformation Module of the Present Invention

FIG. 45 schematically describes how the homogeneous (HG) transformation module 2910 of FIG. 41 uses homogeneous transformations to convert a vector-based "scanning beam" model referenced to a local scanner coordinate reference frame $R_{localscannerj}$ into a corresponding vector-based "scanning beam" model referenced to the global scanner coordinate reference frame $R_{global}$ symbolically embedded within the system of FIG. 33. This mathematical technique is essential in that it converts locally-referenced coordinates used to represent the laser beam (which scanned a bar code symbol) into globally-referenced coordinates used to represent the same laser scanning beam. Notably, this method of coordinate conversion involves computing the package travel distance (zed) between (i) the package detection position at which time stamp (Tj) is applied to the PIT data element, and (ii) the package scanning position at which time stamp (Tj+k) is applied to the scan beam data element. In the illustrative embodiment, this computation involves using (i) the package or conveyor belt velocity (v), and (ii) the difference in time (i.e. $\Delta T=(Tj+k)-(Tj)$) indicated by the time stamps (Tj+k) and (Tj) placed on the scan beam data element and package data element, respectively, matched thereto during each scan beam/package location region intersection determination carried out within module 2911. Notably, this package displacement distance z=d, defined between the package detection and scanning positions, is given by the mathematical expression d=v $\Delta T$.

The Scan Beam and Package-scanning Region Intersection Determination Subsystem of the Second Illustrative Embodiment of the Present Invention for Use with Scan Beam Data Elements Produced by Holographic Scanning Subsystems The procedure carried out within the scan beam and package location region intersection determination module 2911 of FIG. 41 is shown in FIG. 46. In general, the function of this computational module is to determine whether (i) the scan beam (rays) associated with a particular scan beam data element produced by a holographic scanning subsystem intersects with (ii) the package location region that has been modeled at a particular scanning position (i.e. specified by laser beam position information associated with the corresponding scan beam data element). If so, the module 2910 correlates the particular scan beam data element (i.e. package identification data element) with the package measurement data element corresponding to the modeled package location position.

As indicated at Block A in FIG. 46, the first step of the procedure involves using the minimum and maximum scan rays models of the laser scan beam (i.e. specified by the minimum and maximum facet scan angles) to determine the zone of coordinates about and within the focal planes of such scan rays models, expressed as: $x_{min} \pm \Delta x$; $y_{min} \pm \Delta y$; $z_{min} \pm \Delta z$; and $x_{max} \pm \Delta x$; $y_{max} \pm \Delta y$; $z_{max} \pm \Delta z$.

As indicated at Block B in FIG. 46, the next step of the method involves determining whether or not the zone of coordinates about and within the focal planes of the minimum and maximum scan rays fall within the spatial boundaries of the computed package location region within ether the first or second conveyor lane of the system. If the scan rays fall within the zone of coordinates specified at Block A then, at Block C in FIG. 46, the method involves outputting a data element in the output queue comprising the package identification data (and weight measurement data if taken) for use by other ancillary subsystems operably connected to the system. In general, such data elements can be displayed graphically, printed out as a list, provided to sorting subsystems, shipping pricing subsystems, routing subsystems and the like. If the scan rays do not fall within the zone of coordinates specified at Block A then, the method involves not outputting any data element in the output queue.

Automated Tunnel-type Laser Scanning Package Identification and Weighing System Constructed According to a Third Illustrated Embodiment of the Present Invention Referring now to FIGS. 47 through 57B the automated laser scanning package identification and measurement system of the third illustrated embodiment 3000 will now be described in detail. In contrast with the capabilities of the systems of the first and second illustrative embodiments detailed above, the system of the third embodiment is capable of detecting, measuring, identifying and tracking multiple packages along the conveyor belt, regardless of their orientation or arrangement (e.g. stacked side-by-side and/or overlapping arrangements). As such, this novel system design, by incorporating many of the functionalities of the systems of the first and second illustrative embodiments, while providing several additional functionalities, enables simultaneous measurement and identification of non-singulated packages during transport along a high-speed conveyor subsystem so that auxiliary subsystems, operably connected to the tunnel-based system, can determine its safety and suitability for transport to its place of destination, and/or along its planned shipment route, with no human intervention.

Overview of the Tunnel Scanning System of the Third Illustrative Embodiment of the Present Invention As shown in FIGS. 47 and 48, the automated simultaneous package detecting, dimensioning and identifying system of the third illustrative embodiment is indicated by reference numeral 3000 and comprises an integration of subsystems, namely: a high-speed package conveyor system 3100 having a conveyor belt 3101 having a width of at least 30 inches to support one or more package transport lanes along the conveyor belt; a tunnel or similar arrangement of bar code symbol readers 3200 including, in the illustrative embodiment, holographic and non-holographic (e.g. polygonal) laser scanning bar code symbol reading subsystems 3201A through 3201R supported overhead, alongside, and below the conveyor belt 3101 by a support frame 3202, for generating a 3-D "six-axis" type omnidirectional scanning volume 3203 thereabove, as depicted in FIGS. 5A through 9B, for scanning bar codes 3205 on packages 3204 transported therethrough; a first simultaneous multiple-package detection and dimensioning subsystem 3300 arranged on the input side of the tunnel scanning subsystem 3200, and including, in the illustrative embodiment, a laser-based scanning mechanism 3301A for generating an amplitude modulated laser beam 3302 that is repeatedly scanned across the width-wise dimension of the scanning tunnel while oriented in direction substantially perpendicular to the surface of the conveyor belt, as shown in FIG. 51A and producing data representative of the height profile of packages entering the scanning tunnel, and processing the same to automatically detect the presence of each package moving along the conveyor belt and into the scanning. tunnel, and generate a data element (i.e. data object) indicative thereof; a master clock 3400 for generating a global time reference used in connection with the time stamping of data elements generated within the system; a second simultaneous multiple-package detection and dimensioning subsystem 3500 arranged on the output side of the tunnel scanning subsystem 3200, and including, in the illustrative embodiment, a laser-based scanning mechanism 3301 for generating an amplitude modulated laser beam 3302 that is repeatedly scanned across the width-wise dimension of the scanning tunnel while oriented in direction substantially perpendicular to the surface of the conveyor belt and producing data representative of the height profile of packages exiting the scanning tunnel and processing the same to automatically detect the presence of each package moving along the conveyor belt and out of the scanning tunnel, and generate a data element (i.e. data object) indicative thereof; a weighing-in-motion subsystem 3700, installed beneath the first simultaneous multiple-package detection and dimensioning subsystem 3500, along the conveyor belt structure, for weighing packages as they are transported therealong; a package/belt velocity detection subsystem 3800 realized using a roller wheel 3801 engaged against the undersurface of the conveyor belt 3101, an optical shaft incremental encoder 3802 connected to the axle of the roller wheel 3801 and producing an electrical pulse output stream per revolution of the roller wheel, and a programmed microprocessor 3803 for processing the output pulse stream and producing digital data representative of the velocity of the conveyor belt (and thus package transported thereby) at any instant in time; an input/output subsystem 3900 for managing the data inputs to and data outputs from the system of FIG. 33; and a data management computer 3925, with a graphical user interface (GUI) 3926, for realizing a data element queuing, handling and processing subsystem 3950 as shown in FIGS. 49 and 49A, as well as other data and system management functions.

The High-speed Conveyor Belt Subsystem of the Third Illustrative Embodiment

As shown in FIG. 47, the high-speed conveyor belt subsystem 3100 of the third illustrative embodiment comprises: a plurality of rollers 3102 spaced apart and supported by support frame structure (not shown in FIG. 33); a belt structure 3101, extending between and supported by a belt support structure 3103, and having a width of at least 30 inches to provide one or more package transport lanes along the conveyor belt subsystem; a drive motor 3104 for imparting torque to the rollers; and a belt velocity controller 3105 for controlling the velocity of the belt and thus packages during system operation.

First Simultaneous Multiple-package Detection and Dimensioning Subsystem of the Third Illustrative Embodiment of the Present Invention As shown in FIG. 49, the first simultaneous multiple-package detection and dimensioning subsystem 3300 of the illustrative embodiment is arranged on the input side of the tunnel scanning subsystem 3200, and comprises: a laser scanning unit 3301, mounted above the conveyor belt as shown in FIG. 49, and adapted for scanning the upwardly-facing surfaces of packages moving along the conveyor belt, using an amplitude modulated (AM) laser beam that is repeatedly swept across the entire width dimension thereof while oriented in substantially perpendicular manner to the surface thereof, and generating an array of package height profile data $\{H_{n;i}\}$ where $n=0,1,2,\ldots,N-1$ is the sampling index (i.e. position) along the widthwise dimension of the conveyor, and is the sampling time index $i=0,1,2,\ldots,I$ indicative of when each array of height profile data $\{H_{n;i}\}$ is collected from the packages arranged on the conveyor belt using the laser scanning mechanism 3301; a height profile date queue 3302 for queuing height profile data elements $\{H_{n;i}\}$ for subsequent use and analysis; a data controller 3303 for transferring each linear array of height profile data $\{H_{n;i}\}$ to the height profile data queue 3302; a timing-stamping unit 3304, controlled by the master clock 3400 in FIG. 48, for generating time stamps $T_i$ to be symbolically linked to height profile data elements $\{H_{n;i}\}$ and the sub-elements thereof by way of the data controller 3302; a plurality of moving package tracking queues (FIFOs) 3305A through 3305D, each corresponding to different spatial location above the conveyor belt and adapted for buffering "data objects" representative of detected packages and their various attributes, in an object-oriented programming environment (e.g. a Java programming environment); a height profile data analyzer 3306 for removing a height profile data element $\{H_{n;i}\}$ from the output port of the height profile data queue 3302, and writing the same to the input port of one of the moving package tracking queues 3305A through 3305D, as well as removing one or more data objects (representative of detected/tracked packages) from the output ports of one or more moving package tracking queues 3305A through 3305D and writing the same to the input port of the I/O unit 3951A shown in FIG. 51. Collectively, subcomponents 3302 through 3306 form the height profile data processor 3307 of the first simultaneous multiple-package detection and dimensioning subsystem 3300.

As shown in FIG. 49C, the laser beam scanning mechanism 3301 of the illustrative embodiment comprises: at least one visible laser diode VLD 3340 for producing a low power visible laser beam 3341; an amplitude modulation (AM) circuit 3342 for modulating the amplitude of the visible laser beam produced from the VLD at a frequency $f_0$; an opto-mechanical; an electro-optical or an acousto-optical mechanism 3343 for sweeping the modulated laser beam across a conveyor belt or like transport structure and collecting the reflected light from the scanned packages moving therealong; an optical detector 3344 for converting received optical signal 3341' into an electrical signal 3341"; an amplifier and filter circuit 3345 for isolating the $f_0$ signal component and amplifying it; a phase detector 3346 for mixing the reference $f_0$ signal component from the AM circuit 3342 and the received $f_0$ signal component reflected from the packages and producing a resulting signal which is equal to a DC voltage proportional to the Cosine of the phase difference between the reference and the reflected $f_0$ signals; an amplifier circuit 3347 for amplifying the phase difference signal; an A/D converter 3348 for converting the DC voltage into digital data element representative of the distance to a point on the surface of the scanned package moving along the conveyor belt (i.e. height profile of the scanned packages; and a sampling circuit 3349 for sampling the digital data elements so as to produce, at each sampling instant $T_i$, an array of N package height profile data elements $\{H_{n;i}\}$ taken along $n=N$ equally spaced sampling positions (i.e. locations) along the width of the conveyor belt.

Notably, the CLC-based laser beam steering mechanisms disclosed is Published International Patent Application No. WO 95/24671 entitled "Electromagnetic Beam Scanning Arrays and Electro-Optical Image Display Systems Incorporating The Same" by Reveo, Inc., incorporated herein by reference, can be used to electronically sweep the amplitude modulated laser beam cross the width of the conveyor belt in an electronically controlled manner. This WIPO Patent Application Publication teaches how to construct laser beam steering and scanning devices utilizing beam steering cells having transmission and reflecting characteristics which are dependent upon the wavelength and polarization state of incident laser beams. Each beam steering cell includes a cholesteric liquid crystal material and an electrically-controlled variable half-wave retarder. Depending on whether or not the retarder is actuated, the laser beam is ether diverted along another orthogonal path or remains along the original path.

Alternatively, the laser beam scanning unit 3301 may be realized using the Cargoscan™ Model CS5900 Arm by Cargoscan, Inc., a Mettler Toledo Company. Notably, this laser based height measuring device is based on teachings disclosed in U.S. Pat. Nos. 5,742,068 and 5,528,517, each being incorporated herein by reference. In other embodiments, the laser beam scanning unit 3301 may be replaced with a stereoscopic camera subsystem in which stereoscopic-image pairs are captured from packages along the conveyor belt, and processed to determine the vertices of the imaged packages as well as the length, height and width dimensions thereof measured relative to a local coordinate referenced symbolically embedded in the stereoscopic camera subsystem.

In order to simultaneously detect and measure multiple packages arranged in ether a stacked, side-by-side and/or hybrid configuration while moving through the multiple-package detection and dimensioning subsystem 3300, a novel data processing structure is provided within the height profile data analyzer 3306 shown in FIG. 49. As shown in FIG. 49A, the data processing structure of the illustrative embodiment comprises: a package height/run-length difference engine 3309 for processing, as input, each height profile data array $\{H_{n;i}\}$ of length N provided to its data input ports at sampling time $T_i$, and producing as output a height/width profile difference data array $\{\Delta H_{n,n-1,i}\}$ of length N–1 indicative of package height profile changes between position n and n–1 at sampling time $T_i$ with respect to the widthwise dimension of the conveyor belt; a package height/width difference engine 3309 for processing, as input, time-consecutive height profile data arrays $\{H_{n;i}\}$ and $\{H_{n;i+1}\}$ each of length N, and producing as output a height profile difference data array $\{\Delta H_{n;i,i-1}\}$ of length N–1, indicative of package height profile changes at sampling position n over sampling times $T_i$ and $T_{i-1}$ with respect to the run-lengthwise dimension of the conveyor belt; and a height profile data analyzer 3310 for processing, as input, each height/width profile difference data array $\{\Delta H_{n,n-1,i}\}$ and height/run-length difference data array $\{\Delta H_{n,n-1,i}\}$ produced by the difference engines 3308 and 3309, and producing as output, time-stamped PIT data elements as well as time-stamped Package Dimension Data Elements (PDEs) for buffering in moving package tracking queues 3305A through 3305D, shown in FIG. 49.

In the illustrative embodiment of FIG. 49A, the package height/run-length difference engine 3308 comprises: a first data array buffering unit 3311 having N input data ports and N output data ports, and adapted for buffering the height profile data array $\{H_{n;i}\}$ captured from the conveyor belt at sampling time $T_i$, where n=0,1,2, . . . ,N–2,N–1; a second data array buffering unit 3312 having N input data ports and N output data ports, and adapted for buffering the height profile data array $\{H_{n;i}\}$ captured from the conveyor belt at sampling time $T_{i-1}$, where n=0,1,2, . . . ,N–2,N–1; a height data array differentiator unit 3313 for comparing time-consecutive height profile data arrays $\{H_{n;i}\}$ and $\{H_{n;i+1}\}$ captured at sampling times $T_i$ and $T_{i-1}$ at sampling position n along the run-lengthwise dimension of the conveyor belt, and producing as output a height profile difference data array $\{\Delta H_{n;i,i-1}\}$ of length N–1, indicative of package height profile changes at sampling position n over sampling times $T_i$ and $T_{i-1}$ with respect to the run-lengthwise dimension of the conveyor belt; a third data array buffering unit 3314 having N–1 input data ports and N–1 output data ports, and adapted for buffering the height profile difference data array $\{\Delta H_{n;i,i-1}\}$ of length N–1 produced from the height data array differentiator unit 3313, prior to transfer as input to the height profile data analyzer 3310. As shown in FIG. 49A, the operation of units 3311, 3312, 3313 and 3314 are each controlled by the height profile data analyzer 3310 which, in the preferred embodiment, is realized as a programmed microprocessor provided with a memory hierarchy for high-speed performance.

In the illustrative embodiment of FIG. 49A, the package height/width difference engine 3309 comprises: a first data array buffering unit 3315 having N input data ports and N output data ports, and adapted for buffering the height profile data array $\{H_{n;i}\}$ captured from the conveyor belt at sampling time $T_i$, where n=0,1,2, . . . ,N–2,N–1; an array of N–1 height data differentiation units 3316A through 3316C for comparing spatially-contiguous height profile data samples $H_{n;i}$ and $H_{n-1;i}$ captured at sampling time $T_i$ over sampling positions n and n–1, respectively, along the widthwise dimension of the conveyor belt, and producing as output a height profile difference data array $\{H_{n,n-1;i}\}$ of length N–1, indicative of package height profile changes between sampling positions n and n–1 at sampling time $T_i$ with respect to the widthwise dimension of the conveyor belt; a second data array buffering unit 3317 having N–1 input data ports and N–1 output data ports, and adapted for buffering the height profile difference data array $\{H_{n,n-1,i}\}$ produced from the array of height sample differentiator units 3316A through 3316C, prior to transfer as input to the height profile data analyzer 3310. As shown, the operation of units 3315, 3316A, 3316B, 3316C and 3317 are each controlled by the height profile data analyzer 3310 described above.

As shown in FIG. 49A, the height profile data analyzer 3310 receives, as input, height profile difference data arrays $\{\Delta H_{n,n-1;i}\}$ and $\{\Delta H_{n;i,i-1}\}$ which are buffered and analyzed in order to automatically carry out the following functions in a programmed manner, namely: (1) detecting singulated, stacked and/or side-by-side configurations of packages on the conveyor belt about the enter the scanning tunnel and, for each detected package thereabout, generating one package-in-the-tunnel (PIT) data element (or token) and attaching thereto, a time-stamp ($T_i$) obtained from the underlying height profile data utilized in the package detection process; (2) obtaining (i.e. computing) accurate height, width and/or length dimension measurements for each detected package, and attaching thereto, a time-stamped obtained from the underlying height profile data utilized in the package measurement process; (3) loading each time-stamped PIT data element into the spatially correct moving package tracking queue 3305A through 3305D shown in FIG. 49, based on dimensional data obtained for the corresponding package, so as to create a unique trackable "data object" therefor within the multiple-package detection and dimensioning subsystem 3300; (4) loading time-stamped package dimension data elements (PDEs) into the spatially correct moving package tracking queue 3305A through 3305D shown in FIG. 49, in order to link the same with and becoming an attribute of the corresponding package (i.e. object) in the moving package tracking queue; (5) transferring each data object in each moving package queue 3305A through 3305D, into its corresponding moving package queues 3954A, 3954B, 3954C, or 3954D maintained in the data element queuing, handling and processing subsystem 3950 shown in FIG. 51; and (6) resetting (i.e. flushing) the moving package tracking queues 3305A through 3305D each time the height data profile analyzer 3310 determines that one or more packages on the conveyor belt, arranged in a stacked and/or side-by-side configuration, appear in a singulated configuration with respect to a downstream arrangement of packages.

As shown in FIG. 49B, the height profile data analyzer 3310 of the illustrative embodiment of the present invention employs six different types of data processing rules (i.e. expressed in the IF x, THEN y format) in order to carry out the six above-described functions. As illustrated in FIG. 49B, these data processing rules can be categorized in the following six classes: (1) Package Detection Rules; (2) Package Measurement Rules; (3) Add Package Object To Queue Rules; (4) Add Package Attributes To Queue Rules; (5) Remove Package Object From Queue Rules; and (6) Reset Package Tracking Queue Rules. It is understood that there are many different ways to analyze the package height profile data elements and implement the six above-described functions. Having the benefit of the present disclosure, one with ordinary skill in the art can write these rules in a straight-forward manner so that the above-described function of the height profile data analyzer 3310 are realized.

Second Simultaneous Multiple-package Detection and Dimensioning Subsystem of the Third Illustrative Embodiment of the Present Invention As shown in FIG. 50, the second simultaneous multiple-package detection and dimensioning subsystem 3500 of the illustrative embodiment is arranged on the output side of the tunnel scanning subsystem 3200, and comprises: a laser scanning unit 3501, mounted above the conveyor belt as shown in FIG. 49, and adapted for scanning the upwardly-facing surfaces of packages moving along the conveyor belt, using an amplitude modulated (AM) laser beam that is repeatedly sweep across the entire width dimension thereof while oriented in substantially perpendicular manner to the surface thereof, and generating an array of package height profile data $\{H_{n;i}\}$ where n=0,1,2, . . . ,N−1 is the sampling position (i.e. index) along the widthwise dimension of the conveyor, and i is the sampling time index i=0,1,2, . . . ,I indicative of when each array of height profile data $\{H_{n;i}\}$ is collected from the packages arranged on the conveyor belt using the laser scanning mechanism 3501; a height profile date queue 3502 for queuing height profile data elements $\{H_{n;i}\}$ for subsequent use and analysis; a data controller 3503 for transferring each linear array of height profile data $\{H_{n;i}\}$ to the height profile data queue 3502; a timing-stamping unit 3504, controlled by the master clock 3400 in FIG. 48, for generating time stamps $T_i$ to be symbolically linked to height profile data elements $\{H_{n;i}\}$ and the sub-elements thereof by way of the data controller 3502; a plurality of moving package tracking queues (FIFOs) 3505A through 3505D, each corresponding to different spatial location above the conveyor belt and adapted for buffering "data objects" representative of detected packages and their various attributes, in an object-oriented programming environment (e.g. a Java programming environment); a height profile data analyzer 3506 for removing a height profile data element $\{H_{n;i}\}$ from the output port of the height profile data queue 3502, and writing the same to the input port of one of the moving package tracking queues 3505A through 3505D, as well as removing one or more data objects (representative of detected/tracked packages) from the output ports of one or more moving package tracking queues 3505A through 3505D and writing the same to the input port of the I/O unit 3951A shown in FIG. 51. Collectively, subcomponents 3502 through 3506 form the height profile data processor 3507 of the first simultaneous multiple-package detection and dimensioning subsystem 3500.

As shown in FIG. 50C, the laser beam scanning mechanism 3501 of the illustrative embodiment comprises: at least one visible laser diode VLD 3540 for producing a low power visible laser beam 3541; an amplitude modulation (AM) circuit 3542 for modulating the amplitude of the visible laser beam produced from the VLD at a frequency $f_0$; an opto-mechanical, an electro-optical or an acousto-optical mechanism 3543 for sweeping the modulated laser beam across a conveyor belt or like transport structure and collecting the reflected light from the scanned packages moving thereal-ong; an optical detector 3544 for converting received optical signal 3541' into an electrical signal 3541"; an amplifier and filter circuit 3545 for isolating the $f_0$ signal component and amplifying it; a phase detector 3546 for mixing the reference $f_0$ signal component from the AM circuit 3542 and the received $f_0$ signal component reflected from the packages and producing a resulting signal which is equal to a DC voltage proportional to the Cosine of the phase difference between the reference and the reflected $f_0$ signals; an amplifier circuit 3547 for amplifying the phase difference signal; an A/D converter 3548 for converting the DC voltage into digital data element representative of the distance to a point on the surface of the scanned package moving along the conveyor belt (i.e. height profile of the scanned packages; and a sampling circuit 3549 for sampling the digital data elements so as to produce, at each sampling instant $T_i$, an array of N package height profile data elements $\{H_{n;i}\}$ taken along n=N equally spaced sampling positions (i.e. locations) along the width of the conveyor belt. Notably, the CLC-based laser beam steering mechanisms disclosed is Published International Pat. No. WO 95/24671 entitled "Electromagnetic Beam Scanning Arrays and Electro-Optical Image Display Systems Incorporating The Same" by Reveo, Inc., can be used to electronically sweep the amplitude modulated laser beam cross the width of the conveyor belt in an electronically controlled manner.

Alternatively, the laser beam scanning unit 3501 may be realized using the Cargoscan™ Model CS5900 Arm by Cargoscan, Inc., a Mettler Toledo Company. Notably, this laser based height measuring device is based on teachings disclosed in U.S. Pat. No. 5,742,068 and 5,528,517, each being incorporated herein by reference.

In order to simultaneously detect and measure multiple packages arranged in ether a stacked, side-by-side and/or hybrid configuration while moving through the multiple-package detection and dimensioning subsystem 3500, the novel data processing structure employed in the height profile data processor 3507 in the height profile data analyzer 3306 shown in FIG. 49, is also provided in the height profile data processor 3507 shown in FIG. 50. As shown in FIG. 50A, the data processing structure of the illustrative embodiment comprises: a package height/run-length difference engine 3509 for processing, as input, each height profile data array $\{H_{n;i}\}$ of length N provided to its data input ports at sampling time $T_i$, and producing as output a height/width profile difference data array $\{\Delta H_{n,n-1,i}\}$ of length N−1 indicative of package height profile changes between position n and n−1 at sampling time $T_i$ with respect to the widthwise dimension of the conveyor belt; a package height/width difference engine 3509 for processing, as input, time-consecutive height profile data arrays $\{H_{n;i}\}$ and $\{H_{n;i+1}\}$ each of length N, and producing as output a height profile difference data array $\{\Delta H_{n;i,i-1}\}$ of length N−1, indicative of package height profile changes at sampling position n over sampling times $T_i$ and $T_{i-1}$ with respect to the run-lengthwise dimension of the conveyor belt; and a height profile data analyzer 3510 for processing, as input, each height/width profile difference data array $\{\Delta H_{n,n-1,i}\}$ and height/run-length difference data array $\{\Delta H_{n,n-1,i}\}$ produced by the difference engines 3508 and 3509, and producing as output, time-stamped PIT data elements as well as time stamped Package Dimension Data Elements (PDEs) for buffering in moving package tracking queues 3505A through 3505D, shown in FIG. 50.

In the illustrative embodiment of FIG. 50A, the package height/run-length difference engine 3508 comprises: a first data array buffering unit 3511 having N input data ports and N output data ports, and adapted for buffering the height profile data array $\{H_{n;i}\}$ captured from the conveyor belt at sampling time $T_i$, where n=0,1,2, . . . ,N−2,N−1; a second data array buffering unit 3512 having N input data ports and N output data ports, band adapted for buffering the height profile data array $\{H_{n;i}\}$ captured from the conveyor belt at sampling time $T_{i-1}$, where n=0,1,2, . . . ,N−2,N−1; a height data array differentiator unit 3513 for comparing time-consecutive height profile data arrays $\{H_{n;i}\}$ and $\{H_{n;i+1}\}$ captured at sampling times $T_i$ and $T_{i-1}$ at sampling position n along the run-lengthwise dimension of the conveyor belt, and producing as output a height profile difference data array $\{\Delta H_{n;i,i-1}\}$ of length N−1, indicative of package height profile changes at sampling position n over sampling times $T_i$ and $T_{i-1}$ with respect to the run-lengthwise dimension of the conveyor belt; a third data array buffering unit 3514 having N−1 input data ports and N−1 output data ports, and adapted for buffering the height profile difference data array $\{\Delta H_{n;i,i-1}\}$ of length N−1 produced from the height data array differentiator unit 3513, prior to transfer as input to the height profile data analyzer 3510. As shown in FIG. 50A, the operation of units 3511, 3512, 3513 and 3514 are each controlled by the height profile data analyzer 3510 which, in the preferred embodiment, is realized as a programmed microprocessor provided with a memory hierarchy for high-speed performance.

In the illustrative embodiment of FIG. 50A, the package height/width difference engine 3309 comprises: a first data array buffering unit 3515 having N input data ports and N output data ports, and adapted for buffering the height profile data array $\{H_{n;i}\}$ captured from the conveyor belt at sampling time $T_i$, where n=0,1,2, . . . ,N−2,N−1; an array of N−1 height data differentiation units 3516A through 3516C for comparing spatially-contiguous height profile data samples $H_{n;i}$ and $H_{n-1;i}$ captured at sampling time $T_i$ over sampling positions n and n−1, respectively, along the widthwise dimension of the conveyor belt, and producing as output a height profile difference data array $\{\Delta H_{n,n-1;i}\}$ of length N−1, indicative of package height profile changes between sampling positions n and n−1 at sampling time $T_i$ with respect to the widthwise dimension of the conveyor belt; a second data array buffering unit 3517 having N−1 input data ports and N−1 output data ports, and adapted for buffering the height profile difference data array $\{\Delta H_{n,n-1;i}\}$ produced from the array of height sample differentiator units 3516A through 3516C, prior to transfer as input to the height profile data analyzer 3510. As shown, the operation of units 3515, 3516A, 3516B, 3516C and 3517 are each controlled by the height profile data analyzer 3510 described above.

As shown in FIG. 50A, the height profile data analyzer 3510 receives, as input, height profile difference data arrays $\{\Delta H_{n,n-1;i}\}$ and $\{\Delta H_{n;i,i-1}\}$ which are buffered and anyzed in order to automatically carry out the following functions in a programmed manner, namely: (1) detecting singulated, stacked and/or side-by-side configurations of packages on the conveyor belt exiting the scanning tunnel and, for each detected package exiting the same, generating one package-out-of-the-tunnel (POOT) data element (or token) and attaching thereto, a time-stamp ($T_i$) obtained from the underlying height profile data utilized in the package detection process; (2) obtaining (i.e. computing) accurate height, width and/or length dimension measurements for each detected package, and attaching thereto, a time-stamped obtained from the underlying height profile data utilized in the package measurement process; (3) loading each time-stamped POOT data element into the spatially correct moving package tracking queue 3505A through 3505D shown in FIG. 50, based on dimensional data obtained for the corresponding package, so as to create a unique trackable "data object" therefor within the multiple-package detection and dimensioning subsystem 3500; (4) loading time-stamped package dimension data elements (PDEs) into the spatially correct moving package tracking queue 3505A through 3505D shown in FIG. 50, in order to link the same with and becoming an attribute of the corresponding package (i.e. object) in the moving package tracking queue; (5) transferring each data object in each moving package queue 3505A through 3505D, into its corresponding moving package queues 3954A, 3954B, 3954C, or 3954D maintained in the data element queuing, handling and processing subsystem 3950 shown in FIG. 51; and (6) resetting (i.e. flushing) the moving package tracking queues 3505A through 3505D each time the height data profile analyzer 3510 determines that one or more packages on the conveyor belt, arranged in a stacked and/or side-by-side configuration, appear in a singulated configuration with respect to a downstream arrangement of packages.

As shown in FIG. 50B, the height profile data analyzer 3510 of the illustrative embodiment of the present invention employs six different types of data processing rules (i.e. expressed in the IF x, THEN y format) in order to carry out the six above-described functions. As illustrated in FIG. 50B, these data processing rules can be categorized in the following six classes: (1) Package Detection Rules; (2) Package Measurement Rules; (3) Add Package Object To Queue Rules; (4) Add Package Attributes To Queue Rules; (5) Remove Package Object From Queue Rules; and (6) Reset Package Tracking Queue Rules. It is understood that there are many different ways to analyze the package height profile data elements and implement the six above-described functions, it will be helpful for illustrative purposes, to provide below an example of a rule in each of the six above-described classes. Having the benefit of the present disclosure, one with ordinary skill in the art can write these rules in a straight-forward manner so that the above-described functions of the height profile data analyzer 3510 are realized.

Weighing-in-motion Subsystem of the Third
Illustrative Embodiment of the Present Invention As shown in the FIGS. 47 and 48, the in-motion package weighing subsystem 3700 is preferably arranged about the first multiple package detection and dimensioning subsystem 3300. As in the first and second illustrative system embodiments, the in-motion weighing subsystem 3700 comprises: a scale platform integrated with the conveyor belt 3101, for producing analog or digital weight signals indicative of the weight of a package(s) 3204 moving across the scale platform; a filtering circuit for filtering the analog or digital weight signals in order to remove noise components and artifacts therefrom; and a signal processor for processing the filtered weight signals in order to produce a digital word representative of the measured weight of the package. Notably, the in-motion weighing subsystem of the illustrative embodiment can be used to realize using the 9480 EXPRESSWEIGH™ In-Motion Variable Box and Package Weighing System from Mettler-Toledo, Inc. of Worthington, Ohio.

Package/Belt Velocity Detection Subsystem of the Third Illustrative Embodiment of the Present Invention In the third illustrative system embodiment shown in FIGS. 47 and 48, the package/belt velocity detection subsystem 3800 is realized a number of subcomponents, namely: a roller wheel 3801 engaged against the undersurface of the conveyor belt 3 101; an optical shaft incremental encoder 3802 connected to the axle of the roller wheel 3801 and producing an electrical pulse output stream per revolution of the roller wheel; and a programmed microprocessor 3803 for processing the output pulse stream and producing digital data representative of the velocity of the conveyor belt (and thus package transported thereby) at any instant in time. As shown in FIG. 47, the digital velocity information is provided to an assigned data input port provided by the I/O subsystem 3900.

Input/Output Subsystem of the Third Illustrative Embodiment of the Present Invention In the system shown in FIGS. 47 and 48, the function of the input/output subsystem 3900 is to manage the data inputs to and the data outputs from the data management computer system 3950. In the illustrative embodiment, I/O subsystem 3900 can be realized using one or more rack-mounted I/O adapter boxes, such as the RocketPort Series RM16-RJ45 multiport serial controller having sixteen I/O ports, sold by the Comtrol Corporation, of Saint Paul, Minnesota.

Data Management Computer of the Third Illustrative Embodiment of the Present Invention In the system shown in FIGS. 47 and 48, the function of the data management computer 3925, with a graphical user interface (GUI) 3926, is to provide a powerful computing platform for realizing the data element queuing, handling and processing subsystem 3950 in a real-time manner, in addition to carrying out other data and system management functions. In general, subsystem 3950 is best realized by an computing platform having a multi-tasking operating system capable of handling multiple "threads" at the same time.

The Data Element Queuing Handling and Processing Subsystem of the Third Illustrative Embodiment of the Present Invention FIGS. 49 and 49A, the structure and function of data element queuing, handling and processing subsystem 3950 is shown in greater detail. As shown in FIG. 51, all time-stamped data objects, including PIT, POOT and package data elements associated therewith, are transferred from the moving package tracking queues 3305A through 3305D in subsystem 3300 and the moving package tracking queues 3505A through 3505D in subsystem 3500, to a first I/O unit 395A provided in subsystem 3950. Also, all scan beam data elements (SBDEs) and belt/package velocity measurements are provided to a second I/O unit 3951B, as shown in FIG. 51.

As shown in FIG. 51, each data object entering the subsystem 3950 though I/O unit 3951A is directly loaded into the system event queue 3956 under the control of data controller 3952 without performing any form of time-stamping operation, as these data elements already carry time-stamps placed thereon when generated in the package detection and dimensioning subsystems 3300 and 3500. In the illustrative embodiment, the data controller 3952 is realized as a programmed microprocessor and associated memory structures, whereas the system event queue 3956 is realized as a FIFO data structure known in the computing art. Preferably, data objects obtained from the I/O unit 3951A having earlier time-stamps are loaded into the system event queue 3956 before data objects having more recent time-stamps All incoming scan beam data elements and velocity measurements passing through I/O unit 3951C are time-stamped by the data controller 3952 using time-stamping unit 3953 (referenced to the master clock 3400 shown in FIG. 48), and then loaded into the system event queue 3956 under the control of the data controller 3952, as shown in FIG. 51.

In the data element queuing, handling and processing subsystem 3950, the function of the data element analyzer/handler 3955 is to read the data elements (including data objects) from the output port of the system event queue 3956, and analyze and handle the same according to the data Element Handling Rules set forth in FIGS. 52A and 52B.

As shown in FIG. 51, scan beam data elements generated from "holographic type" laser scanning subsystems in the scanning tunnel must be processed using a. system of data processing modules illustrated in FIG. 51. As shown in FIG. 51, this system of data processing modules comprises a data element combining module 3557A for combining (i) each scan beam data element generated from "holographic-type" laser scanning subsystems and accessed from the system event queue 3956 with (ii) each and every data object (i.e. package data element) in the moving package tracking queues 3954A through 3954D, so as to produce a plurality of combined data element pairs; a package surface geometry modeling module 3958A for generating a geometrical model for the package represented by the package data element in each combined data element pair produced by the data element combining module 3957A; a homogeneous transformation (HG) module 3959A for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance "z" from the package dimensioning position); a scan beam geometry modeling module 3960A for generating a geometrical model for the laser scanning beam represented by the scan beam data element in each combined data element pair produced by the data element combining module 3957A; a homogeneous transformation (HG) module 3961A for transforming (i.e. converting) the coordinates of each scanning beam geometry model referenced to the local frame of reference symbolically embedded within the holographic laser scanning system, into scanning beam geometry model coordinates referenced to the global coordinate reference $R_{global}$ at the "scanning position" within the scanning tunnel; a scan beam and package surface intersection determination module 3962A for determining, for each combined data element pair produced from the data element combining module, whether the globally-referenced scan beam model produced by the HG transformation module 3961A intersects with the globally-referenced package surface model produced by the HG transformation module 3959A and if so, then the data output subsystem 3963A produces, as output, package identification data, package dimension data (e.g. height, length, width data etc.), and package weight data, for use by auxiliary systems associated with the tunnel scanning system of the present invention.

As shown in FIGS. 50 and 51A, scan beam data elements generated from "non-holographic type" laser scanning subsystems must be processed using a different system of data processing modules than that shown in FIG. 51. As shown in FIG. 51A, this system of data processing modules comprises: a data element combining module 3957B (similar to module 3957A) for combining (i) each scan beam data element generated from the "non-holographic-type" bottom-located laser scanning subsystems and accessed from the system event queue 3956 with (ii) each and every package data element in each of the moving package tracking queues 3954A through 3954D so as to produce a plurality of combined data element pairs; a package surface geometry modeling module 3958B (similar to module 3958A) for generating a geometrical model for the package represented by the package data object in each combined data element pair produced by the data element combining module 39657B; a homogeneous transformation (HG) module 3959B (similar to module 3959A) for transforming (i.e. converting) the coordinates of each package surface geometry model produced at the "dimensioning position" in the global coordinate reference frame $R_{global}$, into package surface geometry model coordinates at the "scanning position" within the scanning tunnel (i.e. displaced a distance z from the package dimensioning position); a X-Z scanning surface (geometry) modeling module 3960B for generating a geometrical model for the laser scanning surface represented by the scan beam data element in each combined data element pair produced by the data element combining module 3957B; a homogeneous transformation (HG) module 396 1B for transforming (i.e. converting) the coordinates of each X-Z scanning surface geometry model referenced to the local frame of reference symbolically embedded within the non-holographic bottom laser scanning subsystem, into scanning beam geometry model coordinates referenced to the global coordinate 6 reference $R_{global}$ at the "scanning position" within the scanning tunnel; a scan beam and package surface intersection determination module 3962B for determining, for each combined data element pair produced from the data element combining module 3957B, whether the globally-referenced scanning surface model produced by the HG transformation module 3960B intersects with the globally-referenced package surface model produced by the HG transformation module 3959B, and if so, then the data output subsystem 3963B produces, as output, package identification data, package dimension data (e.g. height, width data etc.), and package weight data, for use by auxiliary systems associated with the tunnel scanning system of the present invention.

Having described the overall structure and function of the data element queuing, handling and processing subsystem 3950, it is appropriate at this juncture to now briefly describe the operation thereof with reference to FIGS. 50 and 50A.

Prior to loading into the system event queue 3956, each scan beam data element (SBDE) and each belt/package velocity measurement (v) is time-stamped (i.e. Tj) by timing stamping unit 3953 which is driven by a clock therewithin referenced to the master clock 3400 in FIG. 48. All data elements in the system event queue 3956 and moving package tracking queues 3954A through 3954D are handled by the data element analyzer/handler 3955 which is governed by the table of Data Element Handling Rules set forth in FIGS. 52A and 52B. In general, data element queuing, handling and processing subsystem 3950 is best realized by an computing platform having a multi-tasking operating system capable of handling multiple "threads" at the same time.

Package data objects removed from system event queue 3956 by data element analyzer/handler 3955 are placed into the appropriate moving package tracking queues 3954A through 3954D based on an analysis of the package dimension data elements associated with removed package data objects. As in the case of the multiple package detection and dimensioning subsystem 3300, each package moving through the scanning tunnel is represented by an "object" in an object-oriented programming environment (e.g. Java programming environment) stored in a moving package tracking queue 3954A through 3954D operably connected to the data element analyzer/handler 3955. Package data objects placed in the appropriate moving package tracking queues 3954A through 3954D, are removed therefrom by the data element analyzer/handler 3955 in accordance with the data element handling rules set forth in the table of FIGS. 52A and 52B.

Scan beam data elements generated from holographic-based scanning units are processed along the scan data processing channel illustrated by blocks 3960A, 396.1A and 3962A set forth in the lower right hand corner of FIG. 51, whereas scan beam data elements generated from non-holographic based scanning units (e.g. from the bottom-located polygon scanners in the tunnel) are processed along a different scan data processing channel illustrated by blocks 3960B, 3961B and 3962B set forth in FIG. 51A. This bifurcation of data element processing is required because scan beam data elements generated from holographic-based scanning units are generated from laser scanning beams (or finite scanning sectors) which can be tracked with scan package identification data using the facet sectors on the scanning disc in issue. While a similar technique can be used for polygon-based scanners (e.g. tracking "mirror sectors" instead of HOE-based facet sectors), a different approach has been adopted in the illustrative embodiment. That is, the scanning surface (e.g. 3×5") of each polygon scanning unit along the bottom scanner is accorded a vector-based surface model, rather than ray-type model used for package identification data collected using holographic scanning mechanisms.

The Package Surface Geometry Modeling Subsystem of the Third Illustrative Embodiment of the Present Invention As shown in FIG. 53A, a surface geometry model is created for each package surface by the package surface geometry modeling subsystem (i.e. module) 3958A deployed with the data element queuing, handling and processing subsystem 3950 of FIG. 51. In the illustrative embodiment, each surface of each package transported through multiple package detecting and dimensioning subsystem 3300 is mathematically represented (i.e. modeled) using at least three position vectors (referenced to x=0, y=0, z=0) in the global reference frame $R_{global}$, and a normal vector to the package surface indicating the direction of incident light reflection therefrom. The table of FIG. 51A describes a preferred procedure for creating a vector-based surface model for each surface of each package transported through the multiple package detecting and dimensioning subsystem 3300 in the system 3000 hereof.

The Scan Beam Geometry Modeling Subsystem of the Third Illustrative Embodiment of the Present Invention As described in FIG. 54, a vector-based model is created by the scan beam geometry modeling subsystem (i.e. module) 3960A of FIG. 51, which is similar to structure and function as scan beam geometry modeling subsystem 1010A shown in, FIG. 22. The function of this subsystem is to geometrically model the propagation of the laser scanning beam (ray) emanating from a particular point on the facet, to its point of reflection on the corresponding beam folding mirror, towards to the focal plane determined by the focal length of the facet. Details of this modeling procedure can be found in Applicant's copending application Ser. No. 08/726,522 filed Oct. 7, 1996; and 08/573,949 filed Dec. 18, 1995.

The Scan Surface Modeling Subsystem of the Third Illustrative Embodiment of the Present Invention FIG. 55 schematically shows how the scan surface modeling subsystem (i.e. module) shown of FIG. 51A can be used to define a vector-based 2-D surface geometry model for each candidate scan beam generated by the polygonal-based bottom scanners in the tunnel scanning system. As shown in FIG. 54, each omnidirectional scan pattern produced from a particular polygon-based bottom scanning unit is mathematically represented (i.e. modeled) using four position vectors (referenced to x=0, y=0, z=0) in the global reference frame $R_{global}$, and a normal vector to the scanning surface indicating the direction of laser scanning rays projected therefrom during scanning operations. This modeling subsystem is substantially the same as subsystem 1010B shown in FIG. 22A.

The Homogeneous (HG) Transformation Modules of the Third Illustrative Embodiment of the Present Invention FIG. 56 schematically describes how the homogeneous (HG) transformation module 3961A of FIG. 51 uses homogeneous transformations to convert a vector-based model within a local scanner coordinate reference frame $R_{localscannerj}$ into a corresponding vector-based model created within the global scanner coordinate reference frame $R_{global}$. This mathematical technique is essential in that it converts locally-referenced coordinates used to represent a laser beam (which scanned a bar code symbol) into globally-referenced coordinates used to represent the same laser scanning beam. Module 3961A is similar to module 100A in FIG. 22. T FIG. 57 illustrates how HG transformation module 3959A is used to convert a vector-based package surface model specified within the global coordinate reference frame $R_{global}$ at the "package profiling position", into a corresponding vector-based package surface model created within the global coordinate reference frame $R_{global}$ specified at the "scanning position" within the tunnel scanning system. This mathematical technique is essential in that it converts locally-referenced coordinates used to represent a package surface into globally-referenced coordinates used to represent the same package surface. Notably, this method of coordinate conversion, similar to that disclosed in FIG. 30, involves computing the package travel distance (z=d) between the package profiling and scanning positions using (1) the package or conveyor belt velocity (v) and the difference in time (i.e. $\Delta T = T1-T2$) indicated by the time stamps (T1 and T2) placed on the package data element and scan beam data element, respectively, matched thereto during each scan beam/package surface intersection determination carried out within module 3962A in the data element queuing, handling and processing subsystem 3000. Notably, this package displacement distance z=d between the profiling and scanning positions is given by the mathematical expression $d = v \Delta T$.

The Scan Beam and Package Surface Intersection Determination Subsystem of the Third Illustrative Embodiment of the Present Invention for Use with Scan Beam Data Elements Produced by Holographic Scanning Subsystems FIGS. 58A and 58B, taken together, describes a procedure which is carried out within the scan beam and package surface intersection determination module 3962A of the illustrative embodiment in order to determine whether (i) the scan beam (rays) associated with a particular scan beam data element produced by a holographic scanning subsystem intersects with (ii) any surface on the package that has been scanned at a particular scanning position, and thus whether to correlate a particular package identification data element with particular package measurement 1 data element acquired by the system.

As indicated at Block A in FIG. 58A, the first step of the procedure involves using the minimum and maximum scan rays models of the laser scan beam to determine the intersection point between the scan ray and a surface on the package (using the vector-based models thereof) referenced to the global coordinate reference frame. As indicated at Block B in FIG. 58A, if an intersection point has been determined at Block A, then confirm that the sign of the normal vector of the surface is opposite the sign of the scan ray direction vector. As indicated at Block C in FIG. 58A, if the sign of the normal vector is opposite the sign of the scan ray direction vector, then determine if the intersection point (found at Block A) falls within the spatial boundaries of the package surface. As indicated at Block D in FIG. 58B, if the intersection point t falls within the boundaries of the surface, then output a data element to the output queue in the data output subsystem 3963A, wherein the data element comprises package identification data and data representative of the dimensions and measurements of the package by the system for use by other subsystems. When a scan beam data element taken from the scan beam data element queue 3956 is correlated with a package data element (i.e. object) using the above described method, then the subsystem 3963A outputs a data element (in an output data queue) containing the package ID data and the package dimensional and measurement data. Such data elements I can be displayed graphically, printed out as a list, provided to sorting subsystems, shipping pricing subsystems, routing subsystems and the like.

The Scan Surface and Package Surface Intersection Determination Subsystem of the Third Illustrative Embodiment of the Present Invention for Use with Scan Beam Data Elements Produced by Non-holographic Scanning Subsystems FIGS. 59A and 59B, taken together, describes a procedure which can be carried out within the scan surface and package surface intersection determination module 3962B of FIG. 51A in order to determine whether the scanning surface associated with a particular scan beam data element produced by a non-holographic (e.g. polygon-based) "bottom-located" scanning subsystem spatially intersects with any surface on the package that has been scanned at a particular scanning position, and thus whether to correlate a particular package identification data element with particular package measurement data element acquired by the system.

As indicated at Block A in FIG. 59A, the first step of the procedure involves using the vector-based surface models of the laser scan surfaces of the bottom polygon scanners and side surfaces of the packages so as to determine whether or not there exists a point of intersection between the scanning surface of the polygon-based scanners and any surface of the package. As indicated at Block B in FIG. 59A, if an intersection point exists, then confirm that the sign of the vector model of the scanning surface (i.e. the normal vector) is opposite the sign of the vector model of the package surface. As indicated at Block C in FIG. 59B, if the sign of the normal vector of the scanning surface is opposite the sign of the normal vector to the package surface, then confirm that certain of the points bounded by the scanning surface coincide with points bounded by the surface of the package. As indicated at Block D in FIG. 59B, if sufficient overlap is found to exist between the scanning surface and the package surface, then output a data element to the output queue in the data output subsystem 3963B, wherein the data element comprises package identification data and data representative of the dimensions and measurements of the package by the system for use by other subsystems. When a scan beam data element taken from the system event queue 3956 is correlated with a package data element using the above described method, then the subsystem 3963B outputs a data element (in an output data queue) containing the package ID data and the package dimensional and measurement data. Such data elements can be displayed graphically, printed out as a list, provided to sorting subsystems, shipping pricing subsystems, routing subsystems and the like.

Notably, the smaller the facet sectors on the scanning disc, then the better resolution the system hereof will have with regarding to correlating package identification data with package measurement data. As the facet sector gets small, the corresponding minimum and maximum facet angles generated from the decoder device hereof will get closer and closer, approaching a single scanning ray in the ideal situation.

Modifications of the Illustrative Embodiment

While the package conveyor subsystems employed in the illustrative embodiments have utilized belt or roller structure to transport package, it is understood that this subsystem can be realized in many ways, for example: using trains running on tracks passing through the laser scanning tunnel; mobile transport units running through the scanning tunnel installed in a factory environment; robotically-controlled platforms or carriages supporting packages, parcels or other bar coded objects, moving through a laser scanning tunnel subsystem.

Advantages and Other Features of the System of the Present Invention

The tunnel scanning systems of the illustrative embodiments describe hereinabove can read different bar code symbologies (e.g. Interleaved two of five, Code 128 and Code three of nine) and formats so as to sort and identify packages at various package rates required by USPS or other end-users. The systems of the illustrative embodiments can read the ZIP Code (six digits), Package Identification Code (PIC) (sixteen characters) and Tray bar code (ten digits) symbols.

The tunnel scanning systems hereof can be configured so that all of the products passing through the "tunnel" shall be scanned and read for the valid USPS bar coded symbols regardless of the position of the bar code symbol on the surface of the product. This also includes the bottom surface of the product.

The tunnel scanning system hereof can be provided with additional equipment including, for example, tachometers, dimensioning units, support structures, special power units (if required), air compressors and any other support equipment required by an application at hand.

Preferably, the tunnel scanning systems of the illustrative embodiments are constructed using standard interfaces such that scanners, decoders, concentrator, etc. are interchangeable.

The tunnel scanning systems hereof can read bar coded symbols through the entire population of tray and tub label holders in use by the USPS, and other package or parcel carriers. In addition, the tunnel scanning systems can read bar code symbols on the package products K when the bar code symbol label is placed under diaphanous materials.

There will be more than one bar code symbol on many of the packages found in the tunnel system hereof. Some of these symbols will not be valid USPS symbols. If there are multiple symbols on a package, the scanner logic will automatically identify and process only the USPS valid symbols.

The tunnel scanning systems of the illustrative embodiments can process all types of products (e.g. trays and tubs having extremely large variance in surface types, colors, and plastics (e.g. Tyvek material, canvass, cardboard, polywrap, Styrofoam, rubber, dark packages). some of these product types include: softpack-pillows, bags; package having non-flat bottoms, such as flats, trays, and tubs with and without bands; cartons; rugs; duffel bags (without strings a or metal clips); tires; wooden containers; and sacks.

It is understood that the laser scanning systems, modules, engines and subsystems of the illustrative embodiments may be modified in a variety of ways which will become readily apparent to those skilled in the art, and having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. An automated package identification and dimensioning system capable of (i) identifying packages bearing bar code symbols, and (ii) measuring dimensional characteristics of said packages during package transport operations, said automated package identification and dimensioning system comprising:

a conveyor belt structure for transporting packages along a predetermined direction of travel;

a support framework arranged above said conveyor belt structure, for supporting a package identification subsystem providing a tunnel-like arrangement above said conveyor belt structure through which said conveyor belt structure extends and along which said packages are transported in an automated manner, wherein said tunnel-like arrangement has an entry port and an exit port;

said package identification subsystem being mounted from said scanner framework and projecting a plurality of laser scanning beams that produce a laser scanning pattern confined substantially within a three-dimensional laser scanning volume disposed above said conveyor belt structure, so that when each said package is transported through said three-dimensional laser scanning volume, the bar code symbol on said package is automatically read by at least one laser scanning beam and a scan beam data element is automatically generated, wherein said scan beam data element includes (i) symbol character data representative of the bar code symbol read by at least one said laser scanning beam and thus the identity of said package, and (ii) laser scanning beam index data indicative of said at least one laser scanning beam used to read said bar code symbol;

a package dimensioning subsystem, mounted above said conveyor belt structure and before said entry port of said tunnel scanning arrangement, for optically scanning each said package as said package is transported through said three-dimensional laser scanning volume, and automatically generating a package dimension data element for each optically scanned package, wherein each said package dimension data element contains package dimension-related data representative of one or more dimension-related characteristics of said optically scanned package;

a data element handling and processing subsystem for processing said scan beam data elements and said package dimension data elements, and attempting to correlate one said scan beam data element to each said package dimension data element, and for each pair of correlated scan beam and package dimension data elements, generating an output data element containing the scan beam data element correlated with the package dimension data element, thereby identifying each said package transported through said three-dimensional laser scanning volume while providing a measure of the dimensional characteristics thereof in an automated manner.

2. The automated package identification and dimensioning system of claim 1, wherein said package identification subsystem comprises one or more laser scanning subsystems, and wherein the laser scanning pattern produced by each said laser scanning subsystem has multiple focal planes and a highly confined geometry extending about a projection axis extending from a scanning window provided within said laser scanning subsystem and above said conveyor belt structure.

3. The automated package identification and dimensioning system of claim 2, wherein said plurality of laser scanning subsystems are mounted within the corners of said scanner support framework, on the top and sides of said scanner support framework, and on the front and back of said scanner support framework.

4. The automated package identification and dimensioning system of claim 2, which further comprises a computer system interfaced with said plurality of laser scanning subsystems through a input/output port multiplier, said computer system supporting functions carried out by said data element handling and processing subsystem.

5. The automated package identification and dimensioning system of claim 2, wherein each said laser scanning subsystem is a holographic laser scanning system.

6. The automated package identification and dimensioning system of claim 2, wherein each said laser scanning subsystem is a holographic laser scanning subsystem having a holographic scanning disc with a plurality of scanning facets, and each, said scanning facet consists of a plurality of scanning sectors, and wherein said laser scanning beam index data is representative of the scanning sector(s) used to produce the laser scanning beam that read said package.

7. The automated package identification and dimensioning system of claim 2, wherein each said laser scanning subsystem is a polygonal laser scanning subsystem having a polygonal scanning disc with a plurality of scanning facets, and each said scanning facet consists of a plurality of scanning sectors, and wherein said laser scanning beam index data is representative of the scanning sector(s) used to produce the laser scanning beam that read said package.

8. The automated package identification and dimensioning system of claim 1, wherein said three-dimensional laser scanning volume has a widthwise dimension of at least about 1 meter extending along the width dimension of said conveyor belt structure, a lengthwise dimension of at least 1 meter extending along said predetermined direction of travel, and a heightwise dimension of at least 1 meter extending above said conveyor belt structure.

9. The automated package identification and dimensioning system of claim 1, which further comprises a package velocity determination subsystem for automatically determining the velocity of each said package being transported along said conveyor belt structure, generating a velocity data element representative of said package velocity, and providing said velocity data element to said data element handling and processing subsystem.

10. The automated package identification and dimensioning system of claim 1, wherein said package dimensioning subsystem comprises a pair of light transmitting and receiving structures mounted about said conveyor belt structure.

11. The automated package identification and dimensioning system of claim 1, wherein said dimensional characteristics include one or more dimensions of said package.

* * * * *